(12) United States Patent
Lee et al.

(10) Patent No.: US 12,374,481 B2
(45) Date of Patent: Jul. 29, 2025

(54) LENS DRIVING DEVICE, CAMERA MODULE, AND OPTICAL DEVICE

(71) Applicant: LG INNOTEK CO., LTD., Seoul (KR)

(72) Inventors: Sung Guk Lee, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 471 days.

(21) Appl. No.: 17/637,935

(22) PCT Filed: Sep. 8, 2020

(86) PCT No.: PCT/KR2020/012121
§ 371 (c)(1),
(2) Date: Feb. 24, 2022

(87) PCT Pub. No.: WO2021/049853
PCT Pub. Date: Mar. 18, 2021

(65) Prior Publication Data
US 2022/0285064 A1    Sep. 8, 2022

(30) Foreign Application Priority Data

Sep. 9, 2019 (KR) .......... 10-2019-0111746
Nov. 7, 2019 (KR) .......... 10-2019-0141616
Dec. 11, 2019 (KR) .......... 10-2019-0164436

(51) Int. Cl.
*H01F 7/08* (2006.01)
*G02B 27/64* (2006.01)
(Continued)

(52) U.S. Cl.
CPC .......... *H01F 7/081* (2013.01); *G02B 27/646* (2013.01); *G03B 5/04* (2013.01); *G03B 13/36* (2013.01);
(Continued)

(58) Field of Classification Search
CPC ........ G02B 27/646; G03B 5/04; G03B 13/36; G03B 2205/0015; G03B 2205/0069; H01F 7/081
(Continued)

(56) References Cited

U.S. PATENT DOCUMENTS

2016/0139425 A1   5/2016   Park et al.
2017/0123180 A1   5/2017   Osaka et al.
(Continued)

FOREIGN PATENT DOCUMENTS

EP        3 521 922 A1    8/2019
JP        2016-95514 A    5/2016
(Continued)

*Primary Examiner* — Wyatt A Stoffa
*Assistant Examiner* — Grant A Gagnon
(74) *Attorney, Agent, or Firm* — Birch, Stewart, Kolasch & Birch, LLP

(57) ABSTRACT

An embodiment of the present invention relates to a lens driving device comprising: a base; a housing; a bobbin; a first magnet; a first coil; a first substrate including a second coil; an upper elastic member; a lateral elastic member; a second magnet; and a sensor, wherein the bobbin comprises a recess in which the second magnet is disposed; the upper elastic member comprises an inner portion coupled to the bobbin, an outer portion coupled to the housing, and a connection part connecting the inner portion and the outer portion to each other, and the inner portion includes a first region overlapping the second magnet in the optical axis direction.

20 Claims, 66 Drawing Sheets

(51) Int. Cl.
*G03B 5/04* (2021.01)
*G03B 13/36* (2021.01)

(52) U.S. Cl.
CPC ............ *G03B 2205/0015* (2013.01); *G03B 2205/0069* (2013.01)

(58) Field of Classification Search
USPC ........................................ 359/824
See application file for complete search history.

(56) References Cited

U.S. PATENT DOCUMENTS

| | | |
|---|---|---|
| 2017/0235094 A1 | 8/2017 | Osaka et al. |
| 2020/0033699 A1 | 1/2020 | Kim |
| 2020/0081220 A1 | 3/2020 | Lee |
| 2021/0181455 A1 | 6/2021 | Park et al. |

FOREIGN PATENT DOCUMENTS

| | | |
|---|---|---|
| JP | 2018-4718 A | 1/2018 |
| KR | 10-2016-0023386 A | 3/2016 |
| KR | 10-2016-0094636 A | 8/2016 |
| KR | 10-2016-0148281 A | 12/2016 |
| KR | 10-2017-0017919 A | 2/2017 |
| KR | 10-2017-0032242 A | 3/2017 |
| KR | 10-2018-0037690 A | 4/2018 |
| KR | 10-2018-0098078 A | 9/2018 |
| KR | 10-2018-0129358 A | 12/2018 |
| KR | 10-2019-0018222 A | 2/2019 |
| WO | WO 2016/006168 A1 | 1/2016 |
| WO | WO 2016/133288 A1 | 8/2016 |
| WO | WO2018/062809 A1 | 4/2018 |
| WO | WO 2018/186674 A1 | 10/2018 |
| WO | WO 2019/027199 A1 | 2/2019 |

[FIG. 1]
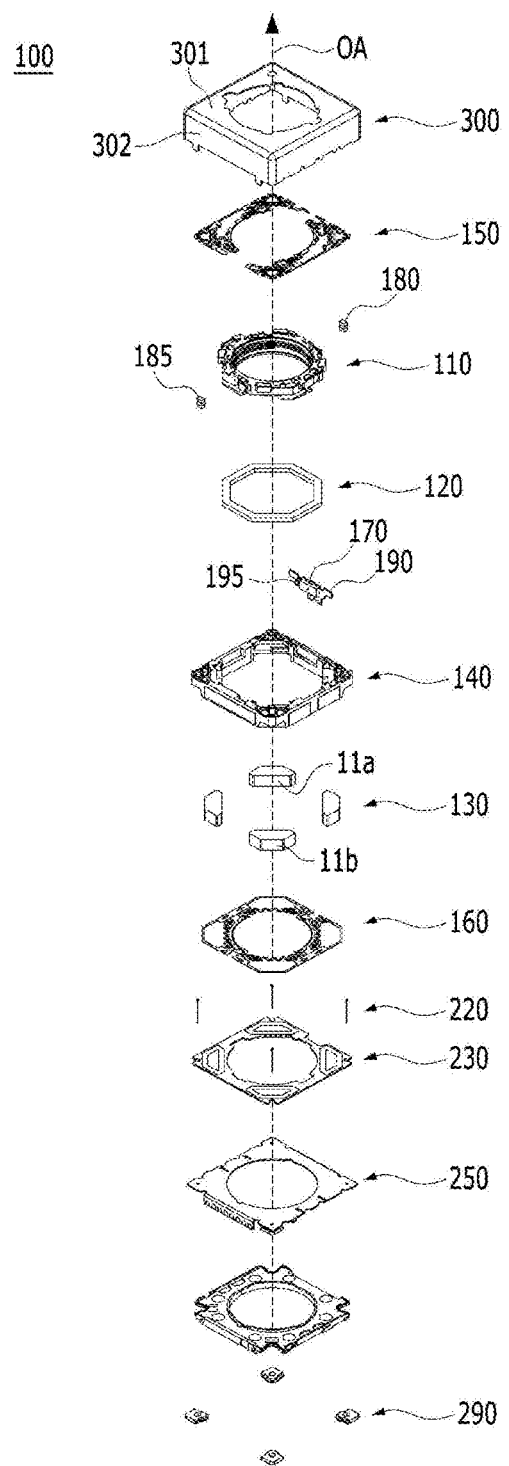

[FIG. 2]
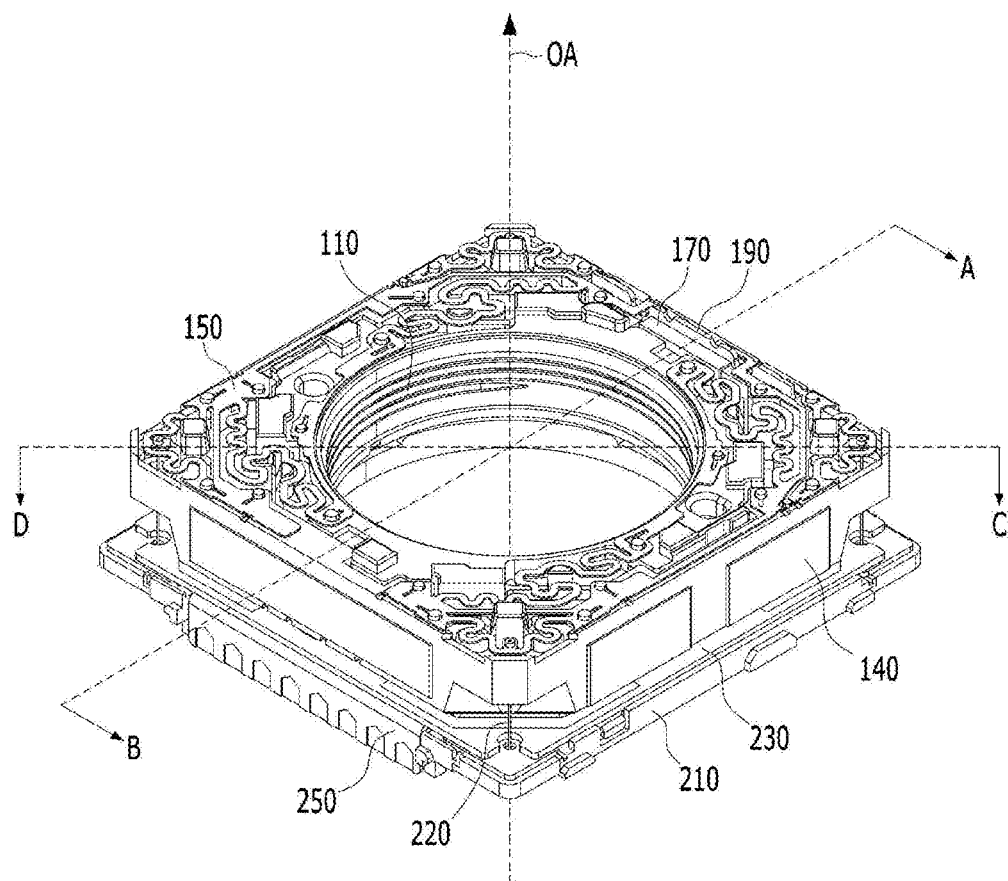

[FIG. 3a]
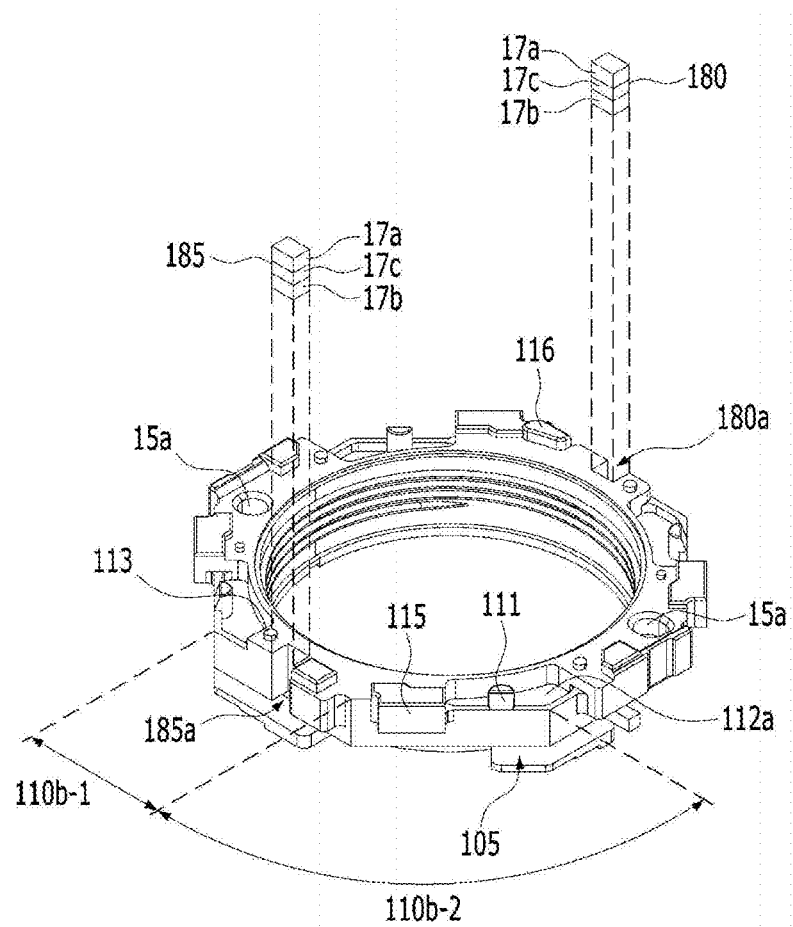

[FIG. 3b]
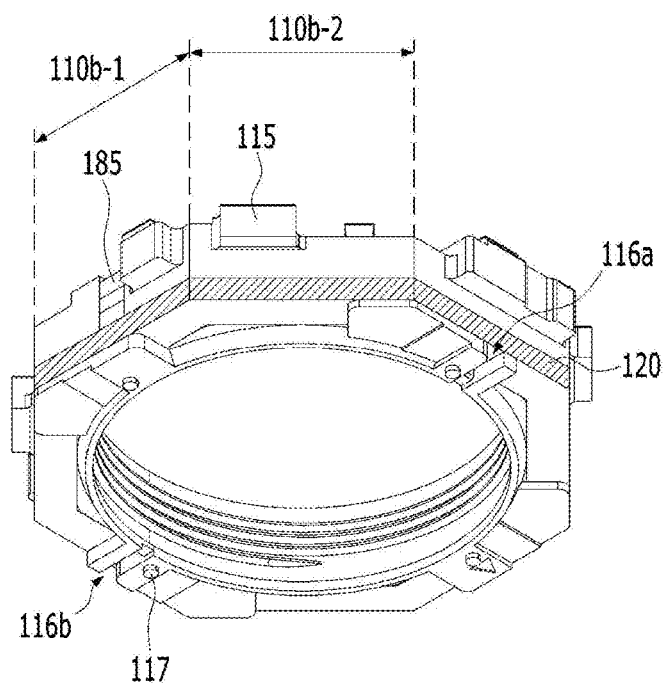

[FIG. 4a]
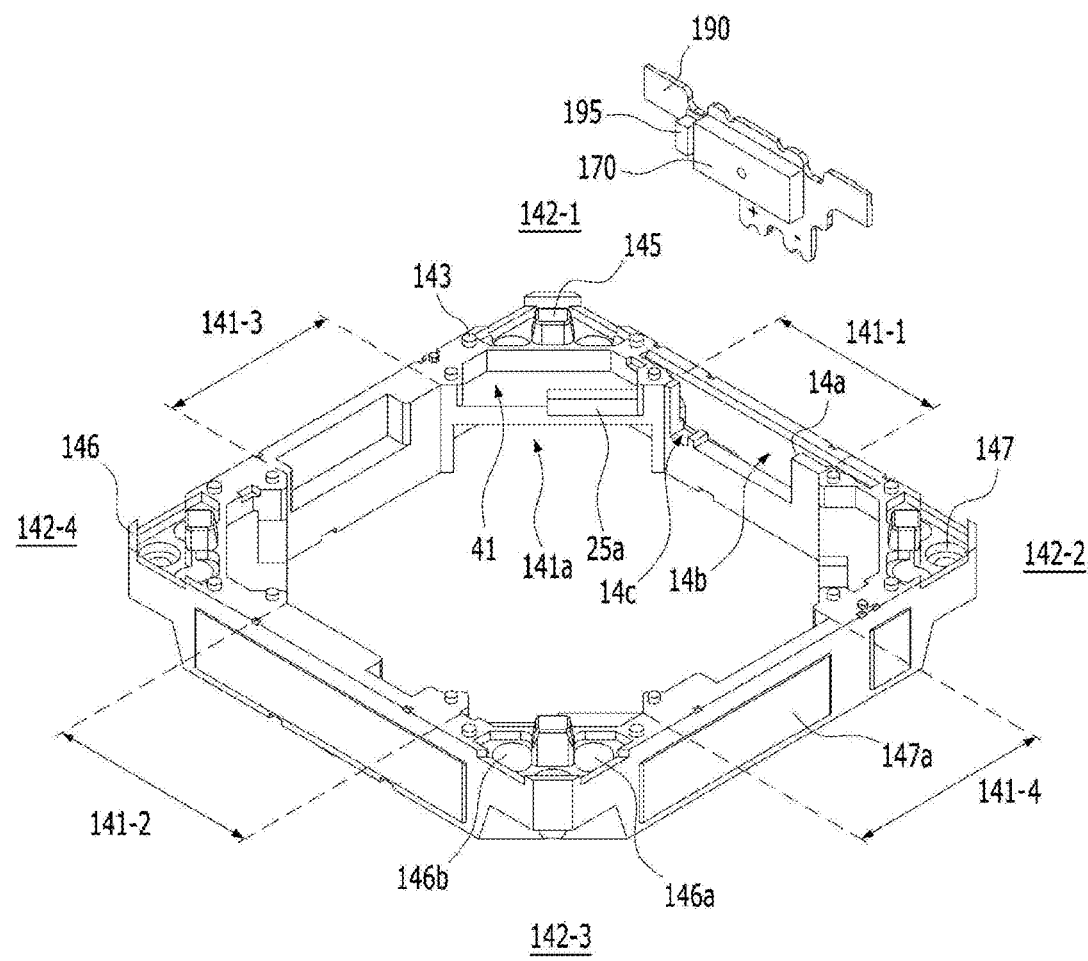

[FIG. 4b]
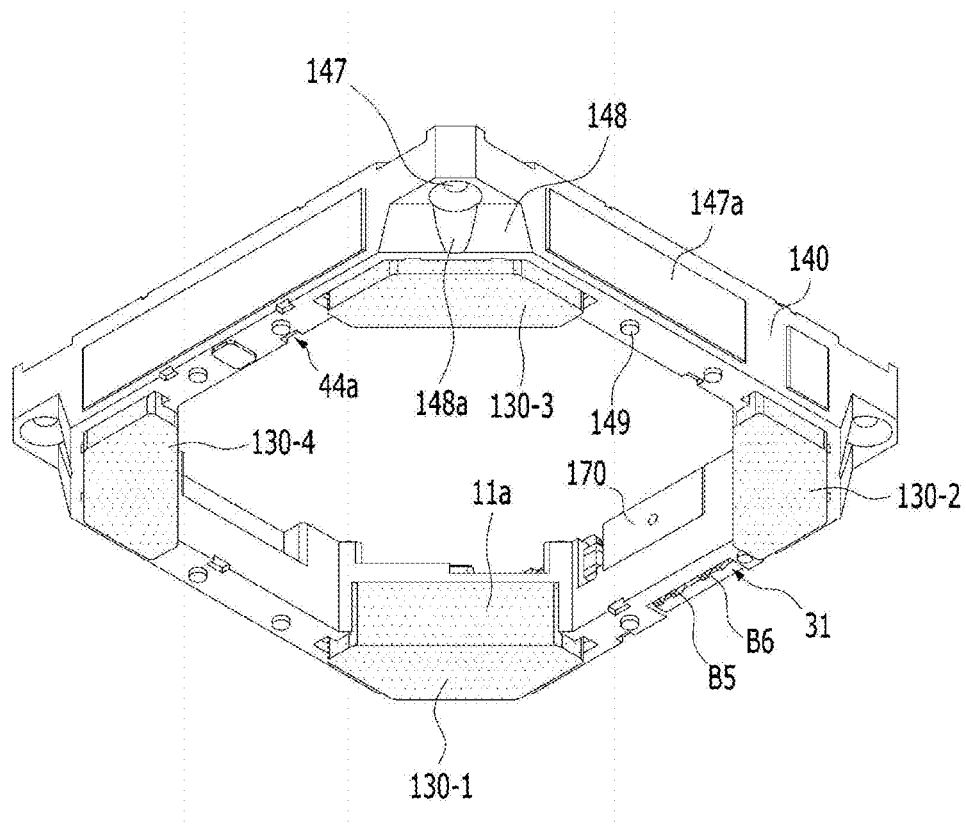
[FIG. 5]
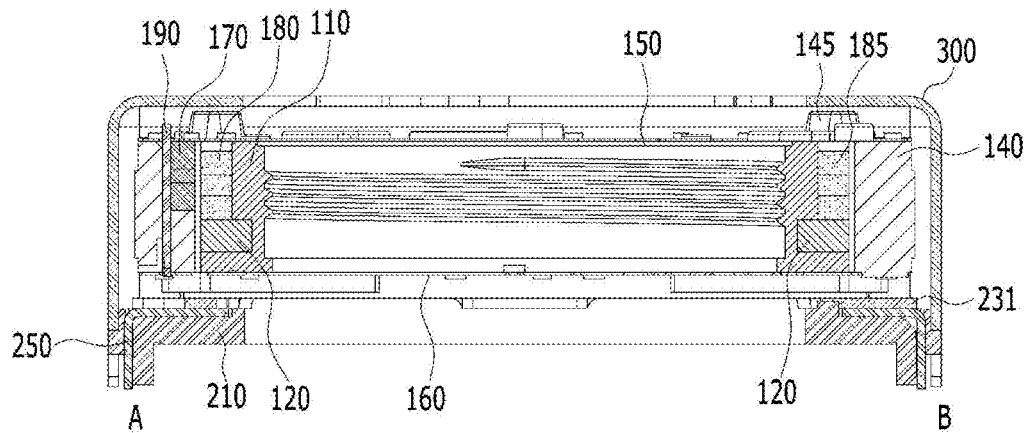

[FIG. 6]
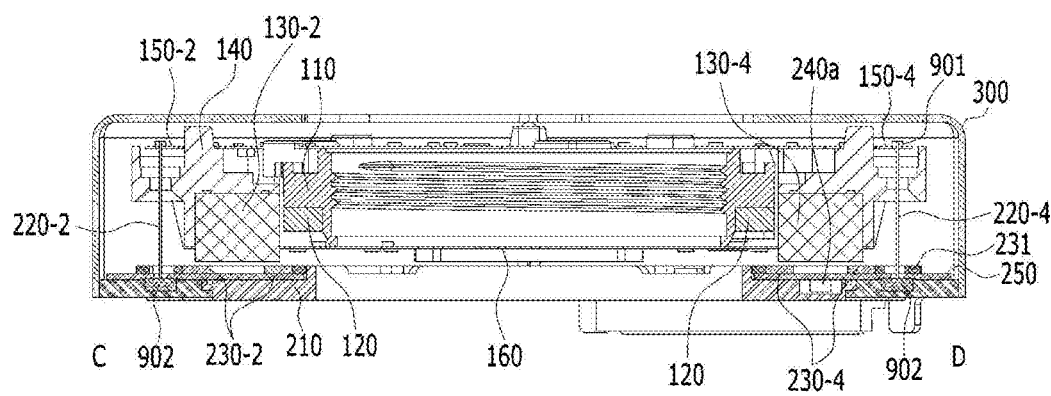
[FIG. 7a]
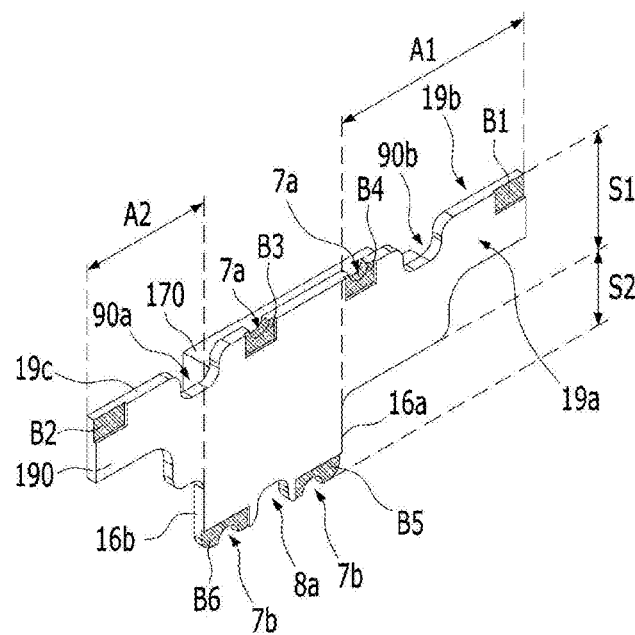

[FIG. 7b]
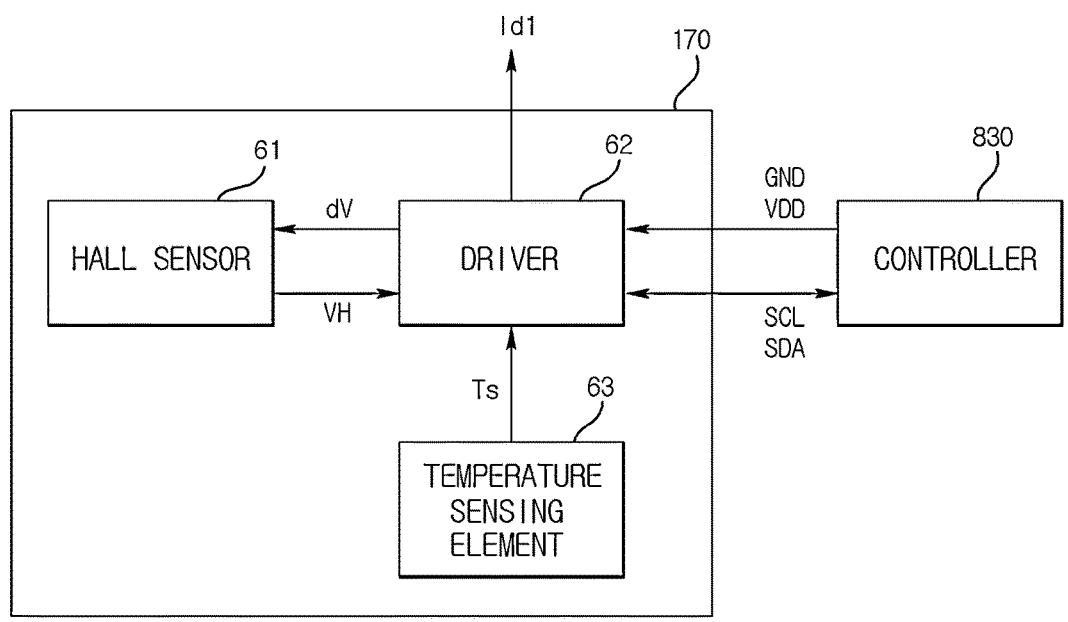

[FIG. 8]
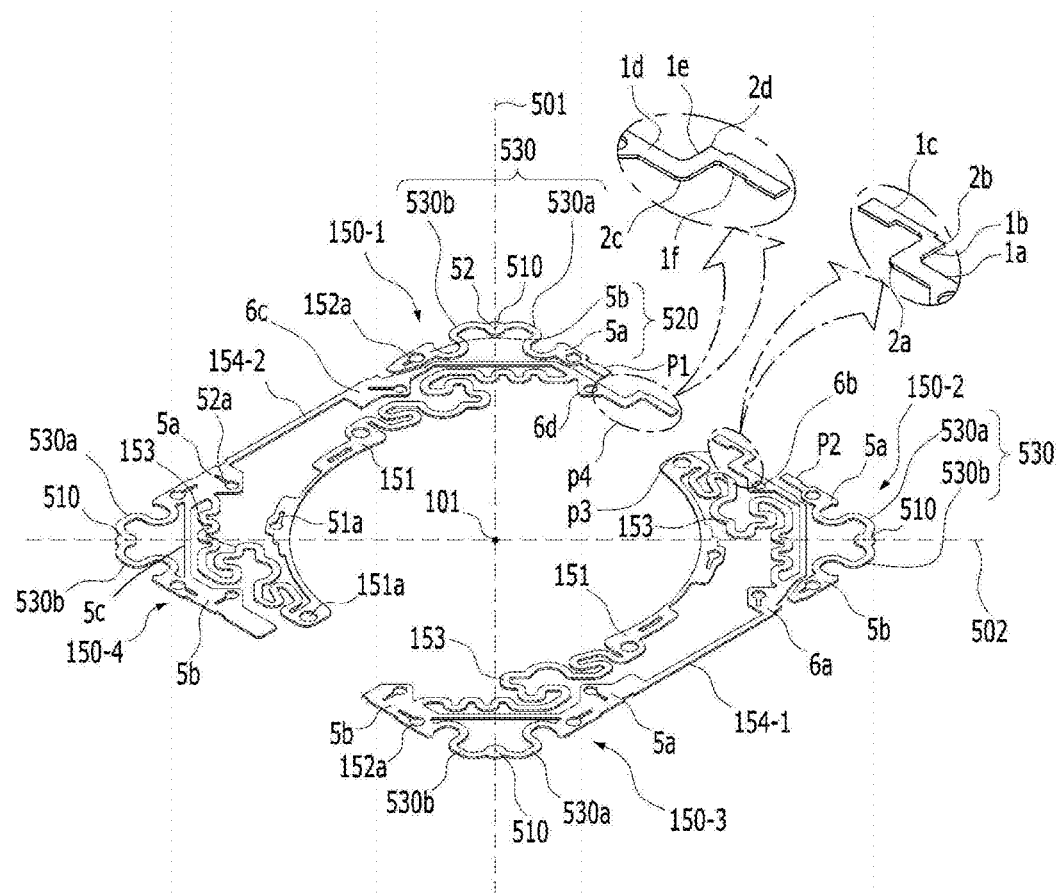

[FIG. 9]
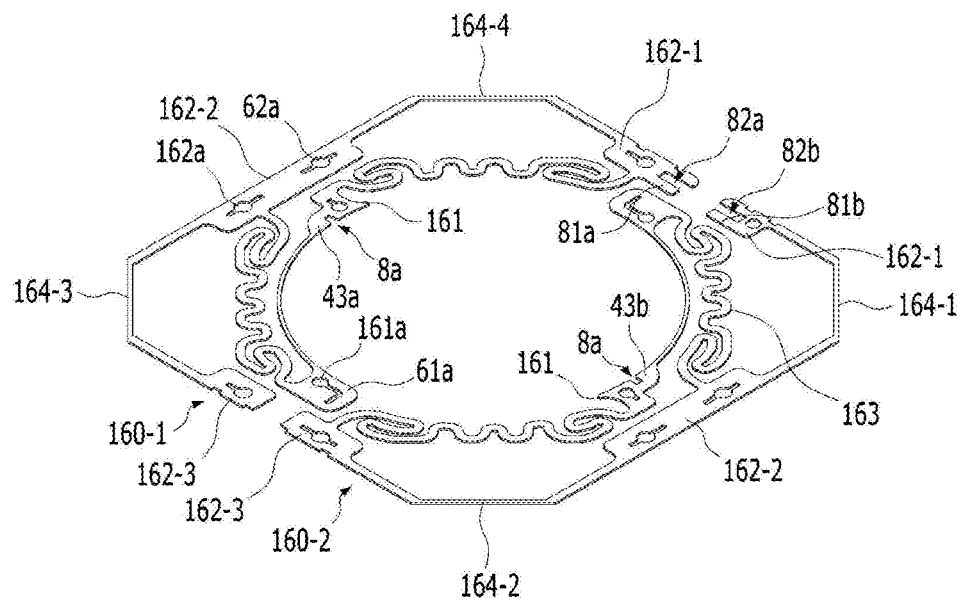
[FIG. 10]
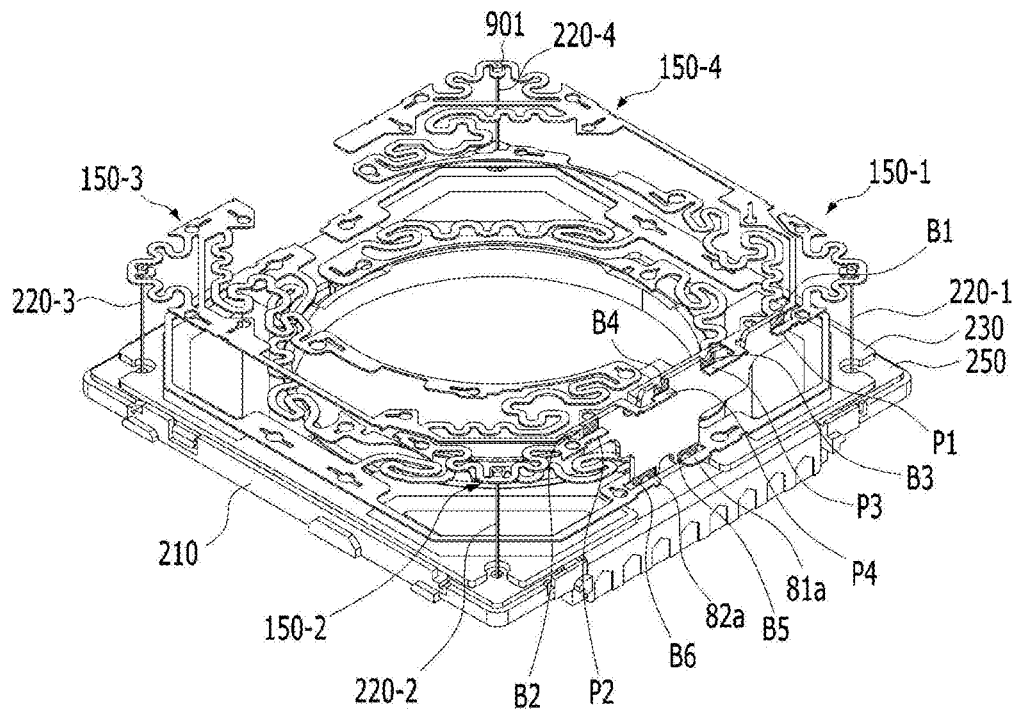

[FIG. 11]
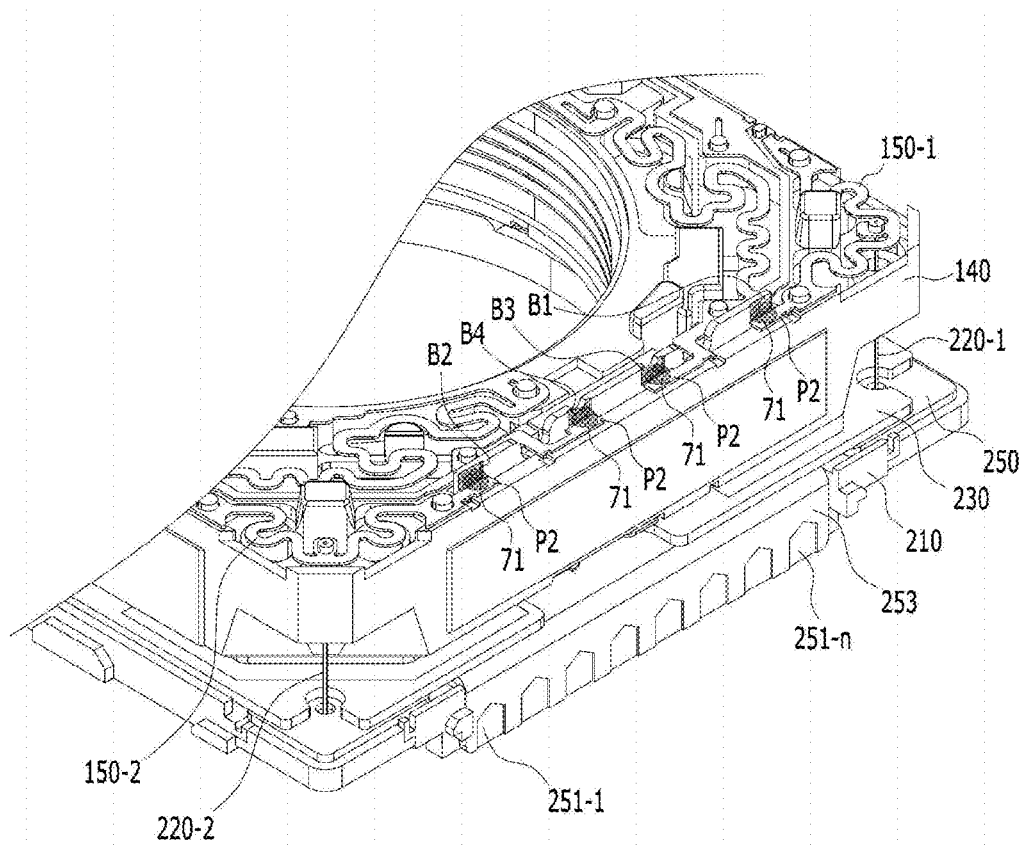

[FIG. 12]
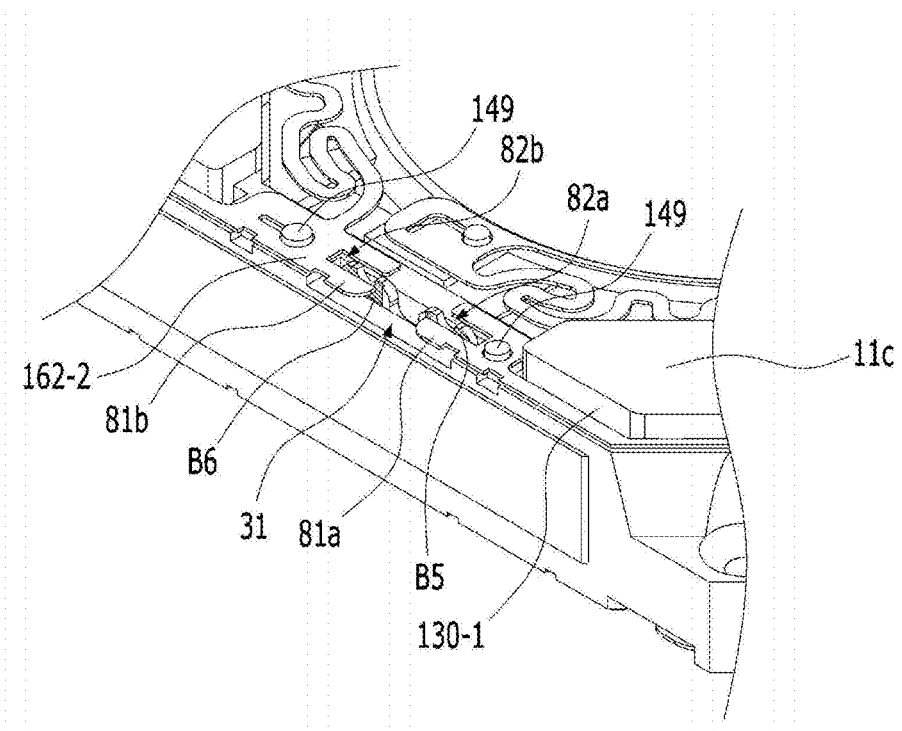

[FIG. 13]
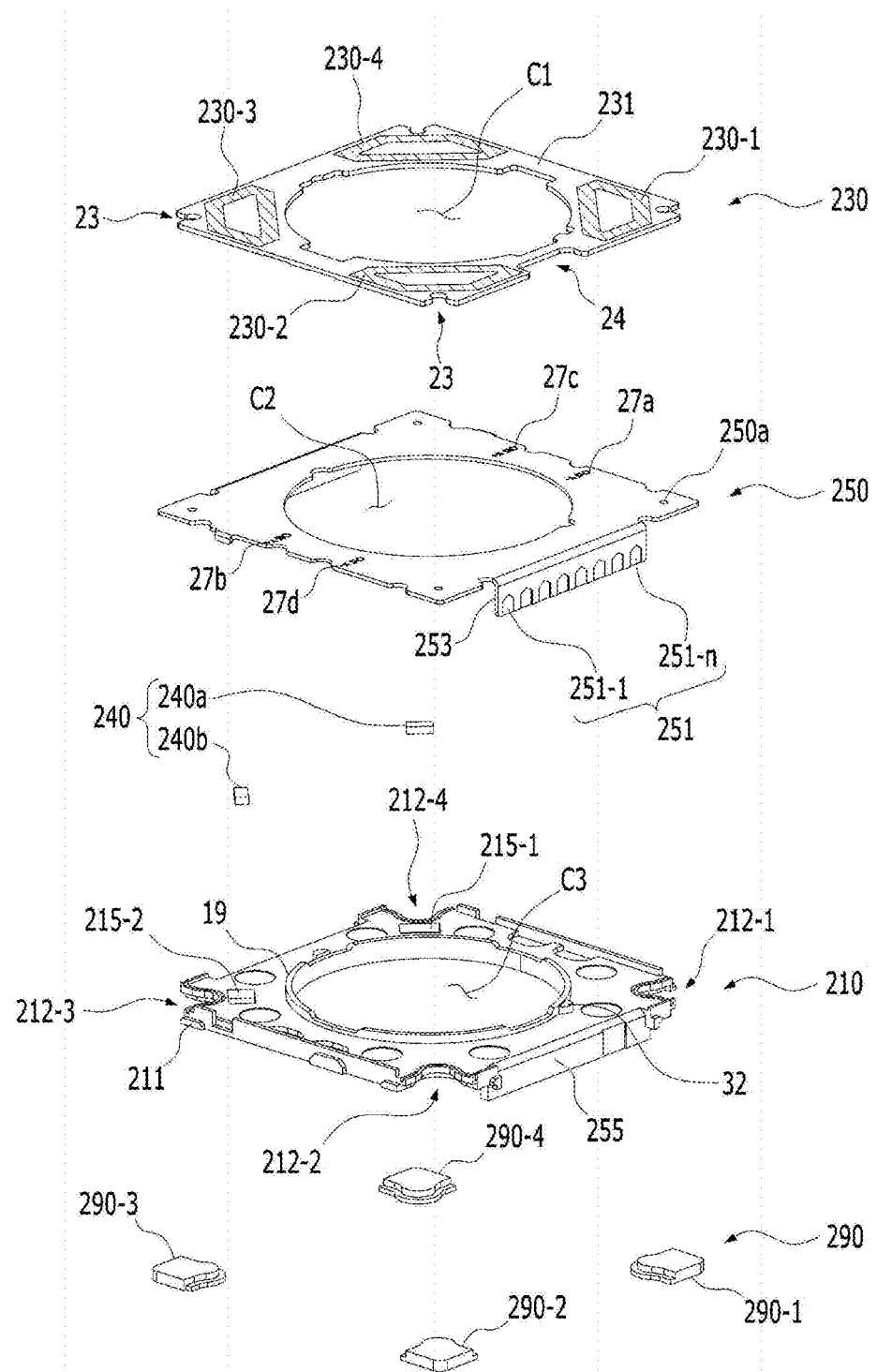

[FIG. 14]
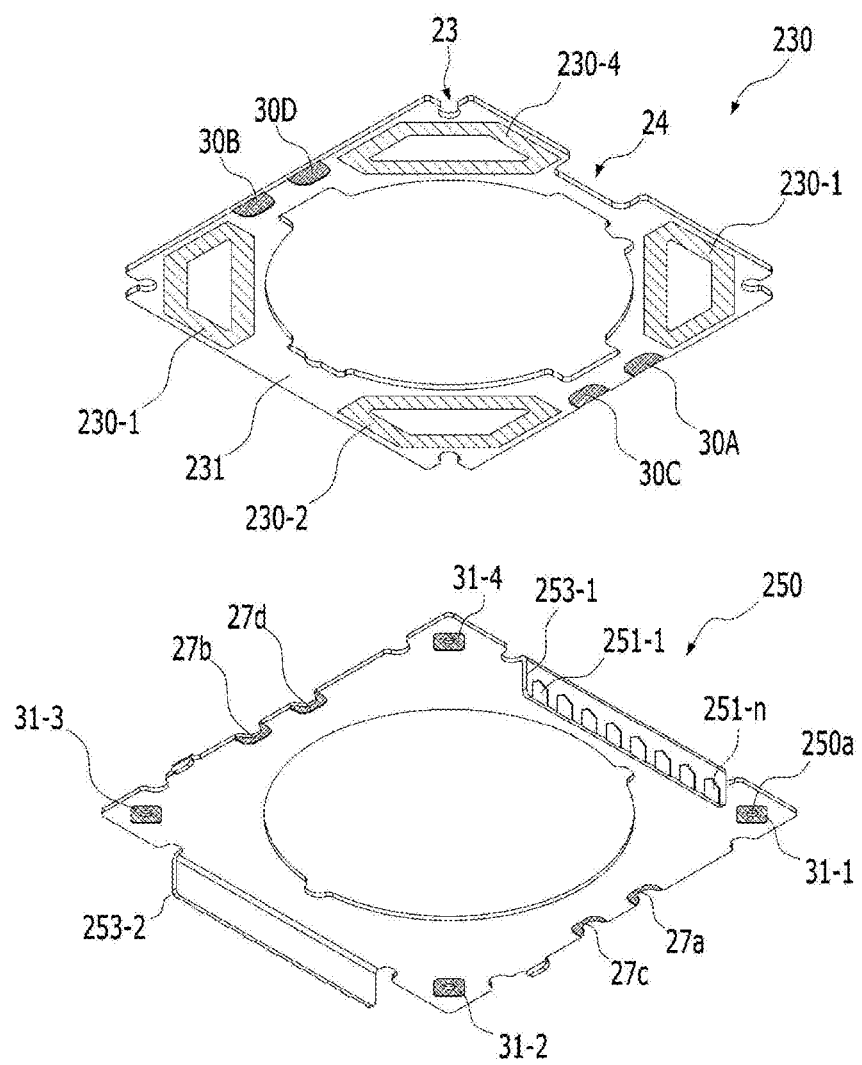

[FIG. 15]
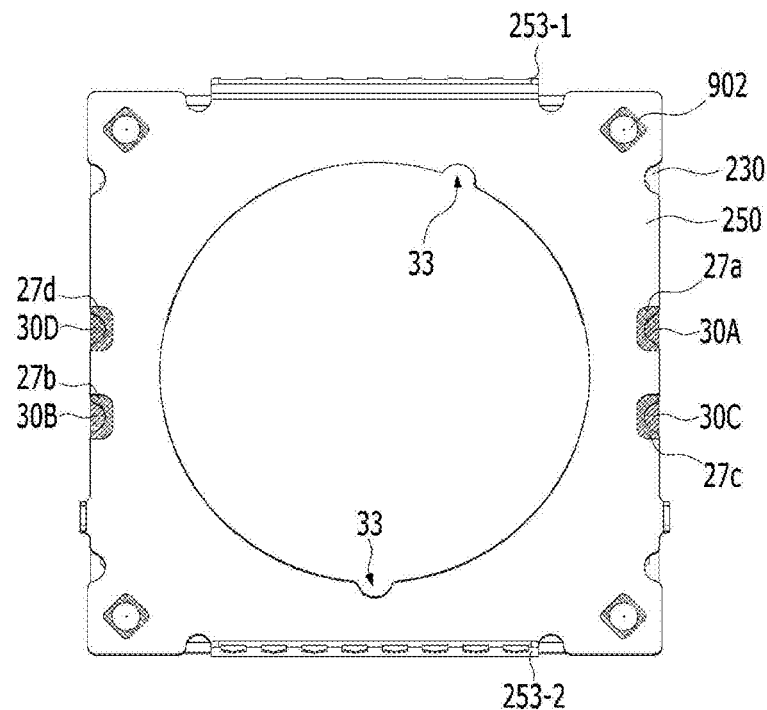
[FIG. 16]
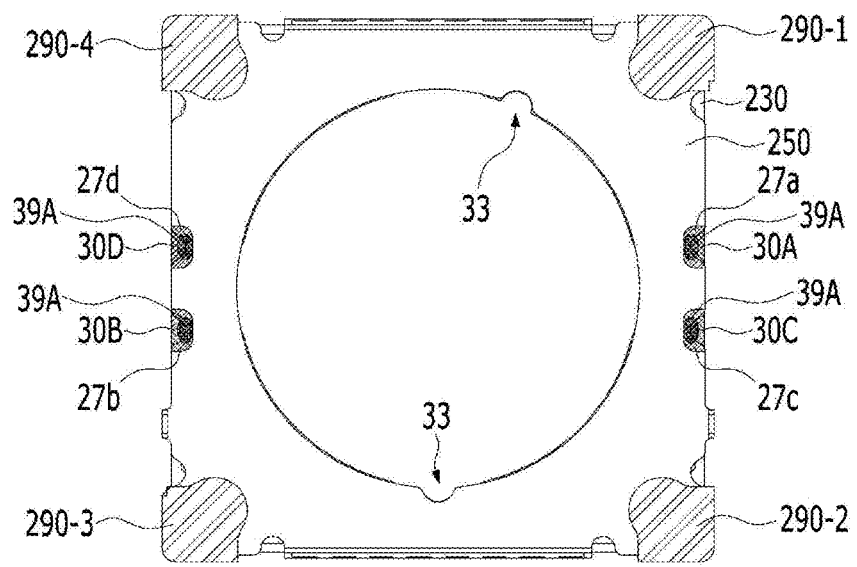

[FIG. 17]
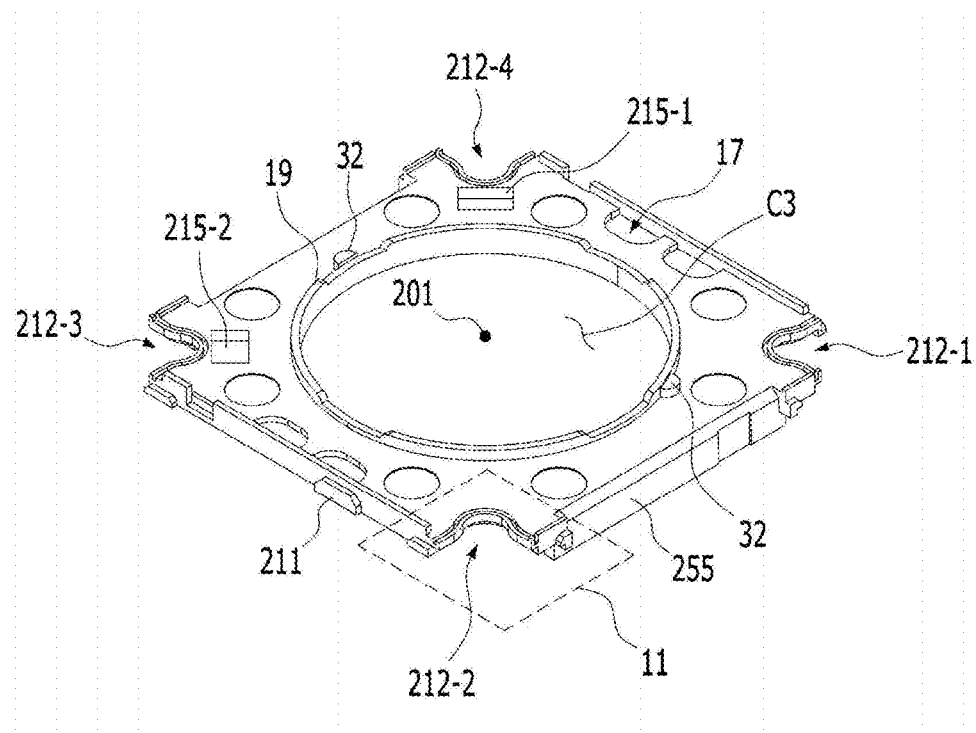
[FIG. 18a]
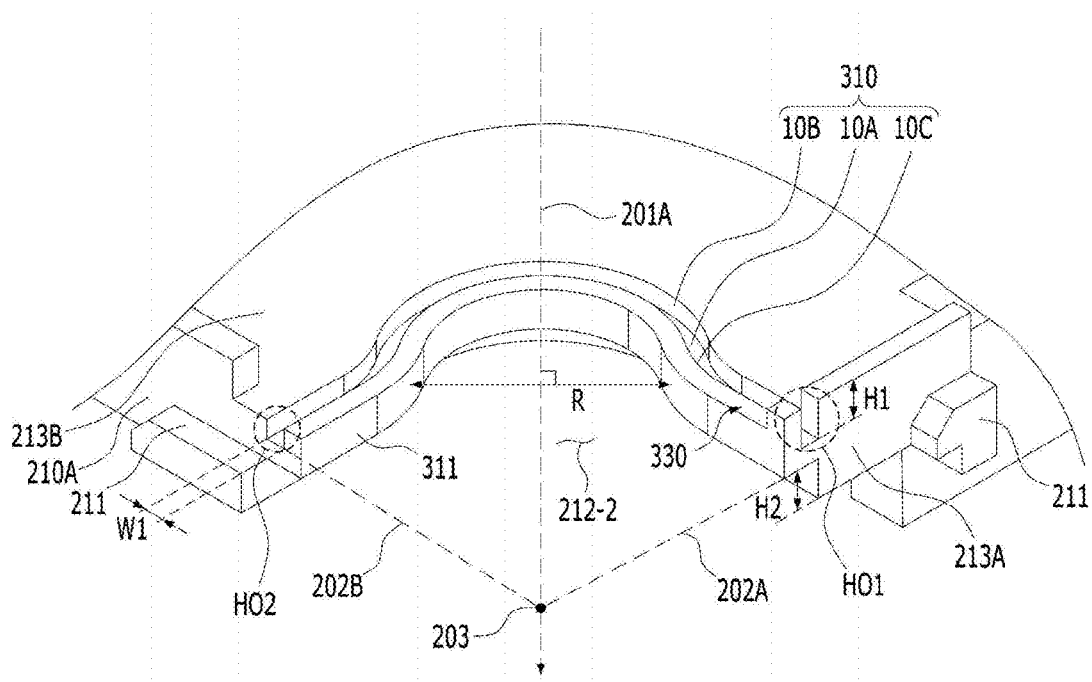

[FIG. 18b]
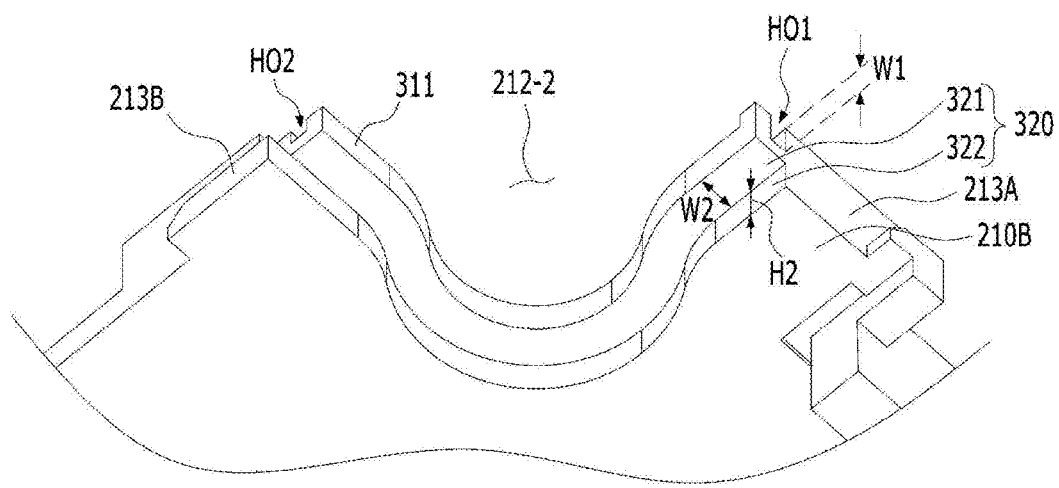

[FIG. 19a]
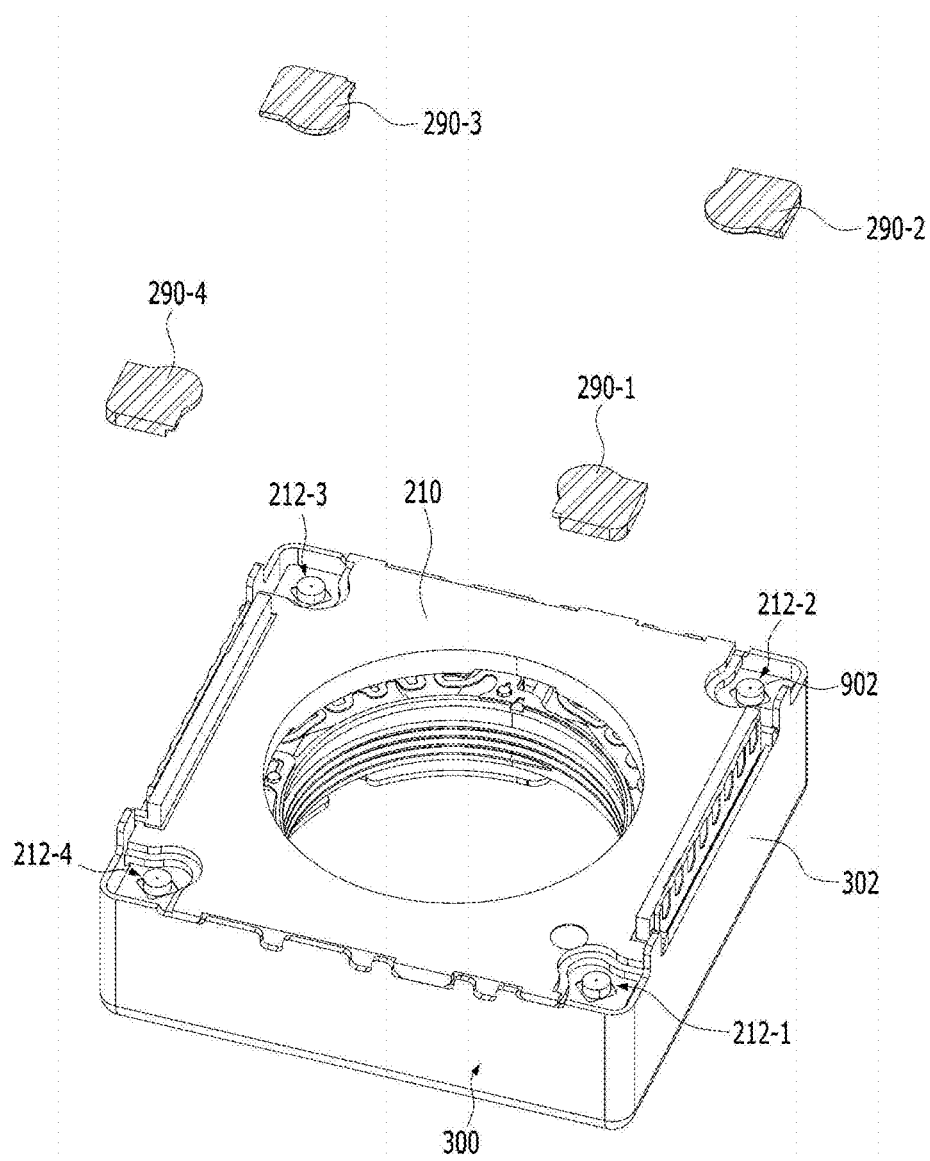

[FIG. 19b]
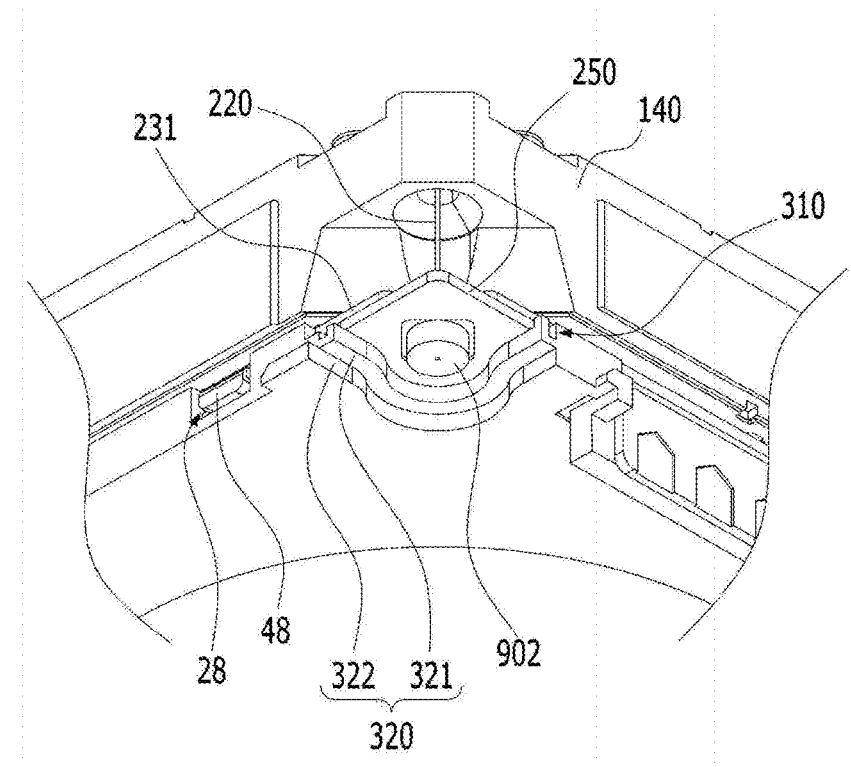
[FIG. 20a]
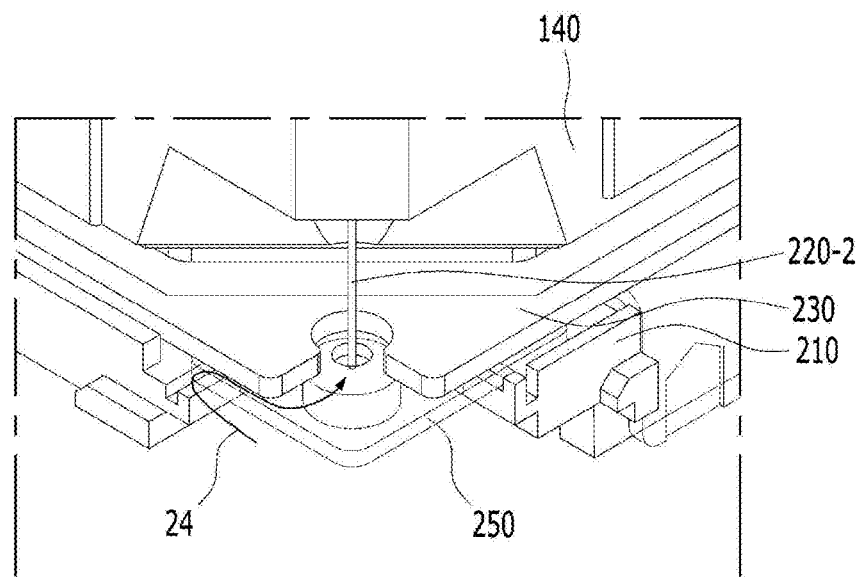

[FIG. 20b]
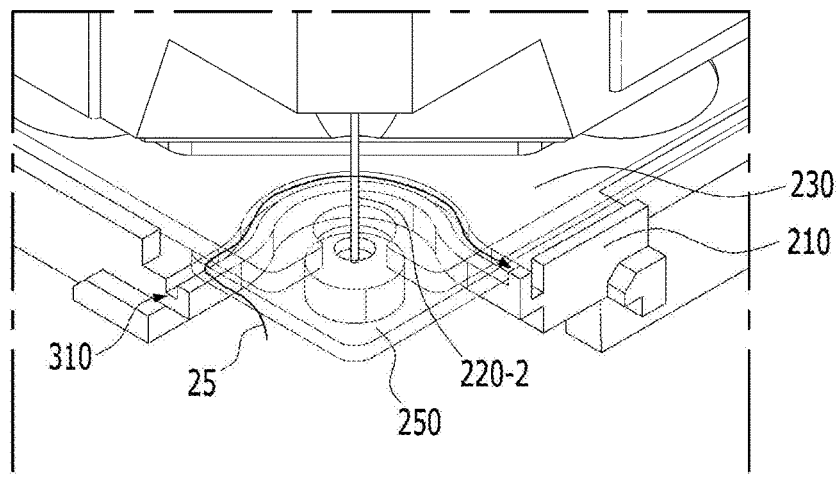
[FIG. 21a]
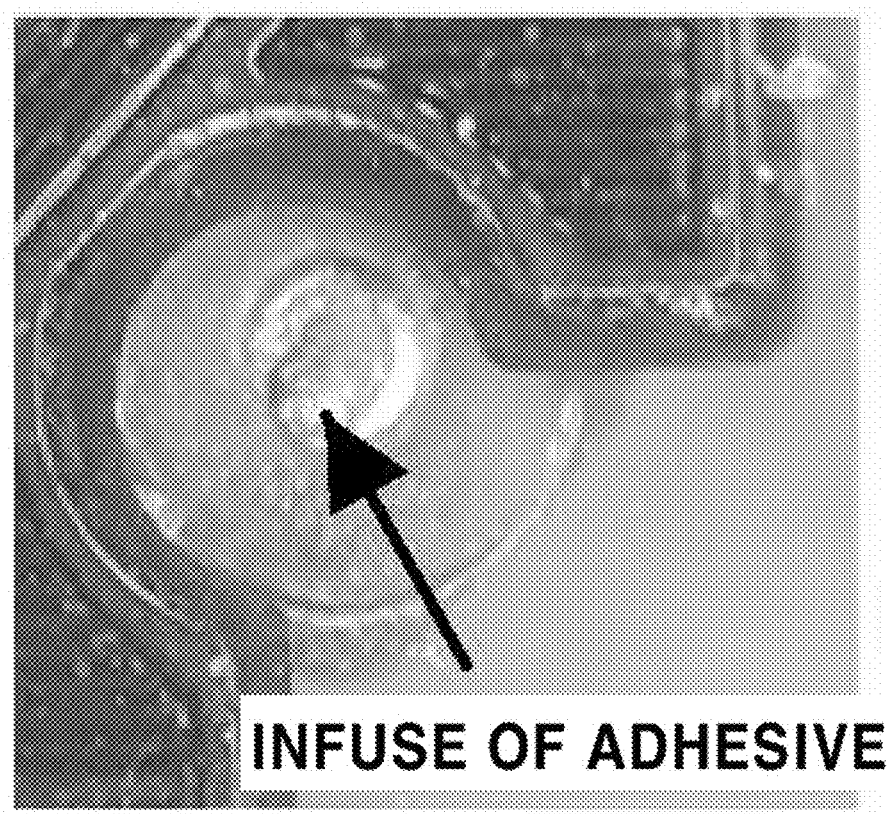

[FIG. 21b]
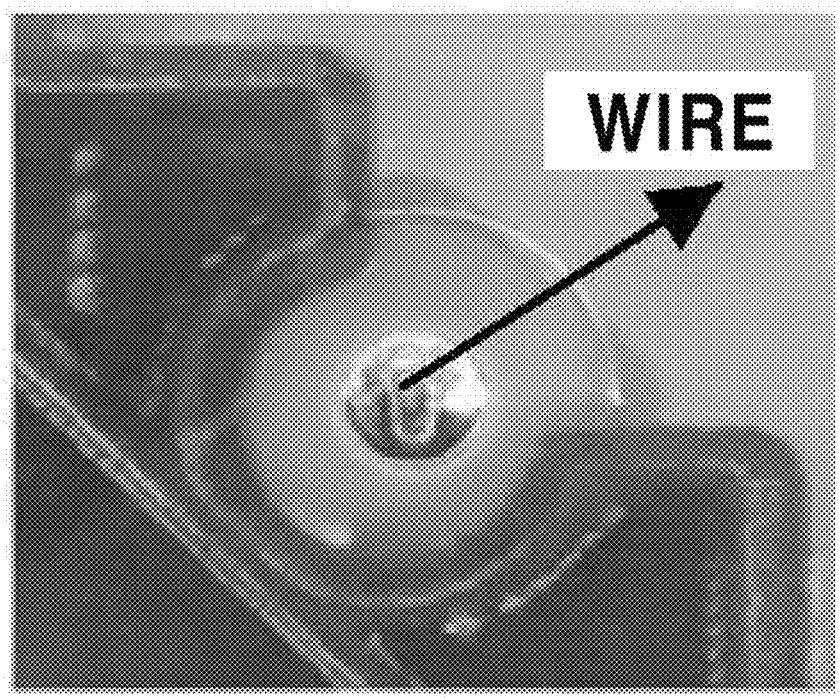
[FIG. 22a]
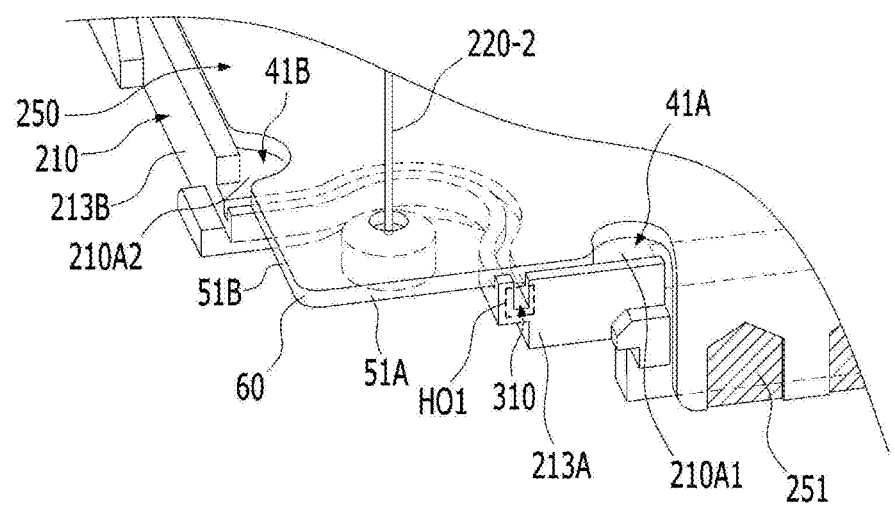

[FIG. 22b]
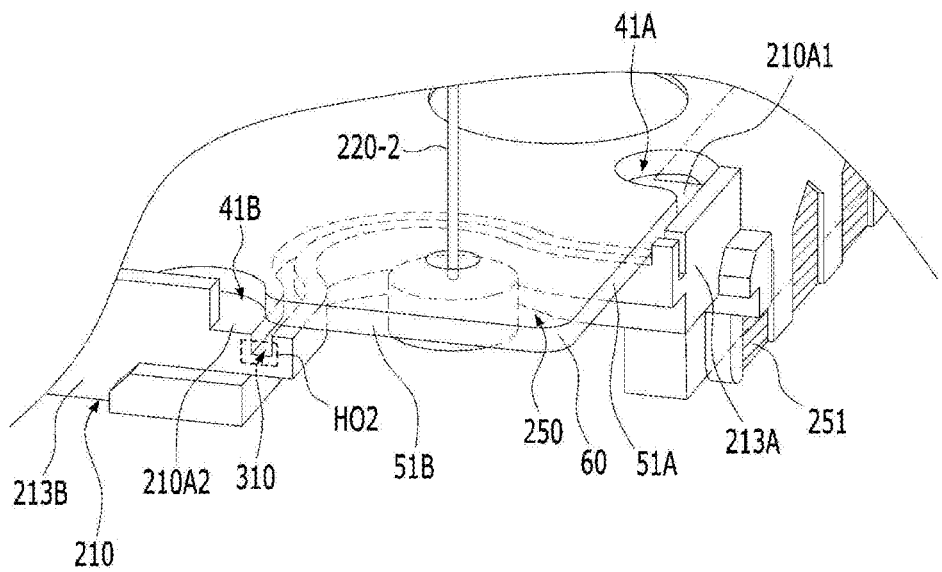
[FIG. 23a]
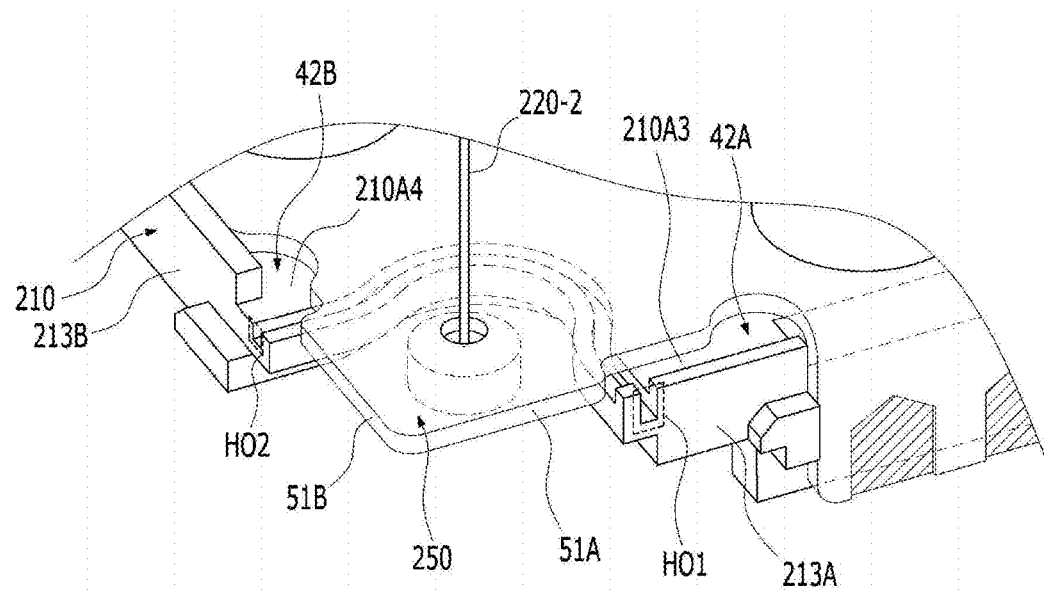

[FIG. 23b]
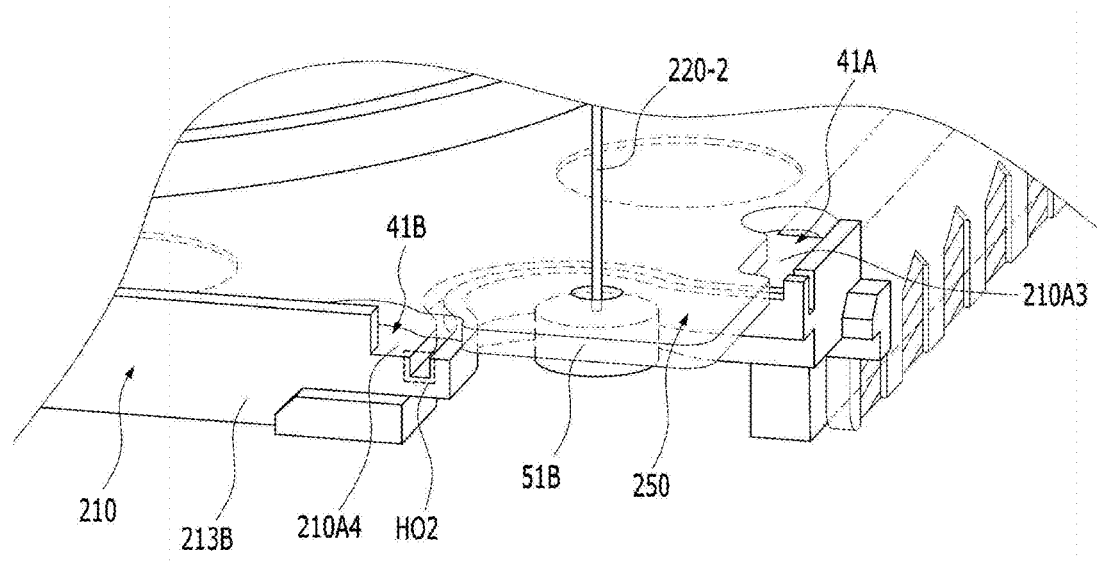
[FIG. 24]
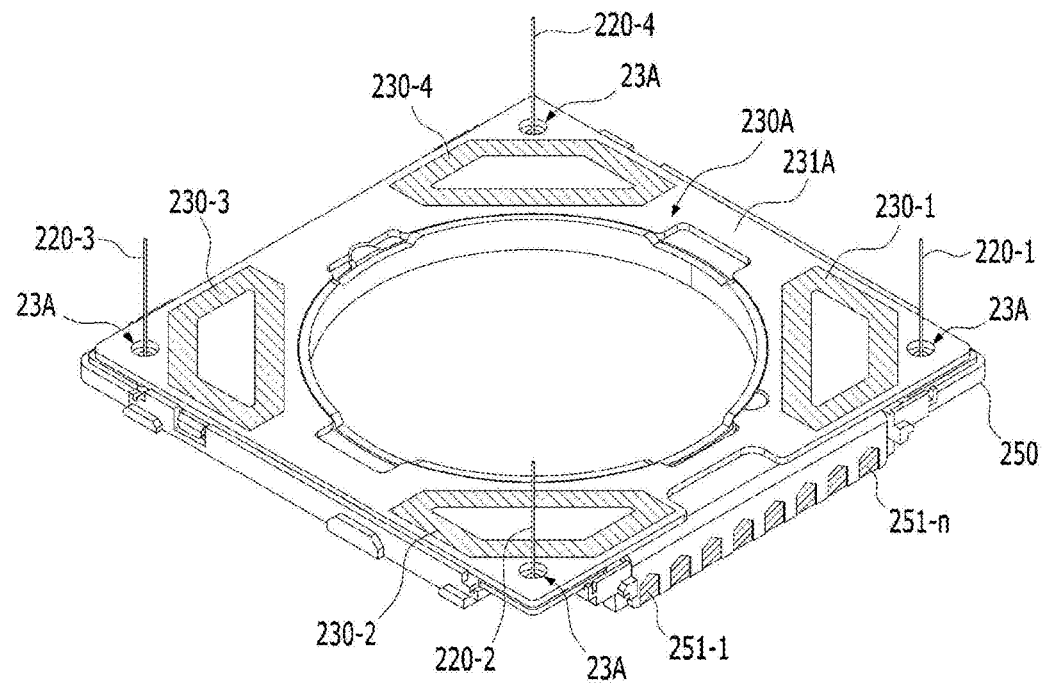

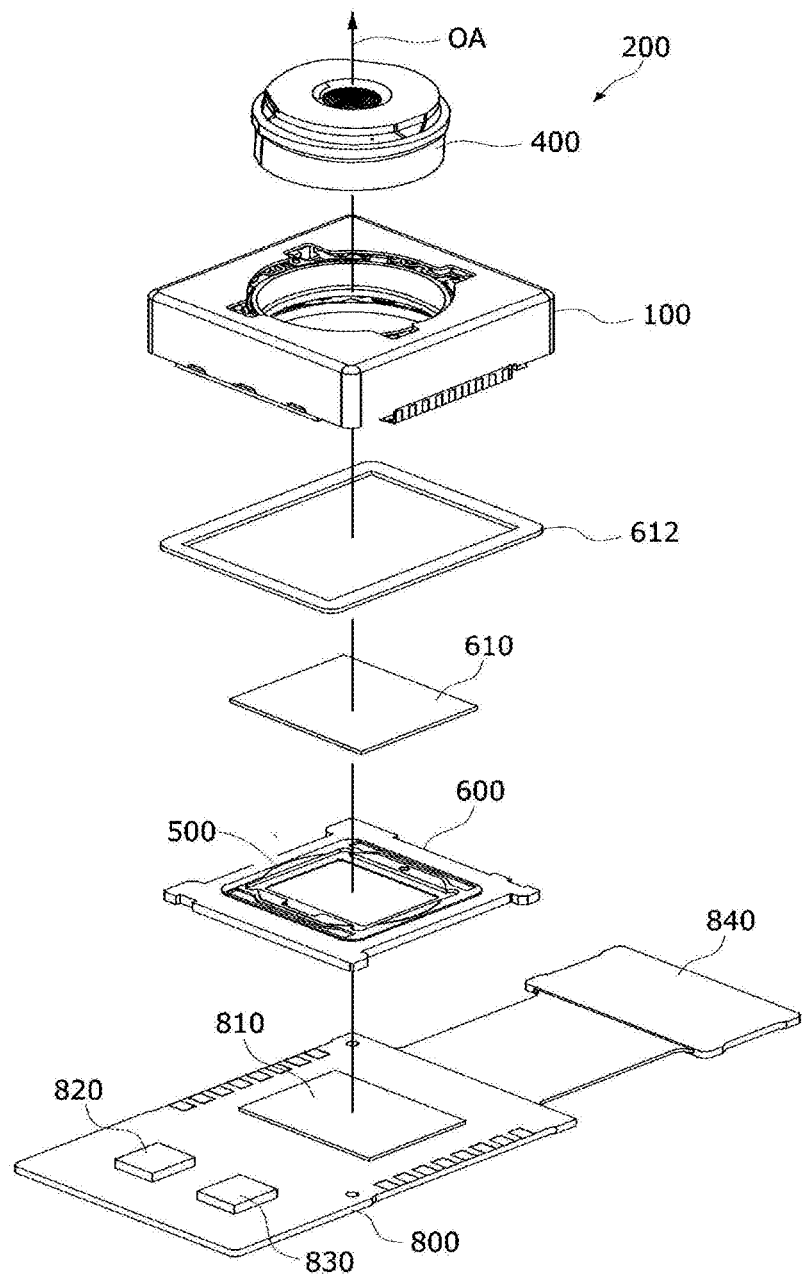
[FIG. 25]

[FIG. 26]
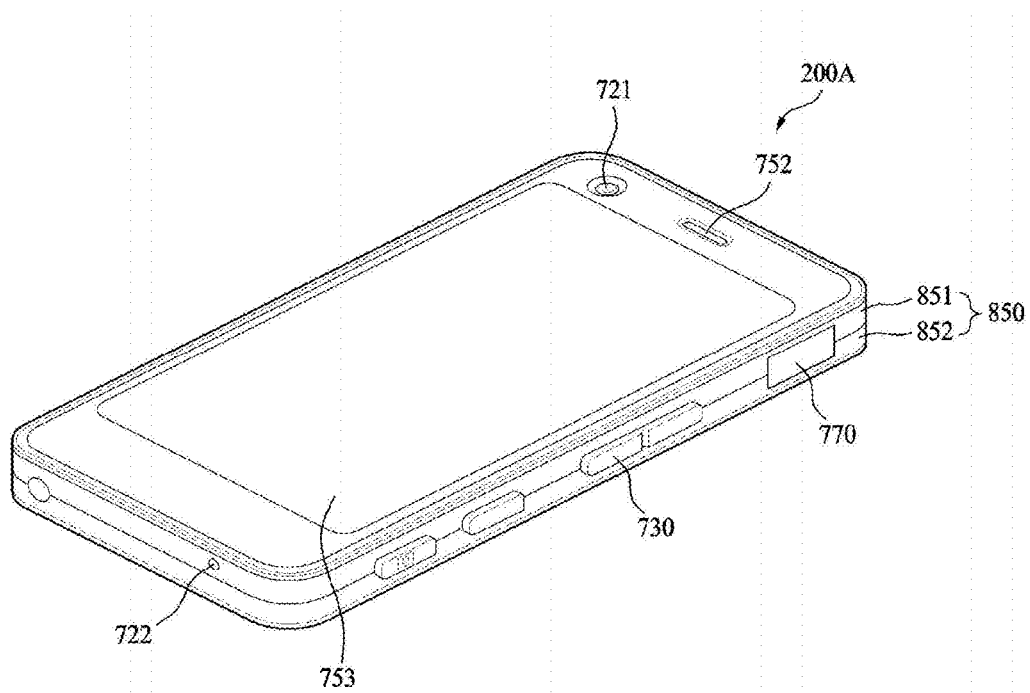

[FIG. 27]
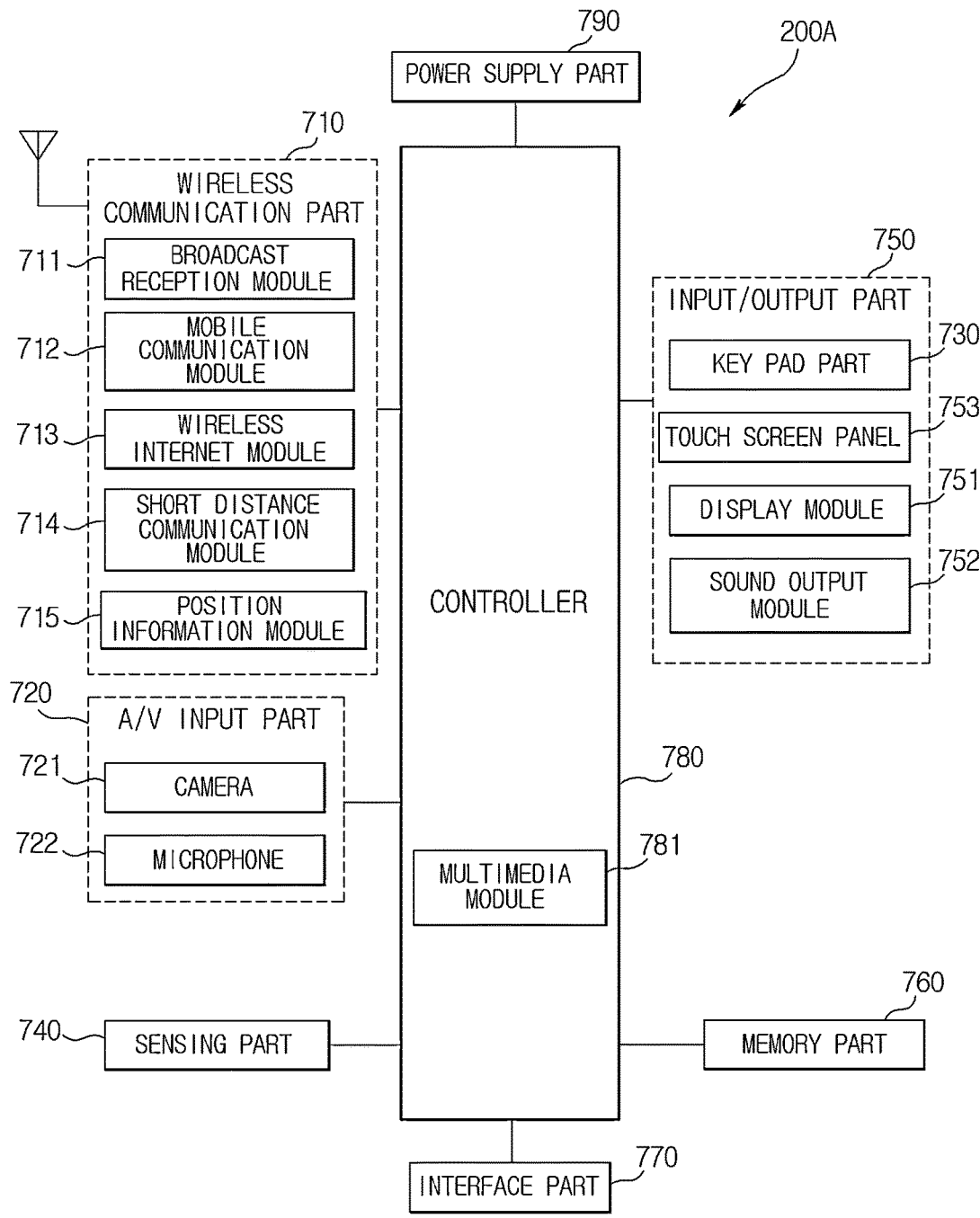

[FIG. 28a]
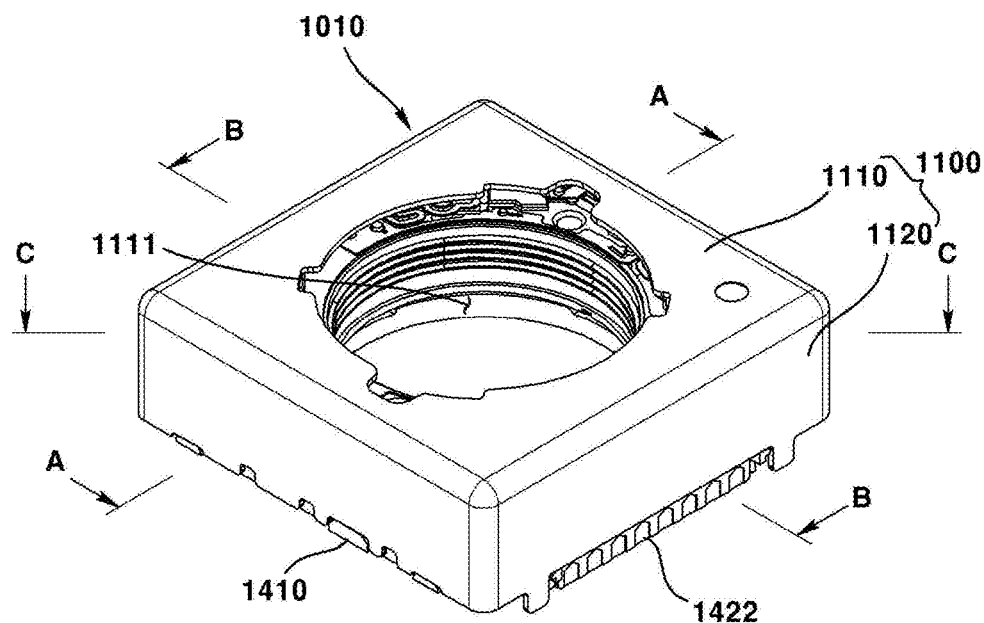

[FIG. 28b]
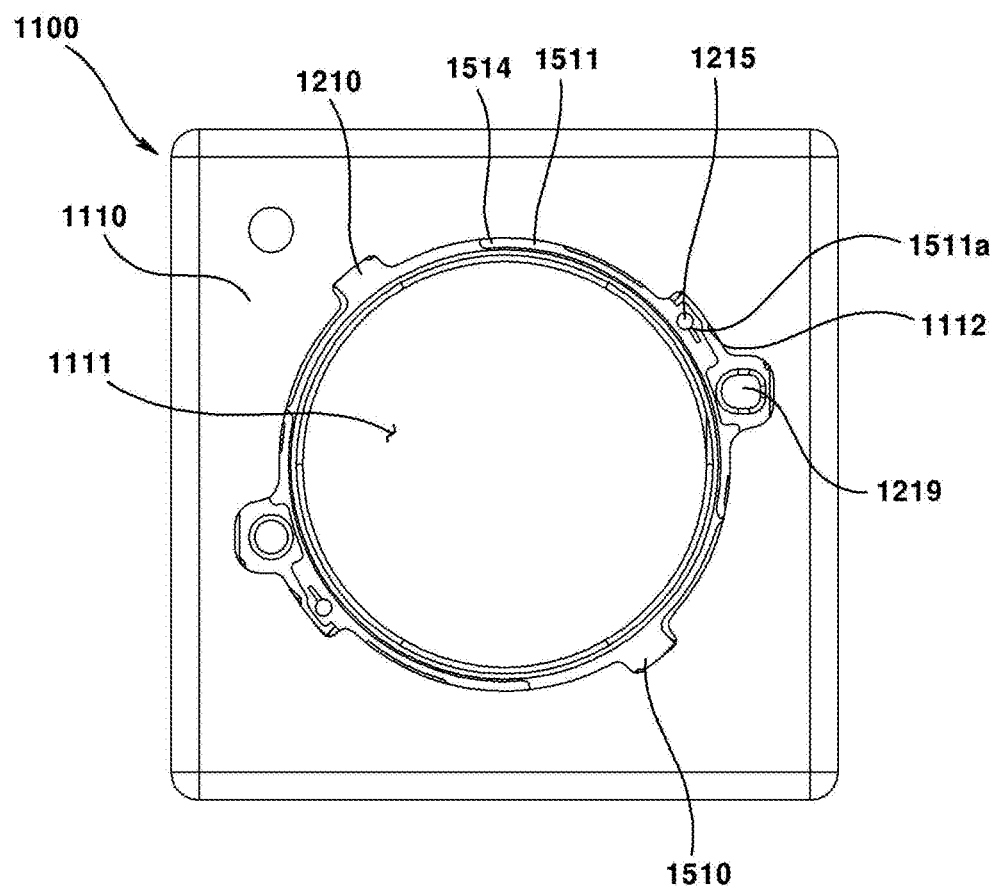

[FIG. 29]
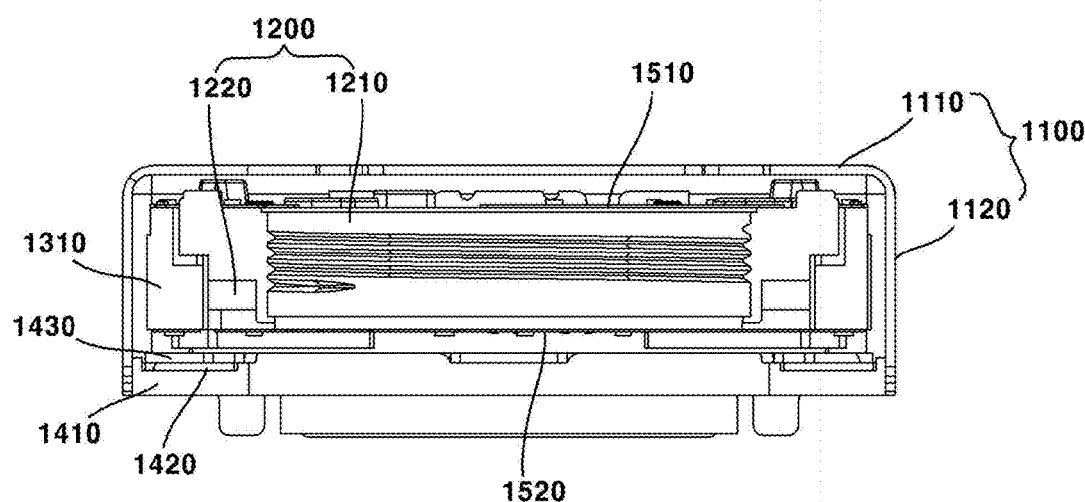
[FIG. 30]
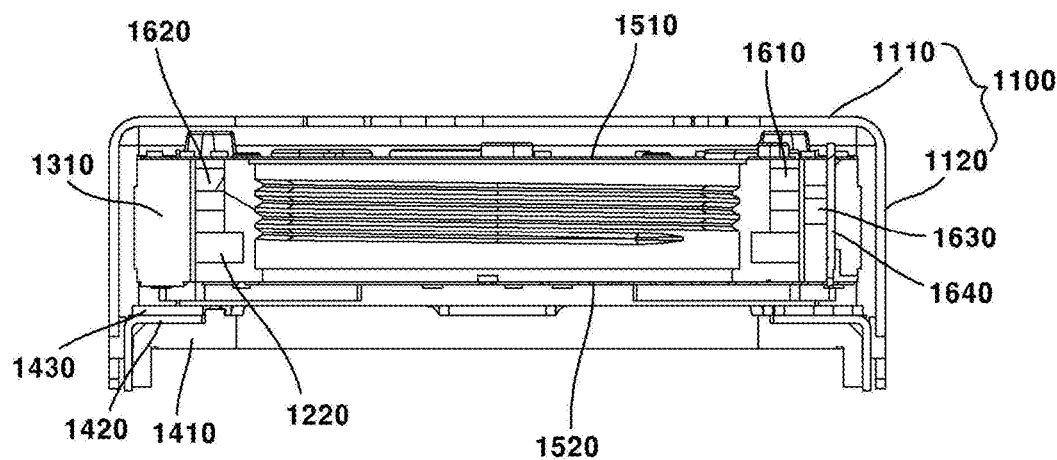

[FIG. 31]
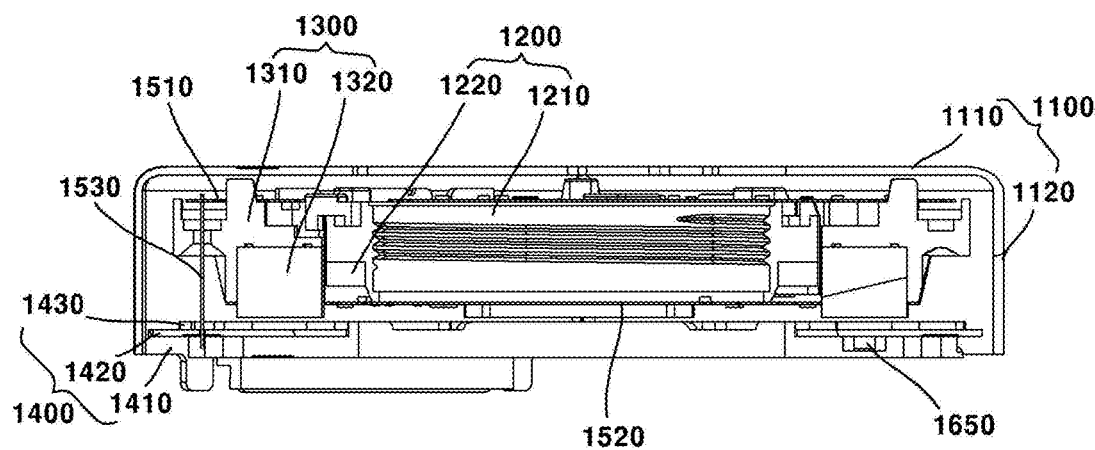

[FIG. 32]
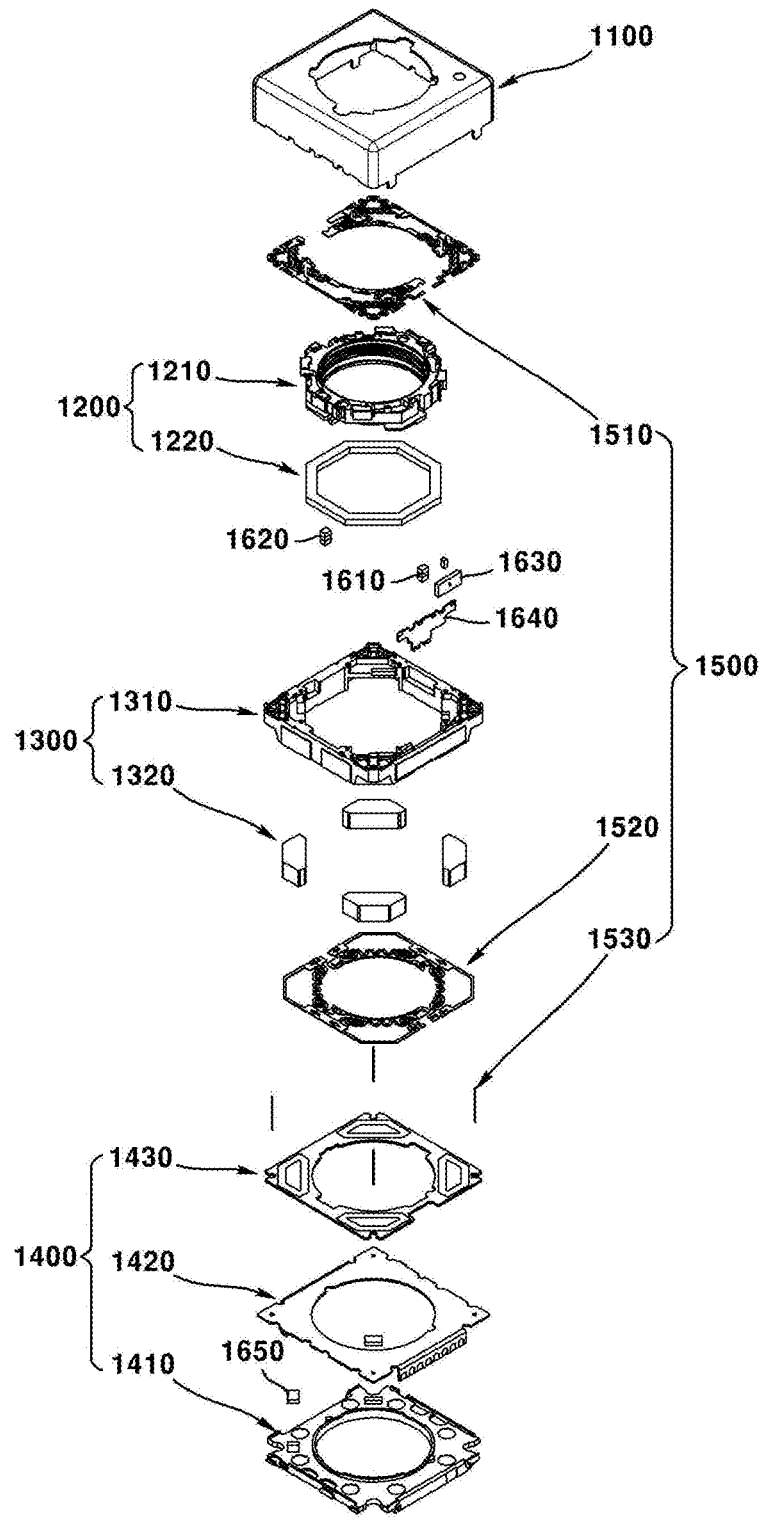

[FIG. 33]
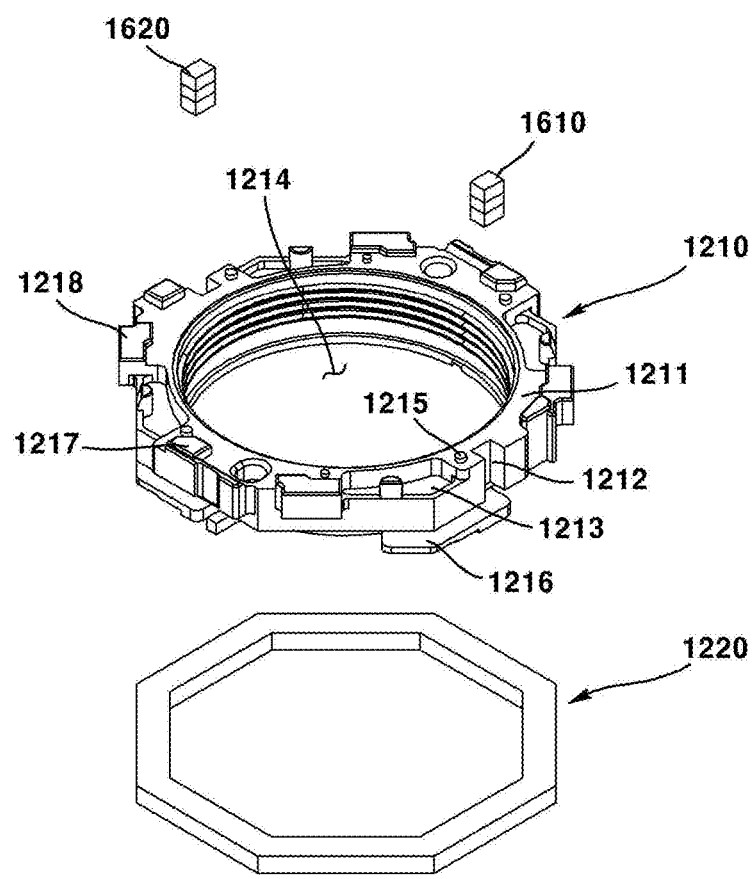

[FIG. 34]
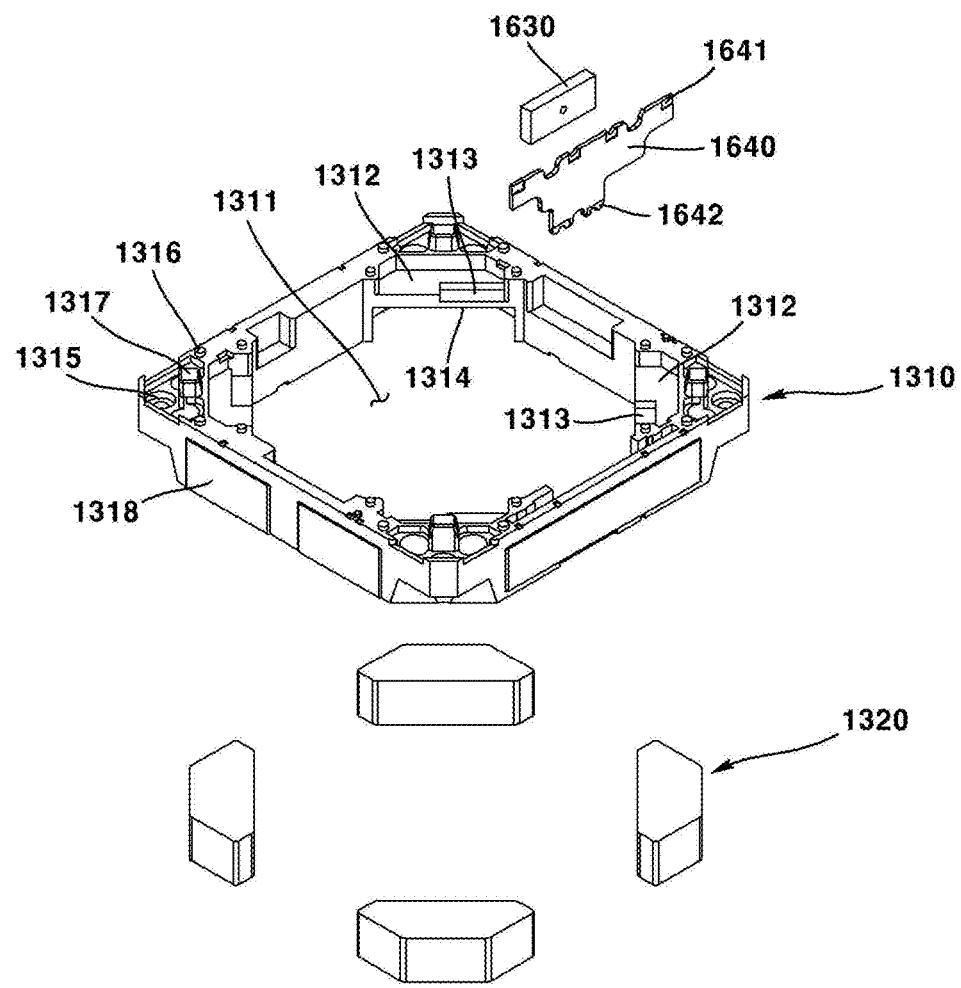

[FIG. 35]
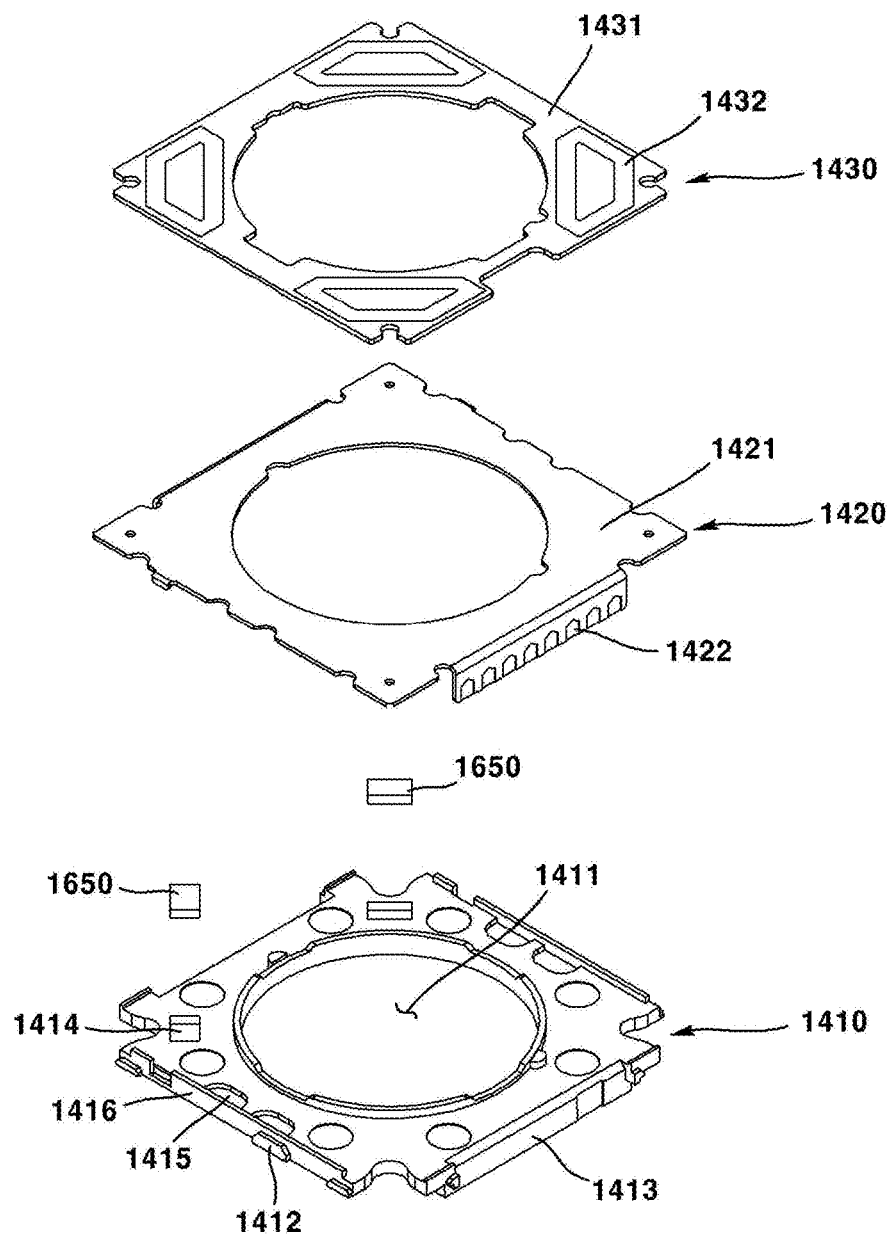

[FIG. 36]
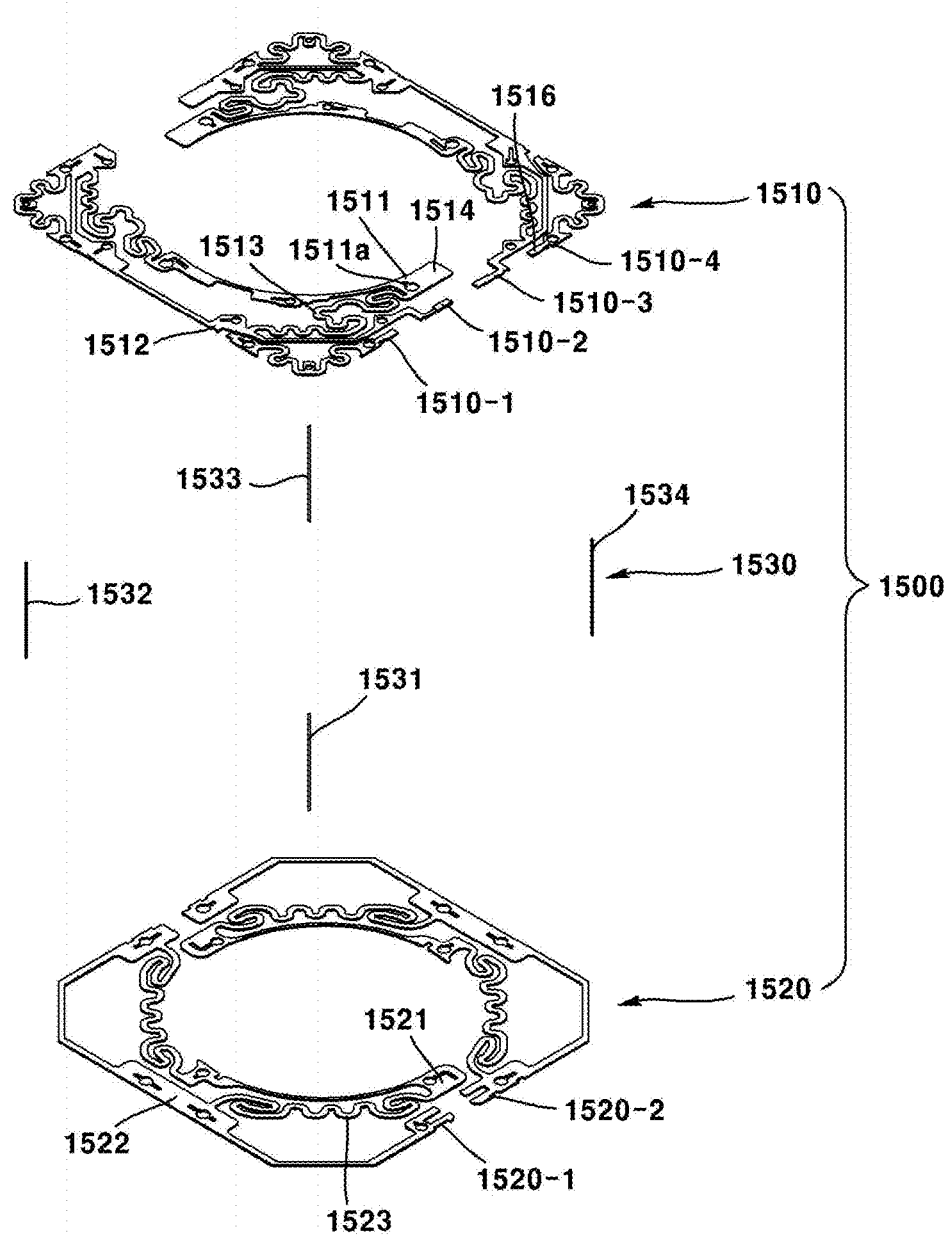

[FIG. 37]
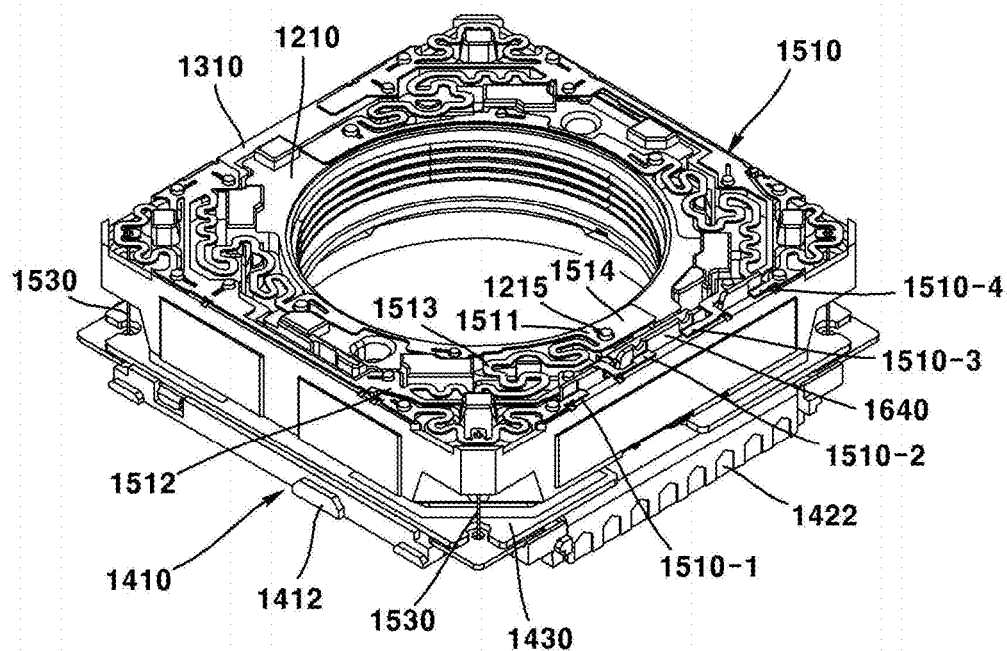

[FIG. 38]
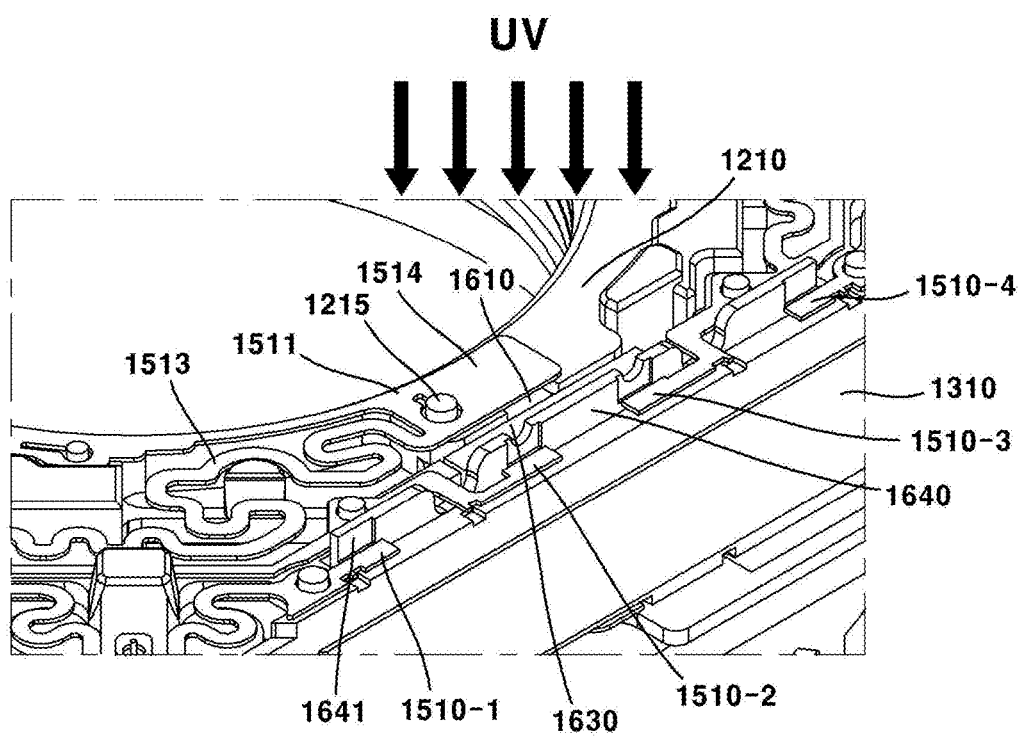

[FIG. 39]
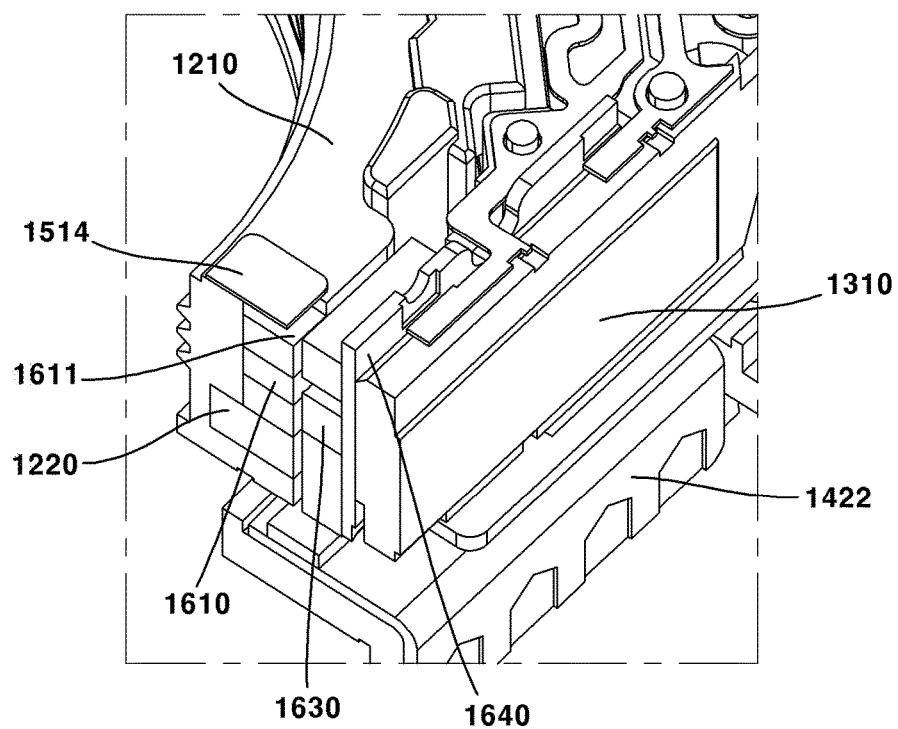

[FIG. 40]
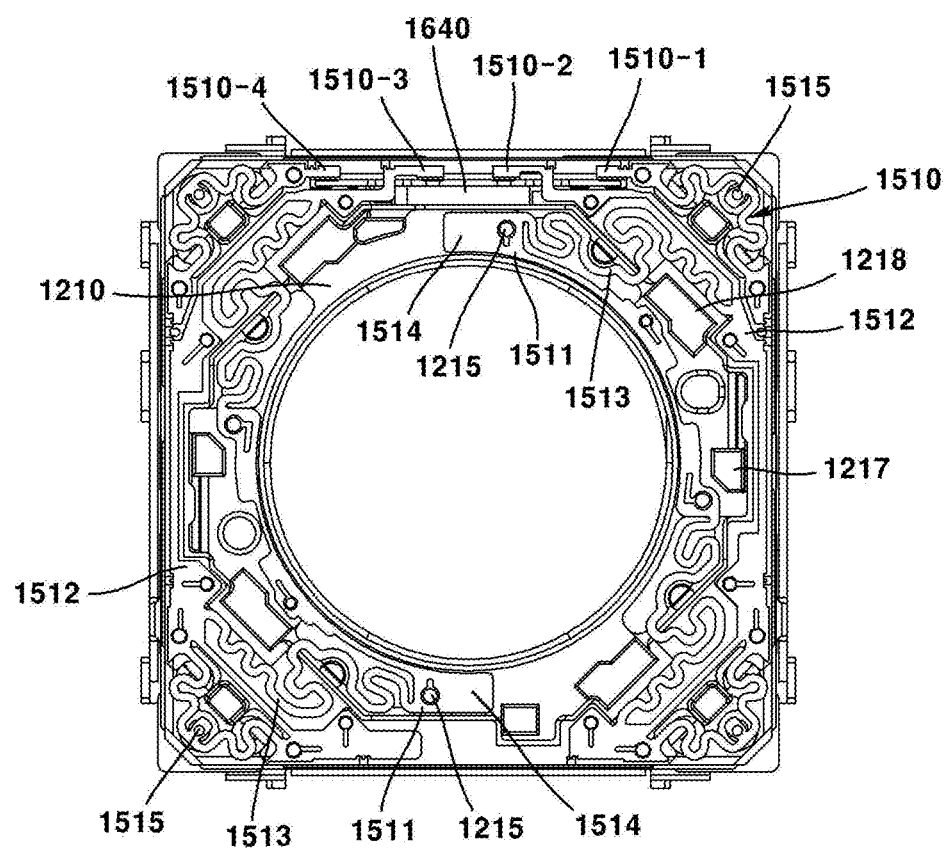

[FIG. 41]
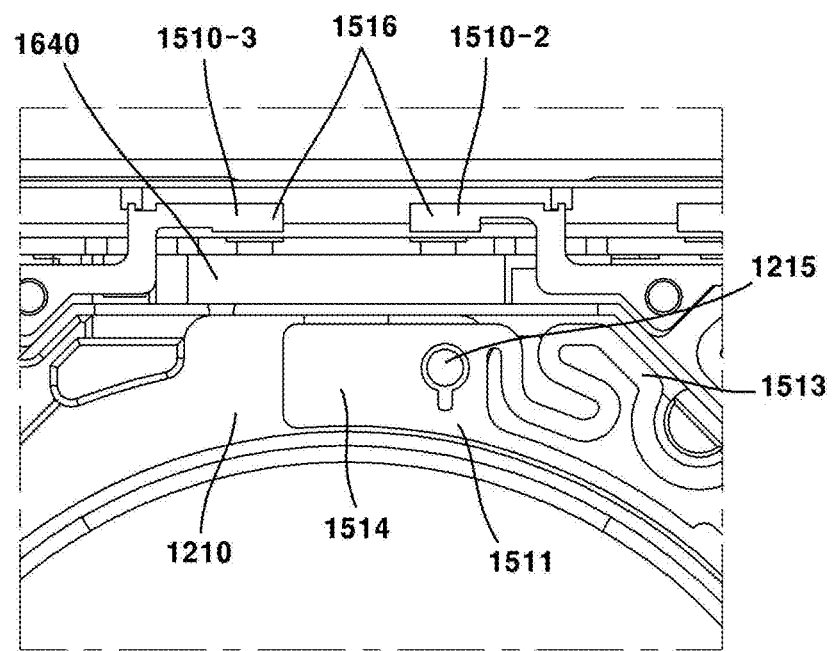

[FIG. 42]
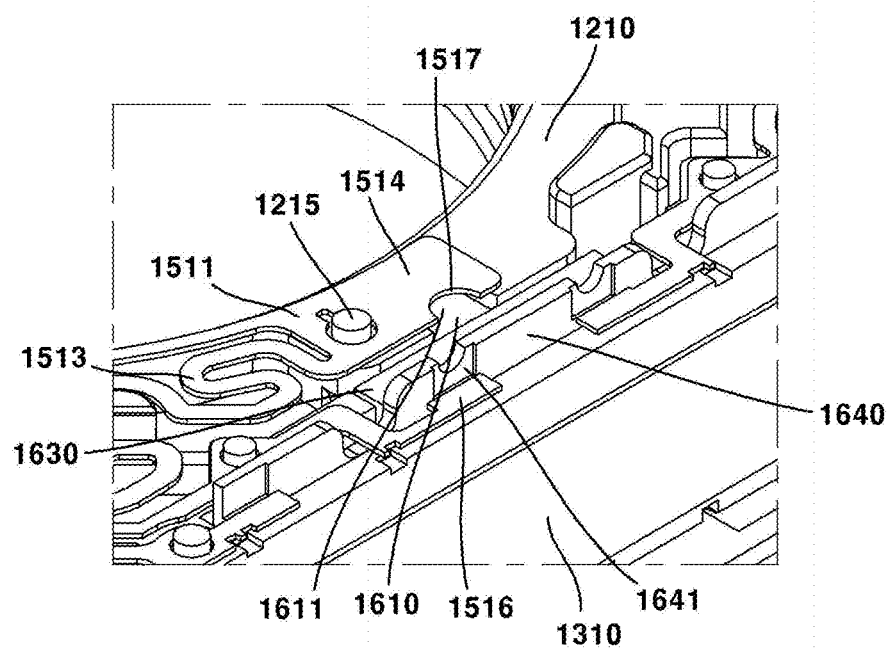

[FIG. 43]
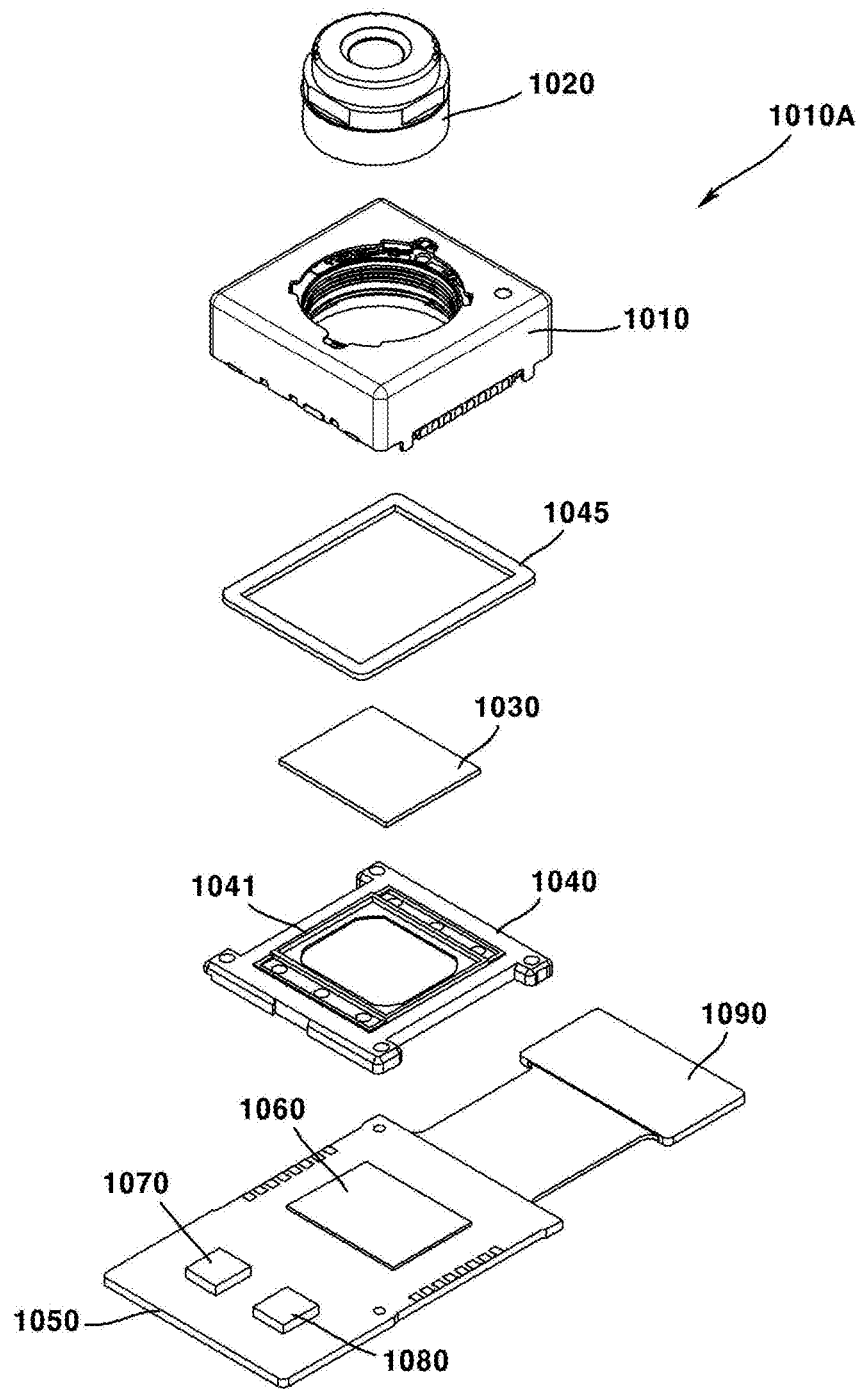

[FIG. 44]
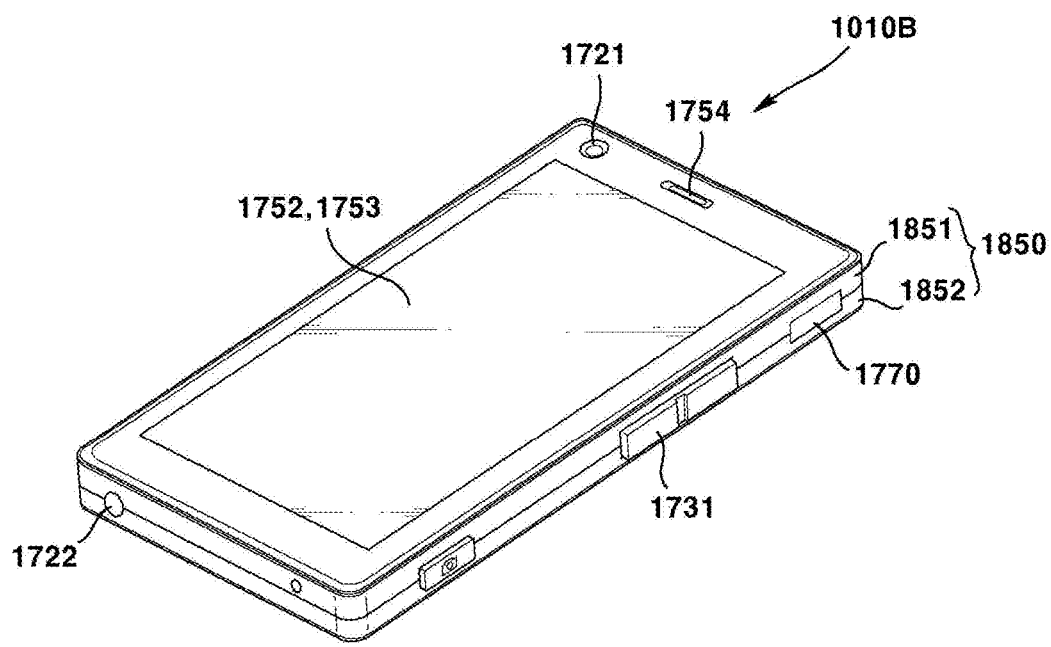

[FIG. 45]
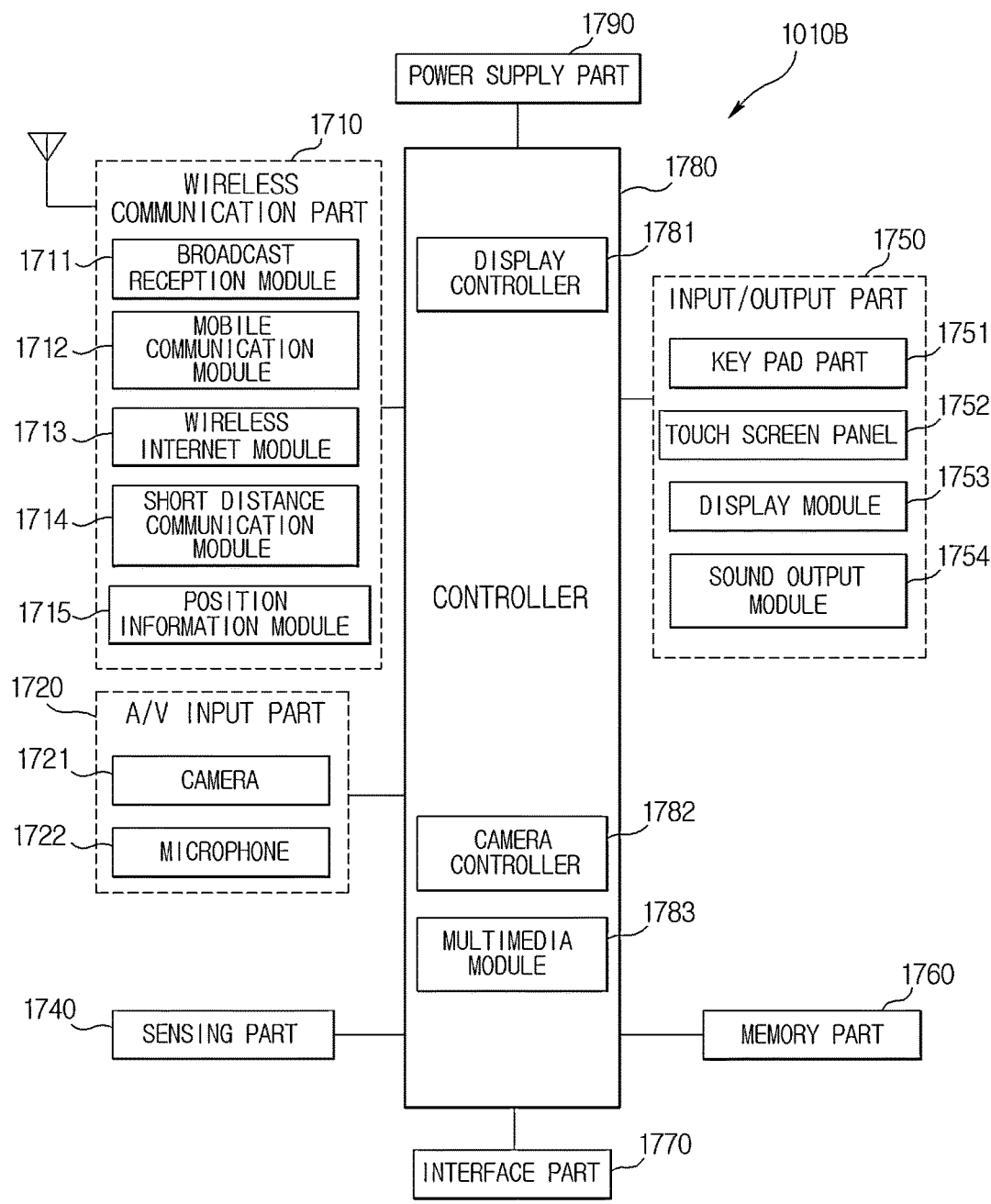

[FIG. 46]
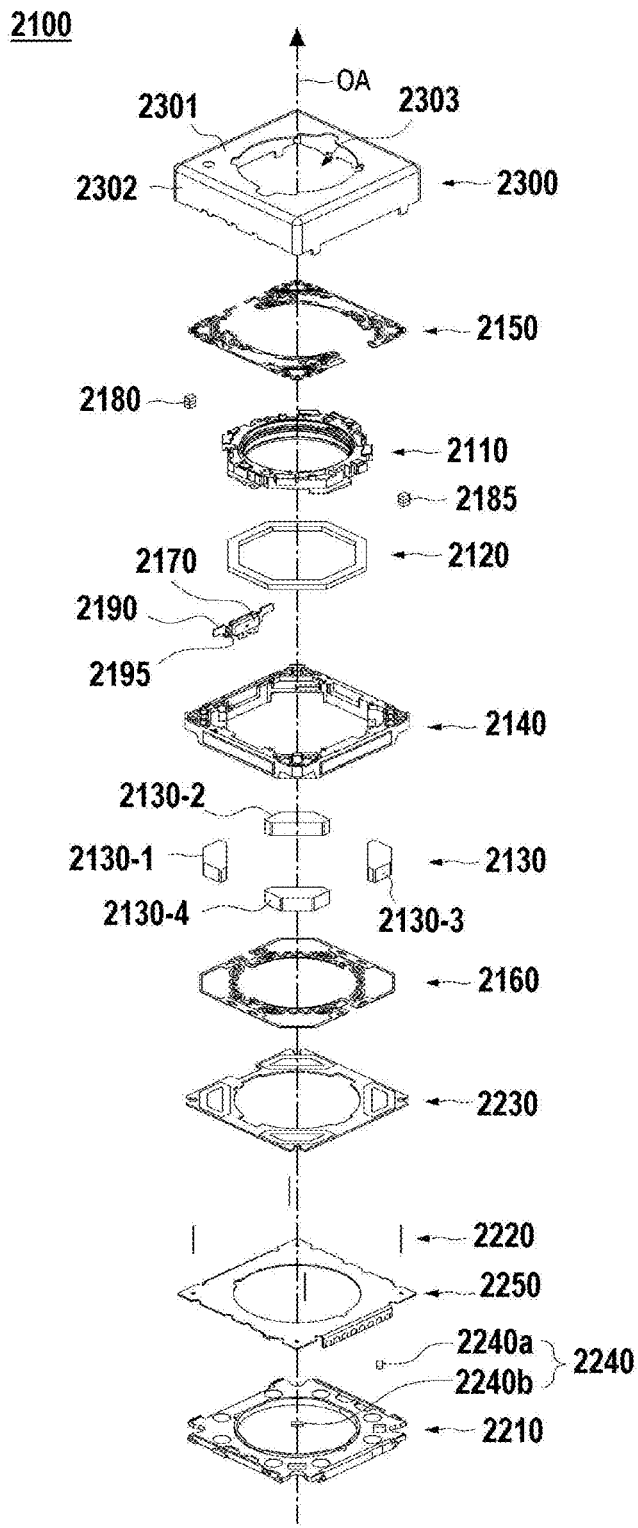

[FIG. 47]
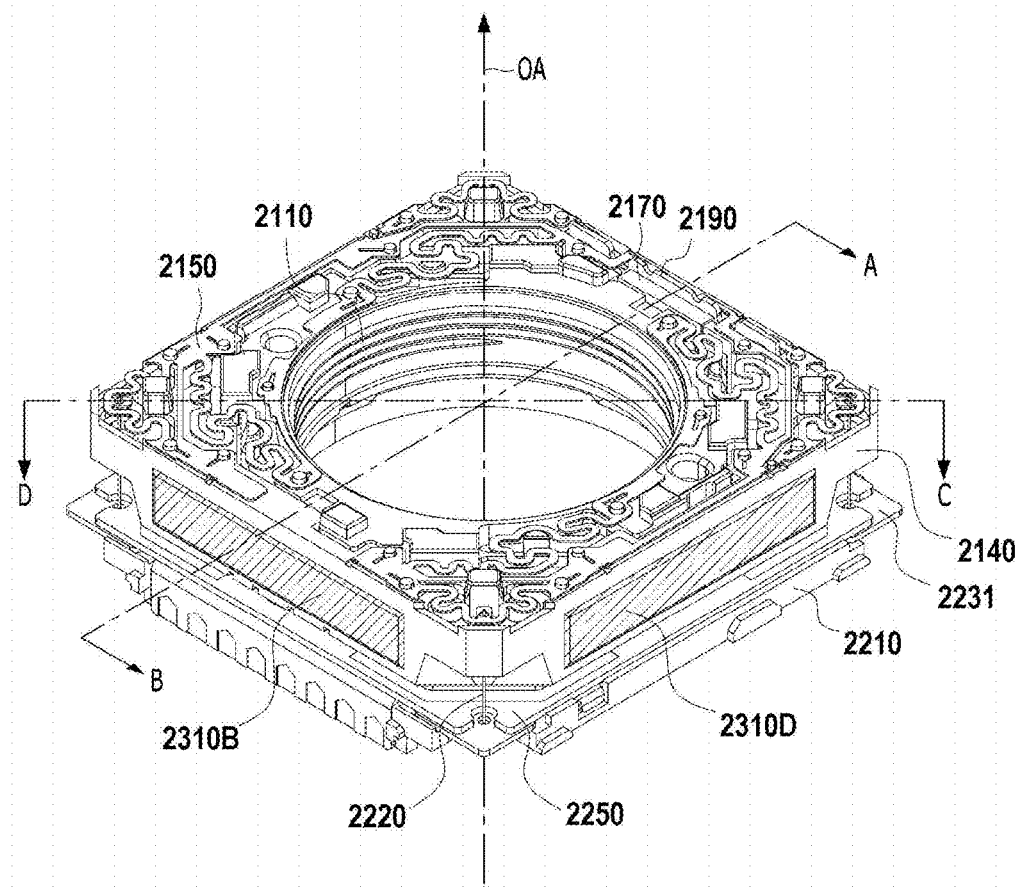

[FIG. 48a]
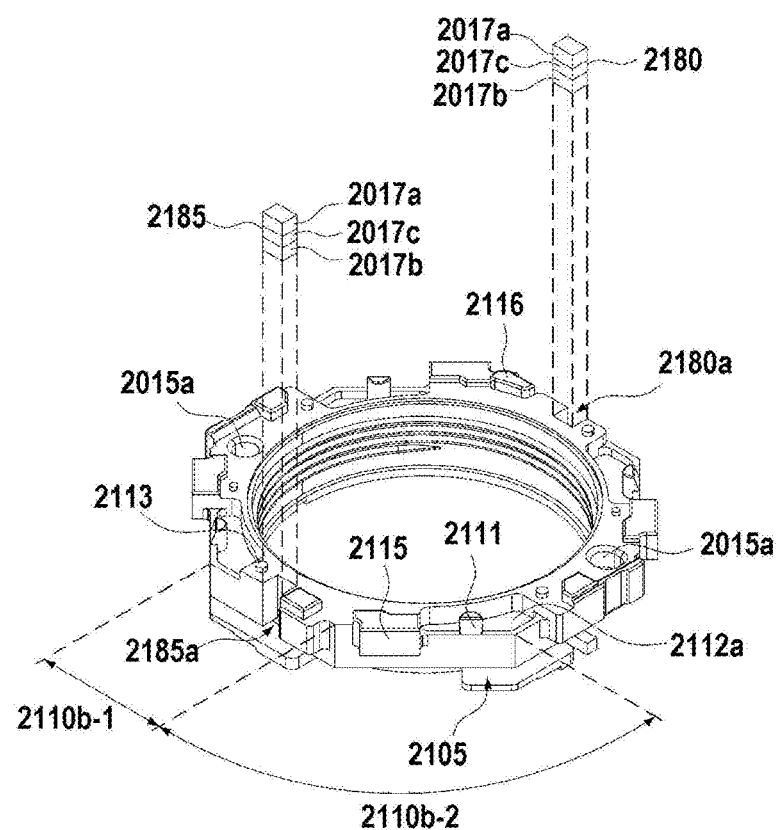

[FIG. 48b]
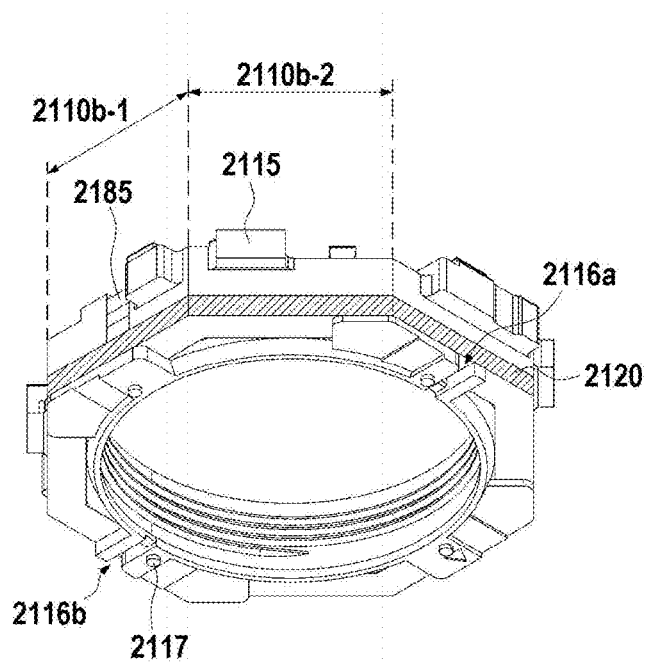

[FIG. 49a]
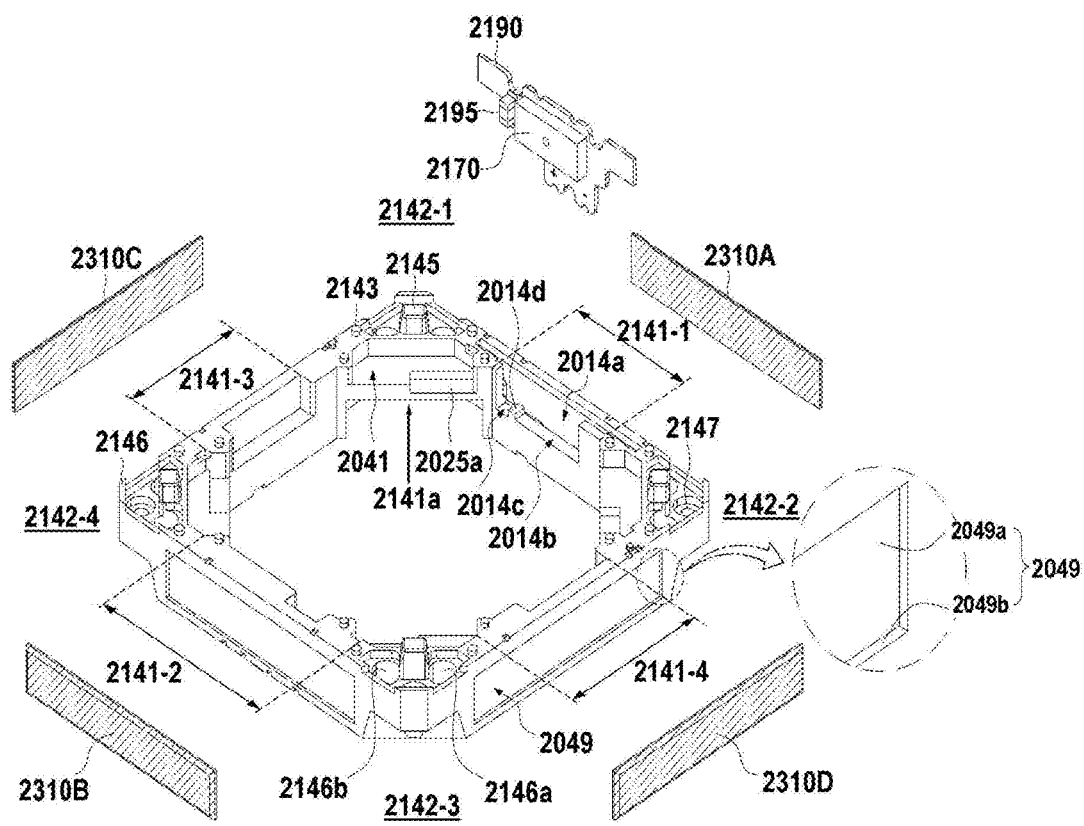

[FIG. 49b]
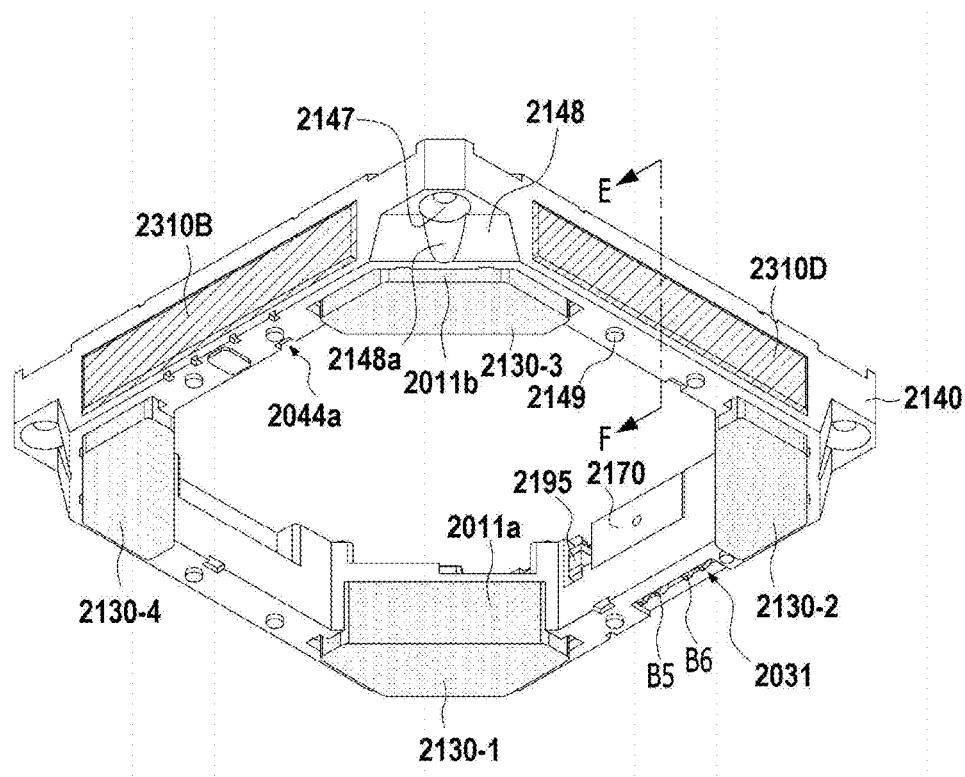
[FIG. 50]
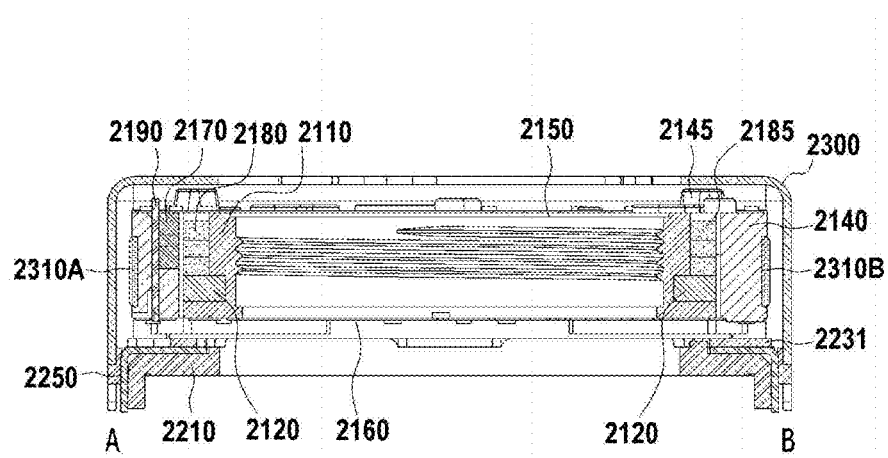

[FIG. 51]
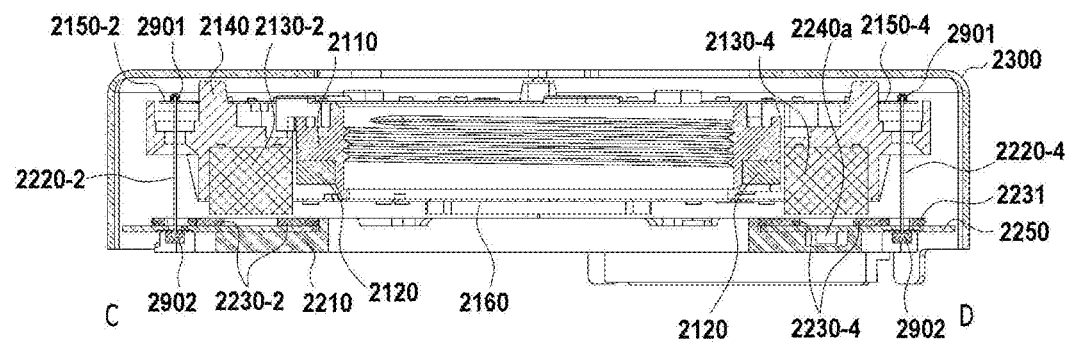
[FIG. 52a]
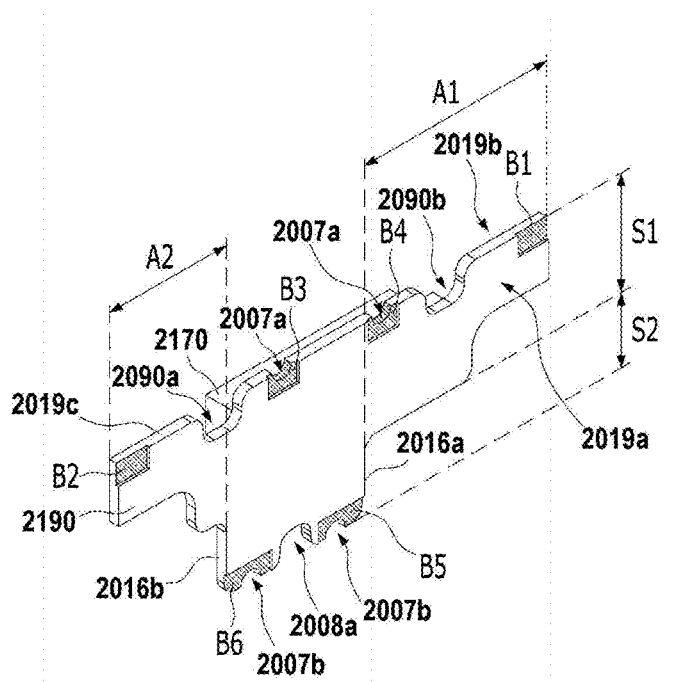

[FIG. 53]
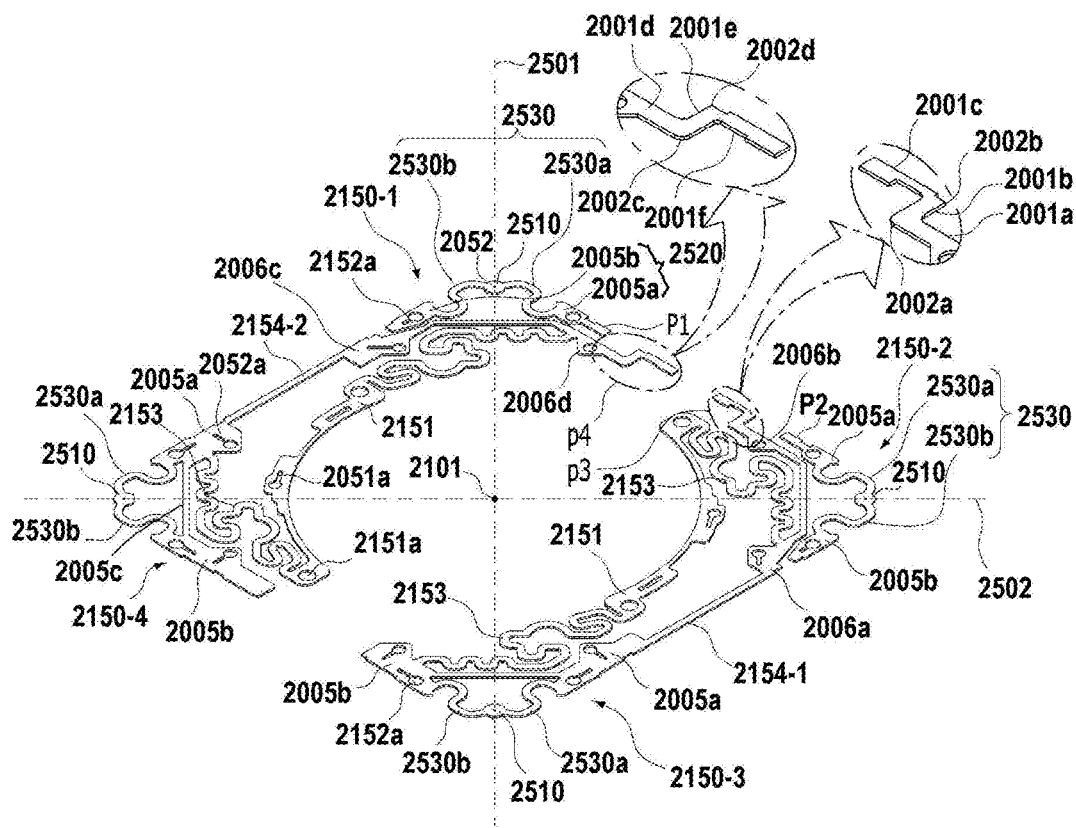

[FIG. 54]
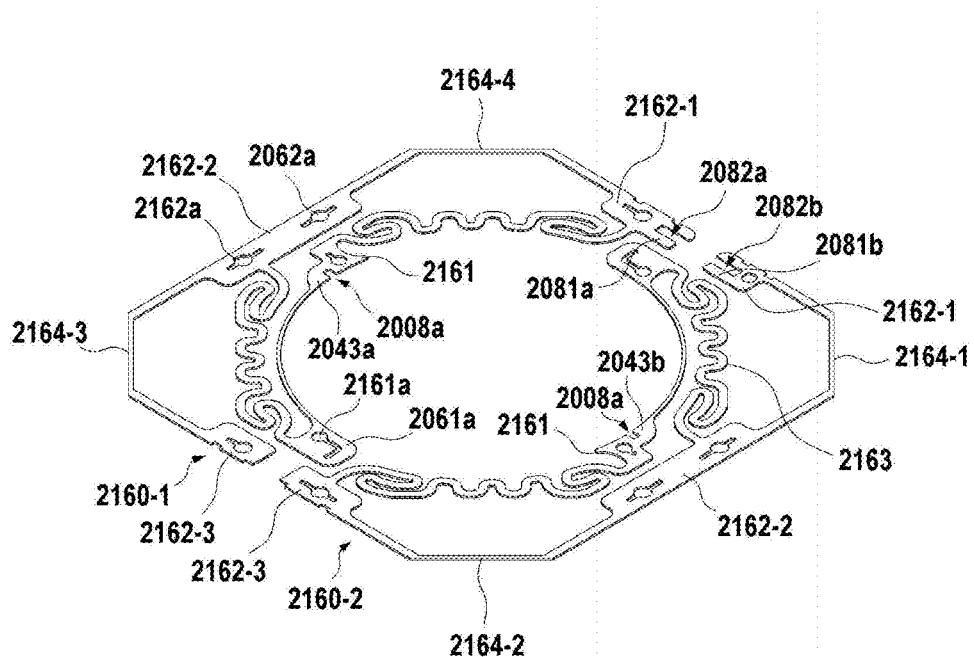
[FIG. 55]
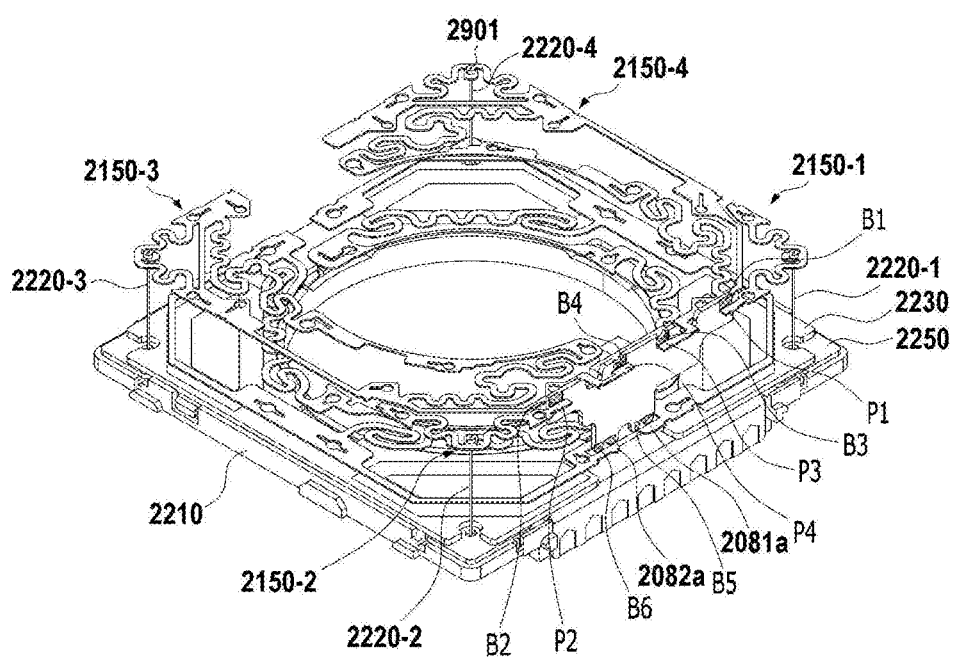

[FIG. 56]
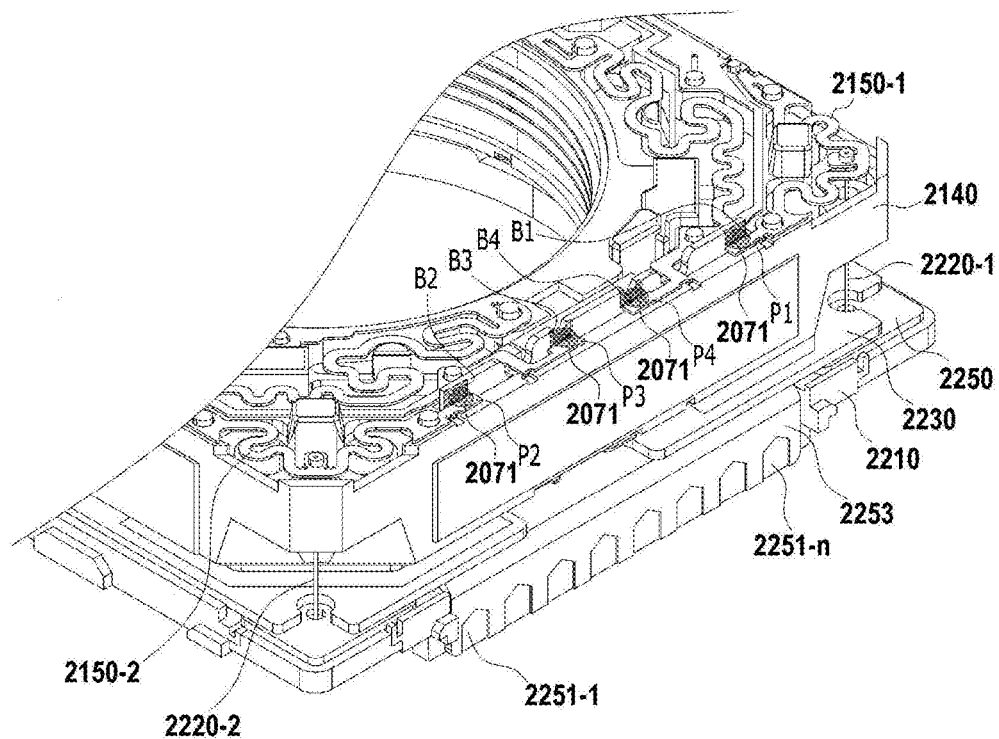
[FIG. 57]
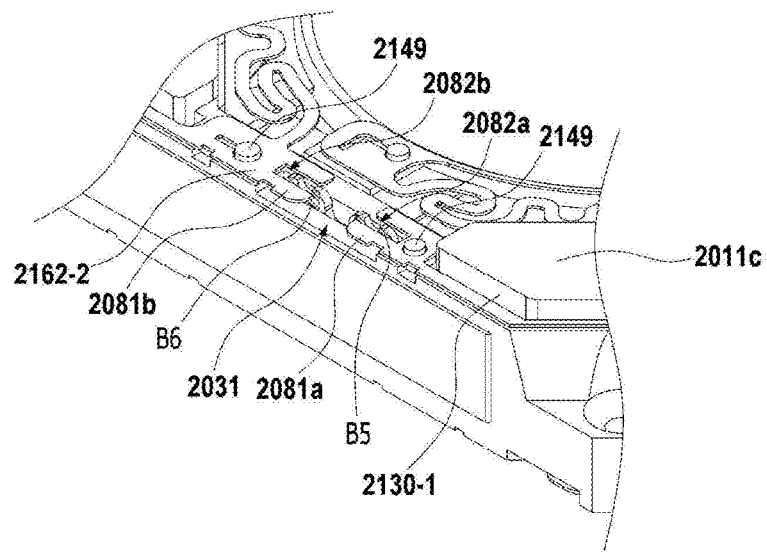

[FIG. 58]
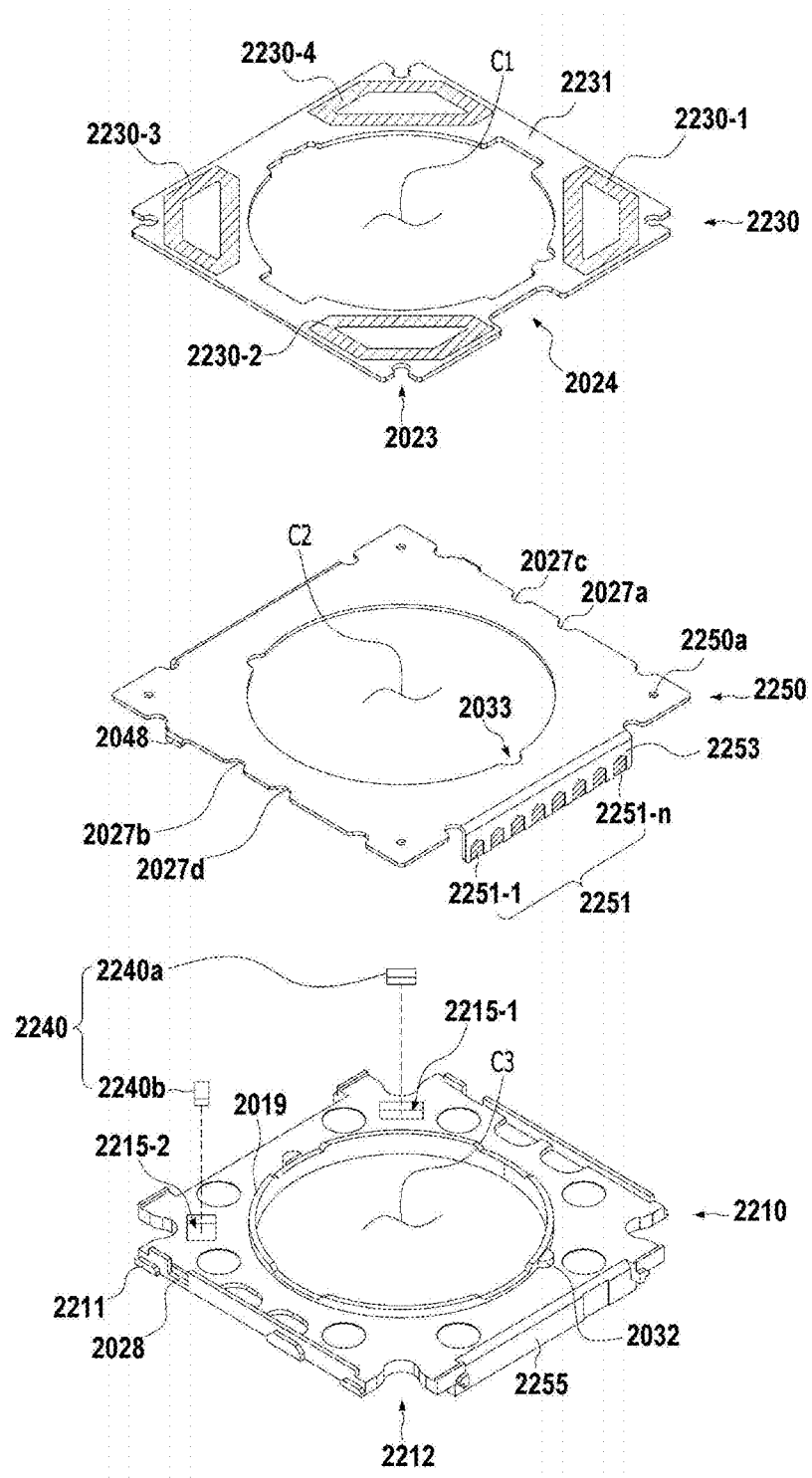

[FIG. 59]
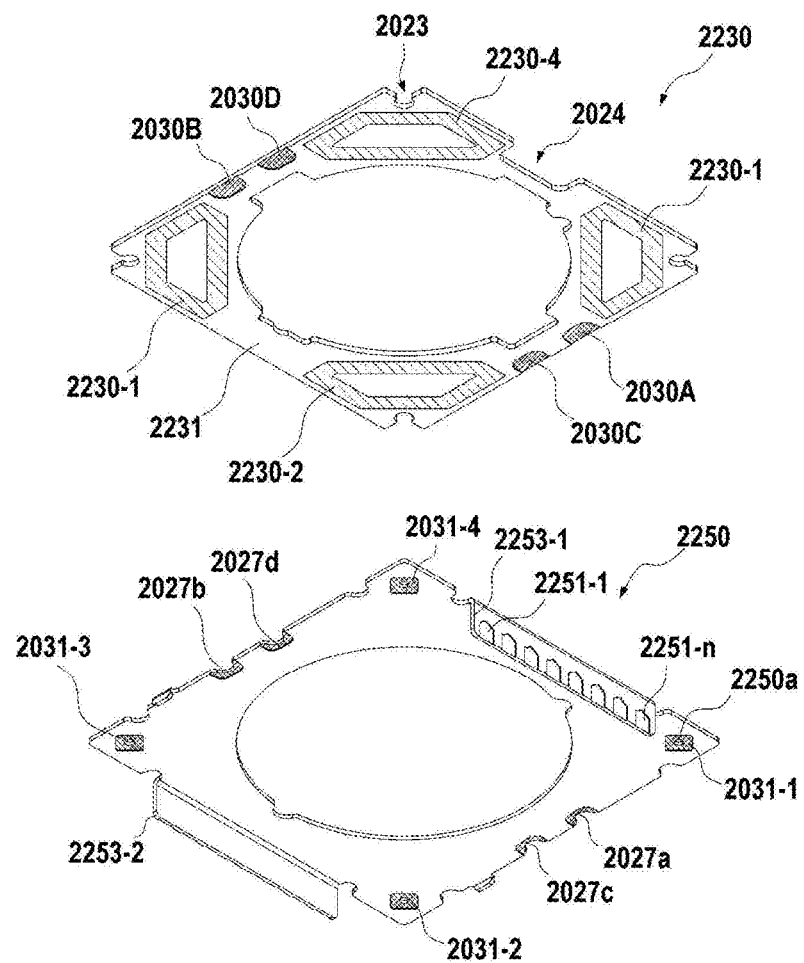

[FIG. 60]
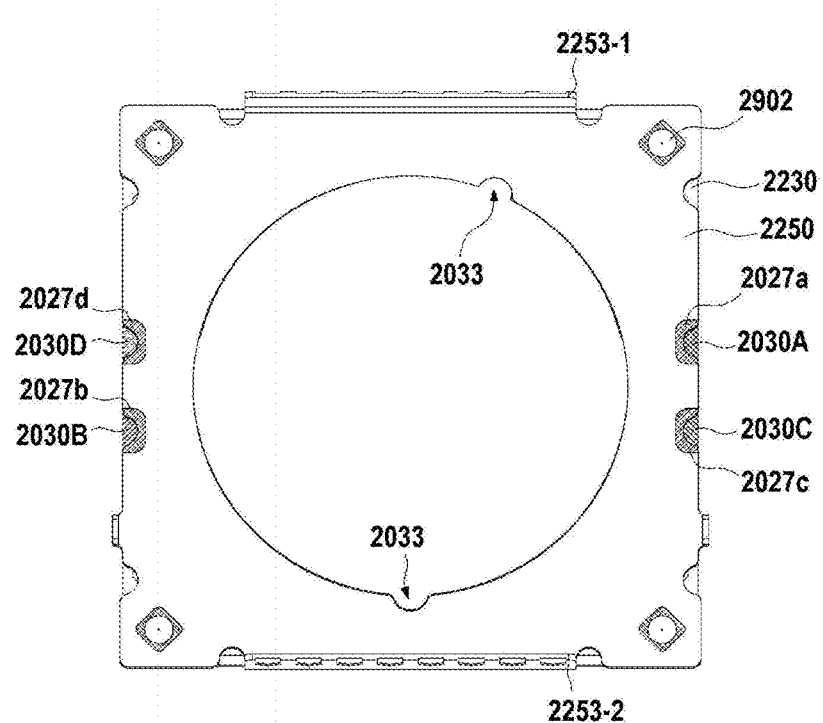
[FIG. 61]
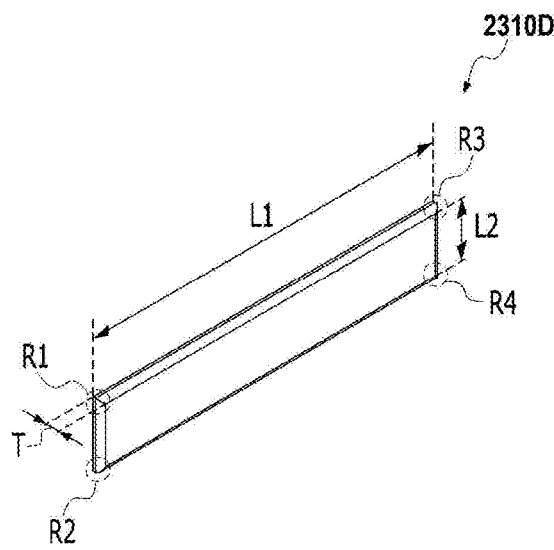

[FIG. 62]
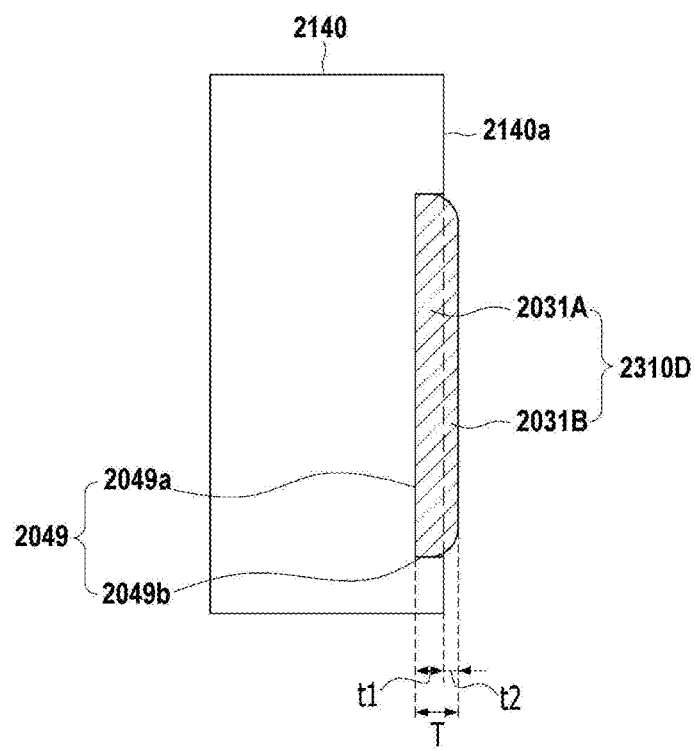

[FIG. 63a]
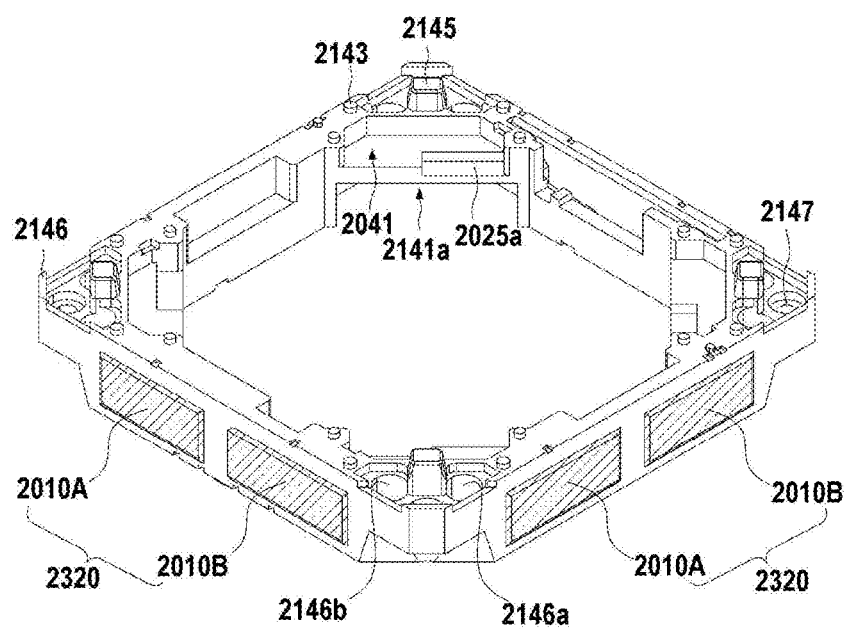

[FIG. 63b]
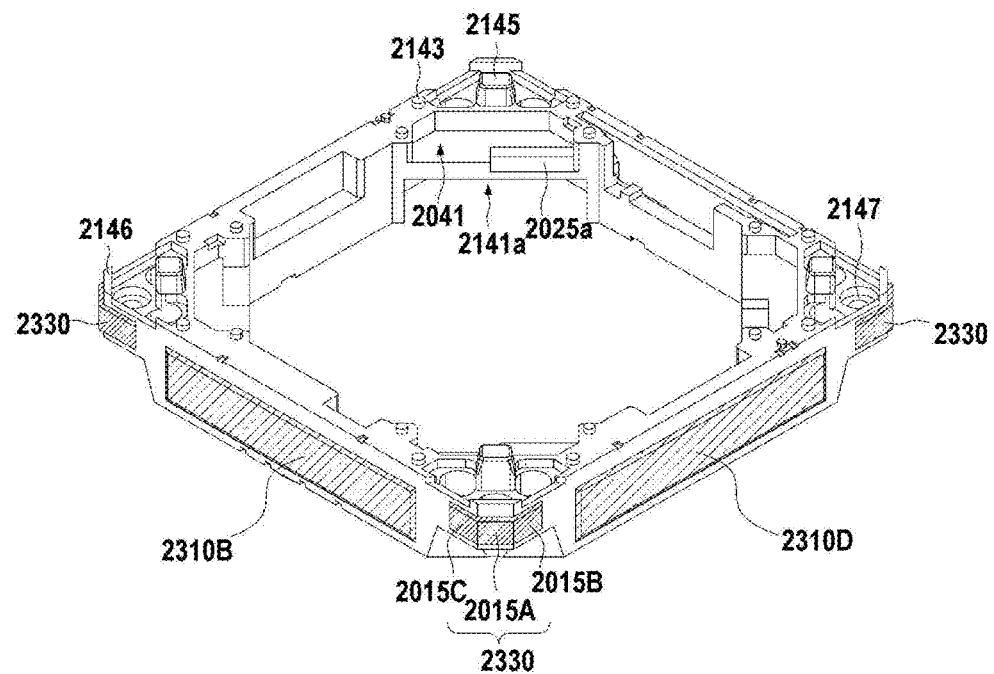
[FIG. 64a]
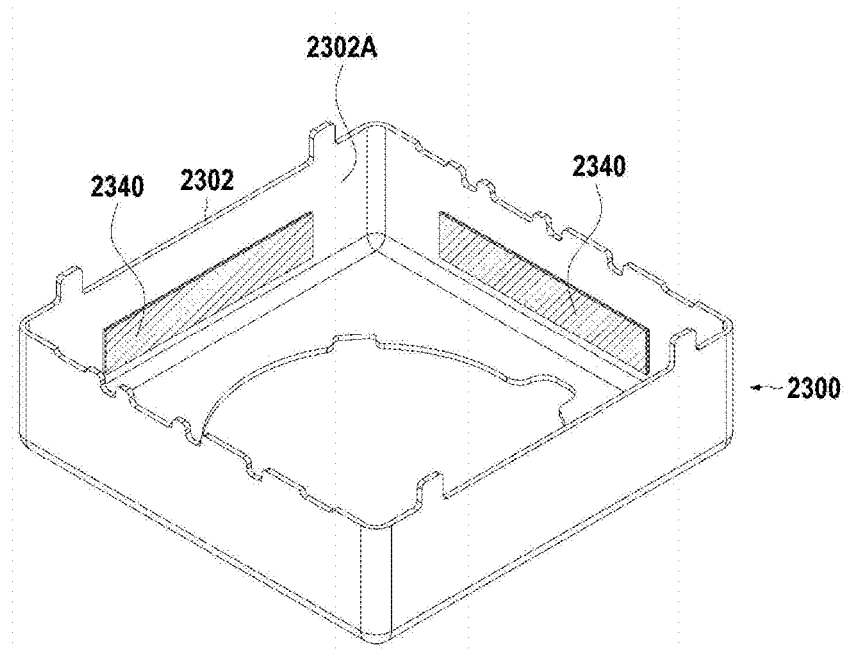

[FIG. 64b]
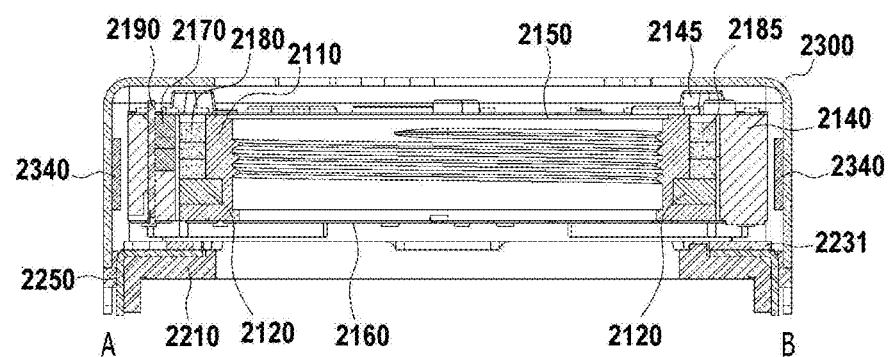
[FIG. 65a]
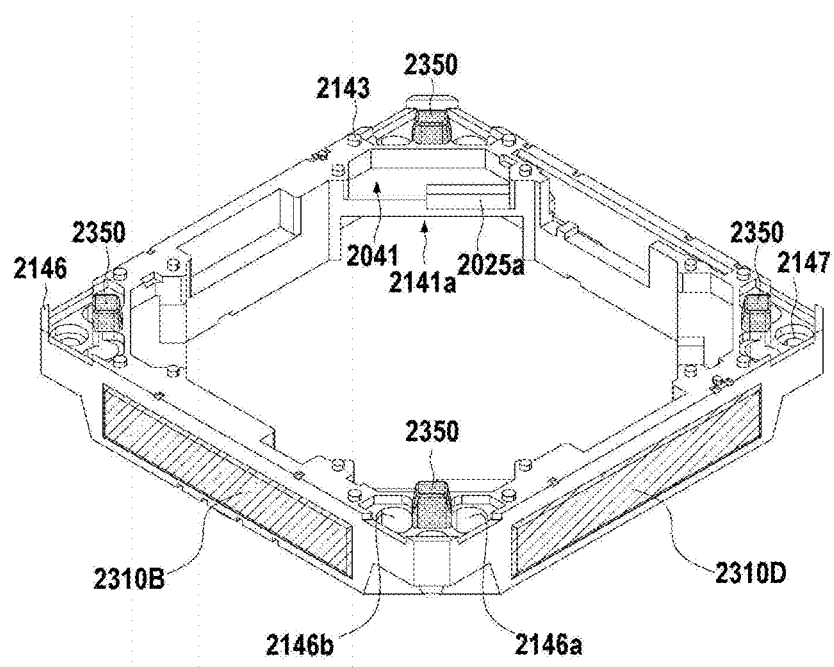

[FIG. 65b]
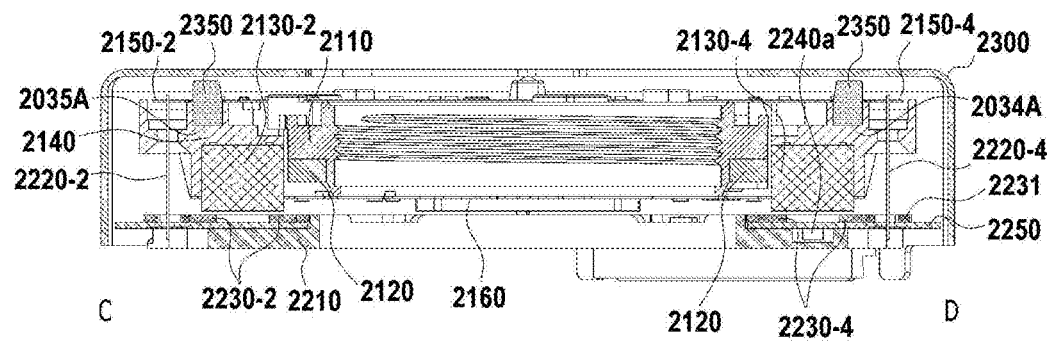
[FIG. 66]
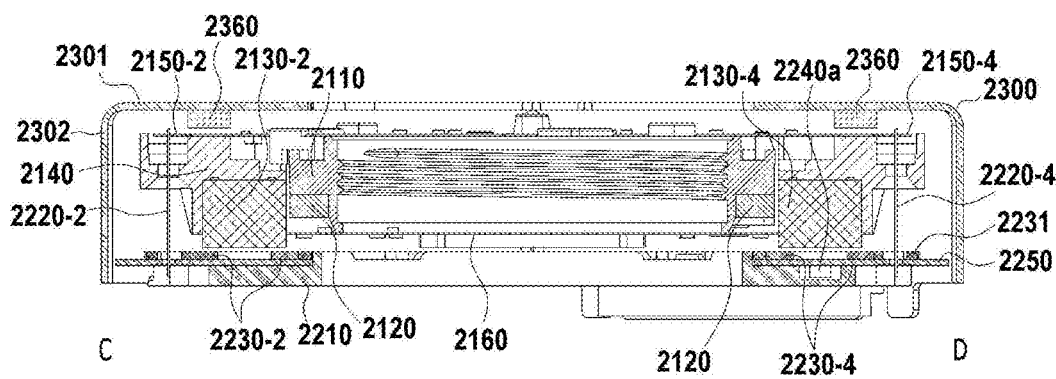

[FIG. 67]
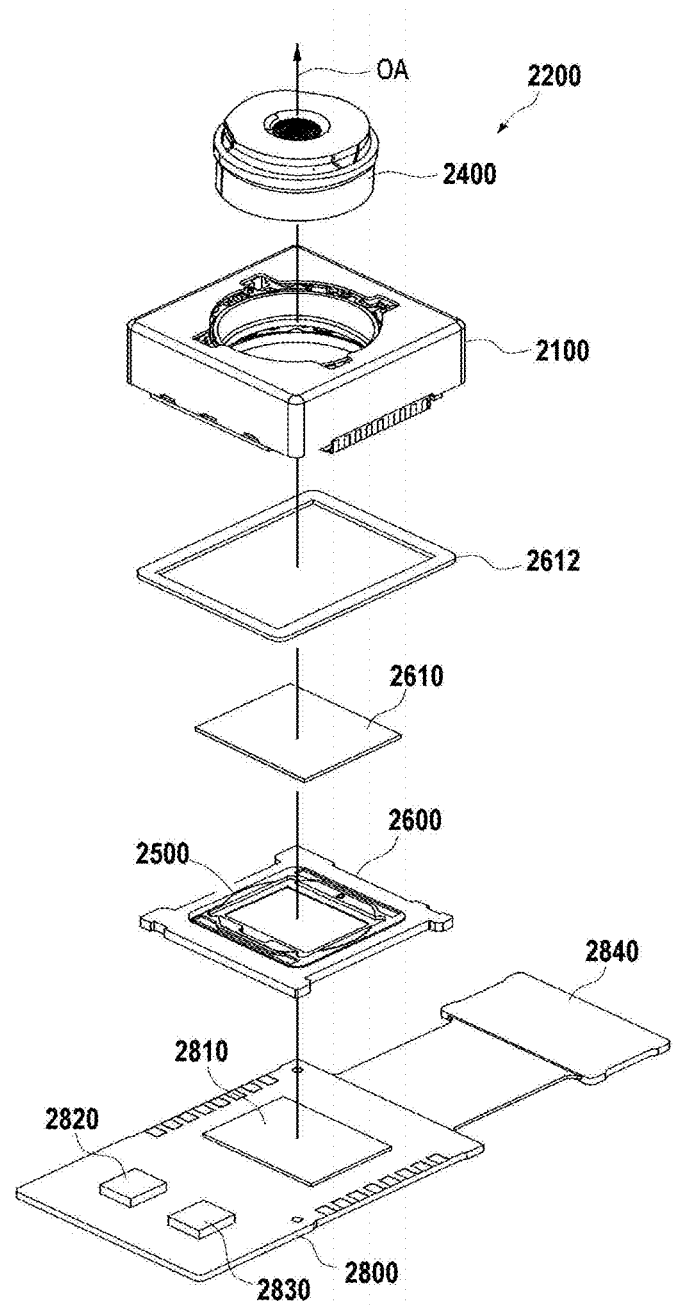

[FIG. 68]
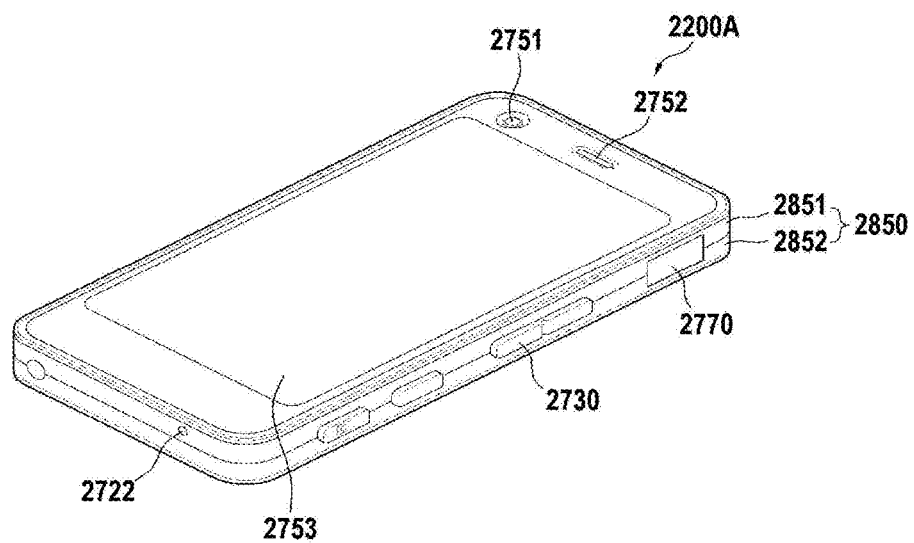

[FIG. 69]
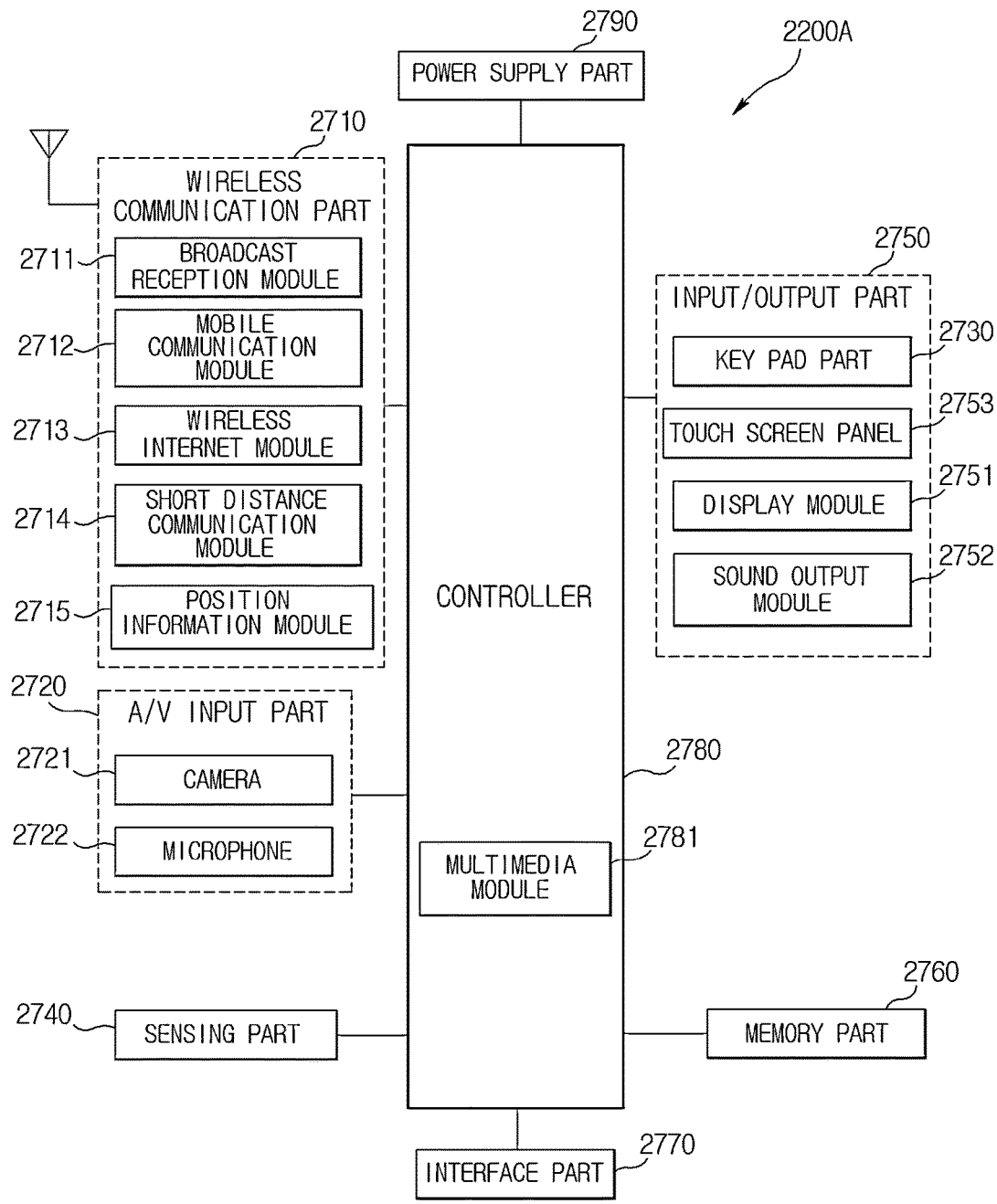

LENS DRIVING DEVICE, CAMERA MODULE, AND OPTICAL DEVICE

CROSS REFERENCE TO RELATED APPLICATIONS

This application is the National Phase of PCT International Application No. PCT/KR2020/012121, filed on Sep. 8, 2020, which claims priority under 35 U.S.C. 119 (a) to Patent Application Nos. 10-2019-0111746, filed in the Republic of Korea on Sep. 9, 2019, 10-2019-0141616, filed in the Republic of Korea on Nov. 7, 2019, and 10-2019-0164436, filed in the Republic of Korea on Dec. 11, 2019, all of which are hereby expressly incorporated by reference into the present application.

TECHNICAL FIELD

The present embodiment relates to a lens driving device, a camera module and an optical apparatus.

BACKGROUND OF THE INVENTION

Ultra-small and low power consumption camera modules have difficulty in being applied with technology of VCM (Voice Coil Motor) used in the conventional general camera module, such that researches related thereto have been briskly waged.

Demands for and manufacturing of smartphones and electronic products comprising, but not limited to, mobile phones mounted with cameras have increased. Cameras for mobile phones are trended for high pixelated (definition) and miniaturization, and as a result, actuators are also headed for being miniaturized, large-diametered and multifunctional. In order to implement a high pixelated mobile camera, additional functions are required comprising, but not limited to, improved performances of portable cameras, autofocusing, improved shutter shaking and zooming functions.

Furthermore, problems of characteristic changes in a sensing magnet for autofocus feedback have been generated in the conventional camera devices by heat caused by UV beams irradiated in the course of curing adhesives for fixing a lens to a bobbin.

DISCLOSURE

Technical Field

A first exemplary embodiment of the present invention provides a lens driving device, and a camera module comprising the same and an optical apparatus configured to prevent a short-circuit of a support member by restricting or inhibiting an overflow of adhesive member over a hole of a circuit substrate when the adhesive member overflows over an upper surface of the circuit substrate due to an adhesive member discharge recess formed around an escape portion of a base and a staircase portion.

A second exemplary embodiment of the present invention provides a camera device having a structure configured to prevent the characteristic change of a sensing magnet disposed on a bobbin.

A third exemplary embodiment of the present invention provides a lens driving device, and a camera module comprising the same and an optical apparatus configured to absorb a shock caused by collision between an OIS mover and a cover member whereby an amount of shock inflicted on the OIS mover can be reduced, and damages to the OIS mover and the cover member can be prevented.

Technical Solution

A lens driving device according to a first exemplary embodiment of the present invention may comprise: a housing; a bobbin disposed inside of the housing; a first coil disposed on the bobbin; a magnet disposed on the housing to correspond to the first coil; an upper elastic member coupled to an upper surface of the bobbin and an upper surface of the housing; a second coil disposed below the housing to correspond to the magnet to an optical axis direction; a circuit substrate disposed below the second coil to comprise a hole; a base disposed below the circuit substrate to comprise an escape portion that exposes a first region of a lower surface of the circuit substrate; a support member coupled at one end to the first region of the lower surface of the circuit substrate by passing through the hole of the circuit substrate and coupled at the other end to the upper elastic member; and an adhesive member disposed at the first region of the lower surface of the circuit substrate, wherein the base may comprise a first recess formed at an upper surface of the base around the escape portion, and wherein the first recess of the base may be opened to an outer surface of the base.

Preferably, the support member may be disposed at a corner of the housing and the escape portion may be disposed at a corner of the base corresponding to the corner of the housing.

Preferably, the first recess may comprise a floor surface having a staircase with the upper surface of the base; and a first lateral wall abutting one lateral of the floor surface; and a second lateral wall abutting the other lateral of the floor surface.

Preferably, the base may comprise a staircase portion formed at a lower surface of the base around the escape portion, and some portions of the adhesive member may be disposed at the staircase portion.

Preferably, some parts of portions of the adhesive member may be disposed at the first recess of the base.

Preferably, the circuit substrate may comprise a pad that abuts the hole of the circuit substrate and that is formed at a lower surface of the circuit substrate, and the one end of the support member may be coupled to the pad by a solder.

Preferably, the first recess may be spaced apart from the escape portion.

Preferably, the adhesive member may be disposed at an inner surface of a corner of the cover member corresponding to the corner of the base.

Preferably, the first recess of the base may be opened to a first outer surface adjacent to one side of the corner of the base, and may be opened to a second outer surface adjacent to the other side of the corner of the base.

Preferably, the staircase portion may comprise a first surface having a staircase with the lower surface of the base to the optical axis direction, and a second surface that connects the first surface and the lower surface of the base, wherein the first surface may be overlapped with the first recess.

A lens driving device according to another exemplary embodiment of the present invention may comprise: a housing; a bobbin disposed within the housing; a first coil disposed at the bobbin; a magnet disposed at the housing to correspond to the first coil; an upper elastic member coupled to an upper surface of the bobbin and an upper surface of the housing; a circuit member disposed below the housing to comprise a second coil corresponding to the magnet to an optical axis direction; a base disposed below the circuit member to comprise an escape portion exposing a first region underneath the circuit member; a support member coupled at one end to the first region of the lower surface of the circuit substrate by passing through the circuit substrate and coupled at the other end to the upper elastic member; and an adhesive member disposed at the first region of the lower surface of the circuit substrate, wherein the base may comprise a recess formed at an upper surface of the base around the escape portion, and wherein the recess of the base may be opened to an outer surface of the base.

Preferably, the circuit member may comprise a coil substrate disposed below the housing to comprise the second coil; and a circuit substrate disposed below the coil substrate, wherein the support member may be coupled at one end to a region of a lower surface of the circuit substrate.

Preferably, the circuit member may comprise a coil substrate comprising the second coil; and a circuit substrate disposed below the coil substrate to be electrically connected to the coil substrate, wherein the one end of the support member may be coupled to a region of the lower surface of the coil substrate.

Preferably, the circuit member may comprise a substrate part disposed on an upper surface of the base to comprise the second coil; and a terminal part extended to the substrate part to comprise a terminal electrically connected to the second coil.

A lens driving device according to a second exemplary embodiment of the present invention may comprise: a base; a housing disposed by being spaced apart from the base; a bobbin disposed within the housing; a first magnet disposed on the housing; a first coil disposed on the bobbin to face the first magnet; a first substrate disposed between the base and the housing to comprise a second coil facing the first magnet; an upper elastic member connecting the housing and the bobbin; a lateral elastic member connecting the first substrate and the upper elastic member; a second magnet disposed on the bobbin; and a sensor detecting the second magnet, wherein the bobbin may comprise a recess disposed with the second magnet, the bobbin may be opened at a portion corresponding to an upper surface of the second magnet by the recess of the bobbin, and the upper elastic member may comprise an inner portion coupled with the bobbin, an outer portion coupled with the housing, a connection part connecting the inner portion and the outer portion, and a first region extended from the inner portion to overlap the second magnet to an optical axis direction.

Preferably, the first region of the upper elastic member may be extended from the inner portion of the upper elastic member to an opposite direction of the connection part of the upper elastic member.

Preferably, the first region of the upper elastic member may cover (conceal) an upper surface of the second magnet when viewed from above.

Preferably, a gap, instead of the bobbin, may be disposed to an optical axis direction between the first region of the upper elastic member and the second magnet.

Preferably, the connection part of the upper elastic member may not overlap the second magnet to the optical axis direction.

Preferably, the first region of the upper elastic member may overlap a portion of an upper surface of the second magnet to the optical axis direction and an adhesive may be disposed between the first region of the upper elastic member and the upper surface of the second magnet.

Preferably, the first region of the upper elastic member may comprise a recess formed by allowing the outer portion of the first region to be inwardly caved in, and the adhesive may be connected to the recess of the first region of the upper elastic member.

Preferably, the upper elastic member may be disposed on an upper surface of the bobbin, the upper surface of the bobbin may be disposed at a position higher than that of the upper surface of the second magnet to prevent the second magnet from being protruded above the bobbin, and the first region of the upper elastic member may be spaced apart from the upper surface of the second magnet.

Preferably, the upper surface of the second magnet may be brought into contact with the first region of the upper elastic member.

Preferably, the bobbin may comprise, at a part corresponding to the connection part of the upper elastic member, a depression part formed by being depressed from the upper surface of the bobbin, and the depression part of the bobbin may be spaced apart from the recess of the bobbin.

Preferably, the second magnet may be disposed on an upper surface of the first coil.

Preferably, the lens driving device may comprise a second substrate disposed on the housing, the sensor may be disposed on the second substrate, and the bobbin may not be disposed between the second magnet and the sensor.

Preferably, the upper elastic member may comprise four (4) upper elastic units, the lateral elastic member may comprise four (4) wires connected in pairs with the four (4) upper elastic units, the second substrate may comprise four (4) terminals disposed on an upper surface of the second substrate, and the four (4) terminals of the second substrate may be electrically connected to the first substrate through the four (4) upper elastic units and the four (4) wires.

Preferably, the lens driving device may comprise a lower elastic member disposed below the upper elastic member to connect the bobbin and the housing, the second substrate may comprise two (2) terminals disposed below the second substrate, the lower elastic member may comprise two (2) lower elastic units, and the two (2) terminals of the second substrate may be electrically connected to the first coil through the two (2) lower elastic units.

Preferably, the second magnet may comprise a lower surface disposed at an opposite side of the upper surface of the second magnet, an inner surface connecting the upper surface of the second magnet and the lower surface of the second magnet, an outer surface and both lateral surfaces, and the lower surface of the second magnet may be fixed to the first coil, and the inner surface of the second magnet and the both lateral surfaces may be fixed to the bobbin.

Preferably, at least parts of the first region of the upper elastic member may overlap an entire area of upper surface of the second magnet to the optical axis direction.

Preferably, the first region of the upper elastic member may cover (conceal) more than 90% area of the upper surface of the second magnet when viewed from above.

A camera device according to a second exemplary embodiment of the present invention may comprise: a PCB (Printed Circuit Board); an image sensor disposed on the PCB; a lens driving device; a lens coupled to a bobbin of the lens driving device to be disposed at a position corresponding to that of the image sensor; and an adhesive fixing the lens to the bobbin, wherein the adhesive may be cured by UV beam.

A lens driving device according to a second exemplary embodiment of the present invention may comprise: a bobbin; a first coil disposed on the bobbin; a first magnet facing the first coil; an upper elastic member connected to the bobbin; a second magnet disposed on the bobbin; and a sensor detecting the second magnet, wherein the bobbin may comprise a recess disposed with the second magnet, the bobbin may be opened at a portion corresponding to an upper surface of the second magnet by the recess of the bobbin, and wherein the upper elastic member may comprise an inner portion coupled with the bobbin, an outer portion disposed at an outside of the inner portion, a connection part connecting the inner portion and the outer portion, and a first region extended from the inner portion to cover (conceal) the upper surface of the second magnet, when viewed from above.

A lens driving device according to a second exemplary embodiment of the present invention may comprise: a base; a housing spaced apart from the base; a bobbin disposed within the housing; a first magnet disposed on the housing; a first coil disposed on the bobbin to face the first magnet; a first substrate disposed between the base and the housing to comprise a second coil facing the first magnet; an upper elastic member connecting the housing and the bobbin; a lateral elastic member connecting the first substrate and the first substrate; a second magnet disposed on the bobbin; and a sensor detecting the second magnet, wherein the upper elastic member may be disposed on an upper surface of the bobbin, the bobbin may comprise a recess disposed with the second magnet, an upper surface of bobbin may be opened at a portion corresponding to the upper surface of the second magnet by the recess of the bobbin, the upper elastic member may comprise a first region overlapping the second magnet to an optical axis direction, and an adhesive may be disposed between the first region of the upper elastic member and the upper surface of the second magnet.

A lens driving device according to a third exemplary embodiment of the present invention may comprise: A cover member comprising an upper plate and a lateral plate connected to the upper plate; a housing disposed within the cover member; a bobbin disposed within the housing; a first coil disposed on the bobbin; a magnet disposed on the housing to correspond to the first coil; an upper elastic member coupled to an upper surface of the bobbin and to an upper surface of the housing; a second coil disposed below the housing to correspond to the magnet to an optical axis direction; a circuit substrate disposed below the second coil; a support member connecting the circuit substrate and the upper elastic member; and a cushioning stopper coupled to an outer lateral surface of the housing corresponding to the lateral plate of the cover member, wherein the cushioning stopper may be interposed between the lateral surface of the housing and the lateral plate of the cover member, and stiffness of the cushioning stopper may be smaller than that of the housing.

Preferably, a recess may be formed at the lateral surface of the housing and the cushioning stopper may comprise a first portion disposed in the recess and a second portion protruded out of the recess.

Preferably, the recess may comprise a floor surface having a staircase with the lateral surface of the housing and a lateral wall connecting the floor surface and the lateral surface of the housing, wherein the first portion of the cushioning stopper may be brought into contact with the floor surface and the lateral wall.

Preferably, the cushioning stopper may be interposed between the upper surface and the lower surface of the housing.

Preferably, thickness of the first portion of the cushioning stopper may be greater than that of the second portion of the cushioning stopper.

Preferably, the housing may comprise a lateral portion and a corner portion, wherein the cushioning stopper may comprise a first cushioning stopper disposed on a lateral surface of the lateral portion of the housing.

Preferably, the cushioning stopper may comprise a second cushioning stopper disposed on the corner portion of the housing.

Preferably, the second coil may be provided with a driving signal, and the housing may be moved to a direction perpendicular to an optical axis by interaction between the second coil and the magnet.

A lens driving device according to another exemplary embodiment of the present invention may comprise: an upper plate; a cover member comprising a lateral plate connected to the upper plate; a housing disposed within the cover member; a bobbin disposed within the housing; a first coil disposed on the bobbin; a magnet disposed on the housing to correspond to the first coil; an upper elastic member coupled to an upper surface of the bobbin and to an upper surface of the housing; a second coil disposed below the housing to correspond to the magnet to an optical axis direction; a circuit substrate disposed below the second coil; a support member connecting the circuit substrate and the upper elastic member; and a cushioning stopper coupled to an upper surface of the housing corresponding to the upper plate of the cover member, wherein the cushioning stopper may be interposed between the upper surface of the housing and the upper plate of the cover member, and the stiffness of the cushioning stopper may be smaller than that of the housing.

Preferably, a recess may be formed at the upper surface of the housing and the cushioning stopper may comprise a first portion disposed in the recess and a second portion protruded out of the recess.

Preferably, the recess may comprise a floor surface having a staircase with the upper surface of the housing and a lateral wall connecting the floor surface and the upper surface of the housing, wherein the first portion of the cushioning stopper may be brought into contact with the floor surface and the lateral wall.

Preferably, thickness of the first portion of the cushioning stopper may be greater than that of the second portion of the cushioning stopper.

Preferably, the stiffness of the cushioning stopper may be smaller than that of the cover member.

Preferably, the cushioning stopper may be formed with at least one of rubber, silicon, foam or urethane.

Advantageous Effects of the Invention

The first exemplary embodiment of the present invention has an advantageous effect in that an adhesive member is restricted or inhibited from being introduced into an upper surface of a hole of a circuit substrate caused by overflow of the adhesive member over an upper surface of the circuit substrate, and a short-circuit of support member can be prevented.

The second exemplary embodiment of the present invention has an advantageous effect in that the characteristic phenomenon of a sensing magnet being changed by a UV beam irradiated from an upper surface can be prevented. Furthermore, fixing (or fastening) power of sensing magnet can be improved.

The third exemplary embodiment of the present invention has an advantageous effect in that a cushioning stopper is disposed to absorb a shock caused by collision between an OIS mover and a cover member, whereby an amount of shock inflicted on the OIS mover can be reduced and damage to the OIS mover and the cover member can be prevented.

BRIEF DESCRIPTION OF DRAWINGS

FIG. 1 is an exploded perspective view of a lens driving device according to a first exemplary embodiment of the present invention.

FIG. 2 is a coupled perspective view of a lens driving device except for a cover member of FIG. 1.

FIG. 3a is a perspective view of a bobbin, a second magnet and a third magnet illustrated in FIG. 1.

FIG. 3b illustrates a first coil coupled to a bobbin.

FIG. 4a is a perspective view of a housing, a circuit substrate, a first position sensor and a capacitor illustrated in FIG. 1.

FIG. 4b is a coupled perspective view of a housing, a first magnet, a circuit substrate, a first position sensor and a capacitor.

FIG. 5 is a cross-sectional view of a lens driving device illustrated in FIG. 2 to an AB direction.

FIG. 6 is a cross-sectional view of a lens driving device of FIG. 2 to a CD direction.

FIG. 7a is an enlarged view of a circuit substrate and a first position sensor.

FIG. 7b is a block diagram of a first position sensor illustrated in FIG. 7a according to an exemplary embodiment of the present invention.

FIG. 8 shows an upper elastic member illustrated in FIG. 1.

FIG. 9 shows a lower elastic member illustrated in FIG. 1.

FIG. 10 is a coupled perspective view of an upper elastic member, a lower elastic member, a base, a support member, a second coil and a circuit substrate.

FIG. 11 shows a coupling between first to fourth terminals of circuit substrate and upper elastic units.

FIG. 12 shows a coupling between fifth and sixth terminals of circuit substrate and lower elastic unit.

FIG. 13 is a separated perspective view of a second coil, a circuit substrate, a base and a second position sensor.

FIG. 14 shows a bottom view of a second coil and a circuit substrate.

FIG. 15 is a bottom view of a circuit substrate coupled with a second coil.

FIG. 16 is a bottom view of a second coil, a circuit substrate, a solder and adhesive members.

FIG. 17 is a perspective view of a base.

FIG. 18a is an enlarged view of dotted lines of a base of FIG. 17.

FIG. 18b is a bottom view of FIG. 18a.

FIG. 19a is a bottom view of a lens driving device before adhesive members are applied.

FIG. 19b is a bottom view of a support member coupled to a staircase portion of a base and to a lower surface of a circuit substrate.

FIG. 20a shows a flow path of adhesive member when the adhesive member is applied to a recess of a base and to an escape portion of the base less a staircase portion according to a first exemplary embodiment of the present invention.

FIG. 20b shows a flow path of adhesive member when the adhesive member is applied to an escape portion of a base according to a first exemplary embodiment of the present invention.

FIG. 21a shows an open wire of support member generated in an actual product in case of FIG. 20a.

FIG. 21b shows a non-occurrence of open wire on a support member in an actual product in case of FIG. 20b.

FIG. 22a shows a positional relationship between a recess of a base and a first recess of circuit substrate.

FIG. 22b shows a positional relationship between a recess of a base and a second recess of circuit substrate.

FIG. 23a shows a positional relationship between a recess of a base and a first recess of a circuit substrate according to another exemplary embodiment.

FIG. 23b shows a positional relationship between a recess of a base and a second recess of a circuit substrate according to another exemplary embodiment.

FIG. 24 shows a second coil comprising a circuit member according to another exemplary embodiment.

FIG. 25 shows an exploded perspective view of a camera module according to a first exemplary embodiment of the present invention.

FIG. 26 shows a perspective view of a portable terminal according to a first exemplary embodiment of the present invention.

FIG. 27 is a block diagram of a portable terminal illustrated in FIG. 26.

FIG. 28a is a perspective view of a lens driving device according to a second exemplary embodiment of the present invention.

FIG. 28b is a plane view of a lens driving device according to a second exemplary embodiment of the present invention.

FIG. 29 is a cross-sectional view taken along line A-A of FIG. 28a.

FIG. 30 is a cross-sectional view taken along line B-B of FIG. 28a.

FIG. 31 is a cross-sectional view taken along line C-C of FIG. 28a.

FIG. 32 is an exploded perspective view of a lens driving device according to a second exemplary embodiment of the present invention.

FIGS. 33 through 36 are exploded perspective views of some configurations of a lens driving device according to a second exemplary embodiment of the present invention.

FIG. 37 is a perspective view illustrating a state where a cover is removed from a lens driving device according to a second exemplary embodiment of the present invention.

FIG. 38 is a schematic view illustrating an enlargement of a portion of FIG. 37 along with an irradiated direction of UV beams.

FIG. 39 is a perspective cross-sectional view illustrating a cross-section of some configurations of a lens driving device of FIG. 37.

FIG. 40 is a plan view of some configurations of a lens driving device of FIG. 37.

FIG. 41 is an enlarged view illustrated with an enlargement of some configurations of FIG. 40.

FIG. 42 is a perspective view illustrating some configurations of a lens driving device according to a modification.

FIG. 43 is an exploded perspective view of a camera device according to a second exemplary embodiment of the present invention.

FIG. 44 is a perspective view illustrating an optical apparatus according to a second exemplary embodiment of the present invention.

FIG. 45 is a block diagram of an optical apparatus according to a second exemplary embodiment of the present invention.

FIG. 46 is an exploded perspective view of a lens driving device according to a third exemplary embodiment of the present invention.

FIG. 47 is a coupled perspective view of a lens driving device less a cover member of FIG. 46.

FIG. 48a is a perspective view of a bobbin, a second magnet and a third magnet illustrated in FIG. 46.

FIG. 48b illustrates a first coil coupled to a bobbin.

FIG. 49a is a perspective view of a housing, a circuit substrate, a first position sensor and a capacitor illustrated in FIG. 46.

FIG. 49b is a coupled perspective view of a housing, a first magnet, a circuit substrate, a first position sensor and a capacitor.

FIG. 50 is a cross-sectional view of a lens driving device illustrated in FIG. 47 to an AB direction.

FIG. 51 is a cross-sectional view of a lens driving device illustrated in FIG. 47 to a CD direction.

FIG. 52a is an enlarged view of a circuit substrate and a first position sensor.

FIG. 53 is a schematic view of an upper elastic member illustrated in FIG. 46.

FIG. 54 is a schematic view of a lower elastic member illustrated in FIG. 46.

FIG. 55 is a coupled perspective view of an upper elastic member, a lower elastic member, a base, a support member, a second coil and a circuit substrate.

FIG. 56 is a schematic view of a coupling between first to fourth terminals of circuit substrate and upper elastic units.

FIG. 57 is a schematic view of a coupling between fifth and sixth terminals of circuit substrate and a lower elastic unit.

FIG. 58 is a separated perspective view of a second coil, a circuit substrate, a base and a second position sensor.

FIG. 59 is a bottom view of a second coil and a circuit substrate.

FIG. 60 is a bottom view of a circuit substrate coupled with a second coil.

FIG. 61 is a perspective view of a cushioning stopper.

FIG. 62 is a cross-sectional view of a housing and a cushioning stopper.

FIG. 63a is a perspective view of a housing coupled with a cushioning stopper according to another exemplary embodiment.

FIG. 63b is a perspective view of a housing coupled with a cushioning stopper according to still another exemplary embodiment.

FIG. 64a is a schematic view of a cushioning stopper according to another exemplary embodiment.

FIG. 64b is a cross-sectional view of a lens driving device disposed with a cushioning stopper of FIG. 64a to a CD direction of FIG. 47.

FIG. 65a is a perspective view of a housing disposed with a cushioning stopper according to still another exemplary embodiment.

FIG. 65b is a cross-sectional view of a lens driving device disposed with a cushioning stopper of FIG. 65a to a CD direction of FIG. 47.

FIG. 66 is a cross-sectional view of a lens driving device disposed with a cushioning stopper to a CD direction of FIG. 47 according to still another exemplary embodiment.

FIG. 67 is an exploded perspective view of a camera module according to a third exemplary embodiment of the present invention.

FIG. 68 is a perspective view of a portable terminal according to a third exemplary embodiment of the present invention.

FIG. 69 is a block diagram of a portable terminal illustrated in FIG. 68.

BEST MODE

Figure 52B:
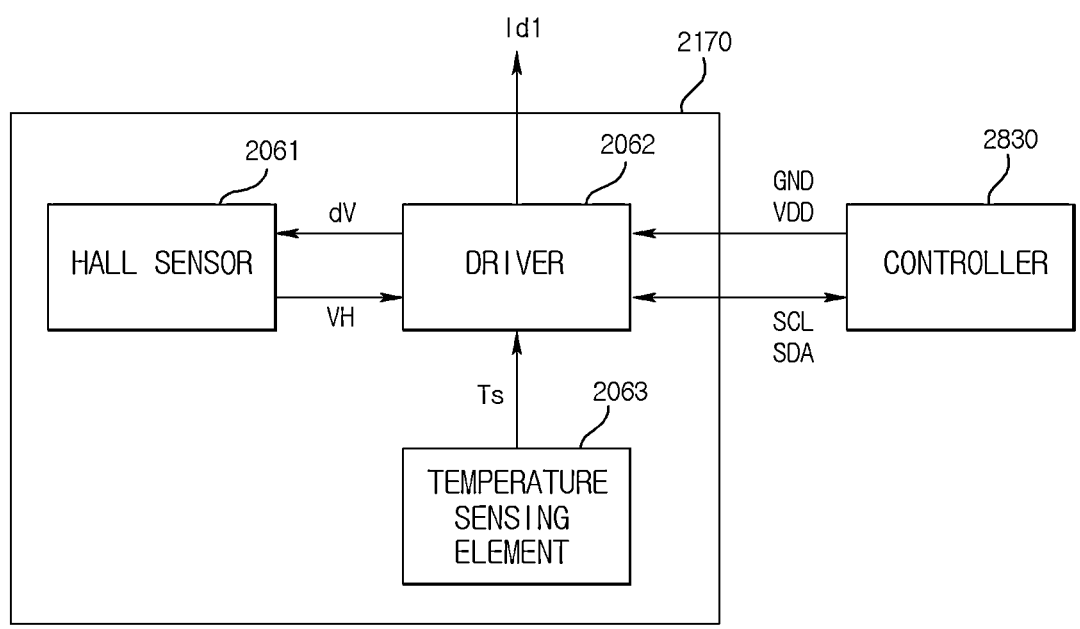
FIG. 52b is a block diagram of a first position sensor illustrated in FIG. 52a according to an exemplary embodiment of the present invention.

Now, exemplary embodiments of the present invention will be described in detail with reference to the accompanying drawings.

However, it should be noted that the technical ideas of the present invention should not be construed as limited to some of the explained exemplary embodiments but may be embodied in mutually different various shapes, and one or more elements may be selectively coupled or substituted among exemplary embodiments as long as within the scope of technical concept of the present invention.

Furthermore, unless otherwise defined, all terms (comprising technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Furthermore, the terms used in the following exemplary embodiments are not intended to limit the invention but to explain the exemplary embodiments.

As used herein, the singular forms "a", "an" and "the" are intended to comprise the plural forms as well, unless the context clearly indicates otherwise, and when it is described as at least one of "A and (or) B, C (or one or more), it means that one or more combinations of all combinations made of A, B and C may be comprised.

It will be understood that, although the terms first, second, A, B, (a), (b), etc. may be used herein to describe various elements, these elements should not be limited by these terms. These terms are only used to distinguish one element from another element, and the essence, sequence or order of relevant elements is not limited by the terms.

Furthermore, it will be understood that when an element is referred to as being "connected", "coupled" or "joined" to another element, it can be directly "connected", "coupled" or "joined" to the other elements or intervening elements may be present.

Furthermore, it will be understood that when an element is referred to as being "upper (above)" or "below (beneath)", the "upper (above)" or "below (beneath)" comprises not only two or more elements being directly "connected", "coupled" or "joined" to the other elements but also one or more elements being formed or disposed between two or more elements.

Furthermore, spatially relative terms, such as "beneath" ("below"), "above" ("upper") and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

An "optical axis direction" as used hereinafter may be defined as an optical axis direction of a lens and/or image sensor in a state of being coupled to a lens driving device.

Hereinafter used 'vertical direction' may be a direction parallel with an optical axis direction. The vertical direction may correspond to a 'z axis direction'. Hereinafter-used 'horizontal direction' may be a direction perpendicular to a vertical direction. That is, the horizontal direction may be a direction perpendicular to an optical axis. Therefore, the horizontal direction may comprise an 'x axis direction' and a 'y axis direction'.

An "auto focus function" as used hereinafter may be defined as a function of automatically matching a focus relative to an object by adjusting a distance from an image sensor by moving a lens module to an optical axis direction in order to obtain a clear image of the object on the image sensor. Furthermore, an 'auto focus feedback (CLAF, closed-loop auto focus) control' is defined as a real-time feedback control of a lens position by detecting a distance between an image sensor and a lens in order to improve accuracy of focus adjustment.

A "handshake correction function" as used hereinafter may be defined as a function of moving or tilting a lens module to a direction perpendicular to an optical axis direction in order to offset vibration (motion) generated on the image sensor by an external force. Meantime, the "handshake (handshaking) correction" may be interchangeably used with an "OIS (Optical Image Stabilization)".

Hereinafter, a lens driving device may be called by being substituted with a lens driver, a VCM (Voice Coil Motor), an actuator, a lens moving device, or the like, and hereinafter, the term of a coil may be expressed by being substituted with a coil unit, and the term of "elastic member" may be expressed by being substituted with an elastic unit or a spring.

Furthermore, the terms of "terminal" in the hereinafter explanation may be expressed by being substituted with a pad, an electrode, a conductive layer, a bonding part or the like.

For the convenience of explanation, although a lens driving device according to an exemplary embodiment is explained by using a Cartesian coordinate system (x, y, z), the lens driving device may be explained by using other coordinate systems, and therefore, exemplary embodiments will not be limited thereto. The 'x' axis and 'y' axis in each drawing mean a direction perpendicular to 'z' axis which is an optical axis direction, and it should be noted that z axis direction which is an optical axis (OA) direction may be called a 'first direction', x axis direction may be called a 'second direction' and y axis direction may be called a 'third direction'.

A lens driving device according to the exemplary embodiments can perform 'auto focusing function'. Here, the auto focusing function means that a focus of an image of an object can be automatically captured on an image sensor surface.

Furthermore, a lens driving device according to the exemplary embodiments can perform the 'handshaking correction function (OIS)'. Here, the handshaking correction function (OIS) refers to prevention of an outline of a photographed image from being unclearly formed due to vibration caused by a user's handshake during photographing of a still image.

FIG. 1 is an exploded perspective view of a lens driving device (100) according to a first exemplary embodiment of the present invention.

FIG. 2 is a coupled perspective view of a lens driving device (100) less a cover member (300) of FIG. 1.

Referring to FIGS. 1 and 2, a lens driving device (100) may comprise a bobbin (110), a first coil (120), a first magnet (130), a housing (140), an upper elastic member (150), a lower elastic member (160), a base (210), a support member (220), a second coil (230), and a circuit substrate (250).

Furthermore, the lens driving device (100) may further comprise a first position sensor (170), a circuit substrate (190) and a second magnet (180) in order to perform an AF feedback driving.

Furthermore, the lens driving device (100) may further comprise a second position sensor (240) in order to perform the OIS.

Furthermore, the lens driving device (100) may further comprise a third magnet (185) and a cover member (300).

Furthermore, the lens driving device (100) may further comprise a capacitor (195) mounted on the circuit substrate (190).

Now, an explanation on the bobbin (110) will be first made.

The bobbin (110) may be disposed at a lateral surface of the housing (140), and moved to an optical axis (OA) direction or to a first direction (e.g., z axis direction) by an electrical interaction between the first coil (120) and the first magnet (130).

FIG. 3a is a perspective view of a bobbin (110), a second magnet (180) and a third magnet (185) illustrated in FIG. 1, and FIG. 3b illustrates a first coil (120) coupled to a bobbin (110).

Referring to FIGS. 3a and 3b, the bobbin (110) may comprise an opening for mounting a lens barrel. For example, the opening of the bobbin (110) may be a through hole through which the bobbin (110) can pass to an optical axis direction, and the bobbin (110) may take a shape of a round, oval, or polygonal shape. However, the shape of the bobbin (110) is not limited thereto.

A lens may be directly mounted on the opening of the bobbin (110), but the present invention is not limited thereto, and in other exemplary embodiments, a lens barrel for mounting or coupling at least one lens may be coupled to or mounted on the opening of the bobbin (110). The lens or the lens barrel may be coupled to an inner surface of the bobbin (110) in various methods.

The bobbin (110) may comprise mutually discrete first lateral portions (110b-1) and mutually discrete second lateral portions (110b-2), and each of the second lateral portions (110b-2) may mutually connect two adjacent first lateral portions (110b-1) respectively. For example, each horizontal direction length or vertical direction length of first lateral portions (110b-1) of bobbin (110) may be different from each horizontal direction length or each vertical direction length of the second lateral portions (110b-2). For example, the horizontal direction length of the first lateral portions (110b-1) may be greater than the horizontal direction length of the second lateral portions, but the present invention is not limited thereto, and the former may be same as or smaller than the latter in other exemplary embodiments.

A protruder (115) may be formed at a lateral surface of the bobbin (110).

For example, the protruder (115) may be disposed at a lateral surface of the second lateral portions (110b-2) of bobbin (110), but the present invention is not limited thereto.

The protruder (115) may pass through a center of opening of the bobbin (110) and may protrude to a direction parallel with a straight line perpendicular to an optical axis, but the present invention is not limited thereto.

The protruder (115) of bobbin (110) may correspond to a recess portion (25a) of the housing (140), may be inserted into or disposed with the recess portion (25a) of the housing (140), and may restrict or prevent the bobbin (110) from rotating over a predetermined scope about the optical axis.

Furthermore, the protruder (115) may function as a stopper to thereby restrict or prevent a lower surface of bobbin (110) from directly colliding with the base (210), the second coil (230), or the circuit substrate (250) even if the bobbin (110) is moved by an external shocks beyond a stipulated scope to an optical axis direction {e.g., direction from an upper elastic member (150) toward the lower elastic member (160)}.

An upper surface of bobbin (110) may be disposed with a first escape recess (112a) to avoid a spatial interference with a first frame connection part (153) of the upper elastic member (150). For example, the first escape recess (112a) may be disposed on the second lateral portions (110b-2) of bobbin (110), but the present invention is not limited thereto.

An upper surface of bobbin (110) may be disposed with a guide part (111) to guide an installation position of the upper elastic member (150). For example, as illustrated in FIG. 3a, the guide part (111) of bobbin (110) may be disposed on the first escape recess (112a) to guide a path through which the frame connection part (153) of the upper elastic member (150) passes. For example, the guide part (111) may protrude toward an optical axis direction from a floor surface of the first escape recess (112a).

Furthermore, a damper may be interposed between the guide part (110) and the first frame connection part (153) of the upper elastic member (150). The bobbin (110) may comprise a stopper (116) protruding from an upper surface thereof.

The stopper (116) of bobbin (110) may function to prevent an upper surface of bobbin (110) from directly colliding with an inner lateral surface of an upper plate of the cover member (300), even if the bobbin (110) is moved over a stipulated scope by an external shock and the like when the bobbin (110) moves to a first direction for auto focusing function.

In order for the bobbin (110) to be coupled or fixed to the upper elastic member (150), the bobbin (110) may comprise a first coupling part (113) formed at an upper surface or an upper lateral surface of bobbin (110). For example, the first coupling part (113) of bobbin (110) illustrated in FIG. 3a may take a protruder (protrusion) shape, but the present invention is not limited thereto, and the first coupling part (113) of bobbin (110) may take a groove shape or a plane surface shape in other exemplary embodiments.

Furthermore, in order for the bobbin (110) to be coupled or fixed to the lower elastic member (160), the bobbin (110) may comprise a second coupling part (117) formed at a lower surface or a lower lateral surface of bobbin (110). For example, the second coupling part (117) of bobbin (110) illustrated in FIG. 3b may take a protruder (protrusion) shape, but the present invention is not limited thereto, and the second coupling part (117) of bobbin (110) may take a groove shape or a plane surface shape in other exemplary embodiments.

An outer lateral surface of bobbin (110) may be provided with an accommodation recess (105) to allow the first coil (120) to be accommodated therewith, inserted thereinto or disposed therewith. The accommodation recess (105) may take a recess structure depressed from outer lateral surfaces of the first and second lateral portions (110b-1, 110b-2) of bobbin (110) and may have a shape, a closed curve shape (e.g., a ring shape) that matches to that of the first coil (120).

Furthermore, in order to restrict the coil (120) from breaking away and to guide both ends of the coil (120) when the coil (120) is connected to the lower elastic members (160-1, 160-2), guide recesses (116a, 116b) may be provided at two first lateral portions (110b-1) disposed opposite to the bobbin (110) or at lower surfaces of the two second lateral portions (110b-2).

An outer lateral surface of the bobbin (110) may be provided with an accommodation recess (180a) where the second magnet (180) is accommodated, inserted into, fixed or disposed thereat.

The accommodation recess (180a) of bobbin (110) may take a structure depressed from an outer lateral surface of bobbin (110), and may have an opening that is opened to at least one of an upper surface or a lower surface of the bobbin (110), but the present invention is not limited thereto.

Furthermore, an outer lateral surface of bobbin (110) may be provided with an accommodation recess (185a) where a third magnet (185) is accommodated, inserted into, fixed or disposed therewith.

The accommodation recess (185a) of bobbin (110) may take a structure depressed from an outer lateral surface of bobbin (110), and may have an opening that is opened to at least one of an upper surface or a lower surface of the bobbin (110), but the present invention is not limited thereto.

Each of the accommodation recesses (180a, 185a) of bobbin (110) may be positioned at an upper lateral surface of the accommodation recess (105) disposed with the first coil (120), and may be connected or abutted with the accommodation recess (105), but the present invention is not limited thereto, and may be mutually spaced apart in other exemplary embodiments.

The accommodation recess (180a) of bobbin (110) may be provided on any one of the first lateral portions (110b-1) of bobbin (110), and the accommodation recess (185a) of bobbin (110) may be provided on any remaining one of the first lateral portions (110b-2) of bobbin (110).

For example, the accommodation recesses (180a, 185a) may be disposed on mutually facing two first lateral portions of bobbin (110) or two first lateral portions disposed opposite thereto.

The weight balance of the second magnet (180) and the third magnet (185) may be maintained because the second magnet (180) and the third magnet (185) are disposed within the accommodation recesses (180a, 185a) provided on the two first lateral portions disposed on an opposite lateral surface of the bobbin (110), and in the exemplary embodiments, an effect of AF driving force caused by magnetic field interference between the first magnet (130) and the second magnet (180) and an effect of AF (Auto Focusing) driving force caused by magnetic field interference between the first magnet (130) and the third magnet (185) can be mutually offset, whereby accuracy of AF driving can be improved.

An inner peripheral surface of bobbin (110) may be provided with a screw thread (11) for being coupled with a lens or a lens barrel. The screw thread may be formed on the inner peripheral surface of bobbin (110) while the bobbin (110) is fixed by a jig or the like, and an upper surface of bobbin (110) may be formed with jig fixing recesses (15a, 15b). For example, the jig fixing recesses (15a, 15b) may be provided on the upper surface of two first lateral portions (110b-1) disposed opposite to the bobbin (110) or the upper surface of two second lateral portions. However, the present invention is not limited thereto. The jig fixing recesses (15a, 15b) may function as a foreign object collection part that collects foreign objects.

Next, an explanation of the first coil (120) will be made.

The first coil (120) may be disposed on an outer lateral surface of bobbin (110).

The first coil (120) may be disposed underneath the second and third magnets (180, 185), but the present invention is not limited thereto. For example, the first coil (120) may be dispose underneath the protruder (115) of bobbin (110), but the present invention is not limited thereto.

For example, the first coil (120) may not be overlapped with the second and third magnets (180, 185) to a direction perpendicular to an optical axis, but the present invention is not limited thereto. In other exemplary embodiments, the first coil (120) may be partially overlapped with at least each of the second and third magnets (180, 185) to a direction perpendicular to an optical axis.

For example, the first coil (120) may be accommodated into the accommodation recess (105) of bobbin (110), the second magnet (180) may be inserted into or disposed with the accommodation recess (180a) of bobbin (110), and the third magnet (185) may be inserted into or disposed with the accommodation recess (185a) of bobbin (110).

Each of the second magnet (180) and the third magnet (185) disposed on the bobbin (110) may be spaced apart from the first coil (120) to an optical axis (OA) direction, but the present invention is not limited thereto, and in other exemplary embodiments, each of the second magnet (180) and the third magnet (185) disposed on the bobbin (110) may be brought into contact with the first coil (120) or partially overlapped with the first coil (120) to a direction perpendicular to the optical axis. The first coil (120) may encompass an outer lateral surface of bobbin (110) to a rotating direction about an optical axis (OA). For example, the first coil (120) may take a closed curve shape, e.g., a ring shape, wound on the outer lateral surface of bobbin (110).

The first coil (120) may be directly wound on the outer lateral surface of bobbin (110), but the present invention is not limited thereto, and in other exemplary embodiments, the first coil (120) may be wound on the bobbin (110) using a coil ring, or may be provided with an angled ring-shaped coil block.

The first coil (120) may be provided with an electric power or a driving signal. The electric power or a driving signal provided with the first coil (120) may be a DC signal or an AC signal, or may comprise a DC signal and an AC signal, or may take a voltage or a current shape.

When supplied with a driving signal (e.g., a driving current), the first coil (120) may form an electromagnetic force through electromagnetic interaction with the first magnet (130), and the bobbin (110) may be moved to an optical axis direction by the formed electromagnetic force.

The bobbin (110) at an initial position of AF mover may be moved to an upward direction or a downward direction, which is called a bidirectional driving of AF mover.

Alternatively, the bobbin (110) at an initial position of AF mover may be moved to an upward direction, which is called a unidirectional driving of AF mover.

The first coil (120) at an initial position of AF mover may be so disposed as to mutually correspond to or as to be overlapped with the first magnet (130) disposed on the housing (140) to a direction parallel with a straight line that is perpendicular to the optical axis and that passes the optical axis.

For example, the AF mover may comprise the bobbin (110) and elements {e.g., first coil (120), second and third magnets (180, 185)} coupled to the bobbin (110). The AF mover may further comprise a lens coupled to the bobbin (110) or a lens barrel.

Furthermore, the initial position of AF mover may be a first position of AF mover while no power is applied to the first coil (120), or a position of the AF mover being placed by the upper and lower elastic members (150,160) that are elastically transformed only by the weight of the AF mover.

In addition, the initial position of the bobbin (110) may be a position of the AF mover being placed when gravity is applied from the bobbin (110) to the base (210) direction, or conversely when the gravity is applied from the base (210) to the bobbin (110) direction.

Next, an explanation will be made on the second and third magnets (180, 185).

The second magnet (180) may be expressed as a "sensing magnet" in terms of the fact that it provides a magnetic field detected by the first position sensor (170), and the third magnet (185) may be expressed as a "balancing magnet" in terms of the fact that it offsets the magnetic field effect of the sensing magnet (180), and maintains a weight balance with the sensing magnet (180).

The second magnet (180) may be disposed within the accommodation recess (180a) of bobbin (110), and may be so disposed as to face the first position sensor (170). For example, the second magnet (180) at an initial position of bobbin (110) may be overlapped with the first position sensor (170) to a direction parallel with a straight line that is perpendicular to the optical axis and that passes the optical axis, but the present invention is not limited thereto. In other exemplary embodiments, the first position sensor (170) at an initial position of bobbin (110) may not be overlapped with the second magnet (180) to a direction parallel with a straight line that is perpendicular to the optical axis and that passes the optical axis.

Parts of any one surface of the second magnet (180) facing the first position sensor (170) may be exposed from the accommodation recess (180a), but the present invention is not limited thereto, and in other exemplary embodiments, a portion of any one surface of the second magnet (180) facing the first position sensor (170) may not be exposed from the accommodation recess (180a).

For example, each of the second and third magnets (180, 185) may be two pole-magnetized magnet comprising two N poles and two S poles, or four-pole magnet.

Each of the second and third magnets (180, 185) may comprise a first magnet part (17a), a second magnet part (17b), and a partition (17c) interposed between the first magnet part (17a) and the second magnet part (17b). Here, the partition (17c) may be expressed by being replaced with a "non-magnetic material partition".

The first magnet part (17a) may comprise an N pole, an S pole and a first boundary part between the N pole and the S pole. The first boundary part may comprise a section having almost no polarity as a portion substantially having no magnetism, and may be a portion naturally generated in order to form a magnet formed with an N pole and an S pole.

The second magnet part (17b) may comprise an N pole, an S pole and a second boundary part between the N pole and the S pole. The second boundary part may comprise a section having almost no polarity as a portion substantially having no magnetism, and may be a portion naturally generated in order to form a magnet formed with an N pole and an S pole.

The partition (17c) may separate or isolate the first magnet part (17a) and the second magnet part (17b), and may be a portion substantially having no magnetism and almost no polarity. For example, the partition (17c) may be made of a non-magnetic material, air or the like. The non-magnetic material partition may be expressed as a "Neutral Zone", or a "neutral region".

The partition (17c) may be a portion artificially formed when the first magnet part (17a) and the second magnet part (17b) are magnetized, and width of the partition (17c) may be greater than that of the first boundary part (or the width of second boundary part). Here, the width of partition (17c) may be a length to a direction from the first magnet part (17a) toward the second magnet part (17b). The width of the first boundary part (or the second boundary part) may be a length of the first boundary part to a direction from an N pole to an S pole of each first and second magnet parts.

For example, the first magnet part (17a) and the second magnet part (17b) may be so disposed as to face each other to an optical axis direction. For example, the partition (17c) may be parallel with a straight line that is perpendicular to an optical axis and that passes through the optical axis.

In another exemplary embodiment, each of the second and third magnets may be a single pole-magnetized magnet each having an N pole and an S pole.

For example, each of the second and third magnets (180, 185) disposed on the bobbin (110) may be such that a boundary surface of N pole and S pole may be parallel with a direction perpendicular to the optical axis. For example, N pole and S pole of each of the second and third magnets (180, 185) may face each other toward an optical axis direction.

For example, surface of each of the second and third magnets (180, 185) facing the first position sensor (170) may be divided by an N pole and an S pole, but the present invention is not limited thereto.

For example, in another exemplary embodiment, each of the second and third magnets (180, 185) disposed on the bobbin (110) may be such that a boundary surface of an N pole and an S pole may be parallel with the optical axis.

The second magnet (180) may move to an optical axis direction along with the bobbin (110), and the first position sensor (170) may detect a strength or magnetic force of magnetic field at the second magnet (180) moving toward an optical axis direction, and may output an output signal generated from the detected result.

For example, the strength or the magnetic force detected by the first position sensor (170) in response to displacement of bobbin (110) may be changed to an optical axis direction, and the first position sensor (170) may output an output signal proportionate to the detected strength of magnetic field, where the displacement to the optical axis direction of bobbin (110) may be detected using the output signal of the first position sensor.

Next, an explanation on the housing (140) will be made.

The housing (140) may accommodate the bobbin (110) at an inner lateral surface thereof, and may support the first magnet (130), the first position sensor (170) and the circuit substrate (190).

FIG. 4a is a perspective view of a housing (140), a circuit substrate (190), a first position sensor (170) and a capacitor (195) illustrated in FIG. 1, and FIG. 4b is a coupled perspective view of a housing (140), a first magnet (130), a circuit substrate (190), a first position sensor (170) and a capacitor (195).

Referring to FIGS. 4a and 4b, the housing (140) may generally take a hollowed cylindrical shape. For example, the housing (140) may be disposed with a polygonal (e.g., square, octagonal) or round opening, and the opening of the housing (140) may take a through hole shape passing through the housing (140) to the optical axis direction.

The housing (140) may comprise a plurality of lateral portions (141-1 to 141-4) and corner portions (142-1 to 142-4).

For example, the housing (140) may comprise mutually-discrete first to fourth lateral portions (141-1 to 141-4) and first to fourth corner portions (142-1 to 142-4).

For example, the first and second lateral portions (141-1, 141-2) of housing (140) may face each other or mutually be positioned at an opposite side, and the third and fourth lateral portions (141-3, 141-4) of housing (140) may face each other or mutually be positioned at an opposite side.

Each of the corner portions (142-1 to 142-4) of housing (140) may be disposed or positioned between adjacent two lateral portions (141-1 and 141-2, 141-2 and 141-3, 141-3 and 141-4, 141-4 and 141-1), and may mutually connect the lateral portions (141-1 to 141-4).

For example, the corner portions (142-1 to 142-4) may be disposed on the corner or edge of the housing (140). For example, the number of lateral portions of housing (140) may be four (4), and the number of corner portions may be four (4), but the present invention is not limited thereto, and the number may be more than five (5).

Each of the lateral portions (141-1 to 141-4) of housing (140) may be so disposed as to be parallel with any one corresponding lateral plates (302) of cover member (300).

For example, the lateral portions (141-1 to 141-4) of housing (140) may correspond to or face the first lateral portions (110b-1) of bobbin (110), and the corner portions (142-1 to 142-4) of housing (140) may correspond to or face the second lateral portions (110b-2) of bobbin (110).

The corner portions (142-1 to 142-4) of housing (140) may be disposed or installed with a first magnet (130).

For example, corners or corner portions (142-1 to 142-4) of housing (140) may be disposed with an accommodation portion (141a) or acceptance portion for accommodating the magnet (130).

The accommodation portion (141a) of housing (140) may be provided on at least one lower part or lower end of the corner portions (142-1 to 142-4) of housing (140).

For example, the accommodation portion (141a) of housing (140) may be provided at a lower inner part or lower inner end of each of the four corner portions (142-1 to 142-4).

The accommodation portion (141a) of housing (140) may be formed with a recess, for example, a concaved groove, having a shape corresponding to that of the first magnet (130), but the present invention is not limited thereto.

For example, a lateral surface of the accommodation portion (141a) of housing (140) facing the first coil (120) may be formed with a first opening, and a lower surface of the accommodation portion (141a) of housing (140) facing the second coil (230) may be formed with a second opening, which is intended to facilitate an easy installation of first magnet (130).

For example, a first surface (11a) of the first magnet (130) fixed to or disposed on the accommodation portion (141a) of housing (140) may be exposed through the first opening of the accommodation portion (141a).

Furthermore, a lower surface (11a) of the first magnet (130) fixed to or disposed on the accommodation portion (141a) of housing (140) may be exposed through the second opening of the accommodation portion (141a).

The housing (140) may be disposed with an escape recess (41) provided on an upper surface of the corner portions (142-1 to 142-4) in order to avoid a spatial interference with the first frame connection part (153) of the upper elastic member (150).

For example, the escape recess (41) of housing (140) may take a shape depressed from an upper surface of housing (140), and may be so disposed as to be more adjacent to a center of housing than to a stopper (145) or to an adhesive infusion hole (147). For example, the escape recess (41) may be disposed at an inner lateral surface, which is a center direction of housing (140) based on the stopper (145) of housing (140), and an outer lateral surface, which is an opposite side, may be disposed with the adhesive infusion holes (146a, 146b).

The corner portions (142-1 to 142-4) of housing (140) may be formed with a recess portion (25a) corresponding to or facing the protruder (115) of bobbin (110). The recess portion (25a) of housing (140) may be disposed on the accommodation portion (141a) of housing (140). For example, the recess portion (25a) of housing (140) may be disposed on a floor surface of the escape recess (41). For example, the floor surface of the recess portion (25a) may be so disposed as to be lower than the floor surface of escape recess (41), and the accommodation portion (141a) of housing (140) may be so disposed as to be lower than the floor surface of escape recess (41).

The first magnet (130) may be fixed to the accommodation portion (141a) using an adhesive, but the present invention is not limited thereto.

For example, the corner portions (142-1 to 142-4) of housing (140) may be formed with at least one adhesive infusion hole (146a, 146b) for injecting an adhesive. The said at least one adhesive infusion hole (146a, 146b) may take a shape depressed from an upper surface of the corner portions (142-1 to 142-4).

The said at least one adhesive infusion hole (146a, 146b) may comprise a through hole that passes through the corner portions (142-1 to 142-4), and the adhesive infusion hole (146a, 146b) may be connected or communicate with the accommodation recess (141a) of housing (140) to expose at least a part {e.g., at least a part of an upper surface of magnet (130)} of the first magnet (130). The adhesive may be well coated on the first magnet (130) because the adhesive infusion hole (146a, 146b) exposes at least a part {e.g., at least a part of an upper surface of magnet (130)} of the first magnet (130), whereby the fixing force between the first magnet (130) and the housing (140) can be improved.

The housing (140) may be disposed with at least one stopper (147a) that protrudes from an outer lateral surface of the lateral portions (141-1 to 141-4), and the said at least one stopper (147a) may prevent collision with the lateral plates (302) of cover member (300) when the housing (140) is moved to a direction perpendicular to the optical axis.

In order to allow preventing the lower surface of housing (140) from colliding with the base (210) and/or the circuit substrate (250), the housing (140) may be further disposed with a stopper (not shown) protruding from a lower lateral surface.

The housing (140) may comprise an installation recess (14a, or accommodation groove) for accommodating a circuit substrate (190), an installation recess (14b, or accommodation groove) for accommodating a first position sensor (170), and an installation recess (14c, or accommodation groove) for accommodating a capacitor (195).

The installation recess (14a) of housing (140) may be provided on an upper surface or an upper end of at least any one (e.g., 141-1) of the lateral portions (141-1 to 141-4) of housing (140).

In order to facilitate an easy installation of the circuit substrate (190), the installation recess (14a) of housing (140) may be opened at an upper surface thereof, may take a groove shape formed with a lateral surface and a floor, and may have an opening that is opened inwardly of the housing (140).

The installation recess (14a) of housing (140) may have a shape that corresponds to or matches that of the circuit substrate (190).

The installation recess (14b) of housing (140) may be provided at an inner surface of the first lateral portion (141-1) of the housing (140), and may be connected with the installation recess (14a).

The installation recess (14c) of housing (140) may be disposed at one lateral surface of the installation recess (14b), and a protruder or protrusion may be interposed between the installation recess (14b) and installation recess (14c) in order to separate or segregate the capacitor (195) from the first position sensor (170). This is intended to reduce noise caused by increased path by shortening the length of a path for electrical connection of the capacitor (195) and the position sensor (170) through closer position therebetween.

The capacitor (195) may be disposed or mounted on a first surface (19b) of circuit substrate (190). The capacitor (195) may take a chip shape and, at this time, the chip may comprise a first terminal corresponding to one end of the capacitor (195) and a second terminal corresponding to the other end of the capacitor (195). The capacitor (195) may be expressed by replacing with a "capacitive element" or a condenser.

In another exemplary embodiment, the capacitor may be so implemented as to be comprised into a circuit substrate (190). For example, the circuit substrate (190) may comprise a capacitor comprising a first conductive layer, a second conductive layer and an insulation layer (e.g., dielectric layer) that is interposed between the first conductive layer and the second conductive layer.

The capacitor (195) may be electrically connected in parallel to the first and second terminals (B1, B2) for providing a power (or a driving signal) to the position sensor (170) from outside.

Alternatively, the capacitor (195) may be electrically connected in parallel to terminals of the first position sensor (170) electrically connected to the first and second terminals (B1, B2) of circuit substrate (190).

For example, one end of the capacitor (195) (or a first terminal of capacitor chip) may be electrically connected to the first terminal (B1) of circuit substrate (190), and the other end of the capacitor (195) (or a terminal of capacitor chip) may be electrically connected to the second terminal (B2) of circuit substrate (190).

The capacitor (195) may function as a smoothing circuit for removing ripple components comprised in power signals (GND, VDD) provided to the first position sensor (170) from outside by being electrically connected in parallel to the first and second terminals (B1, B2) of circuit substrate (190), whereby a stable and constant power signal can be provided to the first position sensor (170).

The capacitor (195) may also protect the first position sensor (170) against the high frequency noise or ESD introduced from outside by being electrically connected in parallel to the first and second terminals (B1, B2) of circuit substrate (190).

Furthermore, the capacitor (195) may prevent an overcurrent caused by high frequency noise or ESD introduced from outside from being applied to the first position sensor (170), and prevent the phenomenon of a calibration value relative to displacement of bobbin (110) obtained based on an output signal of the first position sensor (170) caused by overcurrent from being reset.

Furthermore, in order to facilitate an easy installation of the first position sensor (170), the installation recess (14b) of the housing (140) may be opened at an upper surface thereof, and in order to increase the sensing sensitivity, the installation recess (14b) may have an opening that is opened to an inner lateral surface of the first lateral portion (141-1) of the housing (140). The installation recess (14b) of the housing (140) may have a shape corresponding or matching to that of the first position sensor (170).

For example, the circuit substrate (19) may be fixed to the installation recess (14a) of housing (140) by an adhesive member. For example, the adhesive member may be epoxy, double-sided tape or the like, but the present invention is not limited thereto.

The corner portions (142-1 to 142-4) of housing (140) may be disposed with support members (220-1 to 220-4).

The corner portions (142-1 to 142-4) of housing (140) may be disposed with a hole (147) that forms a path through which the support members (220-1 to 220-4) pass. For example, the housing (140) may comprise a hole (147) that passes through an upper surface of the corner portions (142-1 to 142-4).

In another exemplary embodiment, the hole formed on the corner portions (142-1 to 142-4) of housing (140) may have a structure depressed from an outer lateral surface of corner portions of housing (140), and at least a portion of the hole may be opened to an outer lateral surface of corner portions. The number of holes (147) of housing (140) may be the same as that of the support member.

One end of support member (220) may pass through a hole (147) to be connected or bonded to the upper elastic member (150). For example, the said one end of the support member (220) may pass through the hole (147) to be coupled to a first outer lateral frame of the upper elastic member (150).

For example, in order to facilitate an easy coating of damper, the diameter of hole (147) may take a shape of gradually increasing in size to a lower surface direction from an upper surface of housing (140), but the present invention is not limited thereto, and in any other exemplary embodiments, the diameter of the hole (147) may be constant.

An outer lateral surface (148) of the corner portions (142-1 to 142-4) may be provided with an escape recess (148a) in order to form a path through which the support members (220-1 to 220-4) can pass and to avoid a spatial interference between the support members (220-1 to 220-4) and the corner portions (142-1 to 142-4) of housing (140). The escape recess (148a) may be connected to the hole (147) of housing (140), and may take a semi-sphere shape or a semi-oval shape. However, the present invention is not limited thereto. The escape recess (148a) may be connected at a lower surface or a lower end thereof to a lower surface of the housing (140).

For example, the diameter of escape recess (148a) may taper off to a lower direction from an upper surface, but the present invention is not limited thereto.

Furthermore, in order to prevent from directly colliding with an inner surface of an upper plate (301) of cover member (300), the housing (140) may be provided at an upper surface, an upper end or an upper lateral with a stopper (145).

For example, the stopper (145) may be disposed on an upper surface of each of the corner portions (142-1 to 142-4) of housing (140), but the present invention is not limited thereto, and in any other exemplary embodiments, the stopper (145) may be disposed at a lateral surface of the housing (140).

Furthermore, in order to prevent a lower surface of housing (140) from colliding with the base (210) and/or the circuit substrate (250), a stopper (not shown) may be further disposed at a lower surface, a lower end or a lower lateral part of the housing Furthermore, a corner of an upper surface of corner portions (142-1 to 142-4) of housing (140) may be provided with a guide protruder (146) to prevent the damper from overflowing.

For example, the hole (147) of housing (140) may be interposed between a corner {e.g., guide protruder (146)} of an upper surface of corner portions (142-1 to 142-4) of housing (140) and stopper (145).

At least one first coupling part (143) coupled with the first outer lateral frame (152) of the upper elastic member (150) may be disposed at an upper surface, an upper end or an upper lateral part of the housing (140).

The first coupling part (143) of housing (140) may be disposed on at least one of lateral portions (141-1 to 141-4) of housing (140) or corner portions (142-1 to 142-4).

A lower surface, a lower end or a lower lateral part of the housing (140) may be formed with a second coupling part (149) coupled or fixed to a second outer lateral frame (162) of lower elastic member (160).

For example, each of the first and second coupling parts (143, 149) of housing (140) may take a protrusion shape, but the present invention is not limited thereto, and in other exemplary embodiments, each of the first and second coupling parts (143, 149) of housing (140) may take a groove or plane surface shape.

For example, the first coupling part (143) of housing (140) and the hole (152a) of the first outer lateral frame (152) of upper elastic member (150) may be coupled, and second coupling part (149) of housing (140) and the hole (162a) of second outer lateral frame (162) of lower elastic member (160) may be coupled using an adhesive or thermal fusion.

An escape recess (44a) may be disposed on a lower surface of at least one of the lateral portions (141-1) of housing (140) in order to avoid a spatial interference with an area where the second outer lateral frame (162-1 to 162-3) of lower elastic member (160) and the second frame connection part (163) meet.

Next, an explanation will be made on the first magnet (130).

The first magnet (130) may be disposed on at least one of the corners {or corner portions (142-1 to 142-4)} of housing (140). For example, the first magnet (130) may be disposed on each of the corners of housing (140).

The first magnet (130) at an initial position of AF mover may be so disposed on the housing (140) as to allow being partially overlapped with the first coil (120) to a direction parallel with a straight line that is perpendicular to the optical axis and that passes the optical axis.

For example, the first magnet (130) may be inserted into or disposed in an inner lateral surface of any one corresponding accommodation portion (141a) in the corner portions (141-1 or 141-4).

In another exemplary embodiment, the first magnet (130) may be also disposed on an outer lateral surface of the corner portions (141-1 to 141-4) of housing (140).

The first magnet (130) may take a polygonal shape that is easy to be accommodated with the corner portions of the housing (140).

For example, an area of first surface (11a) of the first magnet (130) may be greater than that of second surface (11b). Each first surface (11a) of first magnet (130) may be a surface facing any one surface {or an outer lateral surface of bobbin (110)} of first coil (120), and the second surface (11b) may be an opposite surface of the first surface (11a).

For example, a crosswise length of second surface (11b) of first magnet (130) may be smaller than that of the first surface (11a).

For example, a crosswise direction of first surface (11a) of first magnet (130) may be a direction perpendicular to a direction facing an upper surface from a lower surface of first magnet (130) at the first surface (11a) of first magnet (130), or a direction perpendicular to an optical axis direction from the first surface (11a) of first magnet (130).

For example, a crosswise direction of second surface (11b) of first magnet (130) may be a direction perpendicular to a direction facing an upper surface from a lower surface of first magnet (130) at the second surface (11b) of the first magnet (130), or a direction perpendicular to an optical axis direction from the second surface (11b) of the first magnet (130).

For example, the first magnet (130) may comprise a portion where a crosswise length gradually tapers off toward a direction facing the corner portions (142-1, 142-2, 142-3, or 142-4) of housing (140) at the center of the housing (140).

For example, the first magnet (130) may comprise a portion where a crosswise length of the first magnet (130) tapers off toward a second surface (11b) direction from a first surface (11a) direction. For example, a crosswise direction of the first magnet (130) may be a direction parallel with the first surface (11a) of the first magnet (130).

The first magnet (130) may comprise a plurality of magnets (130-1 to 130-4) disposed on the housing (140).

Each of the plurality of magnets (130-1 to 130-4) may be formed in one body, and the first surface (11a) facing the first coil (120) may be so disposed as to be formed with an S pole while the second surface (11b) may be so disposed as to be formed with an N pole. However, the present invention is not limited thereto, and in other exemplary embodiments, each of the plurality of magnets (130-1 to 130-4) may be such that the first surface (11a) may be so disposed as to be formed with an N pole while the second surface (11b) may be so disposed as to be formed with an S pole.

At least two or more first magnets may be disposed or installed on corner portions of the housing (140), each first magnet facing the other first magnet.

For example, mutually cross-facing two pairs of magnets (130-1 and 130-3, 130-2 and 130-4) may be disposed on the corner portions (142-1 to 142-4) of housing (140). At this time, a plane surface toward a horizontal direction of each of the plurality of magnets (130-1 to 130-4) may be shaped of a triangle, a pentagon, a hexagon, or a lozenge.

In another exemplary embodiment, the mutually cross-facing one pair of magnets may be disposed only on the two mutually facing corner portions of housing (140).

In still another exemplary embodiment, the magnet may not be disposed on the corner portions of the housing (140), but disposed on a lateral portion of the housing (140). For example, another exemplary embodiment may comprise a plurality of magnets disposed on lateral portions of housing (140), where each of the magnets may take a polygonal shape, e.g., a cubic or rectangular shape that is appropriate to be disposed on a lateral portion of housing, but the present invention is not limited thereto.

FIG. 5 is a cross-sectional view of a lens driving device (100) illustrated in FIG. 2 to an AB direction, and FIG. 6 is a cross-sectional view of a lens driving device (100) of FIG. 2 to a CD direction.

Referring to FIGS. 5 and 6, each of the second and third magnets (180, 185) may not be overlapped with the first coil (120) to a direction perpendicular to the optical axis, or to a direction parallel with a straight line that is perpendicular to the optical axis and that passes the optical axis, but the present invention is not limited thereto. In another exemplary embodiment, each of the second and third magnets (180, 185) may be overlapped with the first coil (120).

Furthermore, the second magnet (180) at an initial position of the AF mover may be overlapped or aligned with the third magnet (185) to a direction perpendicular to the optical axis, or to a direction parallel with a straight line that is perpendicular to the optical axis and that passes the optical axis, but the present invention is not limited thereto, and in another exemplary embodiment, the second magnet (180) and the third magnet (185) may not be mutually overlapped.

Furthermore, the first position sensor (170) at an initial position of the AF mover may be overlapped with the second and third magnets (180, 185) to a direction perpendicular to the optical axis, or to a direction parallel with a straight line that is perpendicular to the optical axis and that passes the optical axis, but the present invention is not limited thereto, and in another exemplary embodiment, the first position sensor (170) may not be mutually overlapped with at least one of second and third magnets (180, 185).

Furthermore, the first position sensor (170) may not be mutually overlapped with the first magnet (130) to a direction perpendicular to the optical axis, or to a direction parallel with a straight line that is perpendicular to the optical axis and that passes the optical axis.

For example, the first position sensor (170) may not be overlapped with the first magnet (130) to a direction facing the first coil (120) from the first position sensor (170) or to a direction that is perpendicular to the optical axis and that faces a center of the housing (140) from the first lateral portion (141-a) of housing (140).

Next, an explanation will be made on the circuit substrate (190) and a first position sensor (170).

The circuit substrate (190) may be disposed on or coupled to the housing (140).

For example, the circuit substrate (190) may be disposed on or coupled to any one lateral portion (141-1) of housing (140). The first position sensor (170) may be disposed on or mounted on the circuit substrate (190).

For example, the circuit substrate (190) may be disposed within the installation recess (14a) of housing (140).

For example, the circuit substrate (190) may be interposed between the first corner portion (142-1) and the second corner portion (142-2) of housing (140), and the first to fourth terminals (B1 to B4) of circuit substrate (190) may be electrically connected to the first position sensor (170).

For example, the circuit substrate (190) may not be overlapped with an imaginary line connecting the corner portion (e.g., first corner portion (142-1) or a corner} of housing (140) and an optical axis (OA). This is to prevent a spatial interference between the support member (220) and the circuit substrate (190).

FIG. 7a is an enlarged view of a circuit substrate (190) and a first position sensor (170), and FIG. 7b is a block diagram of a first position sensor (170) illustrated in FIG. 7a according to an exemplary embodiment of the present invention.

Referring to FIGS. 7a and 7b, the circuit substrate (190) may be disposed with terminals (B1 to B6) for being electrically connected to an outer lateral terminal or an external device.

The first position sensor (170) may be disposed on a first surface (19b) of circuit substrate (190), and terminals (B1 to B6) may be disposed on a second surface (19a) of circuit substrate (190), but the present invention is not limited thereto.

In another exemplary embodiment, the first position sensor (170) and the terminals (B1 to B6) may be disposed on any one surface of the first and second surfaces of circuit substrate (180). In still another exemplary embodiment, the first position sensor (170) may be disposed on any one surface of the first and second surfaces of circuit substrate (180), and the terminals (B1 to B6) may be disposed on any other surface of the first and second surfaces.

Here, the second surface (19a) of circuit substrate (190) may be an opposite surface of first surface (19b) of circuit substrate (190). For example, the second surface (19a) of circuit substrate (190) may be any one surface of circuit substrate (190) facing the bobbin (110).

The circuit substrate (190) may comprise a body part (S1) and an extension part (S2) disposed underneath the body part (S1). The body part (S1) may be expressed by being replaced with an "upper portion", and the extension part (S2) may be expressed by being replaced with a "lower portion".

The extension part (S2) may be downwardly extended from the body part (S1). The body part (S1) may take a protruding shape based on lateral surfaces (16a, 16b) of extension part (S2). For example, the lateral surfaces (16a, 16b) of extension part (S2) may be a surface connecting the first surface (19b) and the second surface (19a) of extension part (S2).

The body part (S1) may comprise a first extension region (A1) extended toward a direction facing the first corner portion (142-1) of housing (140) and a second extension region (A2) extended toward a direction facing the second corner portion (142-2) of housing (140).

For example, the first extention region (A1) may be extended or protruded from a first lateral surface (16a) of the extension part (S2), and the second extension region (A2) may be extended or protruded from a second lateral surface (16b) of the extension part (S2).

For example, FIG. 7a shows that a crosswise length of the first extention region (A1) is greater than that of the second extension region (A2), but the present invention is not limited thereto, and in another exemplary embodiment, the crosswise length of the first extention region (A1) may be same as or smaller than that of the second extension region (A2).

For example, a crosswise length of body part (S1) of circuit substrate (190) may be greater than that of the extension part (S2).

For example, the first to fourth terminals (B1 to B4) of circuit substrate (190) may be so disposed as to be mutually spaced apart from the second surface (19a) of the body part (S1). For example, the four terminals (B1 to B4) may be arranged in series to a crosswise direction of the circuit substrate (190).

The first terminal (B1) and the second terminal (B2) respectively may be adjacently disposed to both distal ends of body part (S1) of circuit substrate (190). That is, each of the first terminal (B1) and the second terminal (B2) may be adjacently disposed to any corresponding one out of both distal ends of body part (S1) of circuit substrate.

For example, the first terminal (B1) of circuit substrate (190) may be disposed on one end (e.g., one end of upper end surface) of circuit substrate (190), the second terminal (B1) may be disposed on the other end of the circuit substrate (190), a third terminal (B3) may be interposed between the first terminal (B1) and the second terminal (B2), and a fourth terminal (B4) may be interposed between the third terminal (B3) and the first terminal (B1).

The first terminal (B1) of circuit substrate (190) may be disposed on the first extension region (A1) of body part (S1) of the circuit substrate (190), and the second terminal (B2) may be disposed on the second extension region (A2) of body part (S1) of circuit substrate (190).

The first to fourth terminals (B1 to B4) of circuit substrate (190) may be so disposed as to be more adjacent to an upper surface (19c) than to a lower surface of the circuit substrate (190).

For example, the first to fourth terminals (B1 to B4) may be so formed as to abut the second surface (19a) and the upper surface (19c) of body part (S1) of circuit substrate (190) abutting the second surface (19a).

Furthermore, for example, at least one of the first to fourth terminals (B1 to B4) may comprise a groove (7a) or a via formed on an upper surface (19c) of the circuit substrate.

For example, the third terminal (B3) and the fourth terminal (B4) may comprise a curved portion depressed from the upper surface (19c) of the circuit substrate (190), e.g., a semi-circular via, or a groove (7a).

The soldered and contacted area between the terminals (B3, B4) can be increased by the said groove (7a) to thereby improve the adhesion and solderability.

The fifth terminal (B5) and sixth terminal (B6) of circuit substrate (190) may be disposed on the second surface (19a) of the extension part (S2) of the circuit substrate (190) while being mutually spaced apart.

The circuit substrate (190) may comprise a groove (8a) or a hole provided between the fifth terminal (B5) and the sixth terminal (B6). The groove (8a) may take a shape depressed from a lower surface of the circuit substrate (190), and may be all opened to the first surface (19b) and the second surface (19a) of circuit substrate (190).

A discrete distance between the fifth terminal (B5) and the sixth terminal (B6) may be shorter than that between two adjacent terminals of first to fourth terminals (B1 to B4), which is to prevent the formation of soldering from occurring between the fifth terminal (B5) and the sixth terminal (B6) by the groove (8a) during the soldering operation for electrical connection with outer lateral surface, whereby an electrical short-circuit between the fifth terminal (B5) and the sixth terminal (B6) can be prevented.

Furthermore, for example, at least one of the fifth terminal (B5) and the sixth terminal (B6) may comprise a groove (7a) or a via formed at a lower surface of the circuit substrate (190).

For example, the fifth terminal (B5) and the sixth terminal (B6) may comprise a curved portion depressed from a lower surface of the circuit substrate (190), e.g., a semi-circular via, or a groove. A contacted area between the fifth terminal (B5) and the sixth terminal (B6) may be increased by the groove (7b) to thereby improve the adhesion and solderability.

The circuit substrate (190) may comprise a groove (or recess 90a) interposed between the second terminal (B2) and the third terminal (B3), and a groove (or recess 90b) interposed between the first terminal (B1) and the fourth terminal (B4). Here, the groove (90a, 90b) may be expressed by being replaced with an "escape groove".

Each of the first groove (90a) and the second groove (90b) may take a shape depressed from an upper surface (19c) of the circuit substrate (190), and may be opened to both the first surface (19b) and the second surface (19a) of the circuit substrate (190).

The first groove (90a) of the circuit substrate (190) may be so formed as to avoid a spatial interference with the first outer lateral frame (151) of third upper elastic unit (150-3), and the second groove (90b) of the circuit substrate (190) may be so formed as to avoid a spatial interference with the first outer lateral frame (151) of fourth upper elastic unit (150-4). For example, the circuit substrate (190) may be a PCB (Printed Circuit Board) or an FPCB.

The circuit substrate (190) may comprise a circuit pattern or a wiring (not shown) for electrically connecting the first to sixth terminals (B1 to B6) and the first position sensor (170).

The first position sensor (170) may detect a magnetic field or magnetic strength of second magnet (180) installed on the bobbin (110) in response to the motion of bobbin (110), and may output an output signal in response to the detected result.

The first position sensor (170) may be mounted on the circuit substrate (190) disposed on the housing (140) and may be fixed to the housing (140). For example, the first position sensor (170) may be mounted within the installation recess (14b) of housing (190), and may move along with the housing (140) during an OIS operation.

The first position sensor (170) may be disposed on a first surface (19b) of circuit substrate (190). In another exemplary embodiment, the first position sensor (170) may be disposed on the second surface (19a) of the circuit substrate (190).

The first position sensor (170) may comprise a Hall sensor (61) and a driver (62). For example, the Hall sensor (61) may be formed with silicone series, and an output (VH) of the Hall sensor (61) may be increased as the surrounding (ambient) temperature increases. For example, the surrounding temperature may be a temperature of lens driving device, e.g., a temperature of circuit substrate (190), a temperature of Hall sensor (61), or a temperature of driver (62).

Furthermore, in another exemplary embodiment, the Hall sensor (61) may be formed with GaAs, and an output (VH) of the Hall sensor (61) may decrease relative to the surrounding temperature. In another exemplary embodiment, the output of the Hall sensor (61) may have an approximate −0.06%/° C. inclination relative to the surrounding temperature.

The first position sensor (170) may further comprise a temperature sensing element (63) configured to detect a surrounding temperature. The temperature sensing element (63) may output, to the driver (62), a temperature detection signal (Ts) based on a result of measuring a temperature around the first position sensor (170).

For example, the Hall sensor (61) of first position sensor (190) may generate an output (VH) in response to a result of detecting the magnetic strength of second magnet (180). For example, the size of output of the first position sensor (190) may be proportionate to the magnetic strength of the second magnet (180).

The driver (62) may output a driving signal (dV) for driving the Hall sensor (61), and a driving signal (Id1) for driving the first coil (120).

For example, the driver (62) may receive a clock signal (SCL), a data signal (SDA) and power signals (VDD, GND) from the controller (830, 780) using the data communication using protocol, for example, using I2C communication.

Here, a first power signal (GND) may be a ground voltage, or 0[V], and a second power signal (VDD) may be a preset voltage for driving the driver (62) and may be a DC voltage and/or an AC voltage, but the present invention is not limited thereto.

The driver (62) may generate a driving signal (dV) for driving the Hall sensor (61) using the clock signal (SCL) and the power signals (VDD, GND), and a driving signal (Id1) for driving the first coil (120).

The first position sensor (170) may comprise four (4) terminals for transmitting and receiving a clock signal (SCL), a data signal (SDA) and power signals (VDD, GND), and two (2) terminals for providing a driving signal to the first coil (120).

Furthermore, the driver (62) may receive the output (VH) of Hall sensor (61), and may transmit, to the controller (830, 780), a clock signal (SCL) on the output (VH) of Hall sensor (61) and a data signal (SDA) using the data communication using protocol, e.g., using I2C communication.

Furthermore, the driver (62) may receive a temperature detection signal (Ts) measured by the temperature sensing element (63), and may transmit, to the controller (830, 780), the temperature detection signal (Ts) using the data communication using protocol, e.g., using I2C communication.

The controller (830, 780) may perform the temperature compensation to the output (VH) of Hall sensor (61) based on changes in the surrounding temperature measured by the temperature sensing element (63) of first position sensor (170).

For example, when the driving signal (dV) of Hall sensor (61), or bias signal is 1 [mA], the output (VH) of Hall sensor (61) of first position sensor (170) may be −20 [mV]~+20 [mV].

Furthermore, in case of temperature compensation on the output (VH) of Hall sensor (61) having a negative inclination relative to changes in the surrounding temperature, the output (VH) of Hall sensor (61) of first position sensor (170) may be 0 [mV]~+30 [mV].

When the output (VH) of Hall sensor (61) of first position sensor (170) is expressed by XY coordinate, the reason of an output scope of Hall sensor (61) of first position sensor (170) being of a first quadrant (e.g., 0 [mV]~+30 [mV]) is given as under:

Because an output of Hall sensor (61) in the first quadrant of XY coordinate in response to ambient temperature changes and an output of Hall sensor (61) in the third quadrant move in a mutually opposite direction, accuracy and reliability of Hall sensor may deteriorate when the first and third quadrants are all used as AF driving control section. Therefore, in order to accurately compensate the ambient temperature changes, a predetermined scope of first quadrant may be used as an output scope of Hall sensor (61) of first position sensor.

The first position sensor (170) may comprise first to fourth terminals for two power signals (VDD, GND), a clock signal (SCL) and data (SDA), and fifth and sixth terminals for providing a driving signal to the first coil (120).

The first to fourth terminals of first position sensor (170) may be electrically connected to any corresponding one of the first to fourth terminals (B1 to B4) of circuit substrate (190), and the fifth and sixth terminals of first position sensor (170) may be electrically connected to any corresponding one of the fifth and sixth terminals (B5, B6) of circuit substrate (190).

In another exemplary embodiment, the first position sensor (170) may be implemented singly by a position detection sensor such as a Hall sensor, and in this case, the first position sensor (170) may comprise two input terminals through which power signals are inputted and two output terminals for outputting the output signals, where the first coil (120) may be provided with a driving signal from an outside through a circuit substrate (250).

The first to fourth terminals (B1 to B4) of circuit substrate (190) may be electrically connected to terminals (251-1 to 251-*n*, n being a natural number of n>1) of circuit substrate (250) by upper elastic units (150-1 to 150-4) and support members (220-1 to 220-4), whereby the first position sensor (170) may be electrically connected to terminals (251-1 to 251-*n*, e.g., n=4) of circuit substrate (250).

Furthermore, the fifth and sixth terminals (B5, B6) of circuit substrate (190) may be coupled to lower elastic units (160-1, 160-2), and the first position sensor (170) may be electrically connected to the first coil (120) by the lower elastic units (160-1, 160-2).

For example, the fifth terminal (B5) of circuit substrate (190) may be coupled to the first lower elastic unit (160-1), and the sixth terminal (B6) of circuit substrate (190) may be coupled to the second lower elastic unit (160-2).

Next, an explanation will be made on the upper elastic member (150), the lower elastic member (160) and the support member (220).

FIG. 8 shows an upper elastic member (150) illustrated in FIG. 1, FIG. 9 shows a lower elastic member (160) illustrated in FIG. 1, FIG. 10 is a coupled perspective view of an upper elastic member (150), a lower elastic member (160), a base (210), a support member (220), a second coil (230) and a circuit substrate (250), FIG. 11 shows a coupling between first to fourth terminals (B1 to B4) of circuit substrate (190) and upper elastic units (150-1 to 150-4), FIG. 12 shows a coupling between fifth and sixth terminals (B5, B6) of circuit substrate (190) and lower elastic units (160-1, 160-2), FIG. 13 is a separated perspective view of a second coil (230), a circuit substrate (250), a base (210) and a second position sensor (240), FIG. 14 shows a bottom view of a second coil (230) and a circuit substrate (190), FIG. 15 is a bottom view of a circuit substrate (250) coupled with a second coil (230), and FIG. 16 is a bottom view of a second coil (230), a circuit substrate (250), a solder (39A) and adhesive members (290-1 to 290-4).

Referring to FIGS. 8 to 16, the upper elastic member (150) may be coupled to an upper part, an upper surface or an upper end of bobbin (110), and the lower elastic member (160) may be coupled to a lower part, a lower end or a lower surface of bobbin (110).

For example, the upper elastic member (150) may be coupled to an upper part, an upper surface or an upper end of bobbin (110) or to an upper part, an upper surface or an upper end of housing (140), and the lower elastic member (160) may be coupled to a lower part, a lower end or a lower surface of bobbin (110), or to a lower part, a lower end or a lower surface of housing (140).

The upper elastic member (150) and the lower elastic member (160) may elastically support the bobbin (110) relative to the housing (140).

The support member (220) may movably support the housing (140) to a direction perpendicular to an optical axis relative to the base (210), and may electrically connect any one of the upper or lower elastic members (150,160) and the circuit substrate (250).

Referring to FIG. 8, the upper elastic member (150) may comprise mutually and electically separated plurality of upper elastic units (150-1 to 150-4). Although FIG. 10 illustrates four (4) electically separated upper elastic units, the number is not limited thereto, and the number may be more than three (3).

Each of the first to fourth upper elastic units (150-1 to 150-4) may be directly coupled to any corresponding one of the first to fourth terminals (B1 to B4) of circuit substrate (190) and electrically connected thereto.

Some parts of each of the plurality of upper elastic units may be disposed on the first lateral portion (141-1) of housing (140) disposed with the circuit substrate (190), and at least one upper elastic unit may be disposed on each of the remaining second to fourth lateral portions (141-2 to 141-4) less the first lateral portion (141-1) of housing (140).

Each of the first to fourth upper elastic units (150-1 to 150-4) may comprise a first outer lateral frame (152) coupled with the housing (140).

At least one of the first to fourth upper elastic units (150-1 to 150-4) may further comprise a first inner lateral frame (151) coupled with the bobbin (110), and a first frame connection part (153) connecting the first inner lateral frame (151) and the first outer lateral frame (152).

In the exemplary embodiment of FIG. 8, each of the first and second upper elastic units (150-1, 150-2) may be disposed only with the first outer lateral frame, and may not be disposed with the first inner lateral frame and the first frame connection part, and each of the first and second upper elastic units (150-1, 150-2) may be spaced apart from the bobbin (110).

Each of the third and fourth upper elastic units (150-3, 150-4) may comprise a first inner lateral frame (151), a first outer lateral frame and a first frame connection part (153), but the present invention is not limited thereto.

For example, the first inner lateral frame (151) of the third and fourth upper elastic units (150-3, 150-4) may be provided with a hole (151*a*) for being coupled with the first coupling portion (113) of bobbin (110), but the present invention is not limited thereto. For example, a hole (152*a*) of the first inner lateral frame (151) may have at least one cut-out portion (51*a*) for allowing an adhesive member to be introduced between the first coupling portion (113) of bobbin (110) and the hole (151*a*).

The first outer lateral frame (152) of the first to fourth upper elastic members (150-1 to 150-4) may be provided with a hole (152*a*) for being coupled with the first coupling portion (143) of housing (140).

Each first outer lateral frame (151) of first to fourth upper elastic units (150-1 to 150-4) may include a body part coupled with the housing (140) and connection terminals (P1 to P4) connected to any corresponding one of the first to fourth terminals (B1 to B4) of the circuit substrate (190). Here, the connection terminals (P1 to P4) may be expressed by replacing the same with a "extension part". For example, the support member (220) may be coupled with the body part of the first outer lateral frame (151).

Each first outer lateral frame of first to fourth upper elastic units (150-1 to 150-4) may comprise a first coupling portion (520) coupled to the housing (140), a second coupling portion (510) coupled to any corresponding one of the support members (220-1 to 220-4), a connection portion (530) connecting the first coupling portion (520) and the second coupling portion (510), and extension portions (P1 to P4) coupled to the second coupling portion (510) and extended to the first lateral portion (141-1) of the housing (140).

Each body part of first to fourth upper elastic units (150-1 to 150-4) may comprise a first coupling portion (520). Furthermore, each body part of first to fourth upper elastic units (150-1 to 150-4) may further comprise at least one of a second coupling portion (510) and a connection portion (530).

For example, one end of the first support member (220-1) may be coupled to the second coupling portion (510) of the first upper elastic unit (150-1) by a solder or a conductive adhesive member, and one end of second support member (220-2) may be coupled to the second coupling portion (510) of second upper elastic unit (150-1), one end of third support member (220-3) may be coupled to the second coupling portion (510) of the third upper elastic unit (150-3), and one end of the fourth support member (220-4) may be coupled to the second coupling portion (510) of the fourth upper elastic unit (150-4).

The second coupling portion (510) may be disposed with a hole (52) through which the support member (220-1 to 220-4) passes. One end of the support member (220-1 to 220-4) that has passed through the hole (52) may be directly coupled to the second coupling portion (510) by the conductive adhesive member or a solder (901, See FIG. 10), and the second coupling portion (510) and the support member (220-1 to 220-4) may be electically connected.

For example, the second coupling portion (510) is a region where the solder (901) is disposed for being coupled with the support member (220-1 to 220-4), and may comprise a hole (52) and a region about the hole (52).

The first coupling portion (520) may comprise at least one coupling region (e.g., 5a, 5b) coupled with the housing (140) {e.g., corner portions (142-1 to 142-4)}. For example, the coupling region (e.g., 5a, 5b) of first coupling portion (520) may comprise at least one hole (152a) coupled with the first coupling portion (143) of housing (140).

For example, each of the coupling regions (5a, 5b) may comprise at least one or more holes, and the corner portions (142-1 to 142-4) of housing (140) may be provided with one or more first coupling portions corresponding thereto.

For example, the coupling regions (5a, 5b) of first coupling portion (520) of first to fourth upper elastic units (150-1 to 150-4) may be bilaterally symmetrical based on a baseline (e.g., 501, 502) in order to support the housing (140) in a balanced way for avoiding being biased to one side, but the present invention is not limited thereto.

Furthermore, the first coupling portions (143) of housing (140) may be bilaterally symmetrical based on a baseline (e.g., 501, 502), and two first coupling portions may be provided on both sides based on the baseline but the number is not limited thereto.

The baseline (501, 502) may be a straight line that passes a center point (101) and any one corner of corners of corner portions (142-1 to 142-4) of housing (140). For example, the baseline (501, 502) may a straight line that passes the center point (101) and mutually faces two corners among corners of corner portions (142-1 to 142-4) of housing (140) to a diagonal direction of the housing (140).

Here, the center point (101) may be a center of housing (140), a center of bobbin (110) or a center of upper elastic member (150). The center point (101) may be a spatial center of the said configurations (140, 110, or 150).

Furthermore, for example, the corner of corner portions of housing (140) may be a corner (or edge) aligned to or corresponding to a center of corner portions of housing (140).

The exemplary embodiment of FIG. 8 is so implemented as to allow each coupling region (5a, 5b) of first coupling portion (520) to comprise a hole (152a), but the present invention is not limited thereto, and in another exemplary embodiment, each coupling region (5a, 5b) may be embodied by various shapes, e.g., a groove shape or the like, sufficient enough to be coupled with the housing (140).

For example, the hole (152a) of first coupling portion (520) may be disposed with at least one cut-out portion (52a) to allow an adhesive member to be introduced between the first coupling portion (143) of housing (140) and the hole (152a).

The connection portion (530) may mutually connect the second coupling portion (510) and the first coupling portion (520). For example, the connection portion (530) may connect the coupling region (5a, 5b) of second coupling portion (510) and the first coupling portion (520). For example, the connection portion (530) may comprise a first connection portion that connects the second coupling portion (510) with the first coupling region (5a) of the first coupling portion (520) of each of the first to fourth upper elastic units (150-1 to 150-4), and a second connection portion (530b) that connects the second coupling region (5b) of first coupling portion (520) with the second coupling portion (510).

For example, the first outer lateral frame (151) may comprise a connection region (5c) that directly connects the first coupling region (5a) and the second coupling region (5b), but the present invention is not limited thereto.

Each of the first and second connection portions (530a, 530b) may comprise a bent portion that folds at least once or a curved portion that bends at least once, but the present invention is not limited thereto, and in another exemplary embodiment, each of the first and second connection portions (530a, 530b) may instead comprise a shape of a straight portion.

Width of connection portion (530) may be smaller than that of the first coupling portion (520). Furthermore, the width of connection portion (530) may be smaller than width (or diameter) of the first coupling portion. In another exemplary embodiment, width of connection portion (530) may be the same as that of the first coupling portion (520), and may be same as the width (or diameter) of the first coupling portion.

For example, the first coupling portion (520) may be brought onto contact with an upper surface of the corner portions (142-1 to 142-4) of housing (140) and may be supported by the corner portions (142-1 to 142-4) of housing (140). For example, the connection portion (530) may not be supported by the upper surface of housing (140), and may be spaced apart from the housing (140). Furthermore, in order to prevent oscillation caused by vibration, a damper (not shown) may be filled in an empty space between the connection portion (530) and the housing (140).

Width of each of the first and second connection portions (530a, 530b) may be narrower than that of the first coupling portion (520), whereby the connection portion (530) may easily move to a first direction, and as a result, stress applied to the upper elastic units (150-1 to 150-4) can be spread, and the stress applied to the support members (220-1 to 220-4) can be also spread.

Each of the first and second extension portions (P1, P2) of first outer lateral frame of first and second upper elastic units (150-1, 150-2) may be extended from the first coupling portion (520, e.g., the first coupling region 5a) toward any corresponding one of the first and second terminals (B1, B2) of circuit substrate (190) disposed on the first lateral portion (141-1) of housing (140).

The first coupling portion (520) of third upper elastic unit (150-3) may further comprise at least one coupling region (6a, 6b) connected to at least one of the fourth lateral portion (141-4) of housing (140) and the second corner portion (142-2).

Furthermore, the first coupling portion (520) of the fourth upper elastic unit (150-4) may further comprise at least one coupling region (6c, 6d) connected to at least one of the third lateral portion (141-3) of housing (140) and the first corner portion (142-1).

Each of the third and fourth extension portions (P3, P4) of the first outer lateral frame of third and fourth upper elastic units (150-3, 150-4) may be extended from the first coupling portion (520, e.g., the coupling region 6b, 6d) toward any corresponding one of the third and fourth terminals (B3, B4) of circuit substrate (190) disposed on the first lateral portion (141-1) of housing (140).

Each one end of the first to fourth extension portions (P1 to P4) may be coupled to any corresponding one of the first to fourth terminals (B1 to B4) of circuit substrate (190) by soldering or a conductive adhesive member.

Each of the first and second extension portions (P1, P2) may take a straight line shape, but the present invention is not limited thereto, and in another exemplary embodiment, each of the first and second extension portions (P1, P2) may comprise a shape of a portion that is bent or curved.

The third and fourth extension portions (P3, P4) may comprise a portion that is folded or bent in order to allow an easy coupling with any corresponding one of the third and fourth terminals (B3, B4) of circuit substrate (190).

The first outer lateral frame of the third upper elastic unit (150-3) may be connected between the first coupling portion (520) and the extension portion (P3), and may further comprise a first extension frame (154-1) disposed on the fourth lateral portion (141-4) of housing (140) and the second corner portion (142-2).

In order to prevent the third upper elastic unit (150-3) from being lifted by strengthening the cohesion (coupling force) with the housing (140), the first extension frame (154-1) may comprise at least one coupling region (6a, 6b) coupled with the housing (140), where the coupling region (6a, 6b) may comprise a hole for being coupled with the first coupling portion (143) of housing (140).

The first outer lateral frame of the fourth upper elastic unit (150-4) may be connected between the first coupling portion (520) and the extension portion (P4), and may further comprise a second extension frame (154-2) disposed on the third lateral portion (141-3) of housing (140) and the first corner portion (142-1).

In order to prevent the fourth upper elastic unit (150-4) from being lifted by strengthening the cohesion (coupling force) with the housing (140), the second extension frame (154-2) may comprise at least one coupling region (6c, 6d) coupled with the housing (140), where the coupling region (6c, 6d) may comprise a hole for being coupled with the first coupling portion (143) of housing (140).

Although FIG. 8 illustrates that each of the third and fourth upper elastic units (150-3, 150-4) comprises two first frame connection portions, the present invention is not limited thereto, and the number of first frame connection portions may be one or more than three (3).

As noted above, each of the first to fourth upper elastic units may comprise extension portions (P1 to P4) disposed on the first lateral portion (141-1) of housing (140), and as a result, the upper elastic units (150-1 to 150-4) may be easily coupled to the first to fourth terminals (B1 to B4) provided on the body part (S1) of circuit substrate (190) by the extension portions (P1 to P4).

Because the structure is such that the four terminals (B1 to B4) provided on the body part (S1) of circuit substrate (190) disposed on the first lateral portion (141-1) of housing (140) are electrically and directly connected to the first to fourth upper elastic units (150-1 to 150-4), the first lateral portion (141-1) of housing (140) may be partially disposed with each of the first outer lateral frame (151) of first to fourth upper elastic units (150-1 to 150-4).

Each of the upper elastic units (150-1 to 150-4) may be disposed or coupled to any corresponding one of the corner portions (142-1 to 142-4) of housing (140), and may comprise extension portions (P1 to P4) extended to the first lateral portion (141-1) of housing (140).

Referring to FIG. 11, each of the extension portions (P1 to P4) of the upper elastic units (150-1 to 150-4) may be directly coupled to any corresponding one of four terminals (B1 to B4) provided on the body part (S1) of circuit substrate (190) by a conductive adhesive member (71) comprising a solder or the like.

The first outer lateral frame (151) of first upper elastic unit (150-1) may be disposed on the first corner portion (142-1) of housing (140), the first outer lateral frame (151) of second upper elastic unit (150-2) may be disposed on the second corner portion (142-2) of housing (140), the first outer lateral frame (151) of third upper elastic unit (150-3) may be disposed on the third corner portion (142-3) of housing (140), and the first outer lateral frame (151) of four upper elastic unit (150-4) may be disposed on the fourth corner portion (142-4) of housing (140).

Parts of the third upper elastic unit (150-3) may be disposed within a first recess (90a) of the first circuit substrate (190), and a partial distal end of the third upper elastic unit (150-3) may be coupled to the third terminal (B3) of circuit substrate (190).

Parts of the fourth upper elastic unit (150-4) may be disposed within a second recess (90b) of the first circuit substrate (190), and a partial distal end of the fourth upper elastic unit (150-4) may be coupled to the fourth terminal (B4) of circuit substrate (190).

The third extension portion (P3) of third upper elastic unit (150-3) may be extended toward the third terminal (B3) of the circuit substrate (190) by passing through the first recess (90a) of circuit substrate (190), and may be bent at least twice.

Furthermore, the fourth extension portion (P4) of fourth upper elastic unit (150-4) may be extended toward the fourth terminal (B4) of the circuit substrate (190) by passing through the second recess (90b) of circuit substrate (190), and may be bent at least twice.

The third extension portion (P3, or "a third connection terminal") of third upper elastic unit (150-3) may comprise at least two bent regions For example, the third extension portion (P3) of third upper elastic unit (150-3) may comprise a first portion (1a) extended from the first coupling portion (520, e.g., a coupled region 6b) of third upper elastic unit (150-3), a first bent region (2a or "a first bent portion") bent from the first portion (1a), a second portion (1b) extended from the first bent region (2a), a second bent region (2b or "a second bent portion") bent from the second portion (1b), and a third portion (1c) extended from the second bent region (2b) toward a third terminal (B3) direction.

For example, the second portion (1b) of the third extension portion (P3) (or third connection terminal) may be bent from the first portion (1a), and the third portion (1c) may be bent from the second portion (1b).

The second portion (1b) of third extension portion (P3) may be interposed between the first bent region (2a) and the second bent region (2b) and can connect the first and second bent regions (2a, 2b).

For example, each of the first and third portions (1a, 1c) of third extension portion (P3) may be extended from the second corner portion (142-2) of housing (140) to a direction toward the first corner portion (141-1). For example, the second portion (1b) of third extension portion (P3) may be extended from an inner surface of housing (140) to a direction toward the outer lateral surface.

A part (e.g., the second portion 1b) of the third extension portion (P3) of third upper elastic unit (150-3) may be disposed within the first recess (90a) of circuit substrate (190) or may pass through the first recess (90a).

The fourth extension portion (P4, or "a fourth connection terminal") of fourth upper elastic unit (150-4) may comprise at least two bent regions (2c, 2d).

For example, the fourth extension portion (P4) of fourth upper elastic unit (150-4) may comprise a fourth portion (1d) extended from the first coupling portion (520, e.g., a coupled region 6d) of fourth upper elastic unit (150-4), a third bent region (2c or "a third bent portion") bent from the fourth portion (1d), a fifth portion (1e) extended from the third bent region (2c), a fourth bent region (2d or "a fourth bent portion") bent from the fifth portion (1e), and a sixth portion (1f) extended from the fourth bent region (2d) toward a fourth terminal (B4) direction.

For example, the fifth portion (1e) of fourth extension portion (P4) (or a fourth connection terminal) may be bent from the fourth portion (1d), and the sixth portion (1f) may be bent from the fifth portion (1e).

The fifth portion (1e) of fourth extension portion (P4) may be disposed between the third bent region (2c) and the fourth bent region (2d), and may connect the third and fourth bent regions (2c, 2d).

For example, each of the fourth portion (1d) and the sixth portion (1f) of fourth extension portion (P4) may be extended from the first corner portion (142-1) of housing (140) to a direction toward the second corner portion (141-2). For example, the fifth portion (1e) of fourth extension portion (P4) may be extended from an inner surface of housing (140) to an outer lateral direction.

A part (e.g., the fifth portion 1e) of the fourth extension portion (P4) of fourth upper elastic unit (150-4) may be disposed within the second recess (90b) of circuit substrate (190) or may pass through the second recess (90b).

Referring to FIG. 9, the lower elastic member (160) may comprise a plurality of lower elastic units (160-1, 160-2).

For example, each of the first and second lower elastic units (160-1, 160-2) may comprise a second inner frame (161) coupled or fixed to a lower surface, a lower part or a lower end of bobbin (110), a second outer lateral frame (162-1 to 162-3) coupled or fixed to a lower surface, a lower part or a lower end of housing (140), and a second frame connection portion (163) mutually connecting the second inner frame (161) and the second outer lateral frame (162-1 to 162-3).

The second inner frame (161) may be provided with a hole (161a) for being coupled with the second coupling portion (117) of bobbin (110), and the second outer lateral frame (162-1 to 162-3) may be provided with a hole (162a) for being coupled with the second coupling portion (149) of housing.

For example, each of the first and second lower elastic units (160-1, 160-2) may comprise three second outer lateral frames (162-1 to 162-3) coupled with the housing (140), and two second frame connection portions (163), but the present invention is not limited thereto. In another exemplary embodiment, each of the first and second lower elastic units may comprise one or more second outer lateral frames and one or more second frame connection portions.

Each of the first and second lower elastic units (160-1, 160-2) may comprise connection frames (164-1, 164-2) that mutually connect the second outer lateral frames (162-1 to 162-3).

Width of each of the connection frames (164-1, 164-2) may be narrower than that of the second outer lateral frames (162-1 to 162-3), but the present invention is not limited thereto.

The connection frames (164-1, 164-2) may be disposed outside of the coil units (230-1 to 230-4) and magnets (130-1 to 130-4) based on the coil units (230-1 to 230-4) and magnets (130-1 to 130-4) in order to avoid a spatial interference with the second coil (230) and the first magnet (130). At this time, the outside of the coil units (230-1 to 230-4) and magnets (130-1 to 130-4) may be an opposite side of a region where a center of bobbin (110) or a center of housing (140) is situated based on the coil units (230-1 to 230-4) and magnets (130-1 to 130-4).

Furthermore, the connection frames (164-1, 164-2) may be so positioned as not to overlap the coil units (230-1 to 230-4) or/and magnets (130-1 to 130-4) to an optical axis direction, but the present invention is not limited thereto, and in another exemplary embodiment, at least parts of the connection frames (164-1, 164-2) may be aligned or overlapped with the coil units (230-1 to 230-4) or/and magnets (130-1 to 130-4) to an optical axis direction.

The upper elastic units (150-1 to 150-4) and lower elastic units (160-1, 160-2) may be formed with a leaf spring, but the present invention is not limited thereto, and may be implemented by a coil spring and the like. The abovementioned "elastic unit (e.g., 150 or 160)" may be expressed by being replaced with a "spring", the "outer lateral frame (e.g., 152 or 162)" may be expressed by being replaced with an "outer lateral portion", the "inner frame (e.g., 151 or 161)" may be expressed by being replaced with an "inner portion", and the support member (e.g, 220) may be expressed by being replaced with a wire.

Next, an explanation will be made on support members (220-1 to 220-4).

The support members (220-1 to 220-4) may be disposed on corner portions (142-1 to 142-4) of housing (140), and may mutually connect the upper elastic units (150-1 to 150-4) and the circuit substrate (250).

Each of the support members (220-1 to 220-4) may be coupled to any corresponding one of the first to fourth upper elastic units (150-1 to 150-4), and may electrically connect any corresponding one of the first to fourth upper elastic units (150-1 to 150-4) and any corresponding one of the terminals (251-1 to 251-n, e.g., n=4) of circuit substrate (250).

The support members (220-1 to 220-4) may be spaced apart from the housing (140), and may not be fixed to the housing (140), where one end of the support members (220-1 to 220-4) may be directly connected or coupled to a second coupling portion (510) of upper elastic units (150-1 to 150-4). Furthermore, the other end of the support members (220-1 to 220-4) may be directly connected or coupled to the circuit substrate (250).

For example, the support members (220-1 to 220-4) may pass through a hole (147) provided on the corner portions (142-1 to 142-4) of housing (140), but the present invention is not limited thereto. In another exemplary embodiment, the support members may be adjacently disposed to a boundary line between the lateral portions (141-1 to 141-4) of housing (140) and corner portions (142-1 to 142-4), and may not pass through the corner portions (142-1 to 142-4) of housing (140).

The first coil (120) may be electrically connected to the first and second lower elastic units (160-1, 160-2).

For example, the first coil (120) may directly connected or coupled to any corresponding one of second inner frames of the first and second lower elastic units (160-1, 160-2). For example, the second inner frame (161) of first lower elastic unit (160-1) may comprise a first bonding portion (43*a*) coupled to one end of the first coil (120), and the second inner frame (161) of second lower elastic unit (160-2) may comprise a second bonding portion (43*b*) coupled to the other end of the first coil (120). Each of the first and second bonding portions (43*a*, 43*b*) may be disposed with a groove (8*a*) for guiding the first coil (120).

The first support member (220-1) may be disposed on a first corner portion (142-1) of housing (140), and may be coupled to the second coupling portion (510) of the first upper elastic unit (150-1).

The second support member (220-2) may be disposed on the second corner portion (142-2) of housing (140), and may be coupled to the second coupling portion (510) of second upper elastic unit (150-2).

The third support member (220-3) may be disposed on the third corner portion (142-3) of housing (140) and may be coupled to the second coupling portion (510) of the third upper elastic unit (150-3).

The fourth support member (220-4) may be disposed on the fourth corner portion (142-4) of housing (140) and may be coupled to the second coupling portion (510) of the fourth upper elastic unit (150-4).

The first terminal (B1) of circuit substrate (190) may be electrically connected to the first support member (220-1), the second terminal (B2) of circuit substrate (190) may be electrically connected to the second support member (220-2), the third terminal (B3) of circuit substrate (190) may be electrically connected to the third support member (220-3), and the fourth terminal (B4) of circuit substrate (190) may be electrically connected to the fourth support member (220-4).

Each of the first to fourth support members (220-1 to 220-4) may electrically connected to any corresponding one of first to fourth terminals (e.g., 251-1 to 251-*n*, n=4) of circuit substrate (250).

For example, power signals (VDD, GND) may be provided to the first and second support members (220-1, 220-2) through the first and second terminals (251-1, 251-2) of circuit substrate (250).

For example, power signals (VDD, GND) may be provided to the first and second terminals (B1, B2) of circuit substrate (190) through the first and second support members (220-1, 220-2) and the first and second upper elastic units (150-1, 150-2). Furthermore, the first position sensor (170) may receive the power signals (VDD, GND) through the first and second terminals (B1, B2) of circuit substrate (190).

For example, the first terminal (B1) of circuit substrate (190) may be any one terminal of the VDD terminal and GND terminal, and the second terminal (B2) of circuit substrate (190) may be any one remaining terminal of the VDD terminal and GND terminal.

Furthermore, the third and fourth support members (220-3, 220-4) may be provided with a clock signal (SCL) and a data signal (SDA) through the third and fourth terminals (251-3 to 251-4) of circuit substrate (250).

The third and fourth terminals (B3, B4) of circuit substrate (190) may be provided with a clock signal (SCL) and a data signal (SDA) through the third and fourth support members (220-3, 220-4) and the third and fourth upper elastic units (150-3, 150-4).

Furthermore, the first position sensor (170) may receive a clock signal (SCL) and a data signal (SDA) through the third and fourth terminals (B3, B4) of circuit substrate (190).

For example, the first position sensor (170) may be provided with a power signal (VDD) through the first terminal (251-1) of circuit substrate (250), a first support member (220-1), a first upper elastic unit (150-1), and a first terminal (B1) of circuit substrate (190).

The first position sensor (170) may be provided with a power signal (GND) through the second terminal (251-2) of circuit substrate (250), a second support member (220-2), a second upper elastic unit (150-2), and a second terminal (B2) of circuit substrate (190).

Furthermore, the first position sensor (170) may be provided with a clock signal (SCL) through the third terminal (251-3) of circuit substrate (250), a third support member (220-3), a third upper elastic unit (150-3), and a third terminal (B3) of circuit substrate (190).

The first position sensor (170) may be provided with a data signal (SDA) through the fourth terminal (251-4) of circuit substrate (250), a fourth support member (220-4), a fourth upper elastic unit (150-4), and a fourth terminal (B4) of circuit substrate (190).

Each of the fifth and sixth terminals (B5, B6) of circuit substrate (190) may be connected or coupled to any corresponding one of second outer lateral frame (162-1) of the first and second lower elastic units (160-1, 160-2).

The second outer lateral frame (162-1) of first lower elastic unit (160-1) may be disposed with a first bonding portion (81*a*) for being coupled with the fifth terminal (B5) of circuit substrate (190) using a solder or a conductive adhesive member.

The second outer lateral frame (162-1) of second lower elastic unit (160-2) may be disposed with a second bonding portion (81*b*) for being coupled with the sixth terminal (B6) of circuit substrate (190) using a solder or a conductive adhesive member.

For example, the second outer lateral frame (162-1) of first lower elastic unit (160-1) may be formed with a first hole (82*a*, or first groove) where the fifth terminal (B5) of circuit substrate (190) is inserted or disposed, and the second outer lateral frame (162-1) of second lower elastic unit (160-2) may be formed with a second hole (82*b*, or second groove) where the sixth terminal (B6) of circuit substrate (190) is inserted or disposed.

For example, each of the first and second holes (82*a*, 82*b*) can pass through the second outer lateral frame (161-1), and may have an opening that is opened to one lateral surface of the second outer lateral frame (161-1), and the present invention is not limited thereto, and in another exemplary embodiment, each of the first and second holes (82*a*, 82*b*) may not have an opening that is opened to one lateral surface of the second outer lateral frame (161-1).

While the fifth terminal (B5, or sixth terminal B6) of circuit substrate (190) is inserted within the first recess (82*a*, or second recess 82*b*) of second outer lateral frame (162-1) of first lower elastic unit (160-1), because the fifth terminal (B5, or sixth terminal B6) is coupled with the first bonding portion (81*a*, or second bonding portion 81*b*) provided with the first recess (82*a*, or second recess 82*b*) using a solder or a conductive adhesive member, a coupled area can be increased to thereby improve the cohesion and solderability therebetween.

Referring to FIG. 12, each one end (e.g., a lower end or a lower surface) of the fifth and sixth terminals (B5, B6) may be so disposed as to be lower than a lower end or a lower surface of the second outer lateral frame (162-1) of first and second lower elastic units (160-1, 160-2).

FIG. 12 is a bottom view, which illustrates that each lower surface of the fifth and sixth terminals (B5, B6) is lower than a lower end or a lower surface of the second outer lateral frame (162-1), and this is to improve the solderability between each one end of the fifth and sixth terminals (B5, B6) and the first and second bonding portions (81a, 81b) of first and second lower elastic units (160-1, 160-2).

Furthermore, referring to FIG. 12, the housing (140) may comprise a recess (31) depressed from a lower surface of first lateral portion (141-1). For example, a floor surface of the recess (31) of the housing (140) may have a staircase (step) with a lower surface of housing (140) to an optical axis direction. For example, the floor surface of the recess (31) of the housing (140) may be so disposed as to be higher than a lower surface of housing (140).

The recess (31) of housing (140) may be overlapped with the first and second bonding portions (81a, 81b) of the first and second lower elastic units (160-1, 160-2) to an optical axis direction.

Furthermore, the recess (31) of housing (140) may be overlapped with the recesses (82a, 82b) of second outer lateral frame (162-1) of the first and second lower elastic units (160-1, 160-2) to an optical axis direction, but the present invention is not limited thereto and in another exemplary embodiment, both recesses may not be overlapped.

The fifth and sixth terminals (B5, B6) of circuit substrate (190) may increase an area opened from the housing (140) due to the recess (31) of the housing (140), and a space, where a solder or a conductive adhesive member can be accommodated, can be obtained to thereby improve the solderability, and the degree of soldering protruded downward of the second outer lateral frame (162-1) can be lowered, whereby a spatial interference with the second coil (230) disposed underneath the lower elastic unit, the circuit substrate (250) or the base (210) can be restricted or prevented.

A lower surface (11c) of first magnet (130) disposed on the accommodation portion (141a) of housing (140) may be so positioned as to be lower than a lower surface of the second outer lateral frame (162-1 to 162-3) of first and second lower elastic units (160-1, 160-2), but the present invention is not limited thereto, and in another exemplary embodiment, the lower surface (11c) of first magnet (130) may be higher than or same in height as the lower surface of the second outer lateral frame (162-1 to 162-3) or the lower surface of housing (140).

In order to allow the first magnet (130) to be spaced apart from the second coil (230) and the circuit substrate (250), the other end of the support member (220) may be coupled with the circuit substrate (250, or circuit member 231) at a position lower than the lower surface (11c) of the first magnet (130).

The support member (220) may be embodied using a member conductive and supportable by elasticity, e.g., suspension wire, leaf spring, a coil spring or the like. Furthermore, the support member (220) in another exemplary embodiment may be integrally formed with the upper elastic member (150).

Next, an explanation will be made on the base (210), the circuit substrate (250), the second coil (230) and the adhesive member (290).

Referring to FIG. 13, the base (210) may be disposed with an opening (C3) corresponding to an opening of bobbin (110), or/and an opening of housing, and may take a shape corresponding to or matching to that of a cover member (300), e.g., a square shape. For example, the opening (C3) of base (210) may take a through hole shape that passes through the base (210) to an optical axis direction.

The base (210) may be formed with a staircase (211) coatable by an adhesive when the cover member (300) is adhesively fixed. At this time, the staircase (211) may guide a lateral plate (302) of cover member (300) coupled to an upper side, and the staircase (211) may be contacted by a lower end of lateral plate (302) of cover member (300). The staircase (211) of base (210) and a lower end of lateral plate (302) of cover member (300) may be adhesively fixed by an adhesive or the like.

A region of base (210) facing the terminal surface (253) provided with terminals (251-1 to 251-n) of circuit substrate (250) may be provided with a prop (255). The prop (255) may support the terminal surface (253) of circuit substrate (250) formed with terminals (251-1 to 251-n) of circuit substrate (250). For example, the prop (255) may take a recess shape depressed from an outer lateral surface of base (210), but the present invention is not limited thereto, and in another exemplary embodiment, the prop may be on the same plane surface with the outer lateral surface of base (210) or may take a protruded shape.

A lateral surface of circuit substrate (250) may be formed with a protruder (48) or a protrusion extended or protruded from an outer lateral surface of base (210), and an outer lateral surface of base (210) may be formed with a recess (28) or a coupling recess having a shape corresponding to a position corresponding to the protruder (48) of circuit substrate (250).

The protruder (48) of the circuit substrate (250) may be disposed on, coupled to or accommodated on a recess (28) of base (210).

The base (210) may be disposed with an escape portion (212-1 to 212-4) for avoiding a spatial interference with the support member (220).

For example, the base (210) may have an escape portion (212-1 to 212-4) at a corner region corresponding to a corner of the cover member (300).

The escape portion (212-1 to 212-4) may take a groove shape or a hole shape in order to avoid a spatial interference with the support member (220-1 to 220-4) and an adhesive member (or a solder 902).

For example, the escape portion (212-1 to 212-4) of base (210) may take a concave groove shape depressed from an outer lateral surface of corner of base (210) to a center direction of base (210). The escape portion (212-1 to 212-4) of base (210) may be opened to an upper surface and a lower surface of base (210).

For example, the escape portion (212-1 to 212-4) of base (210) may partially expose a region (e.g., first region or a corner region) of a lower surface of circuit substrate (250). In another exemplary embodiment, the escape portion (212-1 to 212-4) of base (210) may partially expose a region (e.g., first region or a corner region) of a lower surface of circuit member (231).

An inner surface of corner of cover member (300) and the escape portion (212-1 to 212-4) of base (210) may be mutually coupled by an adhesive member (290).

For example, the adhesive member (290) may be disposed at a partial region (e.g., first region or a corner region) of a lower surface of circuit substrate (250).

For example, the adhesive member (290) may be disposed on at least one of the escape portion (212-1 to 212-4), a partial region (e.g., first region or a corner region) of a lower surface of circuit substrate (250) and a partial region of lower surface of base (210) adjacent to the escape portion (212-1 to 212-4). For example, a partial region of lower surface of base (210) may comprise a staircase portion (320). In another exemplary embodiment, for example, the partial region of lower surface of base (210) may comprise the staircase portion (320) and a region of a lower surface of base (210) adjacent to the staircase portion (320).

Furthermore, an upper surface of base (210) may be provided with an accommodation recess (215-1, 215-2) to be disposed with a second position sensor (240).

For example, a first accommodation recess (215-1) of a base (210) may be formed near to any one escape portion (212-3) provided on any one corner of the base (210), and a second accommodation recess (215-2) of the base (210) may be formed near to any other escape portion (212-4) of any other corner of the base (210).

For example, the first accommodation recess (215-1) of base (210) may be formed on an upper surface of base (210) disposed between any one escape portion (212-3) and the protruder (19), and the second accommodation recess (215-2) of base (210) may be formed on an upper surface of base (210) disposed between any other escape portion (212-4) and the protruder (19).

Furthermore, for example, a lower surface of base (210) may be formed with an accommodation portion (not shown) installed with a filter (610) of camera module (200).

Furthermore, an upper surface about an opening (C3) of base (210) may be provided with an opening (C2) of circuit substrate (250), and a protruder (19) coupled to an opening (C1) of circuit member (231).

The protruder (19) of base (210) may take the same shape as that of opening (C3), e.g., a round shape, but the present invention is not limited thereto. For example, the protruder (19) may take a round shape, but the present invention is not limited thereto, and may comprise a plurality of portions each mutually spaced apart.

The base (210) may be formed with a protruder (32) protruded from an upper surface in order to be coupled with a coupling recess (33) of circuit substrate (250).

For example, the coupling recess (33) of circuit substrate (250) may be formed at an inner surface of circuit substrate (250) formed by the opening (C3), and may take a shape depressed from the inner surface of the circuit substrate (250). Furthermore, the protruder (32) of base (210) may be so formed as to correspond to or to face the coupling recess (33) of circuit substrate (250) to an optical axis direction, and the protruder (32) may take a shape to correspond to or match to the coupling recess (33) of circuit substrate (250). For example, the protruder (32) may abut an outer lateral surface of protruder (19) of base (210).

The second coil (230) may be disposed on an upper surface of circuit substrate (250), and OIS position sensors (240a, 240b) may be disposed within accommodation recess (215-1,215-2) of base (210) underneath the circuit substrate (250).

A second position sensor (240) may comprise first and second OIS position sensor (240a, 240b), and the OIS position sensors (240a, 240b) may detect a displacement of OIS mover to a direction perpendicular to an optical axis. Here, the OIS mover may comprise an AF mover and other elements installed on the housing (140).

For example, the OIS mover may comprise an AF mover and a housing (140), and may further comprise a first magnet (130), depending on exemplary embodiments.

The circuit substrate (250) may be disposed on an upper surface of base (210), and may comprise an opening of bobbin (110), an opening of housing (140) or/and an opening (C2) corresponding to the opening (C3) of base (210). The opening (C2) of circuit substrate (250) may take a through hole shape.

The shape of circuit substrate (250) may take a shape corresponding or matching to that of an upper surface of base (210), e.g., a square shape.

The circuit substrate (250) may be bent from an upper surface, and may comprise a plurality of terminals (251-1 to 251-n, n>1, where n is a natural number) that receives an electric signal from outside, or at least one terminal surface (253) provided with pins.

For example, referring to FIG. 14, the circuit substrate (250) may comprise two terminal surfaces (253-1, 253-2), each mutually facing other or each being disposed oppositely, but the present invention is not limited thereto, and the number of terminal surfaces (253) may be more than one.

The second coil (230) may be disposed underneath the bobbin (110). For example, the second coil (230) may be disposed underneath the housing (140).

The second coil (230) may be disposed on an upper surface of circuit substrate (250) by corresponding to or facing the magnets (130-1 to 130-4) disposed on the housing (140).

The second coil (230) may comprise coil units (230-1 to 230-4) that face the magnets (130-1 to 130-4) disposed on the corner portions (142-1 to 142-4) of housing (140) to an optical axis direction, or that are overlapped to an optical axis direction.

For example, the second coil (230) may comprise a circuit member (231) and a plurality of coil units (230-1 to 230-4) formed on the circuit member (231). Here, the circuit member (231) may be expressed as a "substrate", a "circuit substrate", a "coil substrate" or the like. In another exemplary embodiment, the second coil (230) may omit the circuit member (231), and instead comprise coil units (230-1 to 230-4). The circuit member (231) may take a shape, e.g., a square shape, corresponding or matching to that of an upper surface of base (210) {or circuit substrate (250)}.

For example, the four coil units (230-1 to 230-4) may be disposed or formed on a corner or corner regions of polygonal (e.g., square) circuit member (231). Each of the coil units (230-1 to 230-4) may take a shape corresponding or matching to that of magnets (130-1 to 130-4) that correspond to an optical axis direction.

For example, each of the coil units (230-1 to 230-4) may take a closed curve shape, e.g., a ring shape, based on an optical axis, when viewed from above. Each of the coil units (230-1 to 230-4) may take a coil block shape formed with an FP (Fine pattern) coils, but the present invention is not limited thereto.

In exemplary embodiments where magnets are disposed on lateral portions of housing (140), the coil units of second coil may be disposed parallel with sides of circuit member (231), and may take a shape corresponding or matching to that of magnet disposed on lateral portions of housing.

For example, the second coil (230) may comprise two coil units (230-1, 230-3) for a second direction and two coil units (230-2, 230-4) for a third direction, but the present invention is not limited thereto.

For example, the coil units (230-1, 230-3) may be disposed on any two corner portions of circuit member (231) mutually facing to a first diagonal direction of circuit member (231), and the coil units (230-2, 230-4) may be disposed on the other corner portions of circuit member (231) mutually facing to a second diagonal direction of circuit member (231).

The first diagonal direction and the second diagonal direction may be mutually perpendicular directions. For example, the first diagonal direction may be an X axis direction and the second diagonal direction may be a Y axis direction.

The coil units (230-1, 230-3) for the second direction may act to a direction where electronmagnetic forces by interaction with the magnets (130-1, 130-3) corresponding to an optical axis direction are the same. Furthermore, the coil units (230-1, 230-3) for the third direction may act to a direction where electronmagnetic forces by interaction with the magnets (130-2, 130-4) corresponding to an optical axis direction are the same.

In another exemplary embodiment, the second coil (230) may also comprise only one coil unit for the second direction and only one coil unit for the third direction, and may also comprise four (4) or more coil units.

The second coil (230) may be electrically connected to the circuit substrate (250). For example, the second coil (230) may be electrically connected to terminals (251) of circuit substrate (250).

The second coil (230) may be provided with an electric power or a driving signal from the circuit substrate (250). The electric power or the driving signal provided to the second coil (230) may be a DC signal or an AC signal, or may comprise a DC signal and an AC signal, or may be of current or voltage shape.

The housing (140) may be moved to second and/or third direction, e.g., an X axis direction and/or Y axis direction, by interaction between magnets (130-1 to 130-4) and driving signal-provided second coils (230-1 to 230-4), whereby an OIS operation can be performed.

Referring to FIGS. 14, 15 and 16, the second coil (230) may comprise terminals (30A to 30D) for receiving a driving signal from the circuit substrate (250).

For example, the circuit member (231) may be disposed with four terminals (30A to 30D). For example, the said four terminals (30A to 30D) may be disposed or provided on a lower surface of circuit member (231).

For example, the said four terminals (30A to 30D) may be adjacently formed to at least one lateral surface of circuit member (231). For example, two terminals (30B, 30D) of circuit member (231) may be disposed on a lower surface of circuit member (231) adjacent to a first lateral surface of the circuit member (231), and may be interposed between the third coil unit (230-1) and the fourth coil unit (230-4).

The remaining two terminals (30A, 30C) of circuit member (231) may be disposed on a lower surface of circuit member (231) adjacent to a second lateral surface of circuit member (231), and may be interposed between the first coil unit (230-1) and the second coil unit (230-2). For example, the first lateral surface and the second lateral surface of circuit member (231) may mutually face each other, or may be disposed at an opposite side.

The first coil unit (230-1) and the third coil unit (230-4) may be mutually connected in series, and the second coil unit (230-2) and the fourth coil unit (230-4) may be mutually connected in series.

For example, one end of first coil unit (230-1) may be electrically connected to a first terminal (30A) of circuit member (231), and one end of third coil unit (230-1) may be electrically connected to a second terminal (30B) of circuit member (231), and the other end of first coil unit (230-1) may be mutually electically connected to the other end of third coil unit (230-3). For example, the other end of first coil unit (230-1) and the other end of third coil unit (230-3) may be electrically connected through a first conductive pattern or a first wire formed within the circuit member (231).

Furthermore, one end of second coil unit (230-1) may be electrically connected to a third terminal (30C) of circuit member (231), and one end of fourth coil unit (230-4) may be electrically connected to a fourth terminal (30D) of circuit member (231), and the other end of third coil unit (230-3) and the other end of fourth coil unit (230-4) are mutually electrically connected. For example, the other end of third coil unit (230-3) and the other end of fourth coil unit (230-4) may be electrically connected through a second conductive pattern or a second wire formed within the circuit member.

The circuit substrate (250) may comprise pads (27a to 27d) for being electrically connected to the coil units (230-1 to 230-4). Here, the pads (27a to 28d) may be expressed by being replaced with the "terminals" or "bonding portions".

The circuit substrate (250) may comprise pads (27a to 27d) corresponding to or facing the first to fourth terminals (30A to 30D) of the circuit member (231) to an optical axis direction.

For example, the pads (27a to 27d) of circuit substrate (250) may be disposed or provided on a lower surface of circuit substrate (250). Each pad (27a to 27d) of circuit substrate (250) may comprise a recess that exposes any one portion corresponding to terminals (30A to 30D) of circuit member (231). Each pad (27a to 27d) of circuit substrate (250) and terminals (30A to 30D) of circuit member (231) corresponding thereto are mutually coupled, and may be mutually electrically connected by a conductive adhesive member or a solder (39A).

For example, the pads (27a to 27d) of circuit substrate (250) may be disposed or formed on a lower surface of circuit substrate (250) adjacent to at least one lateral surface of circuit substrate (250) not formed with the terminal surface (253).

For example, the two coil units (230-1, 230-3) for second direction may be mutually connected in series, and one end of serially-connected coil units (230-1, 230-3) may be electrically connected to a first pad (27a) of circuit substrate (250), and the other end of serially-connected coil units (230-1,230-3) may be electrically connected to a second pad (27b) of circuit substrate (250).

Furthermore, the two coil units (230-2, 230-4) for third direction may be connected in series, and one end of the serially-connected coil units (230-2, 230-4) may be electrically connected to a third pad (27c) of circuit substrate (250), and the other end of serially-connected coil units (230-2, 230-4) may be electrically connected to a fourth pad (27d) of circuit substrate (250).

The first and second pads (27a, 27b) of circuit substrate (250) may be electrically connected to two terminals corresponding to terminals (251-1 to 251-*n*) of circuit substrate (250), and the serially-connected coil units (230-1, 230-3) may be provided with a first driving signal through two terminals corresponding to the circuit substrate (250).

The third and fourth pads (27c, 27d) of circuit substrate (250) may be electrically connected to two other terminals corresponding to terminals (251-1 to 251-*n*) of circuit substrate (250), and the serially-connected coil units (230-2, 230-4) may be provided with a second driving signal through two other terminals corresponding to the circuit substrate (250).

Although FIG. 13 illustrates that the coil units (230-1 to 230-4) are embodied with a circuit pattern shape, e.g., an FP coil shape, formed on a circuit member (231) separate from the circuit substrate (250), the present invention is not limited thereto.

In another exemplary embodiment, the coil units (230-1 to 230-4) may be omitted from the circuit member (231), and instead may be embodied with coil blocks of a ring shape.

In still another exemplary embodiment, the coil units (230-1 to 230-4) may be embodied with a circuit pattern shape directly formed on the circuit substrate (250), e.g., an FP coil shape. In this case, the circuit substrate (250) may be expressed by being replaced with a "circuit member", and the circuit member may be disposed with a substrate portion formed with the coil units (230-1 to 230-4) and a terminal portion formed with terminals, and explanation on the substrate portion may be applied or applied mutatis mutandis with that of circuit substrate (250), and explanation on the terminal portion may be applied or applied mutatis mutandis with that of terminal portions (253, 253-1, 253-2) of circuit substrate (250).

Furthermore, as elaborated above, at least one of the circuit member (231) or/and the circuit substrate (250) may be formed with a hole or an escape recess to avoid a spatial interference with the support member (220).

The circuit member (231) may be provided with an escape recess (24) to avoid a spatial interference with the fifth and sixth terminals (B5, B6) of circuit substrate (190). For example, the escape recess (24) may be formed on any one side of circuit member (231) to correspond to or face or overlap with the fifth and sixth terminals (B5, B6) of circuit substrate (190) to an optical axis direction. For example, the escape recess (24) may be interposed between the first coil unit (230-1) and the fourth coil unit (230-4).

Although the circuit substrate (250) and the circuit member (231) are expressed by being divided as separate elements, the present invention is not limited thereto, and in another exemplary embodiment, the circuit substrate (250) and the circuit member (231) may be also collectively expressed by a term of "circuit member" or "substrate". In this case, the other end of support members may be coupled to the "circuit member (e.g., a lower surface of circuit member)".

In order to avoid a spatial interference with the support member (220), a corner of circuit member (231) may be provided with an escape recess (23) though which the support member (220) can pass. In another exemplary embodiment, the circuit member may be also disposed with a hole or a through hole instead of the escape recess.

Each of the OIS position sensors (240a, 240b) may be a Hall sensor, and any sensor configured to detect a magnetic field force may be used for the OIS position sensor. For example, each of the OIS position sensors (240a, 240b) may be singly or independently embodied by a position detection sensor such as a Hall sensor, or may be embodied in the form of a driver comprising a Hall sensor. When the OIS position sensors (240a, 240b) are embodied in the form of a driver comprising a Hall sensor, the explanation of FIG. 7b may be applied or applied mutatis mutandis.

Each of the OIS position sensors (240a, 240b) may detect the magnetic field strength of magnets (130-1 to 130-4) in response to motion of OIS mover to a direction perpendicular to an optical axis and may output an output signal in response to a detected result. The displacement of OIS mover may be detected using the output signal of each of the OIS position sensors (240a, 240b), and a controller (830, 780) may perform the OIS feedback operation using the output signals of the OIS position sensors (240a, 240b).

For example, the first OIS position sensor (240a) may be overlapped with a first straight line that connects a first corner of circuit substrate (250) with a center of opening (C2) of circuit substrate (250). The second OIS position sensor (240b) may be overlapped with a second straight line that connects a second corner of circuit substrate (250) with a center of opening (C2) of circuit substrate (250).

For example, a center of first OIS position sensor (240a) may be aligned or overlapped with the first straight line, and a center of second OIS position sensor (240b) may be aligned or overlapped with the second straight line. The first straight line and the second straight line may be mutually perpendicular.

The terminal surface (253) of circuit substrate (250) may be provided with terminals (251-1 to 251-n).

Signals (SCL, SDA, VDD, GND) for data communication with the first position sensor (190) may be transmitted or received through a plurality of terminals (251-1 to 251-n) disposed on the terminal surface (253) of circuit substrate (250), and may supply a driving signal to the OIS position sensors (240a, 240b), and may receive signals outputted from the OIS position sensors (240a, 240b) and output the same to an outside.

According to exemplary embodiments, the circuit substrate (250) may be provided with an FPCB, but the present invention is not limited thereto, and it is possible to directly form terminals of circuit substrate (250) on a surface of base (210) using the surface electrode method.

The circuit substrate (250) may comprise a hole (250a) through which the support members (220-1 to 220-4) can pass. The number and position of hole (250a) may correspond or match to those of the support members (220-1 to 220-4). For example, the hole (250a) may be adjacently formed to a corner of circuit substrate (250) in response to each of the support members (220-1 to 220-4), and may correspond to or face the escape recess (23) of circuit member (231) to an optical axis direction.

Each of the support members (220-1 to 220-4) may pass through the hole (250a) of circuit substrate (250) to be coupled with the pads (31-1 to 31-4, or circuit pattern) formed at a lower surface of circuit substrate (250) through a solder, a conductive adhesive member or the like.

The circuit substrate (250) may comprise four (4) pads (31-1 to 31-4) coupled to the support members (220-1 to 220-4), and each of the four pads (31-1 to 31-4) of circuit substrate (250) may be electrically connected to any corresponding one of the terminals (251-1 to 251-n) of circuit substrate (250).

For example, the pads (31-1 to 31-4) of circuit substrate (250) may be so disposed as to be adjacently formed to or abut the hole (250a). For example, the pads (31-1 to 31-4) may be so formed as to wrap the hole (250a) of circuit substrate (250).

In another exemplary embodiment, the circuit substrate (250) may not be disposed with the hole to allow the support members to pass therethrough, and the support members (220-1 to 220-4) may be electrically connected to a circuit pattern or a pad formed at an upper surface of circuit substrate (250) using a solder, a conductive adhesive member or the like.

Alternatively, in another exemplary embodiment, the support members (220-1 to 220-4) may connect the upper elastic units (150-1 to 150-4) and the circuit member (231), and may electrically connect the upper elastic units (150-1 to 150-4) and the circuit member (231), and the support members (220-1 to 220-4) may be electically connected with the circuit substrate (250) through the circuit member (231).

Because the exemplary embodiment shows a structure where a driving signal is directly provided to the first coil (120) from the first position sensor (170), the number of support members may be reduced and an electrical connecting structure is simplified, compared with a case where a driving signal is directly provided to the first coil (120) through the circuit substrate (250).

Furthermore, because the first position sensor (170) can be embodied by a driver IC configured to measure temperatures, output of Hall sensor is made to be compensated to allow having a minimum change in response to temperature changes, or the output of Hall sensor is made to be compensated to allow having a constant inclination in response to temperature changes, whereby accuracy of AF driving can be improved regardless of temperature changes.

The cover members (300) may accommodate, within an accommodation space formed with the base (210), a bobbin (110), a first coil (120), a first magnet (130), a housing (140), an upper elastic member (150), a lower elastic member (160), a first position sensor (170), a second magnet (180), a circuit substrate (190), a support member (220), a second coil (230), a second position sensor (240) and a circuit substrate (250).

The cover member (300) may take a box shape with a lower surface opened, and comprising an upper plate (301) and lateral plate (302), and the lower surface (e.g., a lower surface of lateral plate 302) of cover member (300) may be coupled with a base (210) {e.g., staircase (211) or/and escape portions (212-1 to 212-4)}. The upper plate (301) of cover member (300) may take a round, or polygonal (e.g., square or octagonal) shape, but the present invention is not limited thereto.

The cover member (300) may comprise an opening on the upper plate (301) for exposing a lens (not shown) coupled with the bobbin (110) to an outside light. The material of cover member (300) may be of a non-magnetic substance such as SUS to prevent being attached with the first magnet (130), but the cover member (300) may function as a yoke for improving the electromagnetic force between the first coil (120) and a first magnet (130) by forming with a magnetic material.

In order to reduce the length of path where the power signals (GND, VDD) are transmitted to the first position sensor (170), the following structure may be provided.

First, the first and second terminals (B1, B2) of circuit substrate (190) for allowing being provided with the power signals (GND, VDD) may be electrically connected to the first and second support members (220-1, 220-1) disposed on two corner portions (142-1, 142-2) adjacent to the first lateral portion (141-1) of housing (140) disposed with the first position sensor (170), whereby the path can be shortened.

Furthermore, the path may be shortened by allowing the first and second terminals (B1, B2) of circuit substrate (190) to be disposed on the body part (S1) of circuit substrate (190).

Furthermore, the first terminal (B1) is disposed at one end of the circuit substrate (190) to allow the first terminal (B1) of circuit substrate (190) to be overlapped with the first corner portion (142-1) of housing (140) to an optical axis direction, and the second terminal (B2) is disposed at the other end of the circuit substrate (190) to allow the second terminal (B2) of circuit substrate (190) to be overlapped with the second corner portion (142-2) of housing (140) to an optical axis direction, whereby the path can be shortened.

Furthermore, a discrete distance (e.g., shortest discrete distance) between the first terminal (B1) of circuit substrate (190) and the first support member (220-1) may be shorter than a discrete distance (e.g., shortest discrete distance) between the third terminal (B3) of circuit substrate (190) and the first support member (220-1) and a discrete distance (e.g., shortest discrete distance) between the fourth terminal (B4) of circuit substance (190) and the first support member (220-1).

Furthermore, a discrete distance (e.g., shortest discrete distance) between the second terminal (B2) of circuit substrate (190) and the second support member (220-2) may be shorter than a discrete distance (e.g., shortest discrete distance) between the third terminal (B3) of circuit substrate (190) and the second support member (220-2) and a discrete distance (e.g., shortest discrete distance) between the fourth terminal (B4) of circuit substance (190) and the second support member (220-2).

Each length of the first and second extension portions (P1, P2) can be shortened by the shortened path because of the abovementioned reasons, whereby resistance {e.g., resistance of first and second upper elastic units (150-1, 150-2)} of path can be reduced.

Furthermore, although each of the first upper elastic unit (150-1) connected to the first terminal (B1) of circuit substrate (190) and the second upper elastic unit (150-2) connected to the second terminal (B2) is disposed with a first outer lateral frame coupled with the housing (140), the first inner frame (151) and the first frame connection portion are not disposed, such that resistance can be reduced compared with the second and fourth upper elastic units (150-3, 150-4).

The exemplary embodiment can shorten the length of path of the power signals (GND, VDD) being transmitted to the first position sensor (170) due to the abovementioned reasons to thereby reduce the resistance of path {e.g., resistances of first and second upper elastic units (150-1, 150-2)}, whereby the power signals (GND, VDD) can be prevented from being reduced, power consumption can be reduced, and driver IC operation voltage of first position sensor (170) can be also reduced.

In the exemplary embodiment, the first to sixth terminals (P1 to P6) may be disposed on a second surface (19*a*) of circuit substrate (190) in order to improve the solderability by making easy the soldering for electrical coupling with the first to fourth extension portions (P1 to P4) of upper elastic units (150-1 to 150-4).

If the said six terminals (B1 to B6) are disposed on the first surface (19*b*) of circuit substrate (190), the solderability may become worse, foreign objects (e.g., pollutant materials) caused by soldering may be introduced into the lens driving device (100), whereby an erroneous operation of lens driving device may be resulted. Because the structure is such that the third and fourth terminals (B3, B4) are interposed between the first terminal (B1) and the second terminal (B2), and the circuit substrate (190) is extended or protruded to the first corner portion (142-1) and the second corner portion (142-2) of housing (140) in order to reduce the path, each of the third upper elastic unit (150-3) and the fourth upper elastic unit (150-3) {e.g., third extension portion (P3) or fourth extension portion (P4)} may be coupled to the third and fourth terminals (B3, B4) through the circuit substrate (190).

The fifth and sixth terminals (B5, B6) of circuit substrate (190) may be disposed on the extension part (S2) of circuit substrate (190) in order to make the coupling with the lower elastic units (160-1, 160-2) easy.

In the exemplary embodiment, the magnetic field interference between the first and second magnets (180, 185) and the first magnet (130) is alleviated to thereby prevent the AF driving force from being reduced by magnetic interference, whereby a desired AF driving force can be obtained even if a separate yoke is not installed. As explained above, the exemplary embodiment can reduce the number of support members, and the size of lens driving device can be also reduced by the reduced number of support members.

Furthermore, because the number of support members is reduced, resistance of support members can be decreased to reduce the consumption current and the OIS driving sensitivity can be also improved.

Furthermore, thickness of support members may be increased in order to obtain the same elasticity instead of reducing the number of support members, and as the thickness of support members is increased, the influence of the OIS mover being received by the external shock can be decreased.

FIG. 17 is a perspective view of a base (210), FIG. 18a is an enlarged view of dotted lines of a base (210) of FIG. 17, and FIG. 18b is a bottom view of FIG. 18a.

Referring to FIGS. 17 and 18b, the base (210) may have escape portions (212-1 to 212-4) formed on four corners.

For example, the escape portion (212-1 to 212-4) may take a recess, groove or through hole shape, but the present invention is not limited thereto, and may take a chamfer shape in another exemplary embodiment.

The escape recess (17) may be formed at one region of upper surface of base (210) corresponded to or overlapped to an optical axis direction with the solder (39A) illustrated in FIG. 16. For example, the base (210) may be formed with four (4) escape recesses (17) corresponding to the solders (39A), but the present invention is not limited thereto.

For example, the escape recess (17) may prevent the solder (39A), the circuit substrate (250), or/and the base (210) from being damaged by soldering while the spatial interference between solders (39A) formed at a lower surface of circuit substrate (250) and the upper surface of base (210) is avoided.

The base (210) may comprise corner portions corresponding to the corner portions (142-1 to 142-4) of housing (140) to an optical axis direction. For example, the base (210) may comprise four (4) corner portions and the dotted area (11) in FIG. 17 may correspond to any one corner portion of base (210). Each of the escape portions (212-1 to 212-4) may be formed on any corresponding one of corner portions (11) of base (210).

Referring to FIG. 18a, for example, a diameter (R) of escape portion (212-1 to 212-4) may increase toward a corner direction of base (1210) from a center (201) of base (210).

For example, a center (201) of base (210) may be a spatial center of base (210). For example, the center (201) of base (210) may be a center of opening (C3) of base (210).

For example, a diameter (R) of base (210) may gradually increase from a center of base (210) to a direction (203) toward an imaginary corner (203) of base (210).

For example, the imaginary corner (203) may be an intersection point between a first straight line (202A) and a second straight line (202B). For example, the first straight line (202A) may be an imaginary straight line parallel with any one lateral surface (213A) of base (210) adjacent to any one escape portion (e.g., 212-2) of base (210) and positioned on the same plane surface. For example, the second straight line (202B) may be an imaginary straight line parallel with any one other lateral surface (213B) of base (210) adjacent to any one escape portion (e.g., 212-2) of base (210) and positioned on the same plane surface.

In another exemplary embodiment, the escape portion (212-1 to 212-4) may comprise a portion having a predetermined diameter (R).

Although the escape portion (e.g., 212-2) of base (210) in FIG. 18a takes a recess type having a curved or bent shape, the present invention is not limited thereto, and the escape portion may be sufficient in shape if the shape is adequate to avoid the support member (220), and is adequate to be coupled to an inner surface of a corner of the cover member (300) by the adhesive member (290).

The base (210) may be formed with a recess (310) formed on an upper surface (210A) of base (210) about the escape portion (212-2). The recess (310) of base (210) may be disposed underneath a lower surface of circuit substrate (250). For example, the recess (310) may be interposed between the circuit substrate (250) and the base (210).

The recess (310) of base (210) may be expressed by being substituted with an "adhesive member discharge recess", a "discharge recess", a "guide recess", an "adhesive member discharge guide recess", or a "staircase portion".

The recess (310) of base (210) may function to restrict or prevent introduction of adhesive member (290) toward one end of support member (220) that has passed through a hole (250a) of circuit substrate (250).

The recess (310) of base (210) may take a shape, e.g., a recess or a groove, depressed from an upper surface (210A) of base (210). Here, the upper surface (210A) of base (210) may be a surface corresponding to or facing a lower surface of circuit substrate (250) to an optical axis direction. For example, the upper surface (210A) of base (210) may be a surface that contacts a lower surface of circuit substrate (250).

The recess (310) of base (210) may be spaced apart from an outer lateral surface (311) of corner portion (11) of base (210) formed by an escape portion (212-2).

For example, the recess (310) of base (210) may comprise a floor surface (10A) having a staircase with an upper surface (210A) of the base (210) to an optical axis direction, a first lateral wall (10B or a "first lateral surface") connecting one side of floor surface (10A) with the upper surface (210A) of base (210), and a second lateral wall (10C or a "second lateral surface") connecting the other side of floor surface (10A) with the upper surface (210A) of base (210).

Alternatively, for example, the recess (310) may comprise a first surface (10A) having a staircase with the upper surface (210A) of base (210), and a second surface (10B, 10C) connecting the first surface (10A) with the upper surface (210A) of base (210).

For example, the floor surface (10A) may be so formed as to be lower than the upper surface (210A) of base (210). For example, the height of floor surface (10A) may be so formed as to be higher than that of the upper surface (210A) of base (210) based on a lower surface (210B) of base (210).

For example, the first lateral wall (10B) and the second lateral wall (10B) may face to face, or face each other.

For example, the floor surface (10A) may be parallel with the upper surface (210A) of base (210), a first interior angle formed by the first lateral wall (19B) and the floor surface (10A) may be a right angle, and a second interior angle formed by the second lateral wall (19C) and the floor surface (10A) may be also a right angle, but the present invention is not limited thereto. In another exemplary embodiment, each of the first and second interior angles may be an acute angle or an obtuse angle.

For example, one end of recess (310) may be opened to any one outer lateral surface (213A) of base (210) adjacent to the escape portion (212-2). Furthermore, the other end of recess (310) may be opened to the other outer lateral surface (213B) of base (210) adjacent to the escape portion (212-2).

For example, the recess (310) may comprise at least one of a first opening (HO1) opened to any one outer lateral surface (213A) of base (210) adjacent to the escape portion (212-2), and a second opening (HO2) opened to the other outer lateral surface (213B) of base (210) adjacent to the escape portion (212-2). This is to prevent the adhesive member (290) from escaping to an outside of base (210) through the first opening (HO1) and the second opening (HO2).

A distance from one end {or first opening (HO1)} of recess (310) to the other end {or second opening (HO2)} of recess (310) may be greater than a width {or width of floor surface (10A)} of recess (310).

For example, the shape of recess (310) may correspond or match to that of the outer lateral surface (311) of corner portion of base (210) or to that of escape portion (212-2).

The shape of outer lateral surface (311) of corner portion of base (210) may comprise at least one of a bent portion or a round portion. For example, referring to FIG. 18a, the shape of outer lateral surface (311) of corner portion of base (210) may comprise three (3) bent portions or round portions, and may be bilaterally symmetrical based on a center bent portion or a center round portion. But the present invention is not limited thereto.

For example, the base (210) may be such that a partition (330) exists between the recess (310) and the escape portion (212-2). The partition (330) may function to restrict or prevent the adhesive member (290) from invading into a hole (250a) of circuit substrate (250).

The recess (310) of base (210) may be disposed with or remained with some of adhesive member (290). But the present invention is not limited thereto. In another exemplary embodiment, the recess (310) of base (210) may not be disposed with or remained with some of adhesive member (290).

Referring to FIGS. 18b and 18b, a lower surface of corner portion of base (210) adjacent to the escape portion (212-1 to 212-4) may be formed with a staircase portion (320) having a step with a lower surface (210B) of base (210) to an optical axis direction. The staircase portion (320) may be expressed by being replaced with a "recess" or a "recess portion".

For example, the staircase portion (320) may be formed at a lower surface of base (210) about the escape portion (212-1 to 212-4). Alternatively, the staircase portion (320) may be so formed as to wrap at least some areas of the escape portion (212-1 to 212-4).

For example, the staircase portion (320) may be interposed between a lower surface of base (210) and the adhesive member (290).

For example, the staircase portion (320) may comprise a first surface (321) having a step (H2) with the lower surface (210B) of base (210) to an optical axis direction, and a second surface (322) connecting the first surface (321) and the lower surface (210B) of base (210).

The first surface (321) of staircase portion (320) may be so positioned as to be higher than a lower surface (210B) of base (210). For example, a distance to the first surface (321) of staircase portion (320) to an optical axis direction based on an upper surface (210A) of base (210) may be shorter than a distance to a lower surface (210B) of base (210) to an optical axis direction based on the upper surface (210A) of base (210).

For example, a distance {or depth (H1) of recess} from the upper surface (210A) of base (210) to the floor surface (10A) of recess (310) may be shorter than or the same as the step (H2) of staircase portion (320) (H1≤H2).

In another exemplary embodiment, the distance may be H1>H2. For example, H2 is a height of a first surface (321) based on a lower surface of base (210).

For example, the first surface (321) of staircase portion (320) may abut the escape portion (212-1 to 212-4). Alternatively, for example, the first surface (321) of staircase portion (320) may abut an outer lateral surface (311) of corner portion (11) of base (210) formed by the escape portion (212-2).

For example, the staircase portion (320) may be overlapped with the recess (310) of base (210) to an optical axis direction.

For example, one end of staircase portion (320) may abut any one outer lateral surface (213A) of base (210) adjacent to an escape portion (e.g., 212-2), and the other end of staircase portion (320) may abut the other end of outer lateral surface (213B) of base (210) adjacent to an escape portion (e.g., 212-2).

This is to improve the adhesion between the base (210) and the cover member (300) by increasing a contact area between the staircase portion (320) of base (210) and adhesive member, and simultaneously to prevent the adhesive member (290) from introducing to an upper portion of the recess (250a) of circuit substrate (250) when the adhesive member invades an upper surface of circuit substrate (250), by lengthening a flow path of adhesive member (290).

In another exemplary embodiment, at least one end and the other end of the staircase portion (320) may not abut the outer lateral surface (213A, 213B) of base (210) adjacent to the escape portion (e.g., 212-2) of base (210), and may be spaced apart.

For example, a width (W2) of first surface (321) of the staircase portion (320) may be greater than a width (W1) of recess (310) of base (210). This is to improve the adhesion between the base (210) and the cover member (300) by increasing a contact area between the staircase portion (320) of base (210) and the adhesive member (290), and simultaneously to prevent the adhesive member (290) from introducing to an upper portion of the recess (250a) of circuit substrate (250) when the adhesive member invades an upper surface of circuit substrate (250), by complicating and lengthening a flow path of adhesive member (290).

Although the staircase portion (320) of base (210) is formed with a dual step structure having one step in the given exemplary embodiment, the present invention is not limited thereto. In another exemplary embodiment, the staircase portion (320) of base (210) may have a triple or more step-structure having two or more steps based on a lower surface of base (210).

In still another exemplary embodiment, the lower surface of base (210) may be formed with a recess having a shape and structure of the abovementioned recess (310) instead of the staircase portion (320), where the explanation of the said recess will be applied or applied mutatis mutandis with that of the recess (310).

In another exemplary embodiment, the base may comprise at least one of the recess (310) and the staircase portion (320). The adhesive member (290) may comprise a plurality of adhesive members (290-1 to 290-4).

Each of the adhesive members (290-1 to 290-2) may couple any corresponding one of the escape portions (212-1 to 212-4) of base (210) to any corresponding one of corners of lateral plate (302) of cover member (300).

As illustrated in FIG. 16, for example, at least some of the adhesive members (290-1 to 290-4) may have a curved shape or a round shape, but the present invention is not limited thereto.

The adhesive member (290) may be an insulating adhesive, e.g., epoxy, epoxy bond, silicone or the like, but the present invention is not limited thereto.

Explanation on any one of escape portion (212-2), recess (310) and staircase portion (320) formed on any one corner portion of the base (210) illustrated in FIGS. 18a to 19b may be also applied to that of the escape portions (212-1, 212-3, 212-4), the recess (31) and the staircase portion (320) formed on the remaining corner portion of base (210).

The shape of escape portions (212-1 to 212-4) may comprise at least one of bent portion or a round portion. For example, referring to FIG. 18a, the shape of escape portions (212-1 to 212-4) may comprise three (3) bent portions or three round portions, and may have a bilaterally symmetrical shape about a center bent portion, but the present invention is not limited thereto.

Coupling (connection) of second coil (230), circuit substrate (250), support member (220) and the base (210) may be implemented as below.

First, the bobbin (110) coupled with the first coil (120) and second and third magnets (180,185) and the housing (140) coupled with the first magnet (130), circuit substrate (190), the first position sensor (170) and the capacitor (195) are coupled with the upper elastic member (150) and the lower elastic member (160), and the upper and lower elastic members (150, 160) and the circuit substrate (190) are electically connected by soldering and the like.

Next, the base (210), the circuit substrate (250) and the second coil (230) are coupled.

The support member (220) is made to pass through the hole (250a) of circuit substrate (250) and the escape recess (23) of second coil (230), and one end of support member (220) is coupled to the upper elastic member (150) through soldering and the like, and the other end of support member (220) is coupled to the pads (31-1 to 31-4) formed at a lower surface of circuit substrate (250). Furthermore, the thus-coupled elements are made to be disposed within the cover member (300).

FIG. 19a is a bottom view of a lens driving device (100) before adhesive members (290-1 to 290-4) are applied, and FIG. 19b is a bottom view of a support member (220) coupled to a staircase portion (320) of a base (210) and to a lower surface of a circuit substrate (250).

Referring to FIGS. 19a and 19b, the adhesive members (290-1 to 290-4) may be disposed on the escape portions (212-1 to 212-4) of base (210), one region (e.g., first region) of a lower surface of circuit substrate (250) exposed by the escape portions (212-1 to 212-4), a solder (902) coupling the other end of support members (220-1 to 220-4) and the pads (27a to 27d) of circuit substrate (250), and an inner surface (or inner lateral surface) of corners (305-1 to 305-4) of cover member (300).

For example, the adhesive members (290-1 to 290-4) may be also coated on one region (e.g., first region) of a lower surface of base (210) adjacent to the escape portions (212-1 to 212-4) of base (210). Furthermore, for example, the adhesive members (290-1 to 290-4) may be also disposed on one region of inner lateral surface of lateral plates of cover member (300) adjacent to an inner surface of corners (305-1 to 305-4) of cover member (300).

The lower surface of hole (250a) of circuit substrate (250) may be sealed or shielded by the solder (902), such that the adhesive member (290) may be prevented from being introduced into the hole (250a) through a lower surface of the hole (250a) of circuit substrate (250) or a lower opening of hole (250a).

FIG. 20a shows a flow path (24) of adhesive member when the adhesive member is applied to a recess (310) of a base (210) and to an escape portion of the base (21A) less a staircase portion (320) according to an exemplary embodiment of the present invention.

The base (21A) may have the same structure as that of base (210) except for the recess (310) and the staircase portion (320).

Referring to FIG. 20a, the adhesive member coated on the escape portion of base (21A) may generate a phenomenon of overflowing into the circuit substrate (250), whereby the adhesive member may flow to an upper surface of circuit substrate (250) through a gap between a lower surface of circuit substrate (250) and an upper surface of base (21A) to an upper surface of corner portion of circuit substrate (250), and may be introduced into an upper surface of hole (250a) at the circuit substrate (250) or an upper opening of the hole (250a) to thereby fill the hole (250a).

The arrow (24) of FIG. 20a illustrates a flow path of adhesive member of FIG. 20a. FIG. 21a shows an open wire of support member generated on an actual product in case of FIG. 20a. FIG. 21a illustrates an upper surface lateral of corner portion of the circuit substrate (250) where the support member illustrates a state of being open-wired and removed.

Referring to FIG. 21a, in case of FIG. 20a, the hole (250a) and one region of support member (250) disposed within the hole (250a) may be coupled or mutually coupled by the adhesive member that has flowed into the hole (250a). The arrow of FIG. 21a illustrates the adhesive member that has flowed into the hole (250a).

An actual length of support member coupled between upper elastic member (150) and the circuit substrate (250) may be decreased to an optical axis direction, and brittleness of support member may be increased, whereby reliability may become susceptible to outside shock to generate an open wire of support member, and as a result, the operation of lens driving device can become impossible due to open wire of support member.

FIG. 20b shows a flow path (25) of adhesive member (290) when the adhesive member is applied to an escape portion (212-1 to 212-4) of a base (210) according to an exemplary embodiment of the present invention. FIG. 21b shows a non-occurrence of open wire on a support member in an actual product in case of FIG. 20b.

The arrow (25) in FIG. 20b shows a flow path of adhesive member of FIG. 20b, and FIG. 21b shows an upper surface lateral of corner portion of circuit substrate (250).

Referring to FIGS. 18a to 20b and 21b, the base (210) according to an exemplary embodiment may be disposed with a staircase portion (320) having more than two steps, whereby the flow path of adhesive member (290) can be complicated and lengthened, and as a result, the adhesive member is prevented from overflowing or infiltrating into over an upper surface of circuit substrate (250).

Furthermore, the base (210) according to an exemplary embodiment is formed with a recess (310) to allow the adhesive member (290) that has overflowed or infiltrated into an upper surface of circuit substrate to be discharged or released from outer lateral surfaces (213A, 213B) of base (210) through the recess (310), whereby the adhesive member (290) can be restricted or prevented from being introduced into an upper surface of hole (250a) of circuit substrate (250) or an upper opening of hole (250a).

FIG. 22a shows a positional relationship between a recess (310) of a base (210) and a first recess (41A) of circuit substrate (250), and FIG. 22b shows a positional relationship between a recess (310) of a base (210) and a second recess (41B) of circuit substrate (250).

Referring to FIG. 22a, the circuit substrate (250) may be disposed with a first recess (41A) formed on a first lateral surface (51A) of circuit substrate (253) where a terminal portion (253) is bent.

For example, the first recess (41A) of circuit substrate (250) may be so formed as to be adjacent to or abut the terminal portion (253). The circuit substrate (250) may comprise four (4) first recesses (41A), but the present invention is not limited thereto, and in another exemplary embodiment, the circuit substrate (250) may comprise more than two first recesses.

For example, the first recess (41A) of circuit substrate (250) may function to allow the terminal portion (253) to be easily bent.

The first recess (41A) may take a semi-circular shape, a semi-oval shape or a curved shape, but the present invention is not limited thereto, and may take a polygonal shape.

For example, the recess (310) of base (210) and a first recess (41A) of circuit substrate (250) may not be mutually overlapped to an optical axis direction.

For example, the first recess (41A) may be interposed between the terminal portion (253) and a corner of circuit substrate (250).

For example, the first recess (41A) of circuit substrate (250) may be disposed at an opposite side of support member {220, or corner (60) of circuit substrate (250)} based on the recess (310) of base (210).

For example, a first opening (HO1) of recess (310) of base (210) may be so disposed as to be nearer to the support member {220, or the corner (60) of circuit substrate (250)} than the first recess (41A) of circuit substrate (250).

A first region (210A1) of upper surface (210A) of base (210) may be exposed by the first recess (41A) of circuit substrate (250).

For example, the recess (310) of base (210) and the first region (210A1) of upper surface (210A) of base (210) may not be mutually overlapped to an optical axis direction.

For example, the first region (210A1) may be spaced apart from the recess (310) of base (210).

The first region (210A1) of upper surface (210A) of base (210) may be disposed at an opposite side of the support member {220, or the corner (60) of circuit substrate (250)} based on the recess (310) of base (210).

The first opening (HO1) of recess (310) of base (210) may be so disposed as to be nearer to the support member {220, or the corner (60) of circuit substrate (250)} than the first region (210A1) of upper surface (210A) of base (210).

Referring to FIG. 22b, the circuit substrate (250) may be disposed with a second recess (41B) formed at a second lateral surface (51B) adjacent to the first lateral surface (51A). The corner (60) may be a place where the first lateral surface (51A) and the second lateral surface (51B) meet. The circuit substrate (250) may comprise four (4) second recesses, but the present invention is not limited thereto, and in another exemplary embodiment, the circuit substrate (250) may comprise five (5) or more second recesses.

The second recess (41B) may take a semi-circular shape, semi-oval shape or a curved shape, but the present invention is not limited thereto, and the second recess (41B) may take a polygonal shape.

For example, a single circuit substrate (250) according to an exemplary embodiment may be produced by manufacturing a plurality of circuit substrates mutually connected by a bridge and then cutting the bridge, where the second recess (41B) may be an area connected by the bridge.

For example, the recess (310) of base (210) and the second recess (41B) of circuit substrate (250) may not be overlapped to an optical axis direction.

For example, the second recess (41B) may be interposed between terminals (30A to 30D) of circuit substrate (250) and the corner (60) of circuit substrate (250).

The second recess (41B) of circuit substrate (250) may be disposed at an opposite side of the support member {220, or the corner (60) of circuit substrate (250)} based on the recess (310) of base (210).

For example, the second opening (HO2) of recess (310) of base (210) may be so disposed as to be nearer to the support member {220, or the corner (60) of circuit substrate (250)} than to the second recess (41B) of circuit substrate (250).

The second region ((210A2) of upper surface (210A) of base (210) may be exposed by the second recess (41B) of circuit substrate (250).

For example, the recess (310) of base (210) and the second region (210A2) of upper surface (210A) of base (210) may not be mutually overlapped to an optical axis direction.

The second region (210A2) of upper surface (210A) of base (210) may be disposed at an opposite side of the support member {220, or the corner (60) of circuit substrate (250)} based on the recess (310) of base (210).

The second opening (HO2) of recess (310) of base (210) may be so disposed as to be nearer to the support member {220, or the corner (60) of circuit substrate (250)} than to the second region (210A2) of upper surface (210A) of base (210).

The adhesive member (290) introduced into a gap between an upper surface of base (210) and a lower surface of circuit substrate (250) by being introduced to the first region ((210A1) or/and the second region (210A2) of upper surface (210A) of base (210) may be discharged or released outside of base (210) through the recess (310) of base (210).

FIG. 23a shows a positional relationship between a recess (310) of a base (210) and a first recess (42A) of a circuit substrate (250) according to another exemplary embodiment, and FIG. 23b shows a positional relationship between a recess (310) of a base (210) and a second recess (42B) of a circuit substrate (250) according to another exemplary embodiment.

The first recess (42A) of FIG. 23a may be a modification of the first recess (41A) of FIG. 22a, and the second recess (42B) of FIG. 23b may be a modification of second recess (41B) of FIG. 22b.

For example, each of the first recess (42A) and the second recess (42B) may take a semi-circular shape, a semi-oval shape or a curved shape, but the present invention is not limited thereto and may also take a polygonal shape.

For example, one part of the recess (310) of base (210) and the first recess (42A) of circuit substrate (250) may be mutually overlapped to an optical axis direction, and the other part of the recess (310) of base (210) and the second recess (42B) of circuit substrate (250) may be mutually overlapped to an optical axis direction.

For example, the first recess (42A) may be disposed between the terminal portion (253) and a corner (60) of the circuit substrate (250), and the second recess (42B) may be disposed between the terminal (30A to 30D) of circuit substrate (250) and a corner of the circuit substrate (250), The first recess (42A) may expose one part (or one end) of recess (310) of base (210), and the second recess (42B) may expose the other part (or the other end) of recess (310) of base (210).

One end of first recess (42A) may be extended to escape portion (122-1 to 122-4) of base (210), and one end of second recess (42B) may be extended to the escape portion (122-1 to 122-4) of base (210).

Because at least a part of the recess (310) of base is exposed by the first recess (42A) and the second recess (42B), the adhesive member introduced into a first region (210A3) of upper surface (210A) of base (210) exposed by the first recess (42A) or/and a second region (210A4) of base (210) exposed by the second recess (42B) may be easily introduced into the recess (310) of base (210) and discharged or released outside of the base (210) to thereby improve the discharge effect of adhesive member.

FIG. 24 shows a second coil (230A) comprising a circuit member (231A) according to another exemplary embodiment. Referring to FIG. 24, the circuit member (231A) may be disposed with a through hole (23A) to allow the support member (220-1 to 220-4) to pass therethrough. The content explained in FIGS. 13 to 23b may be applied or applied mutatis mutandis to the exemplary embodiment of FIG. 24.

Meantime, the lens driving device according to the aforementioned exemplary embodiments may be used to various fields, e.g., camera modules or optical apparatus.

FIG. 25 shows an exploded perspective view of a camera module (200) according to an exemplary embodiment of the present invention.

Referring to FIG. 25, the camera module may comprise a lens barrel (400), a lens driving device (100), an adhesive member (612), a filter (610), a first holder (600), a second holder (800), an image sensor (810), a motion sensor (820), a controller (830) and a connector (840). In another exemplary embodiment, at least one of the motion sensor (820) and controller (830) may be omitted.

The lens barrel (400) may be mounted on a bobbin (110) of lens driving device (100).

The first holder (600) may be disposed underneath the base (210) of lens driving device (100). The filter (610) may be mounted on the first holder (600), and the first holder (600) may be disposed with a protruder (500) accommodated with the filter (610).

The adhesive member (612) can couple or attach the base (210) of lens driving device (100) to the first holder (600). The adhesive member (612) may also function to prevent foreign objects from being introduced into the lens driving device (100), in addition to the abovementioned adhesive function.

For example, the adhesive member (612) may be an epoxy, a thermosetting adhesive or a UV curable adhesive.

The filter (610) may function to prevent a light of particular frequency bandwidth of lights that has passed the lens barrel (400) from being introduced into the image sensor (810). The filter (610) may be an infrared cut-off filter, but the present invention is not limited thereto. At this time, the filter (610) may be so disposed as to be parallel with an x-y plain surface.

An area of the first holder (600) mounted with the filter (610) may be so formed with an opening as to allow the light having passed the filter (610) to be incident on the image sensor (810).

The second holder (800) may be disposed at a lower surface of the first holder (600) and the second holder (600) may be disposed with an image sensor (810). The image sensor (810) is an area where an image comprising the incident light having passed the filter (610) is captured.

The second holder (800) may be disposed with various circuits, elements, and controllers for transforming an image captured on the image sensor (810) to an electric signal and transmitting the same to an outside.

The second holder (800) may be embodied by a circuit substrate mounted with an image sensor, formed with a circuit pattern and coupled with various elements. The first holder (600) may be expressed by being replaced with a "holder" or a "sensor base", and the second holder (800) may be expressed by being replaced with a "substrate" or a "circuit substrate".

The image sensor (810) may receive an image comprised in a light incident on through the lens driving device (100), and may transform the received light to an electric signal. The filter (610) and the image sensor (810) may be so disposed as to be spaced apart by mutually facing each other to a first direction.

The motion sensor (820) may be mounted on a second holder (800) and may be electrically connected with a controller (730) through a circuit pattern provided on the second holder (800).

The motion sensor (820) may output the rotational angular velocity information generated by motion of camera module (200). The motion sensor (820) may be embodied by a 2-axis gyro sensor, a 3-axis gyro sensor, or an angular velocity sensor.

The controller (830) may be mounted on a second holder (800), and may be electrically connected to a second position sensor (240) of lens driving device (100) and a second coil (230).

For example, the second holder (800) may be electrically connected with a circuit substrate (250) of lens driving device (100), and the controller (830) mounted on the second holder (800) may be electrically connected to a second position sensor (240) of lens driving device (100) and a second coil (230) through the circuit substrate (250).

The controller (830) may transmit a clock signal (SCL), a data signal (SDA) and power signals (VDD, GND) with the first position sensor (120) for I2C communication, and receive the clock signal (SCL) and the data signal (SDA) from the first position sensor (170).

Furthermore, the controller (830) may control a driving signal configured to perform an OIS operation on the OIS mover of lens driving device based on an output signal provided from the second position sensor (240) of the lens driving device (100).

The connector (840) may be disposed with a port electrically connected to the second holder (800) for being electrically connected to an outside device.

Furthermore, the lens driving device (100) according to an exemplary embodiment may be comprised in an optical apparatus with a purpose of improving an image of an object using light characteristics of reflection, refraction, absorption, interference, and diffraction, a purpose of increasing an eye vision, a purpose of recording and reproducing an image using a lens and a purpose of optical measurement, transmission or propagation of image. For example, the optical apparatus according to an exemplary embodiment may be a mobile phone, a portable phone, a smart phone, a portable smart device, a digital camera, a laptop computer, a digital broadcasting terminal, a PDA (Personal Digital Assistant), a PMP (Portable Multimedia Player), navigation and the like, but the present invention is not limited thereto, and may comprise any device configured to photograph an image or a photograph.

FIG. 26 shows a perspective view of a portable terminal (200A) according to an exemplary embodiment of the present invention, and FIG. 27 is a block diagram of a portable terminal illustrated in FIG. 26.

Referring to FIGS. 26 and 27, a portable terminal (200A, hereinafter referred to as a "terminal") may comprise a body (850), a wireless communication part (710), an A/V input part (720), a sensing part (740), an input/output part (750), a memory part (760), an interface part (770), a controller (780) and a power supply part (790).

Although the body (850) illustrated in FIG. 26 takes a bar shape, the present invention is not limited thereto, and may be of various structures comprising a slide type structure where two or more sub-bodies are relatively movably coupled, a folder type structure, a swing type structure, a swivel type structure and the like.

The body (850) may comprise an exterior look-forming case (casing, housing, cover) and the like. For example, the body (850) may be divided by a front case (851) and a rear case (852). A space formed between the front case (851) and the rear case (852) may be housed therein with various electronic parts of terminal.

The wireless communication part (710) may be formed by comprising one or more modules configured to enable a wireless communication between a terminal (200A) and a wireless communication system or a terminal (200A) and a network positioned with the terminal (200A). For example, the wireless communication part (710) may be formed by comprising a broadcasting reception module (711), a mobile communication module (712), a wireless Internet module (713), a short distance communication module (714) and a position information module (715).

The A/V (Audio/Video) input part (720) is intended for audio or video signal input, and may comprise a camera (721), a microphone (722) and the like.

The camera (721) may be a camera comprising a camera module (200) according to an exemplary embodiment of the present invention.

The sensing part (740) may generate a sensing signal for controlling the operation of terminal (200A) by detecting a current state of the terminal (200A) comprising, but not limited to, an opening and closing of a terminal (200A), a position of a terminal (200A), a contact or non-contact of a user, azimuth of a terminal (200A) and acceleration/deceleration of a terminal (200A). For example, when a terminal (200A) is of a slide phone type, the terminal (200A) may sense the opening/closing of the slide phone. Furthermore, the terminal (200A) may be in charge of sensing functions related to the power supply/non-supply of a power supply part (790), the coupling/non-coupling of external device of interface part (770) and the like.

The input/output part (750) is intended to generate an input or an output related to visual, audio or tactile functions. The input/output part (750) may generate an input data for operational control of a terminal (200A), and may display information processed by the terminal (200A).

The input/output part (750) may comprise a key pad part (730), a display module (751), a sound output module (752) and a touch screen panel (753). The key pad part (730) may generate an input data using a key pad input.

The display module (751) may comprise a plural number of pixels in which colors are changed in response to an electric signal. For example, the display module (751) may comprise at least any one of a liquid crystal display, a thin film transistor-liquid crystal display, an organic light-emitting diode, a flexible display and a 3D display.

The sound output module (752) may output an audio data received from a wireless communication part (710) under a call signal reception mode, a communication mode, a recording mode, an audio recognition mode or a broadcasting reception mode, or output an audio data stored in a memory part (760).

The touch screen panel (753) may transform, to an electric input signal, changes of capacitance generated by a user touch on a particular region of a touch screen.

The memory part (760) may store programs for processing and controlling of a controller (780) and temporarily store inputted/outputted data (e.g., telephone number directory, message, audio, still image, photograph, video and the like). For example, the memory part (760) may store images, e.g., photographs or videos captured by the camera (721).

The interface part (770) may perform a passage role connected to an external device connected to a terminal (200A). The interface part (770) may receive data from an external device, transmit the same to each element inlateral the terminal (200A) by receiving a power, or transmit the data inlateral the terminal (200A) to an external device. For example, the interface part (770) may comprise a wired/wireless headset port, an external charger port, a wired/wireless data port, a memory card port, a port connecting a device formed with a recognition module, an audio I/O (Input/Output) port, a video I/O (Input/Output) port, an earphone port and the like.

The controller (780) may control an overall operation of terminal (200A). For example, the controller (780) may perform a process and a control related for audio communication, data communication and video communication.

The controller (780) may be formed with a multimedia module (781) for multimedia reproduction. The multimedia module (781) may be formed within the controller (780) or may be embodied independently from the controller (780).

The controller (780) may perform a pattern recognition process capable of recognizing a writing input or picture drawing input performed on a touch screen as text and image.

A controller (780) of an optical apparatus (200A) may perform the role of the controller (830) of a camera module (200) by substituting the controller (830) of a camera module (200).

The power supply part (790) may receive an external power or an internal power in response to control of the controller (780) and supply the power necessary for operation of each element.

Hereinafter, an explanation on configuration of lens driving device according to a second exemplary embodiment of the present invention will be made with reference to accompanying drawings.

FIG. 28a is a perspective view of a lens driving device according to a second exemplary embodiment of the present invention, FIG. 28b is a plane view of a lens driving device according to a second exemplary embodiment of the present invention, FIG. 29 is a cross-sectional view taken along line A-A of FIG. 28a, FIG. 30 is a cross-sectional view taken along line B-B of FIG. 28a, FIG. 31 is a cross-sectional view taken along line C-C of FIG. 28a, FIG. 32 is an exploded perspective view of a lens driving device according to a second exemplary embodiment of the present invention, FIGS. 33 through 36 are exploded perspective views of some configurations of a lens driving device according to a second exemplary embodiment of the present invention, FIG. 37 is a perspective view illustrating a state where a cover is removed from a lens driving device according to a second exemplary embodiment of the present invention, FIG. 38 is a schematic view illustrating an enlargement of a portion of FIG. 37 along with an irradiated direction of UV beams, FIG. 39 is a perspective cross-sectional view illustrating a cross-section of some configurations of a lens driving device of FIG. 37, FIG. 40 is a plan view of some configurations of a lens driving device of FIG. 37 and FIG. 41 is an enlarged view illustrated with an enlargement of some configurations of FIG. 40.

A lens driving device (1010) may be a VCM (Voice Coil Motor). The lens driving device (1010) may be a lens driving motor. The lens driving device (1010) may be a lens driving actuator. The lens driving device (1010) may comprise an AF module. The lens driving device (1010) may comprise an OIS module.

The lens driving device (1010) may comprise a cover (1100). The cover (1100) may comprise a 'cover can'. The cover (1100) may be disposed outer lateral of a housing (1310). The cover (1100) may be coupled with a base (1410). The cover (1100) may be accommodated within a housing (1310). The cover (1100) may form an exterior look of a lens driving device (1010). The cover (1100) may take a lower surface-opened hexahedronal shape. The cover (1100) may be formed with a non-magnetic substance. The cover (1100) may be formed with a metal material. The cover (1100) may be formed with a metal plate. The cover (1100) may be connected to a ground part of a PCB (1050), through which the cover (1100) may be grounded. The cover (1100) may shield an EMI (Electro Magnetic Interference). At this time, the cover (1100) may be called an 'EMI shield can'.

The cover (1100) may comprise an upper plate (1110) and a lateral plate (1120). The cover (1100) may comprise an upper plate (1110) comprising a hole (1111), and a lateral plate (1120) extended downwardly from an outer periphery of the upper plate (1110) or from an edge. A lower end of the lateral plate (1120) of cover (1100) may be disposed at a terminal portion (1412) of a base (1410). An inner surface of lateral plate (1120) of cover (1100) may be fixed to the base (1410) by an adhesive.

The upper plate (1110) of cover (1100) may comprise a hole (1111). The hole (1111) may comprise an 'opening'. The hole (1111) may be formed on the upper plate (1110) of cover (1100). When viewed from above, a lens may be seen through the hole (1111). The hole (1111) may be formed with a size and shape corresponding to those of a lens. The size of the hole (1111) may be formed greater than a diameter of a lens module (1020) to enable the lens module (1020) to be inserted into and assembled through the hole (1111). A light incident on through the hole (1111) may pass through the lens. At this time, the light having passed the lens may be transformed to an electric signal by an image sensor to thereby be obtained as an image.

The upper plate (1110) of cover (1100) may be overlapped with a recess (1212) of a bobbin (1210) in its entirety to an optical axis direction. That is, when viewed from above, the upper plate (1110) of cover (1100) may completely cover the recess (1212) of bobbin (1210). However, because there is formed a discrete space between the cover (1100) and the hole (1212) of bobbin (1210), a UV beam irradiated above from the cover (1100) can be reached to a second magnet (1610) disposed on the hole (1212) of bobbin (1210) despite there being the cover (1100). In an exemplary embodiment, because a first region (1514) of an upper elastic member (150) is adjacently disposed to an upper surface of second magnet (1610), the effect inflicted on the second magnet (1610) by the UV beam can be minimized. As a modification, the upper plate (1110) of cover (1100) may not be overlapped with the recess (1212) of bobbin (1210) to an optical axis direction. In this case, the effect applied on the second magnet (1610) by the above-irradiated UV beam may be minimized by the first region (1514) of upper elastic member (150) according to an exemplary embodiment.

One part of recess (1212) of bobbin (1210) may be overlapped with the upper plate (1110) of cover (1100) to an optical axis direction, and the other part of recess (1212) of bobbin (1210) may be overlapped with the upper elastic member (150) to an optical axis direction.

The upper plate (1110) of cover (1100) may comprise a recess (1112). The recess (1112) of upper plate (1110) of cover (1100) may be formed on an inner surface of the hole (1112) by being depressed. The recess (1112) of upper plate (1110) may be formed on a position corresponding to that of a jig recess (1219) of bobbin (1210). That is, the recess (1112) of upper plate (1110) may expose the jig recess (1219) of bobbin (1210) upwardly, through which the jig recess (1219) of bobbin (1210) may be coupled to a jig that is inserted from an upper side.

The lens driving device (1010) may comprise a first mover (1200). The first mover (1200) may be coupled with a lens. The first mover (1200) may be connected to a second mover (1300) through an upper elastic member (1510) and/or a lower elastic member (1520). The first mover (1200) may move through an interaction with the second mover (1300). At this time, the first mover (1200) may integrally move with a lens. Meanwhile, the first mover (1200) may move during an AF driving. At this time, the first mover (1200) may be called an 'AF mover'. However, the first mover (1200) may move along with the second mover (1300) even during the OIS driving.

The first mover (1200) may comprise a bobbin (1210). The bobbin (1210) may be disposed inside of the housing (1310). The bobbin (1210) may be disposed on a hole (1311) of housing (1310). The bobbin (1210) may be movably coupled with the housing (1310). The bobbin (1210) may move to an optical axis direction relative to the housing (1310). The bobbin (1210) may be coupled by a lens. The bobbin (1210) and the lens may be coupled by a screw connection and/or an adhesive. The bobbin (1210) may be coupled by a first coil (1220). An upper surface or an upper side of bobbin (1210) may be coupled by an upper elastic member (1510). A lower surface or a lower side of bobbin (1210) may be coupled by a lower elastic member (1520). The bobbin (1210) may be coupled to an upper elastic member (1510) and/or a lower elastic member (1520) by using the heat fusion and/or an adhesive. The adhesive that couples the bobbin (1210) and the lens, and bobbin (1210) and the elastic member (1500) may be epoxy cured by any one of UV (ultraviolet), heat and laser.

The bobbin (1210) in an exemplary embodiment may not be disposed between a second magnet (1610) and a sensor (1630). That is, in the exemplary embodiment, a distance between the second (1610) and the sensor (1630) may be minimized. The magnetic strength of the second magnet (1610) detected by the sensor (1630) may be increased through the minimized distance between the second magnet (1610) and the sensor (1630).

The bobbin (1210) may comprise an upper surface (1211). The upper surface (1211) of bobbin (1210) may be disposed with an inner portion (1511) of upper elastic member (1510). The upper surface (1211) of bobbin (1210) may be disposed at a position higher than an upper surface (1611) of the second magnet (1610). The upper surface (1211) of bobbin (1210) may be spaced apart from an upper surface (1611) of second magnet (1610).

The bobbin (1210) may comprise a groove (1212). The groove (1212) may be a recess. The groove (1212) may be disposed with a second magnet (1610). The bobbin (1210) may be opened at a part that corresponds to the upper surface (1611) of the second magnet (1610) by the groove (1212) of bobbin (1210). The groove (1212) of bobbin (1210) may be formed on an upper surface (1211) of bobbin (1210). The groove (1212) of bobbin (1210) may be formed at an inner peripheral surface of bobbin (1210). At least a part of groove (1212) of bobbin (1210) may be formed in a shape and size corresponding to those of the second magnet (1610). The bobbin (1210) may comprise a groove formed underneath the first region (1514). The groove may be connected to a recess (1212) of bobbin (1210). That is, the groove may not be distinguished from the recess (1212) of bobbin (1210) and may be recognized as one groove. The recess (1212) may be an area where the second magnet (1610) is disposed, and the groove may not be an area where the second magnet (1610) is not disposed.

The bobbin (1210) may comprise a depressed portion (1213). The depressed portion (1213) may be formed at an area corresponding to that of a connection portion (1513) of upper elastic member (1510). The depressed portion (1213) may be formed by being depressed from an upper surface (1211) of bobbin (1210), through which the interference between the connection portion (1513) and the bobbin (1210) can be prevented when the connection portion (1513) of upper elastic member (1510) is moved downwardly at an initial state. The depressed portion (1213) may be spaced apart from the recess (1212) of bobbin (1210).

The bobbin (1210) may comprise a hole (1214). The hole (1214) may pass through the bobbin (1210) to an optical axis direction. The hole (1214) may be accommodated with a lens module (1020). For example, an inner lateral surface of bobbin (1210) forming the hole (1214) may be disposed with a screw thread corresponding to that formed on an outer lateral surface of lens module (1020).

The bobbin (1210) may comprise a protrusion (1215). The protrusion (1215) may comprise a lug. The protrusion (1215) may be formed on an upper surface (1211) of bobbin (1210). The protrusion (1215) may be protrusively formed from an upper surface (1211) of bobbin (1210). The protrusion (1215) may be coupled to an inner portion (1511) of upper elastic member (1510). The protrusion (1215) may be inserted into a hole (1511a) of the inner portion (1511) of upper elastic member (1510). The protrusion (1215) may be coupled to the hole (1511a) of the inner portion (1511).

The bobbin (1210) may comprise a coil accommodation groove (1216). The coil accommodation groove (1216) may be coupled by a first coil (1220). The coil accommodation groove (1216) may be formed on an outer peripheral surface of bobbin (1210). The coil accommodation groove (1216) may comprise a recess formed by allowing a part of the outer lateral surface of bobbin (1210) to be depressed. The first coil (1220) may be accommodated into a recess of coil accommodation groove (1216). The coil accommodation groove (1216) may comprise a lug supporting a lower surface of the first coil (1220).

The bobbin (1210) may comprise an upper stopper (1217). The upper stopper (1217) may be formed on an upper surface (1211) of bobbin (1210). The upper stopper (1217) may be protrusively formed from the upper surface (1211) of bobbin (1210). The upper stopper (1217) may be overlapped with an upper plate (1110) of cover (1100) to an optical axis direction. The upper stopper (1217) may form an uppermost end of bobbin (1210), through which the upper stopper (1217) may be brought into contact with the upper plate (1110) of cover (1100) when the bobbin (1210) is moved to an upper side. That is, the upper stopper (1217) may physically restrict the stroke upward of the bobbin (1210).

The bobbin (1210) may comprise a lateral stopper (1218). The lateral stopper (1218) may be formed at a lateral surface of bobbin (1210). The lateral stopper (1218) may be protrusively formed at a lateral surface of bobbin (1210). At least a part of the lateral stopper (1218) may be disposed at a second groove (1313) of housing (1310), through which, when the bobbin (1210) is rotated, the lateral stopper (1218) of bobbin (1210) may be brought into contact with the housing (1310). That is, the lateral stopper (1218) of bobbin (1210) may restrict the rotation of bobbin (1210).

The bobbin (1210) may comprise a jig groove (1219). The jig groove (1219) may be formed on an upper surface of bobbin (1210). The jig groove (1219) may be coupled by a jig for preventing the bobbin (1210) from rotating when the lens module (1020) is screw-connected.

The first mover (1200) may comprise a first coil (1220). The first coil (1220) may be an 'AF driving coil' used for AF driving. The first coil (1220) may be disposed on the bobbin (1210). The first coil (1220) may be interposed between the bobbin (1210) and the housing (1310). The first coil (1220) may be disposed on an outer lateral surface or an outer peripheral surface of bobbin (1210).

The first coil (1220) may be directly wound on the bobbin (1210). Alternatively, the first coil (1220) may be coupled to the bobbin (1210) in a state of being directly wound on the bobbin (1210). The first coil (1220) may face the first magnet (1320). The first coil (1220) may be so disposed as to be in a face-to-face state with the first magnet (1320). The first coil (1220) may electromagnetically interact with the first magnet (1320). In this case, when there is an electromagnetic interaction between the first coil (1220) and the first magnet (1320), the first coil (1220) may move relative to the first magnet (1320) because of the electromagnetic interaction. The first coil (1220) may be formed with a single coil. Alternatively, the first coil (1220) may comprise a mutually discrete plurality of coils.

The first coil (1220) may comprise a pair of lead wires for power supply. At this time, a distal end (lead wire) of one side of the first coil (1220) may be coupled with a first lower elastic unit (1520-1) while a distal end (lead wire) of the other side of the first coil (1220) may be coupled with a second lower elastic unit (1520-2). That is, the first coil (1220) may be electrically connected to the lower elastic member (1520). To be more specific, the first coil (1220) may receive an electric power sequentially from a PCB, a first substrate (1420), a lateral elastic member (1530), an upper elastic member (1510), a second substrate (1640) and a lower elastic member (1520). In a modification, the first coil (1220) may be electrically connected to the upper elastic member (1510).

The lens driving device (1010) may comprise a second mover (1300). The second mover (1300) may be movably coupled to a stator (1400) through a lateral elastic member (1530). The second mover (1300) may support the first mover (1200) through the upper and lower elastic members (1510, 520). The second mover (1300) may move the first mover (1200) or move along with the first mover (1200).

The second mover (1300) may move through interaction with the stator (1400). The second mover (1300) may move during the OIS driving. At this time, the second mover (1300) may be called an 'OIS mover'. The second mover (1300) may integrally move with the first mover (1200) during the OIS driving.

The second mover (1300) may comprise a housing (1310). The housing (1310) may be spaced apart from a base (1410). The housing (1310) may be disposed at an outside of a bobbin (1210). The housing (1310) may accommodate at least a part of the bobbin (1210). The housing (1310) may be disposed within a cover (1100). The housing (1310) may be interposed between the cover (1100) and the bobbin (1210). The housing (1310) may be formed with a material different from that of the cover (1100). The housing (1310) may be formed with an insulating material. The housing (1310) may be formed with an injection. An outer lateral surface of housing (1310) may be spaced apart from an inner surface of lateral plate (1120) of cover (1100). The housing (1310) may move for OIS driving through a discrete space between the housing (1310) and the cover (1100). The housing (1310) may be disposed with a first magnet (1320). The housing (1310) and the first magnet (1320) may be coupled by an adhesive. An upper surface or upper side of housing (1310) may be coupled by an upper elastic member (1510). A lower surface or a lower side of the housing (1310) may be coupled by a lower elastic member (1520). The housing (1310) may be coupled with the upper and lower elastic members (1510, 520) by heat fusion and/or adhesive. The adhesive that couples the housing (1310) and the first magnet (1320), and the housing (1310) and the elastic member (1500) may be epoxy cured by at least one or more of the UV, heat and laser.

The housing (1310) may comprise four (4) lateral portions and four (4) corner portions disposed among the four lateral portions. The lateral portion of the housing (1310) may comprise a first lateral portion, a second lateral portion disposed opposite of the first lateral portion, and third and fourth lateral portions disposed between the first and second lateral portions in a mutually opposite side. The corner portion of housing (1310) may comprise a first corner portion disposed between the first and third lateral portions, a second corner portion disposed between the first and fourth lateral portions, a third corner portion disposed between the second and third lateral portions, and a fourth corner portion disposed between the second and fourth lateral portions. The lateral portion of housing (1310) may comprise a 'lateral wall'.

The housing (1310) may comprise a hole (1311). The hole (1311) may be formed on the housing (1310). The hole (1311) may be so formed as to pass through the housing (1310) to an optical axis direction. The hole (1311) may be disposed with a bobbin (1210). The hole (1311) may be formed with a shape at least partially corresponding to that of the bobbin (1210). An inner peripheral surface or an inner lateral surface of housing (1310) forming the hole (1311) may be so disposed as to be spaced apart from an outer peripheral surface of bobbin (1210). However, at least parts of the housing (1310) and the bobbin (1210) may be overlapped to an optical axis direction to restrict a moving stroke distance of bobbin (1210) to an optical axis direction.

The housing (1310) may comprise a first groove (1312). The first groove (1312) may be formed on an upper surface of housing (1310) by being depressed. The first groove (1312) may be formed on a position corresponding to that of a connection part (1510) of the upper elastic member (1510). The first groove (1312) may prevent an interference of between the upper elastic member (1510) and the housing (1310) when the connection portion (1513) of upper elastic member (1510) moves downwardly from an initial position.

The housing (1310) may comprise a second groove (1313). The second groove (1313) may accommodate at least a part of lateral stopper (1218) of bobbin (1210). The second groove (1313) may be so formed as to have a predetermined gap with the lateral stopper (1218).

The housing (1310) may comprise a magnet accommodation groove (1314). The magnet accommodation groove (1314) may be coupled by the first magnet (1320). The magnet accommodation groove (1314) may comprise a groove formed by allowing an inner peripheral surface of housing (1310) and/or a part of a lower surface to be depressed. The magnet accommodation groove (1314) may be formed on each of the four corner portions of housing (1310). In a modification, the magnet accommodation groove (1314) may be formed on each of four lateral portions of housing (1310).

The housing (1310) may comprise a hole (1315). The hole (1315) may be formed on a corner portion of housing (1310). The hole (1315) may be so formed as to pass through the housing (1310) to an optical axis direction. The hole (1315) of housing (1310) may be disposed with a wire of a lateral elastic member (1530).

The housing (1310) may comprise a lug (1316). The lug (1316) may be formed on an upper surface of housing (1310). The lug (1316) may be protrusively formed from an upper surface of the housing (1310). The lug (1316) may be coupled to an outer portion (1512) of the upper elastic member (1510). The lug (1316) may be inserted into a hole of outer portion (1512) of upper elastic member (1510).

The housing (1310) may comprise an upper stopper (1317). The upper stopper (1317) may be protruded from an upper surface of housing (1310). The upper stopper (1317) may be formed on an upper surface of housing (1310). The upper stopper (1317) may be overlapped with an upper plate (1110) of cover (1100) to an optical axis direction. The upper stopper (1317) may form an uppermost end of the housing (1310), through which the housing (1310) may be brought into contact with an upper plate (1110) of cover (1100) when the housing (1310) moves to an upper side. That is, the upper stopper (1317) may restrict the motion of housing (1310) to an upper side.

The housing (1310) may comprise a lateral stopper (1318). The lateral stopper (1318) may be protruded from an outer lateral surface of housing (1310). The lateral stopper (1318) may face an inner surface of lateral plate (1120) of cover (1100). The lateral stopper (1318) may be brought into contact with the lateral plate (1120) of cover (1100) when the housing (1310) moves to a lateral direction. That is, the lateral stopper (1318) may physically restrict the stroke to a lateral direction of housing (1310).

The second mover (1300) may comprise a first magnet (1320). The first magnet (1320) may be disposed on the housing (1310). The first magnet (1320) may be fixed to the housing (1310) by an adhesive. The first magnet (1320) may be interposed between the bobbin (1210) and the housing (1310). The first magnet (1320) may face the first coil (1220). The first magnet (1320) may electromagnetically interact with the first coil (1220). The first magnet (1320) may face the second coil (1430). The first magnet (1320) may electromagnetically interact with the second coil (1430). The first magnet (1320) may be commonly used for AF driving and OIS driving operations. The first magnet (1320) may be disposed at a corner portion of housing (1310). At this time, the first magnet (1320) may be a corner magnet having a hexahedron shape where an inner lateral surface thereof is broader than an outer lateral surface. In a modification, the first magnet (1320) may be disposed at a lateral portion of housing (1310). At this time, the first magnet (1320) may be a plane magnet having a flat plate shape.

The lens driving device (1010) may comprise a stator (1400). The stator (1400) may be disposed underneath the first and second movers (1200, 300). The stator (1400) may movably support the second mover (1300). The stator (1400) may move the second mover (1300). At this time, the first mover (1200) may move along with the second mover (1300).

The stator (1400) may comprise a base (1410). The base (1410) may be disposed underneath the housing (1310). The base (1410) may be disposed underneath the first substrate (1420). An upper surface of base (1410) may be disposed with the first substrate (1420). The base (1410) may be coupled with the cover (1100). The base (1410) may be disposed above a PCB (1050).

The base (1410) may comprise a hole (1411). The hole (1411) may be a hollowed hole formed on the base (1410). The hole (1411) may pass through the base (1410) to an optical axis direction. A light having passed the lens module (1020) through the hole (1411) may be incident on an image sensor (1060).

The base (1410) may comprise a staircase portion (1412). The staircase portion (1412) may be formed at a lateral surface of base (1410). The staircase portion (1412) may be formed by being wrapped around an outer peripheral surface of base (1410). The staircase portion (1412) may be formed by allowing a part of a lateral surface of base (1410) to be protruded or depressed. The staircase portion (1412) may be disposed with a lower end of the lateral plate (1120) of cover (1100).

The base (1410) may comprise a groove (1413). The groove (1413) may be disposed with a terminal portion (1422) of first substrate (1420). The groove (1413) may be formed by allowing a part of lateral surface of base (1410) to be depressed. Width of the groove (1413) may be formed to correspond to that of the terminal portion (1422) of first substrate (1420). Length of the groove (1413) may be formed to correspond to that of the terminal portion (1422) of first substrate (1420). Alternatively, the length of the terminal portion (1422) of first substrate (1420) may be longer than that of the groove (1413) to allow a part of the terminal portion (1422) to be protruded underneath the base (1410).

The base (1410) may comprise a sensor accommodation groove (1414). The sensor accommodation groove (1414) may be disposed with an OIS sensor (1650). The sensor accommodation groove (1414) may accommodate at least a part of the OIS sensor (1650). The sensor accommodation groove (1414) may comprise a groove formed by allowing an upper surface of base (1410) to be depressed. The sensor accommodation groove (1414) may comprise two grooves. At this time, each of the two grooves may be disposed with an OIS sensor (1650) to detect the motion of first magnet (1320) to an X axis direction and Y axis direction.

The base (1410) may comprise a groove (1415). The groove (1415) may be formed on an upper surface of base (1410). The groove (1415) may be disposed with an adhesive. The adhesive disposed on the groove (1415) may fix the first substrate (1420) to the base (1410).

The base (1410) may comprise a protruder (1416). The protruder (1416) may be formed on an upper surface of base (1410). The protruder (1416) may be formed on an outer peripheral surface of base (1410). The protruder (1416) may be formed on an outside of first substrate (1420). The protruder (1416) may be formed on both sides of first substrate (1420) to guide a position of the first substrate (1420).

The stator (1400) may comprise a first substrate (1420). The first substrate (1420) may be interposed between the base (1410) and the housing (1310). The first substrate (1420) may be disposed on an upper surface of base (1410). The first substrate (1420) may comprise a second coil (1430) facing the first magnet (1320). The first substrate (1420) may supply an electric power to the second coil (1430). The first substrate (1420) may be coupled by a lateral elastic member (1530). The first substrate (1420) may be coupled with a PCB (1050) disposed underneath the base (1410) by a solder. The first substrate (1420) may comprise an FPCB (Flexible Printed Circuit Board). The first substrate (1420) may be bent at a part thereof.

The first substrate (1420) may comprise a body part (1421). The body part (1421) may be formed with a hole. The first substrate (1420) may comprise a terminal portion (1422). The terminal portion (1422) may be downwardly extended from the body part (1421) of first substrate (1420). The terminal portion (1422) may be formed by allowing a part of the first substrate (1420) to be bent. At least a part of the terminal portion (1422) may be exposed to an outside. The terminal portion (1422) may be coupled with the PCB (1050) disposed underneath the base (1410) by soldering. The terminal portion (1422) may be disposed at the groove (1413) of base (1410). The terminal portion (1422) may comprise a plurality of terminals.

The stator (1400) may comprise a second coil (1430). The second coil (1430) may be an element of the first substrate (1420), but may be an element separate from the first substrate (1420). The second coil (1430) may electromagnetically interact with the first magnet (1320). In this case, when a current is supplied to the second coil (1430) to form a magnetic field about the second coil (1430), the first magnet (1320) may move relative to the second coil (1430) in response to the electromagnetic interaction between the second coil (1430) and the first magnet (1320).

The second coil (1430) may move the housing (1310) and the bobbin (1210) relative to the base (1410) to a direction perpendicular to an optical axis through the electromagnetic interaction with the first magnet (1320). The second coil (1430) may be an FP pattern coil (FP coil) integrally formed at a body part (1421).

The lens driving device (1010) may comprise an elastic member (1500). The elastic member (1500) may have elasticity at least on a part thereof. The elastic member (1500) may be formed with a metal. The elastic member (1500) may be formed with a conductive material. The elastic member (1500) may be coupled to the bobbin (1210) and the housing (1310). The elastic member (1500) may elastically support the bobbin (1210). The elastic member (1500) may movably support the bobbin (1210). The elastic member (1500) may support the motion of bobbin (1210) during the AF driving. That is, the elastic member (1500) may comprise an 'AF support member'. The elastic member (1500) may movably support the housing (1310). That is, the elastic member (1500) may comprise an 'OIS support member'.

The elastic member (1500) may comprise an upper elastic member (1510). The upper elastic member (1510) may connect the housing (1310) and the bobbin (1210). The upper elastic member (1510) may be connected to an upper surface of bobbin (1210) and to an upper surface of housing (1310). The upper elastic member (1510) may be connected to an upper surface of bobbin (1210). The upper elastic member (1510) may be connected to an upper surface of housing (1310). The upper elastic member (1510) may be connected to a lateral elastic member (1530). The upper elastic member (1510) may be formed with a leaf spring.

The upper elastic member (1510) may comprise a plurality of upper elastic units. The upper elastic member (1510) may comprise four (4) upper elastic units. The upper elastic member (1510) may comprise first to fourth upper elastic units (1510-1, 1510-2, 1510-3, 1510-4). The first to fourth upper elastic units (1510-1, 1510-2, 1510-3, 1510-4) may connect four upper terminals (1641) of second substrate (1640) and four (4) wires. Each of the four upper elastic units may comprise a body part coupled with the housing (1310) and connection terminals connected to the terminals of second substrate (1640).

The upper elastic member (1510) may comprise an inner portion (1511). The inner portion (1511) may be connected to the bobbin (1210). The inner portion (1511) may be connected to an upper surface of bobbin (1210). The inner portion (1511) may comprise a hole (1511*a*) or a groove connected to a protrusion (1215) of bobbin (1210). The inner portion (1511) may be fixed to the bobbin (1210) by an adhesive.

The upper elastic member (1510) may comprise an outer portion (1512). The outer portion (1512) may be coupled with the housing (1310). The outer portion (1512) may be coupled to an upper surface of housing (1310). The outer portion (1512) may comprise a hole or a groove connected to a lug (1316) of housing (1310). The outer portion (1512) may be fixed to the housing (1310) by an adhesive.

The upper elastic member (1510) may comprise a connection portion (1513). The connection portion (1513) may connect the inner portion (1511) and the outer portion (1512). The connection portion (1513) may have elasticity. At this time, the connection portion (1513) may be called an 'elastic part'. The connection portion (1513) may be formed by being bent more than twice. The connection portion (1513) may not be overlapped with the second magnet (1610) to an optical axis direction. That is, the connection portion (1513) in the exemplary embodiment may be distinguished from a first region (1514) overlapped with the second magnet (1610) to an optical axis direction.

The upper elastic member (1510) may comprise a first region (1514). The first region (1514) may be expressed as an extension portion, an extended lid region, a lid portion, a lid extension portion, a cover portion, an obstructing portion, a shield portion, a UV beam shield portion and the like. The first region (1514) may be extended from the inner portion (1511). The first region (1514) may be overlapped with the second magnet (1610) to an optical axis direction. The first region (1514) may be disposed on the second magnet (1610). The first region (1514) may conceal (or cover) an upper surface (1611) of second magnet (1610) when viewed from above. The first region (1514) may conceal more than 90% of an area of an upper surface (1611) of second magnet (1610) when viewed from above. The first region (1514) may be overlapped with at least more than 360% of an area of the upper surface (1611) of second magnet (1610) to an optical axis direction. The first region (1514) may be overlapped with a part of the upper surface (1611) of second magnet (1610) to an optical axis direction. At least a part of the first region (1514) may be overlapped with an entire area of upper surface (1611) of second magnet to an optical axis direction. The first region (1514) may be so disposed as to cover a groove (1212) of bobbin (1210) accommodated by the second magnet (1610). The first region (1514) may have a sufficient size to completely cover an upper surface of the groove (1212) of bobbin (1210).

The first region (1514) and/or the second magnet (1610) may be so disposed as to be nearer to the protrusion (1215) than to a sensor (1630). The protrusion (1215) may be nearer to the connection portion (1513) than to the first region (1514). The protrusion (1215) may be interposed between the first region (1514) and the connection portion (1513). The first region (1514) may be farther disposed from the connection portion (1513) than from the protrusion (1215).

The first region (1514) may comprise a distal end of one side of inner portion (1511). The first region (1514) may be disposed at one side of hole (1511*a*) of inner portion (1511). The first region (1514) may be adjacently disposed to the hole (1511*a*) of inner portion (1511). The first region (1514) may comprise a distal end farthest from the hole (1511*a*). The distal end of first region (1514) may be more adjacently disposed to the hole (1511*a*) than to the connection portion (1513). The distal end of first region (1514) may be more distantly disposed from the connection portion (1513) than from the hole (1511*a*). The distal end of first region (1514) may not be brought into contact with the connection portion (1513). The first region (1514) may be spaced apart from the connection portion (1513) with the inner portion (1511) interposed therebetween. The first region (1514) may comprise an area having a largest width in the inner portion (1511). The first region (1514) may be disposed at one side of the protrusion (1215). The distal end of first region (1514) may be disposed at a farthest side from the protrusion (1215).

In the exemplary embodiment, the second magnet (1610) can be prevented from being exposed to UV beam and shielded from heat conduction through the shape of the upper elastic member (1510). In the exemplary embodiment, the upper surface (1611) of second magnet (1610) may be closed by the first region (1514) of second magnet (1610) that might have been opened absent the first region (1514) of upper elastic member (1510).

In the exemplary embodiment, UV beam may be used to cure the epoxy that fixes the lens module (1020) to the bobbin (1210). Furthermore, UV beam may be used to fix the upper elastic member (1510) to the bobbin (1210). The UV beam for curing the epoxy that fixes the lens module (1020) to the bobbin (1210) may be irradiated after the cover (1100) is assembled. Furthermore, the UV beam for fixing the upper elastic member (1510) to the bobbin (1210) may be irradiated before the cover (1100) is assembled. The first region (1514) of upper elastic member (1510) may prevent the UV beam from affecting on the magnetic force of second magnet (1610) both before and after the cover (1100) is assembled.

The first region (1514) of upper elastic member (1510) may be extended from the inner portion (1511) of upper elastic member (1510) to a direction opposite from the connection portion (1513) of upper elastic member (1510). The first region (1514) of upper elastic member (1510) may be extended from the inner portion (1511) of upper elastic member (1510) to a direction different from that of the connection portion (1513) of upper elastic member (1510). That is, the first region (1514) of upper elastic member (1510) may be formed separately from the connection portion (1513).

In the exemplary embodiment, a bobbin (1210) may not be disposed between the first region (1514) of upper elastic member (1510) and the second magnet (1610) to an optical axis direction, but instead a gap may be formed. Although a part of bobbin (1210) may be disposed between the first region (1514) of upper elastic member (1510) and the second magnet (1610) to an optical axis direction in the lens driving device (1010) capable of fully obtaining a height to an optical axis direction, because the lens driving device (1010) according to an exemplary embodiment has a minimized length to an optical axis direction due to requirement on ultra-thin product, it may be impossible to arrange a part of bobbin (1210) on an upper lateral of second magnet (1610). Adhesive may be disposed on a gap.

In the exemplary embodiment, the adhesive curable by UV beam may fix the lens to the bobbin (1210). If there is no first region (1514) of upper elastic member (1510) of the exemplary embodiment, there may be a problem of generating a characteristic change in the second magnet (1610) due to heat from UV beam irradiated from an upper surface for curing the lens-fixing adhesive. That is, the first region (1514) of upper elastic member (1510) according to the exemplary embodiment can prevent the UV beam from being irradiated on the second magnet (1610) to thereby prevent the heat desensitization phenomenon of second magnet (1610). The UV beam may be irradiated in a state of the cover (1100) being assembled. Alternatively, the UV beam may be irradiated in a state of the cover (1100) not being assembled.

In a modification, an upper surface (1611) of second magnet (1610) may be contacted by the first region (1514) of upper elastic member (1510). When the height of lens driving device (1010) to an optical axis direction is further reduced, no gap is generated between the upper surface (1611) of second magnet (1610) and the first region (1514) of upper elastic member (1510) as in the modification, and may be contacted. Even in this case, the first region (1514) of upper elastic member (1510) may prevent the second magnet (1610) from being irradiated with the UV beam to thereby prevent the phenomenon of characteristic change in the second magnet (1610).

The upper elastic member (1510) in the exemplary embodiment may be disposed on an upper surface (1211) of bobbin (1210). The upper surface (1211) of bobbin (1210) may be disposed at a position higher than that of an upper surface (1611) of second magnet (1610) to thereby prevent the second magnet (1610) from being protruded above the bobbin. The upper surface (1611) of second magnet (1610) may be disposed at a position lower than that of the upper surface (1211) of bobbin (1210). At this time, the first region (1514) of upper elastic member (1510) may be spaced apart from the upper surface (1611) of second magnet (1610).

The upper elastic member (1510) may comprise a coupling portion (1515). The coupling portion (1515) may be extended from an outer portion (1512). The coupling portion (1515) may be coupled with a lateral elastic member (1530). The lateral elastic member (1530) may comprise a hole through which a wire of the lateral elastic member (1530) can pass. The coupling portion (1515) and the wire may be coupled by a solder.

The upper elastic member (1510) may comprise a terminal portion (1516). The terminal portion (1516) may be extended from an outer portion (1512). The terminal portion (1516) may be coupled with the second substrate (1640) by a solder. The upper elastic member (1510) may comprise four (4) terminal portions (1516) corresponding to first to four upper elastic units (1510-1, 1510-2, 1510-3, 1510-4).

The elastic member (1500) may comprise a lower elastic member (1520). The lower elastic member (1520) may be disposed underneath the upper elastic member (1510). The elastic member (1500) may connect the bobbin (1520) and the housing (1310). The lower elastic member (1520) may be disposed underneath the bobbin (1210). The elastic member (1500) may be coupled to the bobbin (1520) and the housing (1310). The lower elastic member (1520) may be coupled to a lower surface of bobbin (1210). The lower elastic member (1520) may be coupled to a lower surface of housing (1310). The lower elastic member (1520) may be formed with a leaf spring.

The lower elastic member (1520) may comprise a plurality of lower elastic units. The lower elastic member (1520) may comprise two (2) lower elastic units. The lower elastic member (1520) may comprise first and second lower elastic units (1520-1, 1520-2). The first and second lower elastic units (1520-1, 1520-2) may connect two lower elastic units (1642) of second substrate (1640) and a first coil (1220).

The lower elastic member (1520) may comprise an inner portion (1521). The inner portion (1521) may be coupled to the bobbin (1210). The inner portion (1521) may be coupled to a lower surface of bobbin (1210). The inner portion (1521) may comprise a hole or a groove coupled to a lug of bobbin (1210). The inner portion (1521) may be fixed to the bobbin (1210) by an adhesive.

The lower elastic member (1520) may comprise an outer portion (1522). The outer portion (1522) may be coupled to the housing (1310). The outer portion (1522) may be coupled to a lower surface of housing (1310). The outer portion (1522) may comprise a hole or a groove coupled to a lug of housing (1310). The outer portion (1522) may be fixed to housing (1310) by an adhesive.

The lower elastic member (1520) may comprise a connection part (1523). The connection part (1523) may connect the inner portion (1521) and the outer portion (1522). The connection part (1523) may have elasticity. At this time, the connection part (1523) may be called an 'elastic portion'. The connection part (1523) may be formed by being bent more than twice.

The elastic member (1500) may comprise a lateral elastic member (1530). The lateral elastic member (1530) may connect the first substrate (1420) and the upper elastic member (1510). The lateral elastic member (1530) may be coupled to each of the upper elastic member (1510) and the first substrate (1420) by a solder. The lateral elastic member (1530) may movably support the housing (1310). The lateral elastic member (1530) may elastically support the housing (1310). The lateral elastic member (1530) may have elasticity from least a part thereof. The lateral elastic member (1530) may support the motion of housing (1310) and bobbin (1210) during the OIS driving operation. At this time, the lateral elastic member (1530) may be called an 'OIS support member'. The lateral elastic member (1530) may have an elastic member. The lateral elastic member (1530) may be formed using a wire. In a modification, the lateral elastic member (1530) may be formed with a leaf spring.

The lateral elastic member (1530) may comprise a wire. The lateral elastic member (1530) may comprise a wire spring. The lateral elastic member (1530) may comprise a plurality of wires. The lateral elastic member (1530) may comprise four (4) wires connected in pairs with four upper elastic units. The lateral elastic member (1530) may comprise first to fourth wires (1531, 1532, 1533, 1534). The first wire (1531) may be electrically connected to a first upper elastic unit (1510-1). The second wire (1532) may be electrically connected to a second upper elastic unit (1510-2). The third wire (1533) may be electrically connected to a third upper elastic unit (1510-3). The fourth wire (1534) may be electrically connected to a fourth upper elastic unit (1510-4).

The lens driving device (1010) may comprise a second magnet (1610). The second magnet (1610) may be a 'sensing magnet'. The second magnet (1610) may be disposed on the bobbin (1210). The second magnet (1610) may be disposed on an upper surface (1611) of first coil (1220). The second magnet (1610) may be detected by a sensor (1630). The second magnet (1610) may face the sensor (1630). The second magnet (1610) may be disposed at a lateral surface of bobbin (1210). That is, the second magnet (1610) may be so disposed as to face the lateral surface of housing (1310). The second magnet (1610) may be disposed at a groove (1212) of bobbin (1210) to allow an upper surface (1611) of second magnet (1610) to face the upper elastic member (1510).

The second magnet (1610) may comprise an upper surface (1611), a lower surface disposed opposite from the upper surface (1611) of second magnet (1610), an inner surface connecting the upper surface (1611) of second magnet (1610) and the lower surface of second magnet (1610), an outer surface and both lateral surfaces. At this time, the lower surface of second magnet (1610) may be fixed to the first coil (1220). The inner surface of second magnet (1610) and both lateral surfaces may be fixed to the bobbin (1210).

In the exemplary embodiment, an adhesive may be interposed between a first region (1514) of upper elastic member (1510) and an upper surface (1611) of second magnet (1610). That is, the second magnet (1610) may be fixed to an upper surface in addition to the lower surface, the inner surface and the both lateral surfaces. As a result, the fixing force of second magnet (1610) can be improved.

The lens driving device (1010) may comprise a third magnet (1620). The third magnet (1620) may be a 'compensating magnet'. The third magnet (1620) may be disposed on the bobbin (1210). The third magnet (1620) may be so disposed as to maintain a magnetic force balance with the second magnet (1610). The third magnet (1620) may be symmetrical with the second magnet (1610) about an optical axis. The third magnet (1620) may be disposed at a position corresponding to that of the second magnet (1610) about an optical axis. The third magnet (1620) may have a size and/or shape corresponding to those of second magnet (1610) about an optical axis. One side of bobbin (1210) may be disposed with the second magnet (1610), and the other side of bobbin (1210) may be disposed with the third magnet (1620). The third magnet (1620) may be disposed at a lateral portion of bobbin (1210). That is, the third magnet (1620) may be so disposed as to face the lateral portion of housing (1310).

The lens driving device (1010) may comprise a sensor (1630). The sensor (1630) may be used for AF feedback driving. At this time, the sensor (1630) may be called an 'AF feedback driving sensor'. The sensor (1630) may detect the second magnet (1610). The sensor (1630) may be disposed on the second substrate (1640). The sensor (1630) may be disposed on the housing (1310). In a modification, the sensor (1630) may be disposed on the bobbin (1210). The sensor (1630) may detect the motion of first mover (1200). The sensor (1630) may comprise a Hall sensor. At this time, the Hall sensor may detect the magnetic force of second magnet (1610) to detect the bobbin (1210) and the motion of lens. A value detected by the sensor (1630) may be used for AF feedback control.

The lens driving device (1010) may comprise a second substrate (1640). The second substrate (1640) may be disposed on the housing (1310). The second substrate (1640) may be disposed on one lateral wall of housing (1310). The second substrate (1640) may be coupled with the sensor (1630). The second substrate (1640) may be electrically connected with the sensor (1630). The second substrate (1640) may be coupled with the upper elastic member (1510). The second substrate (1640) may not be overlapped with an imaginary line connecting a first corner portion and an optical axis.

The second substrate (1640) may comprise a body part disposed with a first terminal and a second terminal and an extension part extended underneath the body part. At this time, the first and second terminals may be adjacently disposed to both distal ends of body part of second substrate (1640).

The second substrate (1640) may comprise a terminal. The second substrate (1640) may comprise a plurality of terminals. The second substrate (1640) may comprise an upper terminal (1641). The second substrate (1640) may comprise four (4) terminals disposed on an upper surface of second substrate (1640). That is, the upper terminal (1641) may comprise four terminals. The four terminals of second substrate (1640) may be electrically connected to the first substrate (1420) through four upper elastic units and four wires. The terminals of second substrate (1640) may comprise a first terminal, a second terminal, a third terminal interposed between the first terminal and the second terminal and a fourth terminal. At this time, the housing (1310) may comprise a first corner portion, and a second corner portion adjacent to the first corner portion, and the first terminal may be adjacent to the first corner portion, and the second terminal may be adjacent to the second corner portion. The first terminal may be connected to a first wire (1531) through the first upper elastic unit (1510-1). The second terminal may be connected to a fourth wire (1534) through the fourth upper elastic unit (1510-4). The first and second terminals on the second substrate (1640) may be terminals for providing an electric signal to the sensor (1630).

The third terminal may be connected to a second wire (1532) through the second upper elastic unit (1510-2). The fourth terminal may be connected to a third wire (1533) through the third upper elastic unit (1510-3). At this time, the second wire (1532) may be disposed on the third corner portion of housing (1310), and the third wire (1533) may be disposed on the fourth corner portion. The third terminal may be a terminal for providing a clock signal to the sensor (1630). The fourth terminal may be a terminal for providing a data signal to the sensor (1630).

The second substrate (1640) may comprise a lower terminal (1642). The second substrate (1640) may comprise two terminals disposed underneath the second substrate (1640). That is, the lower terminal (1642) may comprise two terminals. The two terminals of second substrate (1640) may be electrically connected to the first coil (1220) through the two lower elastic units.

The second substrate (1640) may comprise a groove. The groove of the second substrate (1640) may comprise a first groove formed between the first terminal and the third terminal and a second groove formed between the second terminal and the fourth terminal. A part of the first upper elastic unit (1510-1) may be connected to the first terminal. A part of the fourth upper elastic unit (1510-4) may be connected to the second terminal. A part of the second upper elastic unit (1510-2) may be connected to the third terminal by passing through the first groove of second substrate (1640). A part of third upper elastic unit (1510-3) may be connected to the fourth terminal by passing through the second groove of second substrate (1640).

The lens driving device (1010) may comprise an OIS sensor (1650). The OIS sensor (1650) may be used for OIS feedback control. At this time, the OIS sensor (1650) may be called an 'OIS feedback driving sensor'. The OIS sensor (1650) may be interposed between the base (1410) and the first substrate (1420). The OIS sensor (1650) may detect the motion of second mover (1300). The OIS sensor (1650) may comprise a Hall sensor. At this time, the Hall sensor may detect the magnetic force of first magnet (1320) to detect the housing (1310) and the motion of first magnet (1320). The value detected by the OIS sensor (1650) may be used for OIS feedback control.

Hereinafter, an explanation on configuration of lens driving device according to a modification will be made with reference to the accompanying drawings.

FIG. 42 is a perspective view illustrating some configurations of a lens driving device according to a modification.

In the modification, the shape of first region (1514) of upper elastic member (1510) may be changed compared with the exemplary embodiment. Thus, configurations except for the first region (1514) of upper elastic member (1510) among the configurations of modification may be analogically interpreted from the present exemplary embodiment.

The upper elastic member (1510) in the modification may comprise a first region (1514) overlapped with the second magnet (1610) to an optical axis direction. The first region (1514) of upper elastic member (1510) may comprise a groove (1517) formed by allowing an outer portion of the first region (1514) to be inwardly depressed. The groove (1517) may be a concave portion or an opened portion. An adhesive may be interposed between the first region (1514) of upper elastic member (1510) and the upper surface (1611) of second magnet (1610). The adhesive may be connected to the groove (1517) of first region (1514) of upper elastic member (1510). In the modification, a semi-circular shaped groove (1517) may be placed on the upper elastic member (1510) to reinforce the fixing force of second magnet (1610) through additional bond coating. In this case, five surfaces of second magnet (1610) may be fixed.

The groove (1517) may be overlapped with the second magnet (1610) to an optical axis direction. The groove (1517) may be overlapped with the upper plate (1110) of cover (1100) to an optical axis direction. That is, the groove (1517) may be obstructed (covered) by the upper plate (1110) of cover (1100) when viewed from above.

In case of modification, in the step of irradiating the UV beam for curing the epoxy to fix the upper elastic member (1510) to the bobbin (1210), an area corresponding to the groove (1517) may be covered by a jig.

Hereinafter, an explanation on the camera module according to a second exemplary embodiment of the present invention will be given with reference to the accompanying drawings.

FIG. 43 is an exploded perspective view of a camera device according to a second exemplary embodiment of the present invention.

A camera device (1010A) may comprise a camera module.

The camera device (1010A) may comprise a lens module (1020). The lens module (1020) may comprise at least one lens. The lens may be disposed at a position corresponding to that of image sensor (1060). The lens module (1020) may comprise a lens and a barrel. The lens module (1020) may be coupled to a bobbin (1210) of lens driving device (1010). The lens module (1020) may be coupled to a bobbin (1210) by screw connection and/or adhesive. The lens module (1020) may integrally move with the bobbin (1210).

The camera device (1010A) may comprise a filter (1030). The filter (1030) may function to prevent a light of particular frequency band of lights having passed through the lens module (1020) from being incident on the image sensor (1060). The filter (1030) may be so disposed as to be parallel with an x-y plane surface. The filter (1030) may be interposed between the lens module (1020) and the image sensor (1060). The filter (1030) may be disposed on a sensor base (1040). In a modification, the filter (1030) may be disposed on the base (1410). The filter (1030) may comprise an infrared ray filter.

The infrared ray filter may prevent a light of infrared ray region from entering the image sensor (1060).

The camera device (1010A) may comprise a sensor base (1040). The sensor base (1040) may be interposed between the lens driving device (1010) and a PCB (1050). The sensor base (1040) may comprise a protruder (1041) disposed with a filter (1030). A part of the sensor base (1040) disposed with the filter (1030) may be formed with an opening to allow a light having passed through the filter (1030) to be incident on the image sensor (1060).

An adhesive member (1045) may couple or attach the base (1410) of lens driving device (1010) to the sensor base (1040). Additionally, the adhesive member (1045) may function to prevent foreign objects from entering into the lens driving device (1010). The adhesive member (1045) may comprise one or more of the epoxy, thermosetting adhesive and UV curing adhesive.

The camera device (1010A) may comprise a PCB (1050, Printed Circuit Board). The PCB (1050) may be a substrate or a circuit substrate. The PCB (1050) may be disposed with a lens driving device (1010). The sensor base (1040) may be interposed between the PCB (1050) and the lens driving device (1010). The PCB (1050) may be electrically connected with the lens driving device (1010). The PCB (1050) may be disposed with an image sensor (1060). The PCB (1050) may be disposed with various circuits, elements, controllers and the like to transform an image captured on the image sensor (1060) to an electric signal and transmit the same to an outside device.

The camera device (1010A) may comprise an image sensor (1060). The image sensor (1060) may be an element where a light having passed through the lens and filter (1030) is incident and an image is captured. The image sensor (1060) may be mounted on the PCB (1050). The image sensor (1060) may be electrically connected to the PCB (1050). For example, the image sensor (1060) may be coupled to the PCB (1050) by using an SMT (Surface Mounting Technology). In another example, the image sensor (1060) may be coupled to the PCB (1050) using a flip chip technology. The image sensor (1060) may be so disposed as to match the lens in terms of optical axis. That is, an optical axis of image sensor (1060) and an optical axis of lens may be aligned. The image sensor (1060) may transform a light irradiated on an effective image region of the image sensor (1060) to an electric signal. The image sensor (1060) may be one of a CCD (Charge Coupled Device), an MOS (Metal Oxide Semi-Conductor), a CPD and a CID.

The camera device (1010A) may comprise a motion sensor (1070). The motion sensor (1070) may be mounted on a PCB (1050). The motion sensor (1070) may be electrically connected with a controller (1080) through a circuit pattern provided to the PCB (1050). The motion sensor (1070) may output rotational angular velocity information caused by motion of camera device (1010A). The motion sensor (1070) may comprise a two-axis or three-axis gyro sensor or an angular velocity sensor.

The camera device (1010A) may comprise a controller (1080). The controller (1080) may be disposed on the PCB (1050). The controller (1080) may be electrically connected to the first and second coils (1220, 1430) of lens driving device (1010). The controller (1080) may individually control the direction, strength and amplitude of a current provided to the first and second coils (1220, 1430). The controller (1080) may perform the autofocus function and/or OIS function by controlling the lens driving device (1010). Furthermore, the controller (1080) may perform an autofocus feedback control and/or OIS feedback control on the lens driving device (1010).

The camera device (1010A) may comprise a connector (1090). The connector (1090) may be electrically connected to the PCB (1050). The connector (1090) may comprise a port for being electrically connected to an outside device.

Hereinafter, an explanation on an optical apparatus according to a second exemplary embodiment of the present invention will be made with reference to accompanying drawings.

FIG. 44 is a perspective view illustrating an optical apparatus according to a second exemplary embodiment of the present invention, and FIG. 45 is a block diagram of an optical apparatus according to a second exemplary embodiment of the present invention.

An optical apparatus (1010B) may be any one of a mobile phone, a portable phone, a smart phone, a portable smart device, a digital camera, a notebook computer (laptop computer), a digital broadcasting terminal, a PDA (Personal Digital Assistant), a PMP (Portable Multimedia Player) and a navigation. However, the kinds of optical apparatus (1010B) are not limited thereto, and any devices for photographing an image or a photograph may be comprised in the optical apparatus (1010B).

The optical apparatus (1010B) may comprise a main body (1850). The main body (1850) may take a bar shape. Alternatively, the main body (1850) may be of various structures comprising a slide type, a folder type, a swing type, a swivel type and the like, where two or more sub-bodies are relatively and moveably coupled. The main body (1850) may comprise a casing (housing, cover) forming an external look of the main body. For example, the main body (1850) may comprise a front case (1851) and a rear case (1852). A space formed between the front case (1851) and a rear case (1852) may be comprised therein with various electronic parts of optical apparatus (1010B). One surface of main body (1850) may be disposed with a display module (1753). Any one surface of the said one surface of main body (1850) and the other surface disposed in opposite side of the said one surface may be disposed with a camera (1721).

The optical apparatus (1010B) may comprise a wireless communication part (1710). The wireless communication part (1710) may comprise one or more modules enabling a wireless communication between the optical apparatus (1010B) and a wireless communication system or between the optical apparatus (1010B) and a network. For example, the wireless communication part (1710) may comprise one or more of a broadcasting reception module (1711), a mobile communication module (1712), a wireless Internet module (1713), a short-distance communication module (1714) and a position information module (1715).

The optical apparatus (1010B) may comprise an A/V input part (1720). The A/V (Audio/Video) input part (1720) is intended for audio signal or video signal input, and may comprise more than one of camera (1721) and a microphone (1722). At this time, the camera (1721) may comprise a camera device (1010A) according to the exemplary embodiment of the present invention.

The optical apparatus (1010B) may comprise a sensing part (1740). The sensing part (1740) may generate a sensing signal for controlling the operation of the optical apparatus (1010B) by detecting a current state of the optical apparatus (1010B) comprising, but not limited to, an opening/closing state of the optical apparatus (1010B), a position of the optical apparatus (1010B), a user touch or non-touch, an azimuth of the optical apparatus (1010B), acceleration/deceleration of the optical apparatus (1010B). For example, in case of the optical apparatus (1010B) being of a slide phone type, the sensing part (1740) may sense the opening/closing of slide phone. Furthermore, the sensing part (1740) may take charge of sensing functions related to the power supply of power supply part (1790) and coupling of interface part (1770) to external devices.

The optical apparatus (1010B) may comprise an input/output part (1750). The input/output part (1750) may be an element for generating an input or an output related to vision, auditory sense or tactility. The input/output part (1750) may generate an input data for controlling the operation of optical apparatus (1010B), and may also output information processed by the optical apparatus (1010B).

The input/output part (1750) may comprise one or more of a key pad part (1751), a touch screen panel (1752), a display module (1753) and a sound output module (1754). The key pad part (1751) may generate an input data caused by key pad input. The touch screen panel (1752) may transform a capacitance change generated by a user touch on a particular region of a touch screen to an electric input signal. The display module (1753) may output an image photographed by the camera (1721). The display module (1753) may comprise a plurality of pixels where colors are changed by an electric signal. For example, the display module (1753) may comprise at least one of a liquid crystal display, a thin film transistor-liquid crystal display, an organic light-emitting diode, a flexible display, and a 3D display. The sound output module (1754) may output an audio data received from a wireless communication part (1710) under a call signal reception, a call mode, a recording mode, a voice recognition mode, or a broadcasting reception mode, or output an audio data stored in a memory part (1760).

The optical apparatus (1010B) may comprise a memory part (1760). The memory part (1760) may be stored with a program for processing and controlling the controller (1780). Furthermore, the memory part (1760) may store the inputted/outputted data comprising more than one of a telephone number directory, a message, an audio, a still image, a photograph and a video. The memory part (1760) may store an image, e.g., a photograph or a video, photographed by a camera.

The optical apparatus (1010B) may comprise an interface part (1770). The interface part (1770) may serve as a path to perform a role of being connected to an (outside) external device connected to the optical apparatus (1010B). The interface part (1770) may receive a data from an external device, transmit an electric power to each element inside the optical apparatus (1010B) by receiving the same, or allow the data inside the optical apparatus (1010B) to be transmitted to the external device. The interface part (1770) may comprise more than any one of a wired/wireless headset port, an external charger port, a wired/wireless data port, a memory card port, a port connecting a device formed with a recognition module, an audio I/O (Input/Output) port, a video I/O (Input/Output) port and an earphone port.

The optical apparatus (1010B) may comprise a controller (1780). The controller (1780) may control an overall operation of optical apparatus (1010B). The controller (1780) may perform the control and process related to voice call, data communication, video telephony and the like. The controller (1780) may comprise a display controller (1781) that controls a display module (1753) which is a display of the optical apparatus (1010B). The controller (1780) may comprise a camera controller (1782) that controls a camera device (1010A). The controller (1780) may comprise a multimedia module (1783) for multimedia reproduction. The multimedia module (1783) may be provided within the controller (1180) or separately provided from the controller (1780). The controller (1780) may perform a pattern recognition process that respectively recognizes a writing input or a drawing input performed on a touch screen as a text and an image.

The optical apparatus (1010B) may comprise a power supply part (1790). The power supply part (1790) may receive an external power or an internal power in response to the control of the controller (1780) and supply the same necessary for operation to each element.

Now, an explanation on operation of a camera device according to a second exemplary embodiment of the present invention will be made.

That is, auto focus function of a camera device will be given according to a second exemplary embodiment of the present invention.

When a power is supplied to a first coil (1220), the first coil (1220) may perform a motion relative to the first magnet (1320) in response to an electromagnetic interaction between the first coil (1220) and the first magnet (1320). At this time, the bobbin (1210) coupled with the first coil (1220) may integrally move along with the first coil (1220). That is, the bobbin (1210) coupled with the lens module (1020) may move relative to the housing (1310) to an optical axis direction. The said motion of bobbin (1210) may result in an approaching motion of lens module (1020) relative to the image sensor (1060) or a distancing motion, whereby focus adjustment on an object can be performed by supplying a power to the first coil (1220) according to the present exemplary embodiment. Meantime, the said focus adjustment may be automatically implemented in response to a distance to an object.

An autofocus feedback control may be performed by the camera device according to an exemplary embodiment for realization of more accurate autofocus function.

The sensor (1630) disposed on the housing (1310) may detect the magnetic field of second magnet (1610) disposed on the bobbin (1210). As a result, when the bobbin (1210) performs a relative motion to the housing (1310), an amount of magnetic field detected by the sensor (1630) may be changed. The sensor (1630) may detect the amount of motion of bobbin (1210) to an optical axis direction or the position of bobbin (1210) by the said method and transmit the detected value to the controller. The controller may determine whether to perform an additional motion relative to the bobbin (1210) through the received detected value. These processes are performed in realtime, such that a more accurate autofocus function of camera device according to the exemplary embodiment can be performed through the autofocus feedback control.

A handshaking correction function (OIS function) of a camera device according to the exemplary embodiment will be explained.

When a power is supplied to a second coil (1430), the first magnet (1320) may perform a motion relative to the second coil (1430) in response to the electromagnetic interaction between the second coil (1430) and the first magnet (1320). At this time, the housing (1310) coupled by the first magnet (1320) may integrally move along with the first magnet (1320). That is, the housing (1310) is moved to a horizontal direction (a direction perpendicular to an optical axis) relative to the base (1410). However, at this time, tilt of housing (1310) may be induced relative to the base (1410). Meantime, the bobbin (1210) may integrally move along with the housing (1310) relative to the horizontal direction motion of housing (1310). Therefore, the said motion of housing (1310) may result in the lens module (1020) coupled to the bobbin (1210) moving to a direction relative to the image sensor (1060) parallel with a direction on which the image sensor (1060) is located. That is, in the present exemplary embodiment, the OIS function can be performed by supplying a power to the second coil (1430).

An OIS feedback control may be performed by the camera device according to the present exemplary embodiment for realization of a more accurate OIS function. The OIS sensor (1650) disposed on the base (1410) may detect a magnetic field of the first magnet (1320) disposed on the housing (1310). As a result, when the housing (1310) performs a motion relative to the base (1410), an amount of magnetic field detected by the OIS sensor (1650) may be changed. A pair of OIS sensors (1650) may detect the amount of motion or a position of housing (1310) to a horizontal direction (x axis and y axis direction) using the method thus mentioned, and may transmit the detected value to the controller. The controller may determine whether to perform an additional motion relative to the housing (1310) through the received detected value. These processes are performed in realtime, such that a more accurate OIS function of camera device according to the exemplary embodiment can be performed through the OIS feedback control.

FIG. 46 is an exploded perspective view of a lens driving device (2100) according to a third exemplary embodiment of the present invention, and FIG. 47 is a coupled perspective view of a lens driving device (2100) less a cover member (2300) of FIG. 46.

Referring to FIGS. 46 and 47, the lens driving device (2100) may comprise a bobbin (2110), a first coil (2120), a first magnet (130), a housing (2140), cushioning stoppers (2310A to 2310D), an elastic member, a support member (2220), a second coil (2230) and a circuit substrate (2250).

The elastic member may comprise at least one of an upper elastic member (2150) and a lower elastic member (2160).

Furthermore, the lens driving device (2100) may further comprise a first position sensor (2170), a circuit substrate (2190) and a second magnet (2180) for AF feedback driving.

Furthermore, in order to perform a feedback OIS function, the lens driving device (2100) may further comprise a second position sensor (2240).

In addition, the lens driving device (2100) may further comprise at least one of a third magnet (2185), a base (2210) and a cover member.

In addition, the lens driving device (2100) may further comprise a capacitor (2195) mounted on the circuit substrate (2190).

First, the bobbin (2110) will be explained

The bobbin (2110) may be disposed at an inside of the housing (2140) and may move to an optical axis direction or a first direction (e.g., z axis direction) in response to the electromagnetic interaction between the first coil (2120) and the first magnet (2130).

FIG. 48a is a perspective view of a bobbin (2110), a second magnet (2180) and a third magnet (2185) illustrated in FIG. 46, and FIG. 48b illustrates a first coil (2120) coupled to a bobbin (2110).

Referring to FIGS. 48a and 48b, the bobbin (2110) may have an opening for mounting a lens or a lens barrel. For example, the opening of bobbin (2110) may be a through hole or a hollowed hole to allow the bobbin (2110) to pass therethrough to an optical axis direction, and the opening of bobbin (2110) may take a round shape, an oval shape or a polygonal shape, but the present invention is not limited thereto.

The opening of bobbin (2110) may be directly mounted with a lens, but the present invention is not limited thereto, and in another exemplary embodiment, a lens barrel may be coupled to or mounted on the opening of bobbin (2110) for at least one lens to be coupled or mounted. The lens or lens barrel may be coupled to an inner peripheral surface of bobbin (2110) by way of various methods.

The bobbin (2110) may comprise mutually discrete first inner portions (2110b-1) and mutually discrete second outer portions (2110b-2), where each of the second outer portions (2110b-2) may mutually connect adjacent two first inner portions. For example, each horizontal or crosswise directional length of the first inner portions (2110b-1) of bobbin (2110) may be different from each horizontal or crosswise directional length of second outer portions (2110b-2). For example, a horizontal directional length of first inner portions (2110b-1) may be greater than a horizontal directional length of the second outer portions (2110b-2), but the present invention is not limited thereto, and in another exemplary embodiment, the former and the latter may be the same or the former may be smaller than the latter.

The bobbin (2110) may be formed at an outer surface with a protruder (2115).

For example, the protruder (2115) may be disposed at an outer surface of second portions (2110b-2) of bobbin (2110), but the present invention is not limited thereto. The protruder (2115) may pass through a center of opening of bobbin (2110) and protrude to a direction parallel with a straight line perpendicular to an optical axis, but the present invention is not limited thereto.

The protruder (2115) of bobbin (2110) may correspond to a groove portion (2025a) of housing (2140), and may be inserted into or disposed within the groove portion (2025a) of housing (2140), and may restrict or prevent the bobbin (2110) from rotating over a predetermined scope about an optical axis.

Furthermore, the protruder (2115) may perform a stopper role by restricting or preventing a lower surface of bobbin (2110) from directly colliding with the base (2210), the second coil (2230) or circuit substrate (2250), even if the bobbin (2110) is moved to an optical axis direction {e.g., a direction from the upper elastic member (2150) toward the lower elastic member (2160)} by an external shock over a predetermined stipulated scope.

An upper surface of bobbin (2110) may be provided with a first escape groove (2112a) in order to avoid a spatial interference with a first frame connection part (2153) of upper elastic member (2150). For example, the first escape groove (2112a) may be disposed on the second portions (2110b-2) of bobbin (2110), but the present invention is not limited thereto.

An upper surface of bobbin (2110) may be provided with a guide portion (2111) for guiding an installation position of upper elastic member (2150). For example, as illustrated in FIG. 48a, the guide portion of bobbin (2110) may be disposed with a first escape groove (2112a) to guide a path through which the frame connection part (2153) of upper elastic member (2150) can pass. For example, the guide portion (2111) may protrude to an optical axis direction from a floor surface of the first escape groove (2112a).

Furthermore, a damper may be interposed between the guide portion (2110) and the first frame connection part (2153) of upper elastic member (2150).

The bobbin (2110) may comprise a stopper (2116) protruded from an upper surface.

The stopper (2116) of bobbin (2110) may prevent an upper surface of bobbin (2110) from directly colliding with an inner side of upper plate of cover member (2300), even if the bobbin (2110) is moved to a first direction over a predetermined stipulated scope by an external shock in order to perform an autofocusing function.

The bobbin (2110) may comprise a first coupling portion (2113) formed on an upper side or an upper surface in order to be coupled or fixed to the upper elastic member (2150). For example, although FIG. 48a illustrates the first coupling portion (2113) of bobbin (2110) in a protrusive shape, the present invention is not limited thereto, and in another exemplary embodiment, the first coupling portion of bobbin (2110) may take a groove shape or a plane surface shape.

Furthermore, the bobbin (2110) may comprise a second coupling portion (2117) formed at a lower side or a lower surface of bobbin (2110) in order to be coupled or fixed to a lower elastic member (2160), and although FIG. 48b illustrates that the second coupling portion (2117) of bobbin (2110) takes a lug shape, the present invention is not limited thereto, and in another exemplary embodiment, the second coupling portion (2117) of bobbin (2110) may take a groove shape, or a plane surface shape.

An outer surface of bobbin (2110) may be provided with an accommodation groove (2105) where the first coil (2120) is accommodated, inserted or disposed. The accommodation groove (2105) may take a groove structure depressed from an outer surface of first and second portions (2110b-1, 2110b-2) of bobbin (2110), and may have a shape matching to that of the first coil (2120) or a closed curved shape (e.g., ring shape).

Furthermore, in order to prevent the coil (2120) from breaking away and to guide both ends of coil (2120) when the coil (2120) is connected to the lower elastic members (2160-1, 2160-2), guide grooves (2116a, 2116b) may be provided to a lower surface of two first portions (2110b-1) disposed in opposite side of bobbin (2110) or two second portions (2110b-2).

Furthermore, an outer surface of bobbin (2110) may be provided with an accommodation groove (2180a) where the second magnet (2180) is to be accommodated, inserted, fixed or disposed.

The accommodation groove (2180a) of bobbin (2110) may take a structure depressed from an outer surface of bobbin (2110), and may have an opening opened at least to an upper surface or to a lower surface of the bobbin (2110), but the present invention is not limited thereto.

Furthermore, an outer surface of bobbin (2110) may be provided with an accommodation groove (2185a) for the third magnet (2185) is to be accommodated, inserted, fixed, or disposed.

The accommodation groove (2185a) of bobbin (2110) may take a structure depressed from an outer surface of bobbin (2110), and may have an opening opened at least to an upper surface or to a lower surface of the bobbin (2110), but the present invention is not limited thereto.

Each of the accommodation grooves (2180a, 2185a) of bobbin (2110) may be disposed on an upper side of accommodation groove (2105) disposed with the first coil (2120), and may be connected or contacted to the accommodation groove (2105), but the present invention is not limited thereto, and in another exemplary embodiment, both grooves may be mutually spaced apart.

The accommodation groove (2180a) of bobbin (2110) may be provided to any one of the first portions (2110b-1) of bobbin (2110), and the accommodation groove (2185a) of bobbin (2110) may be provided on any other one of first portions (2110b-2) of bobbin (2110).

For example, the accommodation grooves (2180a, 2185a) of bobbin (2110) may be disposed on mutually facing two first portions of bobbin (2110) or oppositely positioned two first portions.

Because the second magnet (2180) and the third magnet (2185) are disposed within the accommodation grooves (2180a, 2185a) provided on two first portions positioned at an opposite side of bobbin (2110), weights of second and third magnets (2180, 2185) can be balanced to thereby mutually offset the AF driving effect caused by magnetic field between the first magnet (2130) and the second magnet (2180) and the AF driving effect caused by magnetic field between the first magnet (2130) and the third magnet (2185), whereby the accuracy of AF driving can be improved by the present exemplary embodiment.

An inner surface of bobbin (2110) may be provided with screw threads (211) for coupling a lens or a lens barrel. The screw threads can be formed on the inner surface of bobbin (2110) while the bobbin (2110) is fixed by a jig and the like, and an upper surface of bobbin (2110) may be formed with jig fixing grooves (2015a, 2015b).

For example, the jig fixing grooves may be provided on upper surface of two first portions (2110b-1) positioned opposite to the bobbin (2110) or two second portions (2110b-1), but the present invention is not limited thereto. The jig fixing grooves (2015a, 2015b) may function as a foreign object collecting portion to collect foreign objects.

Next, the first coil (2120) will be explained.

The first coil (2120) may be disposed on an outer lateral surface of bobbin (2110). The first coil (2120) may be disposed underneath the second and third magnets (2180, 2185), but the present invention is not limited thereto. For example, the first coil (2120) may be disposed underneath the protruder (2115) of bobbin (2110), but the present invention is not limited thereto.

For example, the first coil (2120) may not be overlapped with the second and third magnets (2180, 2185) to a direction perpendicular to an optical axis, but the present invention is not limited thereto. In another exemplary embodiment, the first coil (2120) may be at least partially overlapped with each of the second and third magnets (2180, 2185) to a direction perpendicular to an optical axis.

For example, the first coil (2120) may be disposed within the accommodation groove (2105) of bobbin (2110), and the second magnet (2180) may be inserted or disposed into an accommodation groove (2180a) of bobbin (2110) and the third magnet (2185) may be inserted or disposed into an accommodation groove (2185a) of bobbin (2110).

Each of the second and third magnets (2180, 2185) disposed on the bobbin (2110) may be spaced apart from the first coil (2120) to an optical axis direction, but the present invention is not limited thereto, and in another exemplary embodiment, each of the second and third magnets (2180, 2185) disposed on the bobbin (2110) may be brought into contact with the first coil (2120) or partially overlapped with the first coil (2120) to a direction perpendicular to an optical axis.

The first coil (2120) may wrap an outer lateral surface of bobbin (2110) that rotates about an optical axis. For example, the first coil (2120) may take a closed curved line, e.g., a ring shape wound on the outer lateral surface of bobbin (2110).

The first coil (2120) may be directly wound on the outer lateral surface of bobbin (2110), but the present invention is not limited thereto, and in another exemplary embodiment, the first coil (2120) may be wound on the bobbin (2110) using a coil ring, or may be provided with an angular ring shaped coil block.

In another exemplary embodiment, the first coil may take a coil ring shape wound based on a straight line that is perpendicular to an optical axis and passes the optical axis.

The first coil (2120) may be provided with a power or a driving signal. The power or the driving signal provided to the first coil (2120) may be a DC signal or an AC signal, or comprise a DC signal or an AC signal, and may be a voltage or current type.

When a driving signal (e.g., a driving current) is supplied, the first coil (2120) may form an electromagnetic force through an electromagnetic interaction with the first magnet (2130), and the bobbin (2110) may be moved to an optical axis direction by the formed electromagnetic force.

The bobbin (2110) at an initial position of AF mover may be moved to an upper lateral direction or to a lower direction, which is called bidirectional driving of AF mover.

Alternatively, at an initial position of AF mover, the bobbin (2110) may be moved to an upper lateral direction, which is called a unidirectional driving of AF mover.

At an initial position of AF mover, the first coil (2120) may be so disposed as to mutually correspond to or overlapped with the first magnet (2130) disposed at the housing (2140) to a direction parallel with a straight line that is perpendicular to an optical axis and passes the optical axis.

For example, the AF mover may comprise a bobbin (2110) and elements {e.g., first coil (2120), second and third magnets (2180, 2185)} coupled to the bobbin (2110). The AF mover may further comprise a lens or a lens barrel coupled to the bobbin (2110).

Furthermore, the initial position of AF mover may be an initial position of AF mover when a driving signal or a power is not applied to the first coil (2120), or a position where the AF mover can be laid when the upper and lower elastic members (2150, 2160) are elastically deformed only by the weight of AF mover.

At the same time, an initial position of the bobbin (2110) may be a position where the AF mover is laid when the gravity is applied in a direction from bobbin (2110) to the base (2210), or conversely when the gravity is applied in a direction from the base (2210) to the bobbin.

Next, the second and third magnets (2180, 2185) will be explained.

The second magnet (2180) may be expressed as a "sensing magnet" in that the second magnet (2180) provides a magnetic field for the first position sensor (2170) to detect and the third magnet (2185) may be expressed as a "balancing magnet" in that the third magnet (2185) offsets the magnetic field influence of sensing magnet (2180) and is intended to balance the weight of sensing magnet (2180).

Each of the second and third magnets (2180, 2185) may be disposed on the bobbin (2110), and may be moved to an optical axis direction along with the bobbin (2110).

The second magnet (2180) may be disposed within the accommodation groove (2180a) of bobbin (2110) to thereby face the first position sensor (2170). For example, at an initial position of (2110), the second magnet (2180) may be overlapped with the first position sensor (2170) to a direction parallel with a straight line that is perpendicular to the optical axis and that passes the optical axis, but the present invention is not limited thereto. In another exemplary embodiment, at an initial position of (2110), the second magnet (2180) may not be overlapped with the first position sensor (2170) to a direction parallel with a straight line that is perpendicular to the optical axis and that passes the optical axis.

A part of any one surface of second magnet (2180) facing the first position sensor (2170) may be exposed from the accommodation groove (2180a), but the present invention is not limited thereto, and in another exemplary embodiment, a part of any one surface of second magnet (2180) facing the first position sensor (2170) may not be exposed from the accommodation groove (2180a).

For example, each of the second and third magnets (2180, 2185) may be 2-pole magnetized magnets comprising two N poles and two S poles or 4-pole magnetized magnets.

Each of the second and third magnets (2180, 2185) may comprise a first magnet portion (2017a), a second magnet portion (2017b), and a partition (2017c) interposed between the first magnet portion (2017a) and the second magnet portion (2017b). Here, the partition (2017c) may be expressed by being replaced with a "non-magnetic substance partition".

The first magnet portion (2017a) may comprise an N pole, an S pole, and a first boundary portion between the N pole and the S pole. The first boundary portion may comprise a section having almost no polarity as a portion having substantially no magnetism, and may be a portion naturally generated to form a magnet comprised of one S pole and one N pole.

The second magnet portion (2017b) may comprise an N pole, an S pole, and a second boundary portion between the N pole and the S pole. The second boundary portion may comprise a section having almost no polarity as a portion having substantially no magnetism, and may be a portion naturally generated to form a magnet comprised of one S pole and one N pole.

The partition (2017c) may separate or isolate the first magnet portion (2017a) and the second magnet portion (2017b), and may be a section having almost no polarity as a portion having substantially no magnetism. For example, the partition may be a non-magnetic substance material or an air. The non-magnetic substance material partition may be expressed as a "Neutral Zone", or a "Neutral Region".

The partition (2017c) may be a portion artificially formed when the first magnet portion (2017a) and the second magnet portion (2017b) are magnetized, and a width of the partition (2017c) may be greater than that of the first boundary portion (or that of second boundary portion). Here, the width of partition (2017c) may be a length to a direction from the first magnet portion (2017a) toward the second magnet portion (2017b). The width of first boundary portion (or second boundary portion) may be a length of the first boundary portion from N pole of each of the first and second magnet portions (2017a, 2017b) toward an S pole direction.

For example, the first magnet portion (2017a) and the second magnet portion (2017b) may mutually face each other to an optical axis direction. For example, the partition (2017c) may be parallel with a straight line that is perpendicular to an optical axis and that passes the optical axis.

In another exemplary embodiment, each of the second and third magnets may be a unipolar magnetized magnet having one N pole and one S pole.

For example, a boundary surface between N pole and S pole for each of the second and third magnets (2180, 2185) disposed on the bobbin (2110) may be parallel with a direction perpendicular to an optical axis. For example, the N pole and S pole of each of the second and third magnets (2180, 2185) may mutually face each other to an optical axis direction.

For example, each surface of the second and third magnets (2180, 2185) facing the first position sensor (2170) may be divided by S pole and N pole, but the present invention is not limited thereto.

For example, in another exemplary embodiment, each of the second and third magnets (2180, 2185) disposed on the bobbin (2110) may be parallel with an optical axis at a boundary surface of N pole and N pole.

The second magnet (2180) may move to an optical axis direction along with the bobbin (2110) and the first position sensor (2170) may detect the magnetic strength or the magnetic force of the second magnet (2180) that moves to an optical axis direction, and may output an output signal in response to the detected result.

For example, the magnetic strength or the magnetic force detected by the first position sensor (2170) may be changed in response to the displacement of bobbin (2110) to an optical axis direction, where the first position sensor may output an output signal in proportion to the magnetic strength, and the displacement of bobbin (2110) to an optical axis direction may be detected by using the output signal of the first position sensor (2170).

Next, the housing (2140) will be explained.

The housing (2140) may accommodate the bobbin (2110) therein and may support a first magnet (2130), a first position sensor (2170) and a circuit substrate (2190).

FIG. 49a is a perspective view of a housing (2140), a circuit substrate (2190), a first position sensor (2170) and a capacitor (2195) illustrated in FIG. 46 and FIG. 49b is a coupled perspective view of a housing (2140), a first magnet (2130), a circuit substrate (2190), a first position sensor (2170) and a capacitor (2195).

Referring to FIGS. 49a and 49b, the housing (2140) may generally take a hollowed pillar shape. For example, the housing (2140) may be formed with a polygonal (e.g., square or pentagonal shape) or round shaped opening, and the opening of housing (2140) may be a through hole or a hollowed hole that passes through the housing (2140) to an optical axis direction.

The housing (2140) may comprise a plurality of lateral portions (2141-1 to 2141-4) and corner portions (2142-1 to 2142-4).

For example, the housing (2140) may comprise mutually discrete first to fourth lateral portions (2141-1 to 2141-4) and first to fourth corner portions (2142-1 to 2142-4).

For example, the first to second lateral portions (2141-1, 2141-2) of housing (2140) may mutually face each other, or may be disposed on opposite sides, and the third and fourth lateral portions (2141-3, 2141-4) of housing (2140) may mutually face each other or may be disposed in opposite sides.

Each of the corner portions (2142-1 to 2142-4) of housing (2140) may be disposed or positioned between adjacent two lateral portions (between 2141-1 and 2141-2, between 2141-2 and 2141-3, between 2141-3 and 2141-4, and between 2141-4 and 2141-1), and may mutually connect the lateral portions (2141-1 to 2141-4).

For example, the corner portions (2142-1 to 2142-4) of housing (2140) may be disposed on corners or edges of housing (2140). For example, the number of lateral portions of housing (2140) may be four (4), and the number of corner portions may be four (4), but the present invention is not limited thereto, and may be five (5) or more.

Each of the lateral portions (2141-1 to 2141-4) of housing (2140) may be disposed in parallel with any corresponding one of lateral plates (2302) of cover member (2300).

For example, the lateral portions (2141-1 to 2141-4) of housing (2140) may face or correspond to the first lateral portions (2110b-1) of bobbin (2110), and the corner portions (2142-1 to 2142-4) of (2140) of housing (2140) may face or correspond to the second lateral portions (2110b-2) of bobbin (2110).

The corner portions (2142-1 to 2142-4) of housing (2140) may be disposed or installed with a first magnet (2130).

For example, corners of housing (2140) or corner portions (2142-1 to 2142-4) of housing (2140) may be disposed with an accommodation portion (2141a) or a reception (acceptance) portion for receiving the magnet (2130).

The accommodation portion (2141a) of housing (2140) may be provided on at least one lower surface or lower end of corner portions (2142-1 to 2142-4) of housing (2140).

For example, the accommodation portion (2141a) of housing (2140) may be provided on an inner side of a lower surface or a lower end of each of the four corner portions (2142-1 to 2142-4).

The accommodation portion (2141a) of housing (2140) may be formed with a groove, e.g., a concave groove having a shape corresponding to that of first magnet (2130), but the present invention is not limited thereto.

For example, a lateral surface of the accommodation portion (2141a) of housing (2140) facing the first coil (2120) may be formed with a first opening, and a lower surface of the accommodation portion (2141a) of housing (2140) facing the second coil (2130) may be formed with a second opening, which is intended to facilitate the installation of the first magnet (2130).

For example, a first surface (2011a) of first magnet (2130) fixed to or disposed on the accommodation portion (2141a) of housing (2140) may be exposed through the first opening of accommodation portion (2141a). Furthermore, a lower surface of first magnet (2130) fixed to or disposed on the accommodation portion (2141a) of housing (2140) may be exposed through the second opening of accommodation portion (2141a).

The housing (2140) may be disposed with an escape groove (2041) provided on an upper surface of the corner portions (2142-1 to 2142-4) in order to avoid a spatial interference with the first frame connection part (2153) of upper elastic member (2150).

For example, the escape groove (2041) of housing (2140) may take a shape depressed from an upper surface of housing (2140), and may be more adjacent to a center of housing (2140) than to a stopper (2145) or to an adhesive infusion hole (2147). For example, the escape groove (2041) may be disposed at an inner side which is a center direction of housing based on the stopper of housing (2140), and the adhesive infusion hole (2146a, 146b) may be disposed at an outer side which is an opposite side thereof.

The corner portions (2142-1 to 2142-4) of housing (2140) may be formed with a groove portion (2025a) corresponding to or facing the protruder (2115) of bobbin (2110). The groove portion (2025a) of housing (2140) may be positioned on the accommodation portion (2141a) of housing (2140). For example, the groove portion (2025a) of housing (2140) may be formed on a floor surface of escape groove (2041). For example, the floor surface of escape groove (2041) may be positioned lower than the floor surface of escape groove (2041), and the accommodation portion (2141a) of housing (2140) may be positioned lower than the floor surface of escape groove (2041).

For example, the floor surface of groove portion (2025a) of housing (2140) may be interposed between an upper surface (or an upper end) of cushioning portion (2310A to 2310D) and a lower surface (or lower end) thereof.

The first magnet (2130) may be fixed to the accommodation portion (2141a) by an adhesive, but the present invention is not limited thereto.

For example, the corner portions (2142-1 to 2142-4) of housing (2140) may be disposed with at least one adhesive infusion hole (2146a, 2146b) in order to infuse the adhesive. The said at least one adhesive infusion hole (2146a, 2146b) may take a shape depressed from an upper surface of corner portions (2142-1 to 2142-4).

At least one adhesive infusion hole (2146a, 2146b) may comprise a through hole that passes through the corner portions (2142-1 to 2142-4) and the adhesive infusion hole (2146a, 2146b) may be connected to or communicate with the accommodation portion (2141a) of housing (2140), and may expose at least a part {e.g., at least a part of upper surface of magnet (2130)} of first magnet (2130). The adhesive may be well coated on the first magnet (2130) because the adhesive infusion hole (2146a, 2146b) exposes at least a part {e.g., at least a part of upper surface of magnet (2130)} of the first magnet (2130), and as a result, a fixing force between the first magnet (2130) and the housing (2140) can be enhanced.

An outer lateral surface of housing (2140) may be formed with at least one groove (2049) or one groove portion in order to accommodate the cushioning stopper (2310A to 2310D).

For example, the groove (2049) may take a shape depressed from an outer lateral surface of housing (2140). The shape of groove (2049) may be the same as or may match to that of the cushioning stopper (2310A to 2310D).

For example, the groove (2049) may be formed on each of the outer lateral surfaces (2141-1 to 2141-4) of housing (2140). Furthermore, for example, the groove (2049) may be so formed as to extend to at least a part of the corner portions (2142-1 to 2142-4) of housing (2140).

For example, the groove (2049) may comprise a floor surface (2049a) having a step with an outer lateral surface of housing (2140) to a direction perpendicular to an optical axis, and a lateral wall (2049b, or lateral surface) disposed between the floor surface (2049a) and the housing (2140).

For example, a lateral wall (2049b) of groove (2049) may connect a floor surface (2049a) and an outer lateral surface of housing (2140). For example, although the lateral wall (2049b) of groove (2049) and the floor surface (2049a) may be mutually perpendicular, the present invention is not limited thereto, and in another exemplary embodiment, an angle between the lateral wall (2049b) of groove (2049) and the floor surface (2049a) may be an obtuse angle or an acute angle.

For example, the floor surface (2049a) may be parallel with the outer lateral surface (2140a) of housing (2140), but the present invention is not limited thereto.

In order to prevent a lower surface of housing (2140) from colliding with the base (2210) and/or the circuit substrate (2250), the housing (2140) may further comprise a stopper (not shown) protruded from a lower surface.

The housing (2140) may comprise an installation grove (2014a, or accommodation groove) for accommodating the circuit substrate (2190), an installation grove (2014b, or accommodation groove) for accommodating the first position sensor (2170), and an installation grove (2014c, or accommodation groove) for accommodating a capacitor (2195).

The installation grove (2014a) of housing (2140) may be provided on an upper surface or an upper end of any one (e.g. 2141-1) of lateral portions (2141-1 to 2141-4) of housing (2140).

In order to facilitate the installation of circuit substrate (2190), the installation groove (2014a) of housing (2140) may take a groove shape with an upper surface thereof being opened, and having a lateral surface and a floor, and may have an opening opened toward an inside of the housing (2140). The shape of installation groove (2014a) of housing (2140) may take a shape corresponding to or matching that of the circuit substrate (2190).

The installation groove (2014b) of housing (2140) may be provided on an inner lateral surface of first lateral portion (2141-1) of housing (2140), and may be connected to the installation groove (2014a).

The installation groove (2014c) of housing (2140) may be disposed at one side of installation groove (2014b), and a lug (214d) or a protruder may be interposed between the installation groove (2014b) and the installation groove (2014c) in order to separate or isolate the capacitor (2195) from the first position sensor (2170). This is to reduce noise from the increased path by reducing a path length for electrical connection of both elements through the adjacent positioning of capacitor (2195) and the position sensor (2170).

The capacitor (2195) may be disposed or mounted on a first surface (2019b) of circuit substrate (2190).

The capacitor (2195) may be of a chip shape, and at this time, the chip may comprise a first terminal corresponding to one end of capacitor (2195) and a second terminal corresponding to the other end of the capacitor (2195). The circuit substrate (2190) may comprise two pads (or terminals) electrically connected to the first and second terminals of capacitor (2195).

The capacitor (2195) may be expressed by being replaced with a "capacitative element" or a condenser.

In another exemplary embodiment, the capacitor may be embodied by being comprised in the circuit substrate (2190). For example, the circuit substrate (2190) may be furnished with a capacitor comprising a first conductive layer, a second conductive layer and an insulation layer (e.g., dielectric layer) interposed between the first conductive layer and the second layer.

The capacitor (2195) may be connected in parallel to first and second terminals (B1, B2) of circuit substrate (2190) for providing a power (or a driving signal) from an outside to the position sensor (2170). For example, two pads of circuit substrate (2190) electrically connected to the first and second terminals of capacitor (2195) may be connected in parallel to the first and second terminals (B1, B2) of circuit substrate (2190).

Furthermore, the capacitor (2195) may be electrically connected in parallel to terminals of first position sensor (2170) electrically connected to the first and second terminals (B1, B2) of circuit substrate (2190).

For example, one end (or first terminal of capacitor chip) of capacitor (2195) may be electrically connected to the first terminal (B1) of circuit substrate (2190), and the other end (or terminal of capacitor chip) of capacitor (2195) may be electrically connected to the second terminal (B2) of circuit substrate (2190).

The capacitor (2195) may function as a smoothing circuit removing ripple components comprised in power signals (GND, VDD) provided from an outside to the first position sensor (2170) by being electrically connected in parallel to the first and second terminals (B1, B2) of circuit substrate (2190), whereby a stable and constant power signal can be provided to the first position sensor (2170).

The capacitor (2195) can protect the first position sensor (2170) from high frequency component noises or ESDs (Electrostatic Discharges) introduced from outside by being electrically connected in parallel to the first and second terminals (B1, B2) of circuit substrate (2190).

Furthermore, the capacitor (2195) can prevent the overcurrent caused by high frequency component noises or ESDs introduced from outside from being applied to the first position sensor (2170) and also prevent the calibration value on the displacement of bobbin (2110) obtained from an output signal of the first position sensor (2170) caused by overcurrent from being reset.

Furthermore, in order to facilitate the installation of the first position sensor (2170), the accommodation groove (2014b) of housing (2140) may be opened at an upper surface, and in order to increase the sensing sensitivity, the accommodation groove (2014b) may have an opening opened toward an inner lateral surface of first lateral portion (2141-1) of housing (2140). The accommodation groove (2014b) of housing (2140) may have a shape corresponding to or matching that of the first position sensor (2170).

For example, the circuit substrate (2190) may be fixed to the accommodation groove (2014b) of housing (2140) by an adhesive. For example, the adhesive may be an epoxy or a double-sided tape, but the present invention is not limited thereto.

The corner portions (2142-1 to 2142-4) of housing (2140) may be disposed with support members (2220-1 to 2220-4).

The corner portions (2142-1 to 2142-4) of housing (2140) may be disposed with a hole (2147) forming a path to allow the support members (2220-1 to 2220-4) to pass therethrough. For example, the housing (2140) may comprise a hole (2147) to pass through an upper surface of the corner portions (2142-1 to 2142-4).

In another exemplary embodiment, the hole provided on the corner portions (2142-1 to 2142-4) of housing (2140) may be formed by being depressed from an outer lateral surface of corner portions of housing (2140), and at least a part of the hole may be opened toward the outer lateral surface of corner portions. The number of holes (2147) of housing (2140) may be the same as that of support member.

One end of support member (2220) may pass through the hole (2147) to be connected or bonded to the upper elastic member (2150). For example, the one end of support member (2220) may be coupled to a first outer lateral frame of upper elastic member (2150) by passing through the hole (2147).

For example, in order to facilitate the coating of a damper, the diameter of hole (2147) may take a shape of gradually increasing from an upper surface of housing (2140) toward a lower surface direction, but the present invention is not limited thereto, and in another exemplary embodiment, the diameter of hole (2147) may be constant.

In order to form a path through which the support members (2220-1 to 2220-4) pass, and also to avoid a spatial interference between the support members (2220-1 to 2220-4) and the corner portions (2142-1 to 2142-4) of housing (2140), an outer lateral surface (2148) of corner portions (2142-1 to 2142-4) may be provided with an escape groove (2148a). The escape groove (2148a) may be connected to the hole (2147) of housing (2140), and may take a semispherical shape or semi-oval shape, but the present invention is not limited thereto. A lower surface or a lower end of escape groove (2148a) may be connected to a lower surface of housing (2140).

For example, a diameter of escape groove (2148a) may taper off from an upper surface toward a lower surface, but the present invention is not limited thereto.

Furthermore, the housing (2140) may be provided at an upper surface, an upper end or an upper lateral with a stopper (2145) to avoid directly colliding with an inner surface of upper plate (2301) of cover member (2300).

For example, the stopper (2145) may be disposed on each upper surface of corner portions (2142-1 to 2142-4) of housing (2140), but the present invention is not limited thereto, and in another exemplary embodiment, the stopper (2145) may be disposed on a lateral surface of housing (2140).

In addition, in order to prevent a lower surface of housing (2140) from colliding with the base (2210) and/or the circuit substrate (2250), a stopper (not shown) formed on a lower surface, a lower end or a lower side of housing (2140) may be further provided.

Furthermore, an edge of upper surface of corner portions (2142-1 to 2142-4) of housing (2140) may be provided with a guide protruder (2146) to prevent the damper from overflowing.

For example, a hole (2147) of housing (2140) may be interposed between an edge {e.g., guide protruder (2146)} of upper surface of corner portions (2142-1 to 2142-4) of housing (2140) and the stopper (2145).

An upper surface, upper end or an upper side of housing (2140) may be disposed with at least one first coupling portion (2143) coupled by a first outer lateral frame (2152) of upper elastic member (2150).

The first coupling portion (2143) of housing (2140) may be disposed on at least any one of the lateral portions (2141-1 to 2141-4) of housing (2140) or corner portions (2142-1 to 2142-4).

A lower surface, a lower end or a lower side of housing (2140) may be provided with a second coupling portion (2162) coupled or fixed to a second outer lateral frame (2162) of lower elastic member (2160).

For example, each of the first and second coupling portions (2143, 2149) of housing (2140) may take a lug shape, but the present invention is not limited thereto, and in another exemplary embodiment, the shape of the first and second coupling portions (2143, 2149) may be of a groove or plane surface shape.

For example, the first coupling portion (2143) of housing (2140) and the hole (2152a) of first outer lateral frame (2152) of upper elastic member (2150), and the second coupling portion (2149) of housing (2140) and the hole (2162a) of second outer lateral frame (2162) may be coupled by an adhesive or heat fusion, In order to avoid a spatial interference with an area, where the second outer lateral frame (2162-1 to 2162-3) of lower elastic member (2160) and the second frame connection part (2163) meet, an escape groove (244a) may be provided on at least one lower surface of lateral portions (2141-1) of housing (2140).

Next, the first magnet (2130) will be explained.

The first magnet (2130) may be disposed on at least one of corners {or corner portions (2142-1 to 2142-4)} of housing (2140). For example, the first magnet (2130) may be disposed on each of corners of housing (2140).

The first magnet (2130) at an initial position of AF mover may be disposed on the housing (2140) to allow at least a part of the first coil (2120) to overlap with the first coil (2120) to a direction perpendicular to a straight line that is perpendicular to an optical axis and that passes the optical axis.

For example, the first magnet (2130) may be inserted into or disposed within any one corresponding accommodation portion (2141a) of corner portions (2141-1 to 2141-4) of housing.

In another exemplary embodiment, the first magnet (2130) may be disposed on an outer lateral surface of corner portions (2141-1 to 2141-4) of housing (2140).

The first magnet (2130) may take a polygonal shape that is easy to be accommodated on the corner portions of housing (2140).

For example, an area of a first surface (2011a) of first magnet (2130) may be greater than that of a second surface (2011b). Each of the first surface (2011a) of first magnet (2130) may be a surface facing any one surface (or an outer lateral surface of bobbin (2110)} of first coil (2120) and the second surface (2011b) may be an opposite surface of first surface (2011a).

For example, a length of horizontal direction of second surface (2011b) of first magnet (2130) may be smaller than that of the first surface (2011a).

For example, the horizontal direction of first surface (2011a) of first magnet (2130) may be a direction perpendicular to a direction on the first surface (2011a) of first magnet (2130) toward an upper surface from a lower surface of first magnet (2130), or a direction perpendicular to an optical axis direction from a first surface (2011a) of first magnet (2130).

For example, the horizontal direction of second surface (2011b) of first magnet (2130) may be a direction perpendicular to a direction on the second surface (2011b) of first magnet (2130) toward an upper surface from a lower surface of first magnet (2130), or a direction perpendicular to an optical axis direction from a second surface (2011b) of first magnet (2130).

For example, the first magnet (2130) may comprise a portion where a horizontal direction length gradually tapers off toward a direction facing the corner portions (2142-1, 2142-2, 2142-3, or 2142-4) of housing (2140) from a center of housing (2140).

For example, the first magnet (2130) may comprise a portion where a horizontal direction length of first magnet (2130) tapers off toward a second surface (2011b) of first surface (2011a). For example, a horizontal direction of first magnet (2130) may be a direction parallel with the first surface (2011a) of first magnet (2130).

The first magnet (2130) may comprise a plurality of magnets (2130-1 to 2130-4) disposed on the housing (2140).

Each of the plurality of magnets (2130-1 to 2130-4) may be formed of one body, a first surface (2011a) facing the first coil (2120) may be so disposed as to be an S pole, and the second surface (2011b) may be so disposed as to be an N pole. However, the present invention is not limited thereto, and in another exemplary embodiment, each of the plurality of magnets (2130-1 to 2130-4) may be such that the first surface is so disposed as to be an N pole, and the second surface (2011b) is so disposed as to be an S pole.

At least two or more first magnets may be disposed or installed on the corner portions of housing (2140) so as to mutually face each other.

For example, mutually crossing and facing two pairs of magnets (2130-1 and 2130-3, 2130-2 and 2130-4) may be disposed on the corner portions (2142-1 to 2142-4) of housing (2140). At this time, the plane shape to each horizontal direction of the plurality of magnets (2130-1 to 2130-4) may be a polygonal shape comprising a triangular, pentagonal, hexagonal or rhomboid shape.

In another exemplary embodiment, a mutually facing pair of magnets may be disposed only on two mutually facing corner portions of housing (2140).

In still another exemplary embodiment, the magnets may not be disposed on the corner portions of housing (2140) but may be disposed on lateral portions of housing (2140). For example, in another exemplary embodiment, the first magnet (2130) may comprise a plurality of magnets disposed on the lateral surface of housing (2140), and each shape of magnets may be a polygonal shape adequate to be formed on the lateral surface of housing comprising, for example, but not limited to, a cubic or rectangular shape, but the present invention is not limited thereto.

FIG. 50 is a cross-sectional view of a lens driving device (2100) illustrated in FIG. 47 to an AB direction, and FIG. 51 is a cross-sectional view of a lens driving device (2100) illustrated in FIG. 47 to a CD direction.

Referring to FIGS. 50 and 51, each of the second and third magnets (2180, 2185) may not overlap with the first coil (2120) to a direction perpendicular to an optical axis or to direction parallel with a straight line that is perpendicular to the optical axis and that passes the optical axis, but the present invention is not limited thereto. In another exemplary embodiment, each of the second and third magnets (2180, 2185) may be overlapped with the first coil (2120).

Furthermore, the second magnet (2180) at an initial position of AF mover may be overlapped or aligned with the third magnet (2185) to a direction perpendicular to an optical axis, or to a direction parallel with a straight line that is perpendicular to the optical axis and that passes the optical axis, but the present invention is not limited thereto, and in another exemplary embodiment, the second magnet (2180) and the third magnet (2185) may not mutually overlap.

Furthermore, the first position sensor (2170) at an initial position of AF mover may be overlapped with second and third magnets (2180, 2185) to a direction perpendicular to an optical axis, or to a direction parallel with a straight line that is perpendicular to an optical axis and that passes the optical axis, but the present invention is not limited thereto.

In another exemplary embodiment, the first position sensor (2170) may not be overlapped with at least one of the second and third magnets (2180, 2185).

Furthermore, the first position sensor (2170) may not be overlapped with the first magnet (2130) to a direction perpendicular to an optical axis, or to a direction parallel with a straight line that is perpendicular to an optical axis and that passes the optical axis For example, the first position sensor (2170) may not be overlapped with the first magnet (2130) to a direction from the first position sensor (2170) toward the first coil (2120), or to a direction that is perpendicular to an optical axis and that faces a center of housing (2140) from the first lateral portion (2141-1) toward a center of housing (2140).

For example, an upper surface of magnet (2130) may be lower than an upper surface of cushioning stoppers (2310A to 2310D) but higher than a lower surface of the cushioning stopper (2310D).

Furthermore, a lower surface of magnet (2130) may be so disposed as to be lower than a lower surface of cushioning stoppers (2310A to 2310D).

Width or thickness of magnet (2130) may be greater than thickness (T) of the cushioning stoppers (2310A to 2310D). The width or thickness of magnet (2130) may be a length from a first surface (2011a) of magnet (2130) to a second surface (2011b).

Next, the circuit substrate (2190) and the first position sensor (2170) will be explained.

The circuit substrate (2190) may be disposed with or coupled to the housing (2140).

For example, the circuit substrate (2190) may be disposed at or coupled to any one lateral portion (2141-1) of housing (2140). The first position sensor (2170) may be disposed at or mounted on the circuit substrate (2190). For example, the circuit substrate (2190) may be disposed within an accommodation groove (2014a) of housing (2140).

For example, the circuit substrate (2190) may be interposed between the first corner portion (2142-1) and the second corner portion (2142-2) of housing (2140), and the first to fourth terminals (B1 to B4) of circuit substrate (2190) may be electrically connected with the first position sensor (2170).

For example, the circuit substrate (2190) may not be overlapped with an imaginary line connecting the corner portion {e.g., the first corner portion (2142-1) or a corner} of housing (2140) and an optical axis. This is to prevent a spatial interference between the support member (2220) and the circuit substrate (2190).

FIG. 52a is an enlarged view of a circuit substrate (2190) and a first position sensor (2170), and FIG. 52b is a block diagram of a first position sensor (2170) illustrated in FIG. 52a according to an exemplary embodiment of the present invention. Referring to FIGS. 52a and 52b, the circuit substrate (2190) may be formed with terminals (B1 to B6) for being electrically connected to an external terminal or an external device.

The first position sensor (2170) may be disposed on a first surface (2019b) of circuit substrate (2190), and the terminals (B1 to B6) may be disposed on a second surface (2019a) of circuit substrate (2190), but the present invention is not limited thereto.

In another exemplary embodiment, the first position sensor (2170) and the terminals (B1 to B6) may be disposed on any one surface of the first surface and the second surface of circuit substrate (2180). In still another exemplary embodiment, the first position sensor (2170) may be disposed on any one surface of the first surface and the second surface of circuit substrate (2180), and the terminals (B1 to B6) may be disposed on any one of the other surface of the first surface and the second surface of circuit substrate (2180).

Here, the second surface (2019a) of circuit substrate (2190) may be an opposite surface of the first surface (2019b) of circuit substrate (2190). For example, the second surface (2019a) of circuit substrate (2190) may be any one surface of circuit substrate (2190) facing the bobbin (2110).

The circuit substrate (2190) may comprise a body part (S1) and an extension part (S2) disposed underneath the body part (S1). The body part (S1) may be expressed by being replaced with an "upper end portion", and the extension part (S2) may be expressed by being replaced with a "lower end portion".

The extension part (S2) may be downwardly extended from the body part (S1).

The body part (S1) may take a protruded shape based on a lateral surface (2016a, 2016b) of extension part (S2). For example, the lateral surface (2016a, 2016b) of extension part (S2) may be a surface connecting the first surface (2019b) and the second surface (2019a) of extension part (S2).

The body part (S1) may a first extention region (A1) extended to a direction toward the first corner portion (2142-1) of housing (2140) and a second extension region (A2) extended to a direction toward the second corner portion (2142-2) of housing (2140).

For example, the first extension region (A1) may be extended or protruded from the first lateral surface (2016a) of extension part (S2) and the second extension region (A2) may be extended or protruded from the second lateral surface (2016b) of extension part (S2).

For example, although FIG. 52a illustrates that a horizontal direction length of the first extension region (A1) is greater than that of the second extension region (A2), the present invention is not limited thereto, and in another exemplary embodiment, the horizontal direction length of first extension region (A1) may be the same as or smaller than that of second extension region (A2).

For example, the horizontal direction length of body part (S1) of circuit substrate (2190) may be greater than that of second extension region (A2).

For example, the first to fourth terminals (B1 to B4) of circuit substrate (2190) may be so formed on the second surface (2019a) of body part (S1) as to be mutually spaced apart or disposed thereon. For example, the first to fourth terminals (B1 to B4) may be arranged in a row to a horizontal direction of circuit substrate (2190).

The first and second terminals (B1, B2) may be adjacently disposed at both distal ends of body part (S1) of circuit substrate (2190). That is, each of the first and second terminals (B1, B2) may be adjacently disposed to any corresponding one of both distal ends of body part (S1) of circuit substrate (2190).

For example, the first terminal (B1) of circuit substrate (2190) may be disposed at one end (e.g., one end of upper end portion) of circuit substrate (2190), the second terminal (B1) may be disposed at the other end of circuit substrate (2190), a third terminal (B3) may be interposed between the first terminal (B1) and the second terminal (B2), and a fourth terminal (B4) may be interposed between the first terminal (B1) and the third terminal (B3).

The first terminal (B1) of circuit substrate (2190) may be disposed on the first extension region (A1) of body part (S1) of circuit substrate (2190), and the second terminal (B2) may be disposed on the second extension region (A2) of body part (S1) of circuit substrate (2190).

The first to fourth terminals (B1 to B4) may be so disposed as to be more adjacent to an upper surface (2019c) than to a lower surface of circuit substrate (2190).

For example, the first to fourth terminals (B1 to B4) may be so formed as to abut the second surface (2019a), and the upper surface (2019c) of body part (S1) of circuit substrate (2190) contacting the second surface (2019a).

Furthermore, for example, at least one of the first to fourth terminals (B1 to B4) may comprise a groove (2007a) or a via formed on the upper surface (2019c) of circuit substrate (2190).

For example, the third and fourth terminals (B3, B4) may comprise a curved portion, e.g., a semi-circular via or a groove (2007a), depressed from the upper surface (2019c) of circuit substrate (2190). As a result of formation of the said groove (2007a), the adhesion and solderability may be improved by increasing a contact area between the terminals (B3, B4).

The fifth and sixth terminals (B5, B6) of circuit substrate (2190) may be so disposed as to be mutually spaced apart on the second surface (2019a) of extension part (S2) of circuit substrate (2190).

The circuit substrate (2190) may be disposed with a groove (2008a) or a hole provided between the fifth and sixth terminals (B5, B6). The groove (2008a) may take a shape depressed from a lower surface of circuit substrate (2190), and may be all opened to the first surface (2019b) and the second surface (2019a).

A discrete distance between the fifth terminal (B5) and the sixth terminal (B6) may be smaller than that of two adjacent terminals of first to fourth terminals (B1 to B4), and an electric short-circuit between the fifth terminal (B5) and the sixth terminal (B6) can be prevented by not allowing formation of solder between the fifth terminal (B5) and the sixth terminal (B6) by the groove (2008a) during soldering for electrical connection with an external device.

Furthermore, for example, at least one of the fifth and sixth terminals (B5, B6) may comprise a groove (2007b) or a via formed on a lower surface of circuit substrate (2190).

For example, the fifth and sixth terminals (B5, B6) may comprise a curved portion, e.g., a semi-circular via or a groove depressed from a lower surface of the circuit substrate (2190).

An adhesion and solderability may be improved by increased contact area between the fifth and sixth terminals (B5, B6) according to the groove (2007b).

The circuit substrate (2190) may comprise a groove (2090a) disposed between the second terminal (B2) and the third terminal (B3), and a groove (2090b) disposed between the first terminal (B1) and the fourth terminal (B4). Here, the grooves (2090a, 2090b) may be expressed by replacing the same with "escape grooves".

Each of the first groove (2090a) and the second groove (2090b) may take a shape depressed from an upper surface (2019c) of circuit substrate (2190), and may be opened to all of the first surface (2019b) and the second surface (2019a) of circuit substrate (2190).

The first groove (2090a) of circuit substrate (2190) may be so formed as to avoid a spatial interference with the first outer frame (2151) of the third upper elastic unit (2150-3), and the second groove (2090b) may be so formed as to avoid a spatial interference with the first outer lateral frame (2151) of the fourth upper elastic unit (2150-4).

For example, the circuit substrate (2190) may be a PCB or an FPCB.

The circuit substrate (2190) may comprise a circuit pattern or a wire (not shown) for electrically connecting the first to sixth terminals (B1 to B6) and the first position sensor (2170).

The first position sensor (2170) may detect the magnetic field or the magnetic strength of second magnet (2180) mounted on the bobbin (2110) in response to the motion of bobbin (2110), and output an output signal based on the detected result.

The first position sensor (2170) may be mounted on the circuit substrate (2190) disposed on the housing (2140), and may be fixed to the housing (2140). For example, the first position sensor (2170) may be disposed within an accommodation groove (2014b) of housing (2190) and may move along with the housing (2140) during the OIS operation.

The first position sensor (2170) may be disposed on the first surface (2019b) of the circuit substrate (2190). In another exemplary embodiment, the first position sensor (2170) may be also disposed on the second surface (2019a) of the circuit substrate (2190).

The first position sensor (2170) may comprise a Hall sensor (2061) and a driver (2062).

For example, the Hall sensor (2061) may be formed with silicone series, and an output (VH) of Hall sensor (2061)

may increase as an ambient temperature increases. For example, the ambient temperature may be a temperature of lens driving device, e.g., a temperature of circuit substrate (2190) or a temperature of driver (2062).

Furthermore, in another exemplary embodiment, the Hall sensor (2061) may be formed with GaAs, and an output (VH) of Hall sensor (2061) may decrease relative to the ambient temperature. For example, in another exemplary embodiment, the output of Hall sensor (2061) may have an approximately −0.06%/° C. inclination relative to the ambient temperature.

The first position sensor (2170) may further comprise a temperature sensing element (2063) configured to detect an ambient (surrounding) temperature. The temperature sensing element (2063) may output a temperature detection signal (Ts) to the driver (2062) in response to a result of measuring a temperature about the first position sensor (2170).

For example, the Hall sensor (2061) of first position sensor (2170) may generate an output (VH) in response to a result of measuring the magnetic strength (force) of second magnet (2180). For example, the magnitude of output of first position sensor (2170) may be proportionate to the magnetic strength of the second magnet (2180).

The driver (2062) may output a driving signal (dV) for driving the Hall sensor (2061) and a driving signal (Id1) for driving the first coil (2120).

For example, the driver (2062) may receive a clock signal (SCL), a data signal (SDA) and power signals (VDD, GND) from the controller (2830, 2780) using a data communication using protocol, e.g., using an I2C communication.

Here, the first power signal (GND) may be a ground voltage or 0[V], the second power signal (VDD) may be a preset voltage for driving the driver (2062), and may be a DC voltage or/and an AC voltage, but the present invention is not limited thereto.

The driver (2062) may generate a driving signal (dV) for driving the Hall sensor (2061) and a driving signal (Id1) for driving the first coil (2120) using the clock signal (SCL) and the power signals (VDD, GND).

The first position sensor (2170) may comprise four terminals for transmitting and receiving the clock signal (SCL), the data signal (SDA) and the power signals (VDD, GND) and two terminals for driving the first coil (2120).

Furthermore, the driver (2062) may receive an output (VH) of Hall sensor (2061), and may transmit, to the controller (2830, 2780), a clock signal (SCL) about the output (VH) of Hall sensor (2061) and a data signal (SDA) using a data communication using protocol, e.g., using an I2C communication.

For example, the driver (2062) may receive a temperature detection signal (Ts) measured by the temperature sensing element (2063), and transmit, to the controller (2830, 2780), the temperature detection signal (Ts) using a data communication using protocol, e.g., using an I2C communication.

The controller (2830, 2780) may perform the temperature compensation about the output (VH) of Hall sensor (2061) based on the ambient temperature measured by the temperature sensing element (2063) of first position sensor (2170).

For example, when the driving signal (dV) of Hall sensor (2061) or a bias signal is 1 [mA], the output (VH) of Hall sensor (2061) of first position sensor (2170) may be −20 [mV]~+20 [mV].

Furthermore, in case of temperature compensation on the output (VH) of Hall sensor (2061) having a negative inclination relative to the ambient temperature change, the output (VH) of Hall sensor (2061) of first position sensor (2170) may be 0 [mV]~+30 [mV].

When the output (VH) of Hall sensor (2061) of first position sensor (2170) is shown on an xy coordinate system, the reason of an output scope of Hall sensor (2061) of first position sensor (2170) being of a first quadrant (e.g., 0 [mV]~+30 [mV]) is given as under:

Because an output of Hall sensor (2061) in the first quadrant of xy coordinate in response to changes in the ambient temperature and an output of Hall sensor (2061) in the third quadrant move in a mutually opposite direction, accuracy and reliability of Hall sensor may deteriorate when the first and third quadrants are all used as AF driving control section. Therefore, in order to accurately compensate the ambient temperature changes, a predetermined scope of first quadrant may be used as an output scope of Hall sensor (2061) of first position sensor (2170).

The first position sensor (2170) may comprise first to fourth terminals for two power signals (VDD, GND), a clock signal (SCL) and data (SDA), and fifth and sixth terminals for providing a driving signal to the first coil (2120).

The first to fourth terminals of first position sensor (2170) may be electrically connected to any corresponding one of the first to fourth terminals (B1 to B4) of circuit substrate (2190), and the fifth and sixth terminals of first position sensor (2170) may be electrically connected to any corresponding one of the fifth and sixth terminals (B5, B6) of circuit substrate (2190).

In another exemplary embodiment, the first position sensor (2170) may be implemented alone by a position detection sensor such as a Hall sensor, and in this case, the first position sensor (2170) may comprise two input terminals through which power signals are inputted and two output terminals for outputting the output signals, where the first coil (2120) may be provided with a driving signal from an outside through a circuit substrate (2250).

The first to fourth terminals (B1 to B4) of circuit substrate (2190) may be electrically connected to terminals (2251-1 to 2251-*n*, n being a natural number of n>1) of circuit substrate (2250) by upper elastic units (2150-1 to 2150-4) and support members (2220-1 to 2220-4), whereby the first position sensor (2170) may be electrically connected to terminals (2251-1 to 2251-*n*, e.g., n=4) of circuit substrate (2250).

Furthermore, the fifth and sixth terminals (B5, B6) of circuit substrate (2190) may be coupled to lower elastic units (2160-1, 2160-2), and the first position sensor (2170) may be electrically connected to the first coil (2120) by the lower elastic units (2160-1, 2160-2).

For example, the fifth terminal (B5) of circuit substrate (2190) may be coupled to the first lower elastic unit (2160-1), and the sixth terminal (B6) of circuit substrate (2190) may be coupled to the second lower elastic unit (2160-2).

Next, the upper elastic member (2150), the lower elastic member (2160) and the support member (2220) will be explained.

FIG. 53 is a schematic view of an upper elastic member (2150) illustrated in FIG. 46, FIG. 54 is a schematic view of a lower elastic member (2160) illustrated in FIG. 46, FIG. 55 is a coupled perspective view of an upper elastic member (2150), a lower elastic member (2160), a base (2210), a support member (2220), a second coil (2230), and a circuit substrate (2250), FIG. 56 is a schematic view of a coupling between first to fourth terminals of circuit substrate (2190) and upper elastic units (2150-1 to 2150-4), FIG. 57 is a schematic view of a coupling between fifth and sixth terminals (B5, B6) of circuit substrate (2190) and a lower elastic unit (2160-1, 2160-2), FIG. 58 is a separated perspective view of a second coil (2230), a circuit substrate (2250), a base (2210) and a second position sensor (2240), FIG. 59 is a bottom view of a second coil (2230) and a circuit substrate (2190), and FIG. 60 is a bottom view of a circuit substrate (2190) coupled with a second coil (2230).

Referring to FIGS. 53 to 60, the upper elastic member (2150) may be coupled to an upper surface, an upper end or an upper part of bobbin (2110), and the lower elastic member (2160) may be coupled to a lower surface, a lower end or a lower part of bobbin (2110).

For example, the upper elastic member (2150) may be coupled to an upper part, an upper surface or an upper end of bobbin (2110) or to an upper part, an upper surface or an upper end of housing (2140), and the lower elastic member (2160) may be coupled to a lower part, a lower end or a lower surface of bobbin (2110), or to a lower part, a lower end or a lower surface of housing (2140).

The upper elastic member (2150) and the lower elastic member (2160) may elastically support the bobbin (2110) relative to the housing (2140).

The support member (2220) may movably support the housing (2140) to a direction perpendicular to an optical axis relative to the base (2210), and may electrically connect any one of the upper or lower elastic members (2150, 2160) and the circuit substrate (2250).

Referring to FIG. 53, the upper elastic member (2150) may comprise mutually and electically separated plurality of upper elastic units (2150-1 to 2150-4). Although FIG. 55 illustrates four (4) electically separated upper elastic units, the number is not limited thereto, and the number may be more than three (3).

Each of the first to fourth upper elastic units (2150-1 to 2150-4) may be directly coupled to any corresponding one of the first to fourth terminals (B1 to B4) of circuit substrate (2190) and electrically connected thereto.

Parts of each of the plurality of upper elastic units may be disposed on the first lateral portion (2141-1) of housing (2140) disposed with the circuit substrate (2190), and at least one upper elastic unit may be disposed on each of the remaining second to fourth lateral portions (2141-2 to 2141-4), except for the first lateral portion (2141-1) of the housing (2140).

The upper elastic member may comprise a first outer lateral frame (2152) coupled to the housing (2140). Each of the first to fourth upper elastic units (2150-1 to 2150-4) may comprise a first outer lateral frame (2152) coupled with the housing (2140).

At least one of the first to fourth upper elastic units (2150-1 to 2150-4) may comprise a first inner frame (2151) coupled to the bobbin (2110) and a first frame connection part (2153) connecting the first inner frame (2151) and a first outer lateral frame (2152).

The exemplary embodiment illustrated in FIG. 53 shows that each of the first and second upper elastic units (2150-1, 2150-2) is disposed only with a first outer lateral frame and is not disposed with a first inner frame and a first frame connection part, and each of the first and second upper elastic units (2150-1, 2150-2) may be spaced apart from the bobbin (2110).

Each of the third and fourth upper elastic units (2150-3, 2150-4) may comprise a first inner lateral frame (2151), a first outer lateral frame and a first frame connection part (2153), but the present invention is not limited thereto.

For example, the first inner lateral frame (2151) of the third and fourth upper elastic units (2150-3, 2150-4) may be provided with a hole (2151a) for being coupled with the first coupling portion (2113) of bobbin (2110), but the present invention is not limited thereto. For example, the hole (2151a) of first inner lateral frame (2151) may have at least one cut-off portion (251a) for allowing an adhesive to soak into between the first coupling portion (2113) of bobbin (2110) and the hole (2151a). The first outer lateral frame (2152) of first to fourth upper elastic members (2150-1 to 2150-4) may be provided with a hole (2152a) for being coupled with the first coupling portion (2143) of housing (2140).

Each first outer lateral frame (2151) of first to fourth upper elastic units (2150-1 to 2150-4) may comprise a body part for being coupled with the housing (2140) and connection terminals (P1 to P4) for being connected to any corresponding one of first to fourth terminals (B1 to B4) of circuit substrate (2190).

Here, the connection terminal (P1 to P4) may be expressed by being replaced with an "extensison part". For example, the support member (2220) may be coupled to the body part of first outer lateral frame (2151).

Each first outer lateral frame (2151) of first to fourth upper elastic units (2150-1 to 2150-4) may comprise a first coupling portion (2520) coupled to the housing (2140), a second coupling portion (2510) coupled to any one corresponding support member (2220-1 to 2220-4), and a connection portion (2530) connecting the first coupling portion (2520) and the second coupling portion (2510), and extension parts (P1 to P4) connected to the second coupling portion (2510) and expanded to first lateral portion (2141-1) of housing (2140).

Each body part of first to fourth upper elastic units (2150-1 to 2150-4) may comprise a first coupling portion (2520). Furthermore, each body part of first to fourth upper elastic units (2150-1 to 2150-4) may further comprise at least one of the second coupling portion (2510) and the connection portion (2530).

For example, one end of first support member (2220-1) may be coupled to the second coupling portion (2510) of first upper elastic unit (2150-1) by a solder or a conductive adhesive member, one end of second support member (2220-2) may be coupled to the second coupling portion (2510) of second upper elastic unit (2150-1), one end of third support member (2220-3) may be coupled to the second coupling portion (2510) of third upper elastic unit (2150-3), and one end of fourth support member (2220-4) may be coupled to the second coupling portion (2510) of fourth upper elastic unit (2150-4).

The second coupling portion (2510) may be disposed with a hole (2052) through which the support member (2220-1 to 2220-4) can pass. One of the support members (2220-1 to 2220-4) that has passed through the hole (2052) may be directly coupled to the second coupling portion (2510) by a conductive adhesive member or a solder (2901, see FIG. 55), and the second coupling portion (2510) and the support members (2220-1 to 2220-4) may be electrically connected.

For example, the second coupling portion (2510) is an area where the solder (2901) is disposed for coupling with the support members (2220-1 to 2220-4), and may comprise a hole (2052) and a region around the hole (2052).

The first coupling portion (2520) may comprise at least one coupling region (e.g., 2005a, 2005b) coupled by the housing {2140, e.g., corner portions (2142-1 to 2142-4)}.

For example, the coupling region (e.g., 2005a, 2005b) of first coupling portion (2520) may comprise at least one hole (2152a) coupled by the first coupling portion (2143) of housing (2140).

For example, each of the coupling regions (2005a, 2005b) may comprise one or more holes, and the corner portions (2142-1 to 2142-4) of housing (2140) may be provided with one or more first coupling portions in response thereto.

For example, in order to balancingly support the housing (2140) least there be biased to one side, the coupling regions (2005a, 2005b) of first coupling portion (2520) of first to fourth upper elastic units (2150-1 to 2150-4) may be bilaterally symmetrical based on a baseline (e.g., 2501, 2502), but the present invention is not limited thereto.

Furthermore, the first coupling portion (2143) of housing (2140) may be bilaterally symmetrical based on a baseline (e.g., 2501, 2502), and two first coupling portions (2143) may be provided on each lateral based on the baseline, but the present invention is not limited to the given number.

The baseline (2501, 2502) may be a straight line that passes a center (2101) and any one corner of corner portions (2142-1 to 2142-4) of housing (2140). For example, the baseline (2501, 2502) may be a straight line that passes mutually-facing two corners toward a diagonal line direction of housing (2140) between the center (2101) and corners of corner portions (2142-1 to 2142-4) of housing (2140).

Here, the center (2101) may be a center of housing (2140), a center of bobbin (2110) or a center of upper elastic member (2150). The center (2101) may be a spatial center of the abovementioned elements (2140, 2110, or 2150).

Furthermore, for example, the corner of corner portions of housing (2140) may be a corner aligned or corresponded to a center of corner portions of housing (2140).

Although each of the coupling regions (2005a, 2005b) of first coupling portion (2520) comprises a hole (2152a) in the exemplary embodiment in FIG. 53, the present invention is not limited thereto, and in another exemplary embodiment, the coupling regions may be embodied by taking various shapes, e.g., a groove shape and the like, sufficient enough to be coupled to the housing (2140).

For example, the hole (2152a) of first coupling portion (2520) may have at least one cut-off portion (2052a) to allow an adhesive member to soak into between the first coupling portion (2143) of housing (2140) and the hole (2152a).

The connection part (2530) may mutually connect the second coupling portion (2510) and the first coupling portion (2520).

For example, the connection part (2530) may connect the second coupling portion (2510) and the coupling regions (2005a, 2005b) of first coupling portion (2520).

For example, the connection part (2530) may comprise a first connection part (2530a) connecting the first coupling region (2005a) of first coupling portion (2520) of each of the first to fourth upper elastic units (2150-1 to 2150-4) with the second coupling portion (2510), and a second connection part (2530b) connecting the second coupling region (2005b) of first coupling portion (2520) with the second coupling portion (2510).

For example, the first outer lateral frame (2151) may comprise a connection region (2005c) that directly connect the first coupling region (2005a) and the second coupling region (2005b), but the present invention is not limited thereto.

Each of the first and second connection parts (2530a, 2530b) may comprise a folded (bent) portion that is folded at least once, or a curved portion that is bent at least once, but the present invention is not limited thereto, and in another exemplary embodiment, each of the first and second connection parts (2530a, 2530b) may comprise a straight line shape.

Width of connection part (2530) may be smaller than that (or diameter) of the first coupling portion (2520). Furthermore, in another exemplary embodiment, the width of connection part (2530) may be the same as that of the first coupling portion (2520), and the width of connection part (2530) may be the same as that (or diameter) of the first coupling portion.

For example, the first coupling portion (2520) may contact an upper surface of corner portions (2142-1 to 2142-4) of housing (2140), and may be supported by the corner portions (2142-1 to 2142-4) of housing (2140). For example, the connection part (2530) may not be supported by the upper surface of housing (2140), and may be spaced apart from the housing (2140). Furthermore, in order to prevent oscillation caused by vibration, a damper (not shown) may be filled in an empty space between the connection part (2530) and the housing (2140).

Each width of first and second connection parts (2530a, 2530b) may be narrower than that of first coupling portion (2520), and as a result, the connection part (2530) may be easy in motion to a first direction, and as a result, the stress applied to the upper elastic units (2150-1 to 2150-4) and the stress applied to the support members (2220-1 to 2220-4) may be dispersed.

Each of the first and second extension parts (P1, P2) of first outer lateral frame of first and second upper elastic units (2150-1, 2150-2) may be extended toward any corresponding one of the first and second terminals (B1, B2) of circuit substrate (2190) disposed on the first lateral portion (2141-1) of housing (2140) from the first coupling portion (2520, e.g., first coupling region (2005a).

The first coupling portion (2520) of third upper elastic unit (2150-3) may further comprise at least one coupling region (2006a, 2006b) connected to at least one of the fourth lateral portion (2141-4) of housing (2140) and the second corner portion (2142-2).

Furthermore, the first coupling portion (2520) of fourth upper elastic unit (2150-4) may further comprise at least one coupling region (2006c, 2006d) connected to at least one of the third lateral portion (2141-3) of housing (2140) and the first corner portion (2142-1).

Each of the third and fourth extension parts (P3, P4) of first outer lateral frame of third and fourth upper elastic units (2150-3, 2150-4) may be extended toward any corresponding one of the third and fourth terminals (B3, B4) of circuit substrate (2190) disposed on the first lateral portion (2141-1) of housing (2140) from the first coupling portion (2520, e.g., first coupling region (2005b).

Each end of first to fourth extension parts (P1 to P4) may be coupled to any corresponding one of the first to fourth terminals (B1 to B4) of circuit substrate (2190) by soldering or a conductive adhesive member.

Each of the first and second extension parts (P1, P2) may take a straight line shape, but the present invention is not limited thereto, and in another exemplary embodiment, each of the first and second extension parts (P1, P2) may comprise a bent or curvedly shaped portion.

In order to facilitate an easy coupling to any corresponding one of the third and fourth terminals (B3, B4) of circuit substrate (2190), the third and fourth extension parts (P3, P4) may comprise an bent or folded portion.

The first outer lateral frame of third upper elastic unit (2150-3) may further comprise a first extension frame (2154-1) connected to between the first coupling portion (2520) and the extension part (P3) and disposed on the fourth lateral portion (2141-4) of housing (2140) and the second corner portion (2142-2).

In order to prevent the third upper elastic unit (2150-3) from floating (being swollen) by reinforcing the cohesion (coupling force) with the housing (2140), the first extension frame (2154-1) may comprise at least one coupling region (2006a, 2006b) that is coupled with the housing (2140), and the coupling region (2006a, 2006b) may be disposed with a hole for being coupled with the first coupling portion (2143) of housing (2140).

The first outer lateral frame of fourth upper elastic unit (2150-4) may further comprise a second extension frame (2154-2) connected to between the first coupling portion (2520) and the extension part (P4) and disposed on the third lateral portion (2141-3) of housing (2140) and the first corner portion (2142-1).

In order to prevent the fourth upper elastic unit (2150-4) from floating (being swollen) by reinforcing the cohesion (coupling force) with the housing (2140), the second extension frame (2154-2) may comprise at least one coupling region (2006c, 2006d) that is coupled with the housing (2140), and the coupling region (2006ca, 2006d) may be disposed with a hole for being coupled with the first coupling portion (2143) of housing (2140).

Although each of the third upper elastic unit (2150-3) and the fourth upper elastic unit (2150-4) in FIG. 53 comprises two first frame connection parts, the present invention is not limited thereto, and the number of first frame connection part may be one (1) or more than three (3).

As mentioned above, each of the first to fourth upper elastic units may comprise extension parts (P1 to P4) disposed on the first lateral portion (2141-1) of housing (2140), and the upper elastic units (2150-1 to 2150-4) can be easily coupled to the first to fourth terminals (B1 to B4) provided on the body part (S1) of circuit substrate (2190) by the extension parts (P1 to P4).

Because the structure is one where the four terminals (B1 to B4) provided on the body part (S1) of circuit substrate (2190) disposed on the first lateral portion (2141-1) of housing (2140) are directly electrically connected to the first to fourth upper elastic units (2150-1 to 2150-4), the first lateral portion (2141-1) of housing (2140) may be disposed with parts of first outer lateral frame (2151) of each of the first to fourth upper elastic units (2150-1 to 2150-4).

Each of the upper elastic units (2150-1 to 2150-4) may comprise extension parts (P1 to P4) disposed or coupled to any corresponding one of the corner portions (2142-1 to 2142-4) of housing (2140), and extended to the first lateral portion (2141-1) of housing (2140).

Referring to FIG. 56, extension parts (P1 to P4) of each of the upper elastic units (2150-1 to 2150-4) may be directly and electrically connected to any corresponding one of four terminals (B1 to B4) provided on the body part (S1) of circuit substrate (2190) by a conductive adhesive member (271) such as a solder or the like.

The first outer lateral frame (2151) of first upper elastic unit (2150-1) may be disposed on the first corner portion (2142-1) of housing (2140), the first outer lateral frame (2151) of second upper elastic unit (2150-2) may be disposed on the second corner portion (2142-2) of housing (2140), the first outer lateral frame (2151) of third upper elastic unit (2150-3) may be disposed on the third corner portion (2142-3) of housing (2140), and the first outer lateral frame (2151) of fourth upper elastic unit (2150-43) may be disposed on the fourth corner portion (2142-4) of housing (2140), A part of the third upper elastic unit (2150-3) may be disposed within a first groove (2090a) of first circuit substrate (2190), and a distal end of the part of the third upper elastic unit (2150-3) may be coupled to the third terminal (B3) of circuit substrate (2190).

A part of the fourth upper elastic unit (2150-4) may be disposed within a second groove (2090b) of first circuit substrate (2190), and a distal end of the part of the fourth upper elastic unit (2150-4) may be coupled to the fourth terminal (B4) of circuit substrate (2190).

The third extension part (P3) of third upper elastic unit (2150-3) may pass through a first groove (2090a) of circuit substrate (2190) to be extended toward the third terminal (B3) of circuit substrate (2190), and may be bent at least twice.

Furthermore, the fourth extension part (P4) of fourth upper elastic unit (2150-4) may pass through a second groove (2090b) of circuit substrate (2190) to be extended toward the fourth terminal (B4) of circuit substrate (2190), and may be bent at least twice.

The third extension part (P3, or a "third connection terminal") of third upper elastic unit (2150-3) may comprise at least two bent regions (2002a, 2002b).

For example, the third extension part (P3) of third upper elastic unit (2150-3) may comprise a first part (2001a) extended from a first coupling portion {2520, e.g., a coupling region (26b)} of third upper elastic unit (2150-3), a third bent region (2002a, or a "first bent portion") bent from the first part (2001a), a second part (2001b) extended from the first bent region (2002a), a second bent region (2002b, or a "second bent portion") bent from the second part (2001b), and a third bent part (2001c) extended from the second bent region (2002b) toward the third terminal (B3) direction.

For example, the second part (2001b) of third extension part (P3, or a third connection terminal) may be bent from the first part (2001a) and the third part (2001c) may be bent from the second part (2001b).

The second part (2001b) of third extension part (P3) may be interposed between the first bent region (2002a) and the second bent region (2002b), and may connect the first and second bent regions (2002a, 2002b).

For example, each of the first part (2001a) and the third part (2001c) of third extension part (P3) may be extended from the second corner portion (2142-2) of housing (2140) to a direction toward the first corner portion (2141-1). For example, the second part (2001b) of third extension part (P3) may be extended from an inner lateral surface of the housing (2140) to a direction toward an outer lateral surface.

A part (e.g., the second part (2001b)} of third upper elastic unit (2150-3) may be positioned within the first groove (2090a) of circuit substrate (2190), or may pass through the first groove (2090a).

The fourth extension part (P4, or a "fourth connection terminal") of fourth upper elastic unit (2150-4) may comprise at least two bent regions (2002c, 2002d).

For example, The fourth extension part (P4, or "fourth connection terminal") of fourth upper elastic unit (2150-4) may comprise a fourth part (2001d) extended from the first coupling portion {2520, e.g., the fourth part (2001d) from the coupling region (26d)} of fourth upper elastic unit, a third bent region (2002c, or a "third bent portion") bent from the fourth part (2001d), a fifth part (2001e) extended from the third bent region (2002c), a fourth bent region (2002d, or a "fourth bent portion") bent from the fifth part (2001e) and a sixth part (20010 extended from the fourth bent region (2002d) to a direction toward the fourth terminal (B4).

For example, the fifth part (2001e) of fourth extension part (P4, or a fourth connection terminal) may be bent from the fourth part (2001d), the sixth part (2001f) may be bent from the fifth part (2001e).

The fifth part (2001e) of fourth extension part (P4) may be interposed between the third bent region (2002c) and the fourth bent region (2002d), and may connect the third and fourth bent regions (2002c, 2002d).

For example, each of the fourth part (2001d) of fourth extension part (P4) and the sixth part (2001f) may be extended from the first corner portion (2142-1) of housing (2140) to a direction toward the second corner portion (2141-2). For example, the fifth part (2001e) of fourth extension part (P4) may be extended from an inner lateral surface of housing (2140) to a direction toward an outer lateral surface.

A part (e.g., the fifth part (2001e)} of fourth upper elastic unit (2150-4) may be positioned within the second groove (2090b) of circuit substrate (2190), or may pass through the second groove (2090b).

Referring to FIG. 54, the lower elastic member (2160) may comprise a plurality of lower elastic units (2160-1, 2160-2).

For example, each of the first and second lower elastic units (2160-1, 2160-2) may comprise a second inner lateral frame (2161) coupled or fixed to a lower part, a lower surface or a lower end of bobbin (2110), a second outer lateral frame (2162-1 to 2162-3) coupled or fixed to a lower part, a lower surface, or a lower end of housing (2140), and a second frame connection part (2163) mutually connecting the second inner lateral frame (2161) and the second outer lateral frame (2162-1 to 2162-3).

The second inner lateral frame (2161) may be provided with a hole (2161a) for being coupled with the second coupling portion (2117) of bobbin (2110), and the second outer lateral frame (2162-1 to 2162-3) may be provided with a hole (2162a) for being coupled with the second coupling portion (2149) of housing (2140).

For example, each of the first and second lower elastic units (2160-1, 2160-2) may comprise three (3) second outer lateral frames (2162-1 to 2162-3) coupled with the housing (2140) and two (2) second frame connection portions (2163), but the present invention is not limited thereto. In another exemplary embodiment, each of the first and second lower elastic units may comprise one or more second outer lateral frames and one or more second frame connection portions.

Each of the first and second lower elastic units (2160-1, 2160-2) may comprise a connection frame (2164-1, 2164-2) mutually connecting the second outer lateral frames (2162-1 to 2162-3).

Each width of connection frames (2164-1, 2164-2) may be smaller (narrower) than that of second outer lateral frames (2162-1 to 2162-3), but the present invention is not limited thereto.

In order to avoid a spatial interference with the second coil (2230) and the first magnet (2130), the connection frames (2164-1, 2164-2) may be positioned outside of coil units (2230-1 to 2230-4) and the magnets (2130-1 to 2130-4) based on the coil units (2230-1 to 2230-4) and the magnets (2130-1 to 2130-4). At this time, the outside of the coil units (2230-1 to 2230-4) and the magnets (2130-1 to 2130-4) may be an opposite side of a region where a center of bobbin (2110) or a center of housing is situated, based on the coil units (2230-1 to 2230-4) and the magnets (2130-1 to 2130-4).

Furthermore, for example, the connection frames (2164-1, 2164-2) may be so positioned as not to overlap with the coil units (2230-1 to 2230-4) and/or the magnets (2130-1 to 2130-4) to an optical axis direction, but the present invention is not limited thereto, and in another exemplary embodiment, at least a part of the connection frames (2164-1, 2164-2) may be aligned or overlapped with the coil units (2230-1 to 2230-4) and/or the magnets (2130-1 to 2130-4) to an optical axis direction.

The upper elastic units (2150-1 to 2150-4) and the lower elastic units (2160-1, 2160-2) may be formed with a leaf spring, but the present invention is not limited thereto, and may be formed with a coil spring.

The abovementioned "elastic unit (e.g., 2150 or 2160)" may be expressed by being replaced with a "spring", and the "outer lateral frame (e.g., 2152 or 2162)" may be expressed by being replaced with an "outer lateral portion", and the "inner lateral frame (e.g., 2151 or 2161)" may be expressed by being replaced with an "inner lateral portion" and the support member (e.g., 2220) may be expressed by being replaced with a wire.

Next, the support members (2220-1 to 2220-4) will be explained.

The support members (2220-1 to 2220-4) may be disposed on the corner portions (2142-1 to 2142-4) of housing (2140), and may mutually connect upper elastic units (2150-1 to 2150-4) and a circuit substrate (2250).

Each of the support members (2220-1 to 2220-4) may be coupled to any corresponding one of first to fourth upper elastic units (2150-1 to 2150-4) and may electrically connect any corresponding one of first to fourth upper elastic units (2150-1 to 2150-4) and any corresponding one of terminals (2251-1 to 2251-n, e.g., n=4) of circuit substrate (2250).

The support members (2220-1 to 2220-4) may be spaced apart from the housing (2140), and may not be fixed to the housing (2140), and one end of support members (2220-1 to 2220-4) may be directly connected or coupled with the second coupling portion (2510) of upper elastic units (2150-1 to 2150-4). Furthermore, the other end of support members (2220-1 to 2220-4) may be directly connected or coupled to the circuit substrate (2250).

For example, the support members (2220-1 to 2220-4) may pass through a hole (2147) provided on the corner portions (2142-1 to 2142-4) of housing (2140), but the present invention is not limited thereto. In another exemplary embodiment, the support members may be adjacently disposed to a boundary between the lateral portions (2141-1 to 2141-4) of housing (2140) and the corner portions (2142-1 to 2142-4), and may not pass through the corner portions (2142-1 to 2142-4) of housing (2140).

The first coil (2120) may be electrically connected to the first and second lower elastic units (2160-1, 2160-2).

For example, the first coil (2120) may be directly connected or coupled to any corresponding one of the second inner lateral frames of the first and second lower elastic units (2160-1, 2160-2). For example, the second inner lateral frame (2161) of the first lower elastic unit (2160-1) may comprise a first bonding portion (2043a) coupled to one end of first coil (2120), and the second inner lateral frame (2161) of the second lower elastic unit (2160-2) may comprise a second bonding portion (2043b) coupled to the other end of first coil (2120).

Each of the first and second bonding portions (2043a) may be formed with a hole (2008a) to guide the coil (2120).

The first support member (2220-1) may be disposed on a first corner portion (2142-1) of housing (2140), and may be coupled to the second coupling portion (2510) of first upper elastic unit (2150-1).

The second support member (2220-2) may be disposed on the second corner portion (2142-2) of housing (2140), and may be coupled to the second coupling portion (2510) of second upper elastic unit (2150-2).

The third support member (2220-3) may be disposed on the third corner portion (2142-3) of housing (2140) and may be coupled to the second coupling portion (2510) of third upper elastic unit (2150-3).

The fourth support member (2220-4) may be disposed on the fourth corner portion (2142-4) of housing (2140) and may be coupled to the second coupling portion (2510) of fourth upper elastic unit (2150-4).

The first terminal (B1) of circuit substrate (2190) may be electrically connected to the first support member (2220-1), the second terminal (B2) of circuit substrate (2190) may be electrically connected the second support member (2220-2), the third terminal (B3) of circuit substrate (2190) may be electrically connected the third support member (2220-3), and the fourth terminal (B4) of circuit substrate (2190) may be electrically connected the fourth support member (2220-4).

Each of the first to fourth support members (2220-1 to 2220-4) may be electrically connected to any corresponding one of the first to fourth terminals (e.g., 251-1 to 251-n, n=4) of circuit substrate (2250).

For example, the power signals (VDD, GND) may be provided to the first and second support members (2220-1, 2220-2) through the first and second terminals (2251-1, 2251-2) of circuit substrate (2250).

For example, the power signals (VDD, GND) may be provided to the first and terminals (B1, B2) of circuit substrate (2190) through the first and second support members (2220-1, 2220-2) and the first and second upper elastic units (2150-1, 2150-2).

Furthermore, the first position sensor (2170) may receive the power signals (VDD, GND) through the first and terminals (B1, B2) of circuit substrate (2190).

For example, the first terminal (B1) of circuit substrate (2190) may be any one terminal of VDD terminal and GND terminal, and the second terminal (B2) may be any other terminal of VDD terminal and GND terminal.

Furthermore, the third and fourth support members (2220-3, 220-4) may be provided with a clock signal (SCL) and a data signal (SDA) through the third and fourth terminals (2251-3, 251-4) of circuit substrate (2250).

The clock signal (SCL) and data signal (SDA) may be provided to the third and fourth terminals (B3, B4) of circuit substrate (2190) through the third and fourth support members (2220-3, 2220-4) and the third and fourth upper elastic units (2150-3, 2150-4).

Furthermore, the first position sensor (2170) may receive the clock signal (SCL) and data signal (SDA) through the third and fourth terminals (B3, B4) of circuit substrate (2190).

For example, the first position sensor (2170) may receive the power signal (VDD) through the first terminal (2251-1) of circuit substrate (2250), the first support member (2220-1), the first upper elastic unit (2150-1) and the first terminal (B1) of circuit substrate (2190).

The first position sensor (2170) may receive the power signal (GND) through the second terminal (2251-2) of circuit substrate (2250), the second support member (2220-2), the second upper elastic unit (2150-2) and the second terminal (B2) of circuit substrate (2190).

Furthermore, the first position sensor (2170) may receive the clock signal (SCL) through the third terminal (2251-3) of circuit substrate (2250), the third support member (2220-3), the third upper elastic unit (2150-3) and the third terminal (B3) of circuit substrate (2190).

The first position sensor (2170) may receive the data signal (SDA) through the fourth terminal (2251-4) of circuit substrate (2250), the fourth support member (2220-4), the fourth upper elastic unit (2150-4) and the fourth terminal (B4) of circuit substrate (2190).

Each of the fifth and sixth terminals (B5, B6) of circuit substrate (2190) may be connected or coupled to any corresponding one of the second outer lateral frame (2162-1) of first and second lower elastic units (2160-1, 2160-2).

The second outer lateral frame (2162-1) of first lower elastic unit (2160-1) may be disposed with a first bonding portion (2081a) to allow the fifth terminal (B5) of circuit substrate (2190) to be coupled by a solder or a conductive adhesive member. Furthermore, the second outer lateral frame (2162-1) of second lower elastic unit (2160-2) may be disposed with a second bonding portion (2081b) to allow the sixth terminal (B6) of circuit substrate (2190) to be coupled by a solder or a conductive adhesive member.

For example, the second outer lateral frame (2162-1) of first lower elastic unit (2160-1) may be disposed with a first hole (2082a, or a first groove) through which the fifth terminal (B5) of circuit substrate (2190) is inserted or disposed, and the second outer lateral frame (2162-1) of second lower elastic unit (2160-2) may be disposed with a second hole (2082b, or a second groove) through which the sixth terminal (B6) of circuit substrate (2190) is inserted or disposed.

For example, each of the first and second holes (2082a, 2082b) may pass through the second outer lateral frame (2161-1) and may be formed with an opening opened toward one lateral surface of second outer lateral frame (2161-1), but the present invention is not limited thereto, and in another exemplary embodiment, each of the first and second holes (2082a, 2082b) may not be formed with an opening opened toward one lateral surface of second outer lateral frame (2161-1).

The cohesion and solderability between the two elements can be improved by increased coupled area, because the fifth terminal {B5, or the sixth terminal (B6)} is coupled to the first bonding portion (2081a, or the second bonding portion (2081b)} provided with the first groove {2082a, or the second groove (2082b)} by a solder or a conductive adhesive member, while the fifth terminal {B5, or the sixth terminal (B6)} of circuit substrate (2190) is inserted into the first groove {2082a, or the second groove (2082b)} of second outer lateral frame (2162-1) of the first lower elastic unit (2160-1).

Referring to FIG. 57, each one end (e.g., a lower end or a lower surface) of the fifth and sixth terminals (B5, B6) may be so disposed as to be lower than a lower end or a lower surface of the second outer lateral frame (2162-1) of first and second lower elastic units (2160-1, 2160-2). Because FIG. 57 is a bottom view, the lower surface of each of the fifth and sixth terminals (B5, B6) may be expressed as being positioned lower than the lower end or the lower surface of second outer lateral frame (2162-1). This is to improve the solderability between each one end of fifth and sixth terminals (B5, B6) and the first and second bonding portions (2081a, 2081b) of the first and second lower elastic units (2160-1, 2160-2).

Furthermore, referring to FIG. 57, the housing (2140) may comprise a groove (2031) depressed from a lower surface of first lateral surface (2141-1). For example, a floor surface of groove (2031) of housing (2140) may have a step with a lower surface of housing (2140) to an optical axis direction. For example, the floor surface of groove (2031) of housing (2140) may be positioned higher than a lower surface of housing (2140).

The groove (2031) of housing (2140) may be overlapped with the first and second bonding portions (2081*a*, 2081*b*) of first and second lower elastic units (2160-1, 2160-2) to an optical axis direction.

Furthermore, although the groove (2031) of housing (2140) may be overlapped with holes (2082*a*, 2082*b*) of the second outer lateral frame (2162-1) (2081*a*, 2081*b*) of first and second lower elastic units (2160-1, 2160-2) to an optical axis direction, both elements may not be overlapped in another exemplary embodiment.

An area of fifth and sixth terminals (B5, B6) of circuit substrate (2190) opened from the housing (2140) can be increased by the groove (2031) of housing (2140), a space accommodated by a solder or conductive adhesive member can be obtained to thereby improve the solderability, the degree of solder being downwardly protruded underneath the second outer lateral frame (2162-1) can be reduced, and therefore, the spatial interference with the second coil (2230) disposed underneath the lower elastic unit, the circuit (2250) or the base (2210) can be restricted or prevented.

Furthermore, although a lower surface (2011*c*) of first magnet (2130) disposed on the accommodation portion (2141*a*) of housing (2140) may be positioned to be lower than a lower surface of second outer lateral frame (2162-1 to 2162-3) of first and second lower elastic units (2160-1, 2160-2), the present invention is not limited thereto, and in another exemplary embodiment, the lower surface (2011*c*) of first magnet (2130) may be higher than the lower surface of second outer lateral frame (2162-1 to 2162-3) or a lower surface of housing (2140), or may have the same height.

In order to allow the first magnet (2130) to be spaced apart from the second coil (2230) and the circuit substrate (2250), the other end of support member (2220) may be coupled with the circuit substrate {2250, or circuit substrate (2231)} at a position lower than the lower surface (2011*c*) of first magnet (2130).

The elastic members (2150, 2160) and the support member (2220) may be embodied by members, such as, e.g., a suspension wire, a leaf spring, or a coil spring that are electrically conductive and supportable by elasticity. Furthermore, in another exemplary embodiment, the support member (2220) may be integrally formed with the upper elastic member (2150).

Next, the base (2210), the circuit substrate (2250), the second coil (2230) and the adhesive member (2290) will be explained.

Referring to FIG. 58, the base (2210) may be disposed with an opening (C3) corresponding to an opening of the bobbin (2110), or/and an opening of housing (2140), and may take a shape, e.g., a square shape, matching or corresponding to that of the cover member (2300). For example, the opening (C3) of base (2210) may take a through hole shape that passes through the base (2210) to an optical axis direction.

The base (2210) may have a staircase (2211) to be coated with an adhesive when the cover member (2300) is adhesively fixed. At this time, the staircase (2211) may guide a lateral plate (2302) of cover member (2300) that is to be coupled to an upper side, and the staircase (2211) may be contacted by a lower end of the lateral plate (2302) of cover member (2300). The staircase (2211) of base (2210) and the lower end of lateral plate (2302) of cover member (2300) may be adhesively fixed by an adhesive or the like.

A region of base (2210) facing a terminal surface (2253) provided with terminals (2251-1 to 2251-*n*) of circuit substrate (2250) may be disposed with a pedestal (2255). The pedestal (2255) may support the terminal surface (2253) of circuit substrate (2250) formed with terminals (2251-1 to 2251-*n*) of circuit substrate (2250). For example, the pedestal (2255) may take a groove shape depressed from an outer lateral surface of base (2210), but the present invention is not limited thereto, and in another exemplary embodiment, the pedestal (2255) may take the same plane shape as that of the outer lateral surface of base (2210) or may take a protruding shape.

A lateral surface of circuit substrate (2250) may be formed with a protruder (2048) or a lug protruded or extended to an outer surface of the base (2210), and the outer surface of base (2210) may be formed with a groove (2028) or a coupling groove having a shape corresponding to a position corresponding to that of protruder (2048) of circuit substrate (2250). The protruder (2048) of circuit substrate (2250) may be disposed with, accommodated into, or coupled to the groove (2028) of base (2210).

The base (2210) may be disposed with an escape portion (2212) for avoiding a spatial interference with the support member (2220).

For example, the base (2210) may have an escape portion (2212) at an edge region corresponding to that of the cover member (2300). The escape portion (2212) may take a shape of a groove or a hole to avoid a spatial interference with the support member (2220) and the solder (2902, See FIG. 51) coupling the support member (2220) and circuit substrate (2250).

For example, the escape portion (2212) of base (2210) may take a concaved groove shape depressed from the outer lateral surface of corner of base (2210) toward a center direction of base (2210). The escape portion (2212) of base (2210) may be opened to an upper surface and a lower surface of base (2210).

For example, the escape portion (2212) of base (2210) may expose a partial region (e.g., a first region or a corner region) of a lower surface of circuit substrate (2250). In another exemplary embodiment, the escape portion (2212) of base (2210) may expose a partial region (e.g., corner region) of a lower surface of circuit member (2231).

An inner surface of corner of cover member (2300) and the escape portion (2212) of base (2210) may be mutually coupled by an adhesive member (not shown).

An upper surface of base (2210) may be provided with an accommodation groove (2215-1, 215-2) disposed with a second position sensor (2240).

For example, the accommodation groove (2215-1, 215-2) of base (2210) may be adjacently formed to any one escape portion provided on any one corner of base (2210), and a second accommodation groove (2215-2) of base (2210) may be adjacently formed to any other escape portion of any one corner of base (2210).

For example, the first accommodation groove (2215-1) of base (2210) may be formed on an upper surface of base (2210) interposed between any one escape portion of base (2210) and a protruder (2019), and the second accommodation groove (2215-2) may be formed on an upper surface of base (2210) interposed between any other escape portion of base (2210) and the protruder (2019).

Furthermore, for example, a lower surface of base (2210) may be formed with an accommodation portion (not shown) installed with a filter (2610) of a camera module (2200).

Furthermore, an upper surface around the opening (C3) of base (2210) may be provided with an opening (C2) of circuit substrate (2250) and a protruder (2019) for coupling with an opening (C1) of circuit member (2231).

The protruder (2019) of base (2210) may take a same shape, e.g., a round shape, as that of the opening (C3), but the present invention is not limited thereto. For example, the protruder (2019) may take a round shape, but the present invention is not limited thereto, and may comprise mutually discrete plurality of portions.

The base (2210) may comprise a lug (2032) protruded from an upper surface in order to be coupled with a coupling groove (2033) of circuit substrate (2250).

For example, the coupling groove (2033) of circuit substrate (2250) may be formed on an inner surface of circuit substrate (2250) formed by the opening (C2), and may take a shape depressed from an inner surface of circuit substrate (2250). Furthermore, the lug (2032) of base (2210) may face or correspond to the coupling groove (2033) of circuit substrate (2250) to an optical axis direction, and the lug (2032) may take a shape corresponding or matching to that of the coupling groove (2033) of circuit substrate (2250). For example, the lug (2032) may be brought into contact with an outer surface of protruder (2019) of base (2210).

The second coil (2230) may be disposed on an upper surface of circuit substrate (2250), and the OIS position sensors (2240a, 2240b) may be disposed within the accommodation grooves (2215-1,215-2) of base (2210) disposed underneath the circuit substrate (2250).

A second position sensor (2240) may comprise the first and second OIS position sensors (2240a, 2240b), and the OIS position sensors (2240a, 2240b) may detect the displacement of OIS mover to a direction perpendicular to an optical axis. Here, the OIS mover may comprise an AF mover and elements mounted on the housing (2140).

For example, the OIS mover may comprise an AF mover and a housing (2140), and depending on exemplary embodiments, may further comprise a first magnet (2130).

The circuit substrate (2250) may be disposed on an upper surface of base (2210), and may comprise an opening (C2) corresponding to an opening of bobbin (2110), an opening of housing (2140) or/and an opening (C3) of base (2210). The opening (C2) of circuit substrate (2250) may be a through hole or a hollowed hole.

The circuit substrate (2250) may take a shape, e.g., a square shape, corresponding or matching to an upper surface of base (2210).

The circuit substrate (2250) may comprise a plurality of terminals (2251-1 to 2251-n, n is a natural number where n>1) bent from an upper surface and receiving an electrical signals from an outside, or at least one staircase surface (2253) that is provided with pins.

For example, referring to FIG. 59, the circuit substrate (2250) may comprise two mutually-facing or oppositely-positioned terminal surfaces (2253-1, 2253-2), but the present invention is not limited thereto, and the number of terminal surfaces (2253) may be more than one.

The second coil (2230) may be disposed underneath the bobbin (2110). For example, the second coil (2230) may be disposed underneath the housing (2140). For example, the second coil (2230) may be disposed underneath the magnet (2130).

The second coil (2230) may be disposed on an upper surface of circuit substrate (2250) facing or corresponding to the magnets (2130-1 to 2130-4) disposed on the housing (2140).

The second coil (2230) may comprise coil units (2230-1 to 2230-4) that face magnets (2130-1 to 2130-4) disposed on the housing (2140) to an optical axis direction or overlapped to an optical axis direction.

For example, the second coil (2230) may comprise a circuit member (2231) and a plurality of coil units (2230-1 to 2230-4) formed on the circuit member (2231). Here, the circuit member (2231) may be expressed as a "substrate", a "circuit substrate", or a "coil substrate" and the like. In another exemplary embodiment, the second coil (2230) may comprise coil units (2230-1 to 2230-4) while omitting the circuit member (2231).

The circuit member (2231) may take a shape, e.g., a square shape, corresponding or matching to that of an upper surface of base {2210, or circuit substrate (2250)}.

For example, four (4) coil units (2230-1 to 2230-4) may be disposed or formed on a corner or corner regions of polygonal (e.g., a square shape) circuit member (2231). Each of the coil units (2230-1 to 2230-4) may take a shape corresponding or matching to that of magnets (2130-1 to 2130-4) to an optical axis direction.

For example, each of the coil units (2230-1 to 2230-4) may take a closed curve shape, e.g., a ring shape that rotates about an optical axis, when viewed from above.

Each of the coil units (2230-1 to 2230-4) may take a coil block shape formed with an FP (Fine Pattern) coil, but the present invention is not limited thereto.

In the exemplary embodiments where magnets are disposed on lateral portions of housing (2140), the coil units of second coil may be so disposed as to be parallel with sides of circuit member (2231), and may take a shape corresponding or matching to that of magnet disposed on the lateral portions of housing.

For example, the second coil (2230) may comprise second directional two coil units (2230-1, 2230-3) and third directional two coil units (2230-2, 2230-4), but the present invention is not limited thereto.

For example, the coil units (2230-1, 2230-3) may be disposed on any two corner regions of circuit member (2231) that mutually face to a first diagonal direction of circuit member (2231), and the coil units (2230-2, 2230-4) may be disposed on any other two corner regions of circuit member (2231) that mutually face to a second diagonal direction of circuit member (2231).

The first diagonal direction and the second diagonal direction may be mutually perpendicular directions. For example, the first diagonal direction may be an X axis direction and the second diagonal direction may be a Y axis direction.

The second directional coil units (2230-1, 2230-3) may be such that the electromagnetic forces, caused by interaction with the magnets (2130-1, 2130-3) that correspond to an optical axis direction, are applied to the same direction. Furthermore, the third directional coil units (2230-2, 2230-4) may be such that the electromagnetic forces, caused by interaction with the magnets (2130-2, 2130-4) that correspond to an optical axis direction, are applied to the same direction.

In another exemplary embodiment, the second coil (2230) may have only one second directional coil unit and only one third directional coil unit, and four (4) or more coil units may also be comprised.

The second coil (2230) may be electrically connected to the circuit substrate (2250). For example, the second coil (2230) may be electrically connected to terminals (2251) of circuit substrate (2250).

The second coil (2230) may be provided from the circuit substrate (2250) with an electric power or a driving signal. The electric power or driving signal provided to the second coil (2230) may be a DC signal or an AC signal, or comprise a DC signal and an AC signal, or may take a current or voltage type.

The housing (2140) may be moved to a second and/or third direction, e.g., X axis and/or Y axis direction by the interaction between the magnets (2130-1 to 2130-4) and driving signal-provided second coils (2230-1 to 2230-4), whereby the OIS (handshaking correction) operation can be implemented.

Referring to FIGS. 59 and 60, the second coil (2230) may comprise terminals (2030A to 2030D) for receiving a driving signal from the circuit substrate (2250).

For example, the circuit substrate (2231) may be disposed with four (4) terminals (2030A to 2030D). For example, the said four terminals (2030A to 2030D) may be disposed or provided on a lower surface of circuit substrate (2231).

For example, the four terminals (2030A to 2030D) may adjacently be formed at least to one lateral surface of circuit member (2231). For example, two terminals (230B, 30D) of circuit member (2231) may be disposed on a lower surface of circuit member (2231) adjacent to a first lateral surface of circuit member (2231), and may be interposed between the third coil unit (2230-1) and the fourth coil unit (2230-4).

The remaining two terminals (2030A, 2030C) of circuit member (2231) may be disposed at a lower surface of circuit member (2231) adjacent to a second lateral surface of circuit member (2231), and may be interposed between the first coil unit (2230-2) and the second coil unit (2230-2).

For example, the first lateral surface and the second lateral surface of circuit substrate (2231) may mutually face each other or may mutually be disposed at an opposite side.

Any two coil units among the four coil units may mutually be connected in series, and any remaining two coil units may mutually be connected in series.

For example, the first coil unit (2230-1) and the third coil unit (2230-4) may be mutually connected in series, and the second coil unit (2230-2) and the fourth coil unit (2230-4) may be mutually connected in series.

The two serially connected coil units may be electrically connected to any two terminals among the four terminals of circuit member (2231), and two serially connected remaining coil units may be connected to any remaining two terminals among the four terminals of circuit member (2231).

For example, one end of first coil unit (2230-1) may be electrically connected to the first terminal (2030A) of circuit substrate (2231), and one end of third coil unit (2230-1) may be electrically connected to the second terminal (2030B) of circuit member (2231), and the other end of first coil unit (2230-1) and the other end of third coil unit (2230-3) may be mutually and electrically connected. For example, the other end of first coil unit (2230-1) and the other end of third coil unit (2230-3) may be electrically connected through a first conductive pattern or a first wire formed within the circuit member (2231).

For example, one end of the second coil unit (2230-1) may be electrically connected to the third terminal (2030C) of circuit member (2231), one end of fourth coil unit (2230-4) may be electrically connected to a fourth terminal (2030D) of circuit member (2231), and the other end of third coil unit (2230-3) and the other end of fourth coil unit (2230-4) may be mutually and electrically connected. For example, the other end of third coil unit (2230-3) and the other end of fourth coil unit (2230-4) may be electrically connected through a second conductive pattern or a second wire formed within the circuit member (2231).

The circuit substrate (2250) may comprise pads (2027a to 2027d) for being electrically connected to the coil units (2230-1 to 2230-4). Here, pads (2027a to 2028d) may be expressed by being replaced with "terminals" or "bonding portions".

The circuit substrate (2250) may comprise pads (2027a to 2027d) corresponding to or facing the first to fourth terminals (2030A to 2030D) of circuit substrate (2231) to an optical axis direction, and each pad may be electrically connected to any one terminal of the first to fourth terminals (2030A to 2030D) of circuit member (2231).

For example, pads (2027a to 2027d) of circuit substrate (2250) may be disposed or provided at a lower surface of circuit substrate (2250). Each of the pads (2027a to 2027d) of circuit substrate (2250) may comprise a groove exposing any one corresponding part of terminals (2030A to 2030D) of circuit member (2231). Each of the pads (2027a to 2027d) of circuit substrate (2250) and corresponding terminals (2030A to 2030D) of circuit substrate (2231) thereto may be mutually coupled, or mutually and electrically connected by a conductive adhesive member or a solder (239A).

For example, the pads (2027a to 2027d) of circuit substrate (2250) may be disposed or formed at a lower surface of circuit substrate (2250) adjacent to at least one lateral surface of circuit substrate (2250) not formed with a terminal surface (2253).

For example, two second directional coil units (2230-1, 2230-3) may be mutually connected in series, and one end of the serially connected coil units (2230-1, 2230-3) may be electrically connected to a first pad (2027a) of circuit substrate (2250), and the other end of the serially connected coil units (2230-1,2230-3) may be electrically connected to a second pad (2027b) of circuit substrate (2250).

Furthermore, for example, two third directional coil units (2230-2, 2230-4) may be mutually connected in series, and one end of the serially connected coil units (2230-2, 2230-4) may be electrically connected to a third pad (2027c) of circuit substrate (2250), and the other end of the serially connected coil units (2230-2,2230-4) may be electrically connected to a fourth pad (2027d) of circuit substrate (2250).

The first and fourth pads (2027a, 2027b) of circuit substrate (2250) may be electrically connected to two corresponding terminals of the terminals (2251-1 to 2251-n) of circuit substrate (2250), and the serially connected coil units (2230-1, 2230-3) of circuit substrate (2250) may be provided with a first driving signal through the two corresponding terminals.

The third and fourth pads (2027c, 2027d) of circuit substrate (2250) may be electrically connected to two other corresponding terminals of the terminals (2251-1 to 2251-n) of circuit substrate (2250), and the serially connected coil units (2230-2, 2230-4) of circuit substrate (2250) may be provided with a second driving signal through the two other corresponding terminals.

Although the coil units (2230-1 to 2230-4) in FIG. 58 are embodied by a circuit pattern type, e.g., an FP coil type, formed on a separate circuit member (2231), the present invention is not limited thereto.

In another exemplary embodiment, the coil units (2230-1 to 2230-4) may be omitted with the circuit member (2231), and instead may be implemented by a ring type coil block.

In still another exemplary embodiment, the coil units (2230-1 to 2230-4) may also be implemented by a circuit pattern type, e.g., an FP coil type that is directly formed on the circuit substrate (2250). In this case, the circuit substrate (2250) may be expressed by being replaced with a "circuit member", and the circuit member may comprise a substrate portion formed with coil units (2230-1 to 2230-4) and a terminal portion formed with terminals. The substrate portion may be applied or applied mutatis mutandis with an explanation of circuit substrate (2250), and the terminal portion may be applied or applied mutatis mutandis with an explanation of the terminal portions (2253, 2253-1, 2253-2) of circuit substrate (2250).

Furthermore, as mentioned above, at least one of the circuit member (2231) or/and the circuit substrate (2250) may be formed with a hole or an escape groove in order to avoid a spatial interference with the support member (2220).

The circuit member (2231) may be provided with an escape groove (2024) in order to avoid a spatial interference with the fifth and sixth terminals (B5, B6) of circuit substrate (2190). For example, the escape groove (2024) may be formed at any one lateral of a circuit member (2231) in order to correspond to, face or overlap with the fifth and sixth terminals (B5, B6) of circuit substrate (2190) to an optical axis direction.

For example, the escape groove (2024) may be interposed between the first coil unit (2230-1) and the fourth coil unit (2230-4).

Although the circuit substrate (2250) and the circuit member (2231) are divisibly expressed as a separate element, the present invention is not limited thereto, and in another exemplary embodiment, the circuit substrate (2250) and the circuit member (2231) may be also collectively expressed as a term of a "circuit member" or a "substrate". In this case, the other end of support members may be coupled to the "circuit member (e.g., the lower surface of circuit member)".

In order to avoid a spatial interference with the support member (2220), a corner of circuit member (2231) may be provided with an escape groove (2023) through which the support member (2220) can pass. In another exemplary embodiment, the circuit member may be disposed with a hole or a through hole instead of the escape groove.

Each of the OIS position sensors (2240a, 2240b) may be a Hall sensor, and any sensor capable of detecting the magnetic strength will be sufficient. For example, each of the OIS position sensors (2240a, 2240b) may be implemented alone with a position detection sensor such as a Hall sensor, or may be embodied by a driver type comprising a Hall sensor. When the OIS position sensor (2240a, 2240b) is of a driver type comprising a Hall sensor, the explanation of FIG. 52b may be applied or applied mutatis mutandis.

Each of the OIS position sensors (2240a, 2240b) may detect a magnetic strength of the magnets (2130-1 to 2130-4) in response to motion of the OIS mover to a direction perpendicular to an optical axis direction, and may output an output signal as a result of the detection. The displacement of OIS mover may be detected by using the output signal of each of the OIS position sensors (2240a, 2240b), and the controller (2830, 2780) may perform the OIS feedback handshaking correcting operation using the output signal of the OIS position sensors (2240a, 2240b).

For example, the first OIS position sensor (2240a) may be overlapped with a first straight line linking a first corner of circuit substrate (2250) and a center of an opening (C2) of circuit substrate (2250). The second OIS position sensor (2240b) may be overlapped with a second straight line linking a second corner of circuit substrate (2250) and a center of an opening (C2) of circuit substrate (2250).

For example, a center of first OIS position sensor (2240a) may be aligned or overlapped with the first straight line, and a center of second OIS position sensor (2240b) may be aligned or overlapped with the second straight line, but the present invention is not limited thereto, and the first and second straight lines may be mutually perpendicular.

The terminal surface (2253) of circuit substrate (2250) may be provided with terminals (2251-1 to 2251-n).

Signals (SCL, SDA, VDD, GND) may be transmitted and received for data communication with the first position sensor (2190) through the plurality of terminals (2251-1 to 2251-n) installed on the terminal surface (2253) of circuit substrate (2250), and may provide a driving signal to the OIS position sensors (2240a, 2240b), and may output signals to an outside by receiving the signals outputted from the OIS position sensors (2240a, 2240b).

The circuit substrate (2250) according to the exemplary embodiment may be provided by an FPCB, but the present invention is not limited thereto, and it is possible to directly form the terminals of circuit substrate (2250) on the surface of base (2210) using the surface electrode method.

The circuit substrate (2250) may comprise a hole (2250a) passed by the support members (2220-1 to 2220-4). The position and the number of holes (2250a) may correspond or match to those of the support members (2220-1 to 2220-4). For example, the hole (2250a) may be formed adjacent to a corner of circuit substrate (2250) in correspondence with each support member (2220-1 to 2220-4), and may correspond to or face the escape groove (2023) of circuit member (2231) to an optical axis direction.

Each of the support members (2220-1 to 2220-4) may be coupled to the pads (2031-1 to 2031-4, or circuit pattern) formed at a lower surface of circuit substrate (2250) by passing through the hole (2250a) of circuit substrate (2250) using a solder or a conductive adhesive member.

The circuit substrate (2250) may comprise four pads (2031-1 to 2031-4) coupled to the support members (2220-1 to 2220-4), and each of the pads (2031-1 to 2031-4) of circuit substrate (2250) may be electrically connected to any corresponding one of the terminals (2251-1 to 2251-n) of circuit substrate (2250).

For example, the pads (2031-1 to 2031-4) of circuit substrate (2250) may be adjacently formed at or contacted to the hole (2250a) of circuit substrate (2250). For example, the pads (2031-1 to 2031-4) may be so formed as to wrap the hole (2250a) of circuit substrate (2250).

In another exemplary embodiment, the circuit substrate (2250) may not be formed with a hole through which the support members pass, and the support members (2220-1 to 2220-4) may be electrically connected to a circuit pattern or a pad formed on an upper surface of circuit substrate (2250) through a solder or a conductive adhesive member.

Alternatively, in another exemplary embodiment, the support members (2220-1 to 2220-4) may connect the upper elastic units (2150-1 to 2150-4) and the circuit member (2231), and may electrically connect the upper elastic units (2150-1 to 2150-4) and the circuit member (2231), and support members (2220-1 to 2220-4) may be electrically connected to the circuit substrate (2250) through the circuit member (2231).

Because the exemplary embodiment provides a structure where a driving signal is directly supplied from the first position sensor (2170) to the first coil (2120), the number of support members may be decreased and an electrical connection structure may be simplified, compared with a structure where a driving signal is directly provided to the first coil (2120) through the circuit substrate (2250).

Furthermore, because the first position sensor (2170) may be embodied by a temperature-measurable driver IC, an output of Hall sensor can be compensated to allow having a minimum change in response to temperature change, and accuracy of AF driving can be improved regardless of temperature change to allow having a constant inclination in response to the temperature change by compensating the output of the Hall sensor.

The cover member (2300) may accommodate, within an accommodation space formed along with a base (2210), a bobbin (2110), a first coil (2120), a first magnet (2130), a housing (2140), an upper elastic member (2150), a lower elastic member (2160), a first position sensor (2170), a second magnet (2180), a circuit substrate (2190), a support member (2220), a second coil (2230), a second position sensor (2240) and a circuit substrate (2250).

The housing (2140) may be disposed at an inner lateral of cover member (2300).

The cover member (2300) may take a box shape with a lower part being opened and comprising an upper plate (2301) and lateral plate (2302), and the lower part (e.g., a lower part of lateral plate (2302)) of cover member (2300) may be coupled with the base (2210)(e.g., staircase (2211) or/and an escape portion (2212-1 to 212-4)). The upper plate (2301) of cover member (2300) may take a round or polygonal shape, e.g., a square shape or an octagonal shape, but the present invention is not limited thereto.

The cover member (2300) may comprise, at an upper plate (2301), an opening (2303) exposing a lens (not shown) coupled with the bobbin (2110) to an outside light. The opening (2303) may take a through hole shape passing through the upper plate (2301), or a hollowed hole shape.

Although the material of cover member (2300) may be a non-magnetic substance such as SUS in order to prevent the phenomenon of being attached to a first magnet (2130), the cover member may be formed with a magnetic material to allow functioning as a yoke improving an electromagnetic force between the first coil (2120) and the first magnet (2130).

In order to reduce a length of a path where the power signals (GND, VDD) are transmitted to the first position sensor (2170), the following elements may be comprised.

First, the first and second terminals (B1, B2) of circuit substrate (2190) for being supplied with the power signals (GND, VDD) may be made to be electrically connected to the first and second support members (2220-1, 2220-1) disposed at the two corner portions (2142-1, 2142-2) adjacent to the first lateral portion (2141-1) of housing where the first position sensor (2170) is disposed, whereby the path can be reduced.

Furthermore, the first and second terminals (B1, B2) of circuit substrate (2190) may be disposed on the body part (S1) of circuit substrate (2190) to thereby enable to shorten the path.

Furthermore, the first terminal (B1) may be disposed at one end of the circuit substrate (2190) to allow the first terminal (B1) of circuit substrate (2190) to be overlapped with the first corner portion (2142-1) of housing (2140) to an optical axis direction, and the second terminal (B2) may be disposed at the other end of the circuit substrate (2190) to allow the second terminal (B2) of circuit substrate (2190) to be overlapped with the second corner portion (2142-2) of housing (2140) to an optical axis direction, whereby the path can be decreased.

Furthermore, a discrete distance (e.g., a shortest discrete distance) between the first terminal (B1) of circuit substrate (2190) and the first support member (2220-1) may be shorter than a discrete distance (e.g., a shortest discrete distance) between the third terminal (B3) of circuit substrate (2190) and the first support member (2220-1) and a discrete distance (e.g., a shortest discrete distance) between the fourth terminal (B4) of circuit substrate (2190) and the first support member (2220-1)

Furthermore, a discrete distance (e.g., a shortest discrete distance) between the second terminal (B2) of circuit substrate (2190) and the second support member (2220-2) may be shorter than a discrete distance (e.g., a shortest discrete distance) between the third terminal (B3) of circuit substrate (2190) and the second support member (2220-1) and a discrete distance (e.g., a shortest discrete distance) between the fourth terminal (B4) of circuit substrate (2190) and the second support member (2220-4).

The decreased path as abovementioned above can reduce each length of first and second extension portions (P1, P2) to thereby reduce the path resistance {e.g., resistance of first and second upper elastic units (2150-1, 2150-2)}.

Furthermore, because the first upper elastic unit (2150-1) connected to the first terminal (B1) of circuit substrate (2190) and the second upper elastic unit (2150-2) connected to the second terminal (B2) may respectively have a first outer lateral frame coupled to the housing (2140), but may not have the first inner lateral frame (2151) and the first frame connection part, resistance can be decreased compared with the second and fourth upper elastic units (2150-3, 2150-4).

The exemplary embodiment can reduce the length of path in which the power signal (GND, VDD) is transmitted to the first position sensor (2170) due to the reason thus mentioned, where the path resistance {e.g., resistance of first and second upper elastic units (2150-1, 2150-2)} can be reduced, whereby reduction of power signal (GND, VDD) can be prevented, and power consumption can be reduced, and the operation voltage of driver IC of the first position sensor (2170) can be reduced.

The first to sixth terminals (P1 to P6) in the exemplary embodiment can be disposed on the second surface (2019a) of circuit substrate (2190) in order to improve the solderability by facilitating the soldering for electrical coupling with the first to fourth extension parts (P1 to P4) of upper elastic units (2150-1 to 2150-4).

If the first to sixth terminals (P1 to P6) are disposed on the first surface (2019b) of circuit substrate (2190), the soldering becomes to be difficult, to thereby decrease the solderability, and foreign objects (e.g., pollutants) may be introduced into the lens driving device (2100), whereby resultantly, the lens driving device may be erroneously operated.

Because the third and fourth terminals (B3, B4) are interposed between the first terminal (B1) and the second terminal (B2), and in order to reduce the path, the circuit substrate (2190) is structurally extended or protruded to the first corner portion (2142-1) of housing (2140) and the second corner portion (2142-2), some {e.g., the third extension part (P3) or the fourth extension part (P4)} of each of the third upper elastic unit (2150-3)) and the fourth upper elastic unit (2150-3) may pass through the circuit substrate (2190) to be coupled with the third and fourth terminals (B3, B4).

The fifth and sixth terminals (B5, B6) of circuit substrate (2190) may be disposed on the extension part of circuit substrate (2190) in order to facilitate the coupling with the lower elastic units (2160-1, 2160-2).

The magnetic field interference between the first and second magnets (2180, 2185) and the first magnet (2130) in the exemplary embodiment is alleviated to thereby prevent the AF driving force from being decreased due to magnetic interference, whereby a desired AF driving force can be obtained without installing a separate yoke.

As mentioned above, the number of support members can be reduced, and the size of lens driving device can be decreased due to the reduced number of support members.

Furthermore, due to the reduced number of support members, the resistance of support members can be reduced to thereby decrease the consumption current, and to improve the sensitivity of OIS driving.

In addition, the thickness of support members can be increased in order to obtain the same elasticity instead of reducing the number of support members, and due to the increased thickness of support members, the influence of the OIS mover caused by an outer lateral shock can be reduced.

FIG. 61 is a perspective view of a cushioning stopper (2310D) and FIG. 62 is a cross-sectional view of a housing (2140) and a cushioning stopper (2310D). FIG. 62 may be a cross-sectional view of a housing (2140) of FIG. 49b and a cushioning stopper (2310D) to an EF direction. The explanation on the cushioning stoppers of FIGS. 61 and 62 may be equally applied or applied mutatis mutandis to remaining other cushioning stoppers (2310A to 2310C).

At least a part (some) of the cushioning stopper (2310D) may be disposed within a groove (2049) of housing (2140), and at least some other part of the cushioning stopper (2310D) may be horizontally protruded from an outer lateral surface (2140a) of housing (2140) to a horizontal direction. For example, the horizontal direction may be a direction that is perpendicular to an optical axis and that faces toward the outer lateral surface (2140a) of housing (2140) from the optical axis, or a direction perpendicular to the outer lateral surface (2140a) of housing (2140).

For example, the cushioning stopper (2310D) may comprise a first part (2031A) disposed within a groove (2049) of the housing (2140), and a second part (2031B) connected to the first part (2031A) and protruded from the outer lateral surface (2140a) of housing (2140) to a horizontal direction.

For example, the second part (2031B) may be protruded outside of groove (2049). The cushioning stopper (2310D) may be protruded from the outer lateral surface (2140a) of housing (2140) to a direction of lateral plate (2302) of cover member (2300) based on the outer lateral surface of housing (2140).

The cushioning stopper (2310D) may fill the groove (2049), and the first part (2031A) of cushioning stopper (2310D) may abut a floor surface (2049a) of groove (2049) and a lateral wall (2049b).

The cushioning stopper (2310D), at an initial position of OIS mover, may be spaced apart from an inner surface (or an inner lateral surface) of lateral plate (2302) of cover member (2300).

The initial position of OIS mover may be an initial position of OIS mover in a state when no driving signal or a power is applied to the second coil (2230), or a position where the OIS mover is laid when the elastic member (2150, 2160) and the support member (2220) are elastically changed only by the weight of the OIS mover.

In addition, the initial position of OIS mover may be a position where the OIS is situated when the gravity is applied from bobbin (2110) to a base (2210), or conversely, when the gravity is applied from base (2210) to bobbin (2110) or where the OIS is situated when an optical axis direction is inclined relative to the gravity direction.

When the OIS mover {e.g., housing (2140)} is moved or tilted by an external shock or an OIS driving to a direction perpendicular to an optical axis, the OIS mover {e.g., housing (2140)} is saved from being damaged by absorbing and alleviating the shock applied to the OIS mover by collision between the OIS mover {e.g., housing (2140)} and the cover member (2300) that might have been The cushioning stopper (2310D) may be expressed by being replaced with a "shock alleviator", a "shock absorber", or a "cushioning member".

The cushioning stopper (2310D) may be formed with a material different from that of the housing (2140).

The cushioning stopper (2310D) may be formed with a material having stiffness smaller than that of housing (2140) in order to absorb or alleviate the shock.

Here, the stiffness (k) may be a ratio (k=F/δ) between a force (F) applied to an elastomer and displacement (δ) therefrom.

For example, the stiffness may be defined by a force required to transform the elastomer to as much as a unit length (e.g., 1 mm).

Furthermore, the stiffness may be defined by Young's modulus. The Young's modulus may be a modulus of elasticity that defines a relationship between stress of linear elastic material (force per unit area) and strain in a uniaxial strain region.

Because the unit of Young's modulus is the unit of pressure, and the Young's modulus may be expressed by pascal, MPa, or GPa.

For example, the stiffness of cushioning stopper (2310D) may be 0.001 GPa~0.01 GPa. For example, the stiffness of housing (2140) may be 6 GPa~14 GPa. For example, the stiffness of cover member (2300) may be 100 GPa~150 GPa.

Alternatively, for example, the stiffness of cushioning stopper (2310D) may be 0.004 GPa~0.008 GPa, and the stiffness of housing (2140) may be 8 GPa~12 GPa, and the stiffness of cover member (2300) may be 120 GPa~130 GPa. That is, the stiffness of cushioning stopper (2310D) may be smaller than that of housing (2140).

The cushioning stopper (2310D) may be formed with a shock-absorbing material such as rubber, silicone, foam or urethane.

For example, the cushioning stopper (2310D) may comprise any one of rubber, silicone, foam and urethane. For example, the cover member (2300) may be formed with a metal or plastic material.

In order to absorb and alleviate the shock, the cushioning stopper (2310D) may be formed with a material having stiffness smaller than that of cover member (2300). For example, the stiffness of cushioning stopper (2310D) may be smaller than that of cover member (2300).

For example, the thickness (T) of cushioning stopper (2310D) may be 0.05 mm~1 mm.

For example, the thickness (T) of cushioning stopper (2310D) may be 0.1 mm~0.5 mm.

Alternatively, for example, the thickness (T) of cushioning stopper (2310D) may be 0.15 mm~0.3 mm.

For example, the thickness (t1) of the first part (2031A) of cushioning stopper (2310D) may be greater than the thickness (t2) of second part (2031B) (t1>t2). This is intended to prevent the cushioning stopper (2310D) from breaking away from the housing (2140) due to shock by improving cohesion between the cushioning stopper (2310D) and the housing (2140) through increased contact area between the cushioning stopper (2310D) and the housing (2140).

The thickness (t1) may be a length of the first part (2031A) to a horizontal direction, and the thickness (t2) may be a length of second part (2031B) to a horizontal direction.

For example, a divided value (t1/t2) in which the thickness (t1) of the first part (2031A) is divided by the thickness (t2) of second part (2031B) may be greater than 1, but smaller than 5.

For example, the said divided value (t1/t2) may be greater than 2 or same as 2, but smaller than 4 or same as 4. For example, the said divided value (t1/t2) may be greater than 2 or same as 2, but smaller than 3 or same as 3.

When the divided value (t1/t2) is smaller than 1, the cohesion between the housing (2140) and the cushioning stopper (2310D) may be worsened by shock to make it easy for the cushioning stopper (2310D) to break away. On the other hand, if the divided value (t1/t2) is greater than 5, the moving scope of OIS mover to a direction perpendicular to an optical direction may be restricted.

For example, the horizontal directional length (L1) of cushioning stopper (2310D) may be greater than the vertical directional length (L2) of cushioning stopper (2310D) (L1>L2).

For example, the vertical directional length (L2) of cushioning stopper (2310D) may be smaller than or same as the length to an optical axis direction of magnet (2130). In another exemplary embodiment, the vertical directional length (L2) of cushioning stopper (2310D) may be greater than the length to an optical axis direction of magnet (2130).

The horizontal direction of cushioning stopper (2310D) may be a direction parallel with the outer lateral surface (2140a) of housing (2140), or a direction from any one corner portion (e.g., 142-2) of housing (2140) adjacent to the cushioning stopper (2310D) toward any other corner portion (e.g., 142-3). The vertical direction of cushioning stopper (2310D) may be a direction perpendicular to the horizontal direction of cushioning stopper (2310D).

The groove (2049) of housing (2140) may be coated therein with an adhesive member, and the first part (2031A) of cushioning stopper (2310D) may be attached or fixed to the groove (2049) of housing (2140) by an adhesive member. At this time, the adhesive member may be an epoxy bond, but the present invention is not limited thereto.

In another exemplary embodiment, the thickness of first part (2031A) of cushioning stopper (2310D) may be equal to that of the second part (2031B).

For example, the cushioning stopper (2310D) may be disposed at one lateral portion of housing (2140). Furthermore, for example, the cushioning stopper (2310D) may be disposed at one lateral portion of housing (2140) and two corner portions adjacent to the said one lateral portion of housing (2140).

For example, the cushioning stopper (2310D) to a horizontal direction may be overlapped with the magnet (2130) disposed on the housing (2140).

For example, the cushioning stopper (2310D) may be interposed between an upper surface of housing (2140) and a lower surface. For example, the cushioning stopper (2310D) may be interposed between the upper elastic member (2150) and the lower elastic member (2160).

For example, the cushioning stopper (2310D) may be interposed between the first outer frame (2152) of upper elastic member (2150) and the second outer frame (2162) of lower elastic member (2160).

For example, the cushioning stopper (2310D) may be interposed between the housing (2140) and an inner surface (or inner portion) of lateral plate (2302) of cover member (2300).

Referring to FIG. 61, the cushioning stopper (2310D) may take a tapered-off shape for at least some portion thereof.

Alternatively, for example, the vertical directional length (L2) of cushioning stopper (2310D) may taper off from the outer lateral surface (2140a) of housing (2140) toward an inner surface direction of lateral plate (2302) of cover member (2300), but the present invention is not limited thereto. In another exemplary embodiment, the vertical directional length (L2) of cushioning stopper (2310D) may be constant or uniform.

For example, at least one corner (R1 to R4) of the cushioning stopper (2310D) may take a round or curved shape. This is to prevent the cushioning stopper (2310D) from being damaged while colliding with the cover member (2300). For example, corners (R1 to R4) of second part (2031B) of the cushioning stopper (2310D) protruded to an outside of groove (2049) of housing (2140) may comprise a round form or a curved shape. Furthermore, for example, a first lateral corner interposed between two corners (R1, R2) of second part (2031B), a second lateral corner interposed between two other corners (R3, R4), an upper corner interposed between two other corners (R1, R3) and a lower corner interposed between two other corners (R2, R4) may be round or curved.

The shape of the cushioning stopper (2310D), when viewed from the front surface, may be polygonal (e.g., square or rectangular), but the present invention is not limited thereto, and the shape of the cushioning stopper (2310D), when viewed from the front surface, may be of a round, oval, or dot, stripe, lattice, grid or mesh shape.

FIG. 63a is a perspective view of a housing (2140) coupled with a cushioning stopper (2320) according to another exemplary embodiment.

Referring to FIG. 63a, the cushioning stopper (2310D) disposed at any one lateral portion of housing (2140) may comprise two cushioning portions (2010A, 2010B), each being mutually spaced apart.

Although the number of cushioning portions illustrated in FIG. 63a is two, the present invention is not limited thereto, and in another exemplary embodiment, the number of cushioning portions may three or more. In this case, the housing (2140) may be disposed with grooves corresponding to the cushioning portions (2010A, 2010B).

Explanations on the groove (2049) of housing (2140) and thickness, length, and the first and second parts (2031A, 2031B) may be applied or applied mutatis mutandis to the cushioning portions (2010A, 2010B) of FIG. 63a.

FIG. 63b is a perspective view of a housing (2140) coupled with a cushioning stopper (2330) according to still another exemplary embodiment.

Referring to FIG. 63b, the cushioning stopper (2330) may be disposed on an outer lateral surface of corner portions (2142-1 to 2142-4) of housing (2140).

The corner portions (2142-1 to 2142-4) of housing (2140) may be formed with a groove in which the cushioning stopper (2330) is disposed or accommodated.

For example, the cushioning stopper (2330) may be overlapped with a support member (2220) toward a direction that is perpendicular to an optical axis and toward a direction from the optical axis to a corner portion of housing (2140).

The cushioning stopper (2330) may be disposed underneath a guide protruder (2146) of housing (2140).

The cushioning stopper (2330) may comprise at least one bent portion. For example, the cushioning stopper (2330) may comprise a body (2015a), a first extension portion (2015b) bent from one lateral of body (2015a) to any one lateral portion of housing (2140), and a second extension portion (2015c) bent from any other lateral of body (2015a) to any other lateral portion of housing (2140).

Explanations on the groove (2049) of housing (2140) and thickness, length, and the first and second parts (2031A, 2031B) explained in FIGS. 61 and 62 may be applied or applied mutatis mutandis to the cushioning stopper (2330) of FIG. 63b.

In another exemplary embodiment, the cushioning stopper (2310A to 2310D) may be omitted from FIG. 63b.

FIG. 64a is a schematic view of a cushioning stopper (2340) according to another exemplary embodiment, FIG. 64b is a cross-sectional view of a lens driving device disposed with a cushioning stopper (2340) of FIG. 64a to a CD direction of FIG. 47.

While the cushioning stopper (2310A to 2310D) of FIG. 49a is disposed on the housing (2140), the cushioning stopper (2340) of FIGS. 64a and 64b is not disposed on the housing (2140) but disposed on the cover member (2300).

For example, the cushioning stopper (2340) may be disposed on an inner surface (2302A, or inner lateral surface) of lateral plate (2302) of cover member (2300). The cushioning stopper (2340) may be attached or fixed to an inner surface (2302A, or inner lateral surface) of lateral plate (2302) of cover member (2300) by an adhesive member.

For example, an outer lateral surface of housing (2140) of FIG. 64a may be a plane surface not formed with a groove (2049) of FIG. 49a.

For example, the cushioning stopper (2340) may be interposed between an inner surface (2302A) of lateral plate (2302) of cover member (2300) and an outer lateral surface of housing (2140). For example, the cushioning stopper (2340), at an initial position of the OIS mover, may be mutually spaced apart at the cushioning stopper (2340) and the inner surface (2302A) of lateral plate (2302) of cover member (2300).

Each of the four lateral plates of cover member (2300) may be disposed with the cushioning stopper (2340). Explanations on the size, material, and shape of cushioning stopper (2310D) may be applied to and applied mutatis mutandis to the cushioning stopper (2340) of FIG. 64a.

Explanations on the cushioning stopper (2320, 2330) of FIGS. 63a and 63b may also be applied to or applied mutatis mutandis to the cushioning stopper (2340) of FIG. 64a. In another exemplary embodiment, a cushioning stopper may be disposed on an inner surface (or inner lateral) of corner region of cover member (2300) where the lateral plates of cover member (2300) meet.

FIG. 65a is a perspective view of a housing (2140) disposed with a cushioning stopper (2350) according to still another exemplary embodiment, and FIG. 65b is a cross-sectional view of a lens driving device disposed with a cushioning stopper (2340) of FIG. 65a to a CD direction of FIG. 47.

The stopper (2145) of FIG. 49a may be integrally formed with the housing (2140), and the stopper (2145) and the housing (2140) may be formed with the same material, whereas, in the exemplary embodiment of FIGS. 65a and 65b, a cushioning stopper (2350), instead of stopper (2145), may be disposed.

In order to prevent an inner surface of upper plate (2301) of cover member (2300) from directly colliding with an upper surface of housing (2140), the cushioning stopper (2350) may be protruded from an upper part, an upper end or an upper surface of housing (2140) to an optical axis direction.

The cushioning stopper (2350) may take a pillar shape, a polygonal shape (e.g., hexahedronal shape), a truncated cone shape, a truncated pyramid shape (e.g., a quadrangular pyramid, triangular pyramid, and the like), or cylindrical shape, but the present invention is not limited thereto.

For example, a diameter of cushioning stopper (2350) may gradually taper off from an upper surface of housing (2140) toward an inner surface direction of upper plate (2301) of cover member (2300), but the present invention is not limited thereto, and in another exemplary embodiment, the diameter of cushioning stopper (2350) may be constant or uniform.

Referring to FIG. 65b, the housing (2140) may be disposed with a groove (2035A) formed on an upper surface thereof, and the groove (2035A) may take a shape depressed from an upper surface of housing (2140).

The groove (2035A) may comprise a floor surface having a step with an upper surface of housing (2140) to an optical axis direction, and a lateral wall connecting the floor surface and the upper surface of housing (2140)

The cushioning stopper (2350) may comprise a first part disposed within the groove (2035A) of housing (2140), and a second part connected to the first part and protruded from the upper surface of housing (2140) to an upper lateral direction or to an optical axis direction. At this time, the second part of the cushioning stopper (2350) may protrude outside of the groove (2035A) of housing (2140).

The first part of cushioning stopper (2350) may fill the groove (2035A) and may abut the floor surface of groove (2035A) and the lateral wall.

For example, the cushioning stopper (2350) may be disposed on each upper surface of corner portions (2142-1 to 2142-4) of housing (2140), but the present invention is not limited thereto, and in another exemplary embodiment, the cushioning stopper (2350) may be disposed on a lateral portion of housing (2140).

The explanation on material of cushioning stopper (2310D) may be applied to or applied in mutatis mutandis to the cushioning stopper (2350). Furthermore, the explanation on the first part (2031A) and the second part (2031B) of cushioning stopper (2310D) may be applied to or applied in mutatis mutandis to the cushioning stopper (2350) of FIGS. 65a and 65b.

FIG. 66 is a cross-sectional view of a lens driving device disposed with a cushioning stopper (2360) to a CD direction of FIG. 47 according to still another exemplary embodiment.

While the cushioning stopper (2350) of FIGS. 65a and 65b may be disposed on the housing (2140), the cushioning stopper (2360) of FIG. 66 may be disposed on an inner surface of upper plate (2301) of cover member (2300) instead of the cushioning stopper (2350).

The housing (2140) of FIG. 66 may omit the cushioning stopper (2350) of FIGS. 65a and 65b, and an upper surface of plane surface may be disposed on the position where the cushioning stopper (2350) is omitted. For example, the upper surface of housing (2140) of FIG. 66 may be a plane surface not formed with the groove (2035A) of FIG. 65b.

The cushioning stopper (2360) of FIG. 66 may be disposed on an inner surface of cover member (2300) corresponding to the cushioning stopper (2350) of FIGS. 65a and 65b. For example, the cushioning stopper (2360) may be attached or fixed to an inner surface of upper plate (2301) of cover member (2300) by an adhesive member.

For example, the cushioning stopper (2360) may be interposed between an inner surface of upper plate (2301) of cover member (2300) and the upper surface of housing (2140). For example, at an initial position of the OIS mover, the cushioning stopper (2360) and the inner surface of upper plate (2301) of cover member (2300) may be mutually spaced apart.

The explanation of material and shape of cushioning stopper (2350) may be applied to or applied mutatis mutandis to cushioning stopper (2360) of FIG. 66.

The cushioning stoppers (2310A to 2310D) of FIG. 49a, the cushioning stopper (2320) of FIG. 63a, the cushioning stopper (2330) of FIG. 63b, and the cushioning stopper (2350) of FIG. 65a may be disposed on the OIS mover {e.g., housing (2140)}, and may absorb an external shock, or a shock caused by collision between OIS mover and the cover member (2300) during OIS driving, whereby the amount of shock received by the OIS mover can be absorbed to thereby prevent the OIS mover and the cover member (2300) from being damaged.

Furthermore, the grooves (2049, 2035A) for allowing the cushioning stoppers (2310A to 2310D, 2320, 2330, 2350) to be disposed or accommodated therein, or the accommodation portions are made to be disposed on the OIS mover {e.g., housing (2140)}, such that the cushioning stoppers are restricted from breaking away or being separated from the housing (2140) caused by shocks according to the exemplary embodiments.

Furthermore, the fixed portion of cover member (2300) is disposed with the cushioning stoppers (2340, 2360) according to the exemplary embodiments, shocks caused by collision between the OIS mover and the cover member (2300) can be absorbed, and as a result, the shocks received by the OIS mover can be reduced, thereby preventing damages of the OIS mover and the cover member (2300).

Meantime, the lens driving device according to the aforementioned exemplary embodiments may be used in various fields such as camera modules, optical apparatus and the like.

FIG. 67 is an exploded perspective view of a camera module (2200) according to a third exemplary embodiment of the present invention.

Referring to FIG. 67, the camera module may comprise a lens barrel (2400), a lens driving device (2100), an adhesive member (2612), a filter (2610), a first holder (2600), a second holder (2800), an image sensor (2810), a motion sensor (2820), a controller (2830) and a connector (2840). In another exemplary embodiment, at least one of the motion sensor (2820) and the controller (2830) may be omitted.

The lens barrel (2400) may be mounted on the bobbin (2110) of lens driving device (2100). The first holder (2600) may be disposed underneath the base (2210) of lens driving device (2100). The filter (2610) may be mounted on the first holder (2600), and may comprise a protruder (2500) accommodated by the filter (2610).

The adhesive member (2612) may attach or couple the base (2210) of lens driving device (2100) to the first holder (2600). The adhesive member (2710) may also function to prevent foreign objects from entering into the lens driving device (2100) in addition to the abovementioned adhesive role.

For example, the adhesive member (2612) may be epoxy, thermosetting adhesive, or UV thermosetting adhesive.

The filter (2610) may function to prevent a light of particular frequency band of lights that have passed the lens barrel (2400) from being incident on the image sensor (2810). The filter (2610) may be infrared cut-off filter, but the present invention is not limited thereto. At this time, the filter (2610) may be so disposed as to be parallel with an x-y plane.

An area of the first holder (2600) where the filter (2600) is mounted may be disposed with an opening to allow a filter (2610)-passed light to be incident on the image sensor (2810).

The second holder (2800) may be disposed underneath the first holder (2600) and the second holder (2600) may be mounted with an image sensor (2810). The image sensor (2810) may be an area where the light having passed the filter (2610) and having been incident thereon is captured as an image.

The second holder (2800) may be disposed with various circuits, elements, a controller and the like to transmit the image captured on the image sensor (2810) to be transformed to an electric signal and transmitted to an outside.

The second holder (2800) may be mounted with the image sensor and formed with a circuit pattern, and implemented as a circuit substrate coupled by various elements. The first holder (2600) may be expressed as a "holder" or a "sensor base" by being substituted as such, and the second holder (2800) may be expressed as a "substrate" or a "circuit substrate" by being substituted as such.

The image sensor (2810) may receive an image comprised in a light incident through the lens driving device (2100) and transform the received image to an electric signal.

The filter (2610) and the image sensor (2810) may be so disposed as to mutually face each other and be spaced apart to a first direction.

The motion sensor (2820) may be mounted on the second holder (2800), and electrically connected to the controller (2830) through a circuit substrate provided on the second holder (2800).

The motion sensor (2820) may output rotational angular velocity information in response to the motion of camera module (2200). The motion sensor (2820) may be embodied by a 2-axis or 3-axis gyro sensor or an angular velocity sensor.

The controller (2830) may be mounted on the second holder (2800), and may be electrically connected to a second position sensor (2240) of lens driving device (2100) and a second coil (2230).

For example, the second holder (2800) may be electrically connected to a circuit substrate (2250) of lens driving device (2100), and the controller (2830) mounted on the second holder (2800) may be electrically connected to a second position sensor (2240) and a second coil (2230) through the circuit substrate (2250).

The controller (2830) may transmit a clock signal (SCL), a data signal (SDA) and power signals (VDD, GND) for I2C communication with the first position sensor (2120), and may receive the clock signal (SCL) and the data signal (SDA) from the first position sensor (2170).

Furthermore, the controller (2830) may control a driving signal configured to perform a handshaking correction operation on the OIS mover of the lens driving device (2100) based on the output signal provided from the second position sensor (2240) of lens driving device (2100).

The connector (2840) may be electrically connected to the second holder (2800) and may be disposed with a port for being electrically connected to an external device.

Furthermore, the lens driving device (2100) according to an exemplary embodiment may be comprised within an optical apparatus purported to form an image of an object in a space using characteristics of lights comprising reflection, refraction, absorption, interference, diffraction and the like, to target to an increased vision of eyes, to record an image of a lens and to reproduce thereof, to perform an optical measurement and to transmit or propagate an image.

For example, the optical apparatus according to an exemplary embodiment may be a handphone, a portable phone, a smart phone, a portable smart device, a digital camera, a notebook computer (laptop computer), a digital broadcasting terminal, a PDA (Personal Digital Assistant), a PMP (Portable Multimedia Player), a navigation and the like, but the present invention is not limited thereto, and any device configured to photograph an image or a photograph may be used as an optical apparatus.

FIG. 68 is a perspective view of a portable terminal (2200A) according to a third exemplary embodiment of the present invention, and FIG. 69 is a block diagram of a portable terminal illustrated in FIG. 68.

Referring to FIGS. 68 and 69, the portable terminal (2200A, hereinafter referred to as "terminal") may comprise a body (2850), a wireless communication part (2710), an A/V input part (2720), a sensing part (2740), an input/output part (2750), a memory part (2760), an interface part (2770), a controller (2780) and a power supply part (2790).

Although the body (2850) illustrated in FIG. 68 takes a bar shape, the present invention is not limited thereto, and may comprise various structures comprising a slide type in which two more sub-bodies are relatively and movably coupled, a folder type, a swing type and a swivel type.

The body (2850) may comprise a case (casing, housing, cover and the like) that forms an external look thereof. For example, the body (2850) may be divided to a front case (2851) and a rear case (2852). Various electronic parts of a terminal may be internally comprised in a space formed between the front case (2851) and the rear case (2852).

The wireless communication part (2710) may be formed by comprising one or more modules configured to perform a wireless communication between a terminal (2200A) and a wireless communication system or between the terminal (2200A) and a network in which the terminal (2200A) is located. For example, the wireless communication part (2710) may be formed by comprising a broadcasting reception module (2711), a mobile communication module (2712), a wireless Internet module (2713), a short distance communication module (2714) and a position information module (2715).

The A/V (Audio/Video) input part (2720) is intended to perform an audio signal or video signal input and may comprise a camera (2721), a microphone (2722) and the like.

The camera (2721) may comprise a camera module (2200) according to an exemplary embodiment.

The sensing part (2740) may generate a sensing signal for controlling an operation of the terminal (2200A) by detecting a current state of the terminal (2200A) comprising, but not limited to, an open/closed state of terminal (2200A), a position of terminal (2200A), a user contact/non-contact, an azimuth of terminal (2200A), an acceleration/deceleration of terminal (2200A) and the like. For example, when the terminal (2200A) is of a slide phone type, the sensing part (2740) may sense a current state whether the slide phone is opened or closed. Furthermore, the sensing part (2740) may take charge of sensing functions related to the power supply of power supply part (2790) and coupling of external devices by the interface part (2770).

The input/output part (2750) may generate an input or an output related to visual, audio or tactile senses. The input/output part (2750) may generate an input data for operational control of terminal (2200A), and display information processed by the terminal (2200A).

The input/output part (2750) may comprise a key pad part (2730), a display module (2751), a sound output module (2752) and a touch screen panel (2753). The key pad part (2730) may generate an input data by key pad input.

The display module (2751) may comprise a plurality of pixels in which colors are changed by an electric signal. For example, the display module (2751) may comprise any one of a liquid crystal display, a thin film transistor-liquid crystal display, an organic light-emitting diode, a flexible display, and a 3D display.

The sound output module (2752) may output an audio data received from the wireless communication part (2710) under a call signal reception, a communication mode, a recording mode, a voice recognition mode or a broadcasting reception mode, or output an audio data stored in the memory part (2760).

The touch screen panel (2753) may transform the capacitance changes generated from a user touch on a particular region of touch screen to an electric input signal.

The memory part (2760) may be stored with a program for processing and controlling of the controller (2780), and may temporarily store the input/output data (e.g., telephone number directory, message, audio, still image, photograph, video and the like). For example, the memory part (2760) may store an image captured by a camera (2721), such as a photograph or a video.

The interface part (2770) may function as a path role of being connected to an external device connected to the terminal (2200A). The interface part (2770) may receive a data or a power from an external device and transmit the same to each element inside the terminal (2200A) or allow the data inlateral the terminal (2200A) to be transmitted to an external device. For example, the interface part (2770) may comprise a wired/wireless headset port, an external charging port, a wired/wireless data port, a memory card port, a port connecting a device formed with a recognition module, an audio I/O (Input/Output) port, a video I/O (Input/Output) port, an earphone port, and the like.

The controller (2780) may control an overall operation of a terminal (2200A). For example, the controller (2780) may perform the control and process related to voice communication, data communication, video communication and the like.

The controller (2780) may comprise a multimedia module (2781) for multimedia reproduction. The multimedia module (2781) may be embodied within the controller (2180), and may be embodied separately from the controller (2780).

The controller (2780) may perform a pattern recognition process capable of recognizing a writing input or picture drawing input performed on a touch screen as text and image.

The controller (2780) of an optical apparatus (2200A) replacing the controller (2830) of a camera module (2200) may perform the role of the controller (2830) of a camera module (2200).

The power supply part (2790) may receive an external power or internal power in response to control of the controller (2780) and supply the power to each element necessary for operation of the same.

The characteristics, structures and effects explained in the hitherto exemplary embodiments may be comprised in at least one of the exemplary embodiments of the present invention, but it should be noted that the said characteristics, structures and effects are not comprised only in one exemplary embodiment. Furthermore, the said characteristics, structures and effects exemplified in each exemplary embodiment may be implemented by being combined or transformed even in other exemplary embodiments by those skilled in the art. Thus, content related to the said combination and transformation should be interpreted as being comprised within the scope of the present invention.

The invention claimed is:
1. A lens driving device comprising:
a base;
a housing spaced apart from the base;
a bobbin disposed in the housing;
a first magnet disposed on the housing;
a first coil disposed on the bobbin and facing the first magnet;
a first substrate disposed between the base and the housing and comprising a second coil facing the first magnet;
an upper elastic member connecting the housing and the bobbin;
a lateral elastic member connecting the first substrate and the upper elastic member;
a second magnet disposed on the bobbin;
a second substrate having a length extending in an optical axis direction; and
a sensor configured to detect the second magnet and disposed on the second substrate,
wherein the bobbin comprises a recess disposed with the second magnet,
wherein the upper elastic member comprises an inner portion coupled with the bobbin, an outer portion coupled with the housing, and a connection portion connecting the inner portion and the outer portion,
wherein the inner portion comprises a first region overlapped with the second magnet in the optical axis direction,
wherein the second substrate comprises a plurality of upper terminals, and a groove formed between the plurality of upper terminals, and
wherein a portion of the upper elastic member passes through the groove of the second substrate and is connected with the upper terminal of the second substrate.

2. The lens driving device of claim 1, wherein the first region is a region comprising a distal end of one side of the inner portion, and
wherein the first region is overlapped with at least 90% of an upper surface of the second magnet in the optical axis direction.

3. The lens driving device of claim 1, wherein the upper elastic member comprises a groove formed on the first region, and
wherein the groove of the upper elastic member is overlapped with the second magnet in the optical axis direction.

4. The lens driving device of claim 1, comprising a cover coupled with the base,
wherein the cover is overlapped with an entire area of the recess of the bobbin in the optical axis direction.

5. The lens driving device of claim 1, wherein the first region is overlapped with an entire area of an upper surface of the second magnet.

6. The lens driving device of claim 1, wherein the first region comprises a portion having a largest width among the inner portion.

7. The lens driving device of claim 1, wherein the bobbin comprises a groove formed below the first region, and
wherein the groove is connected to the recess of the bobbin.

8. The lens driving device of claim 1, wherein the first region of the upper elastic member extends from the inner portion of the upper elastic member in a direction opposite to an extending direction of the connection portion of the upper elastic member.

9. The lens driving device of claim 1, wherein the first region of the upper elastic member covers an upper surface of the second magnet when viewed from above.

10. The lens driving device of claim 1, wherein, in the optical axis direction, a gap is formed between the first region of the upper elastic member and the second magnet.

11. The lens driving device of claim 1, wherein the plurality of upper terminals comprises first to fourth terminals,
wherein the third terminal and the fourth terminal are disposed between the first terminal and the second terminal,
wherein the groove comprises a first groove formed between the first terminal and the third terminal, and a second groove formed between the second terminal and the fourth terminal, and
wherein the upper elastic member further comprises a first upper elastic unit passing through the first groove and connected with the third terminal, and a second upper elastic unit passing through the second groove and connected with the fourth terminal.

12. The lens driving device of claim 1, wherein the inner portion comprises a hole coupled with the bobbin,
wherein the first region is disposed at one side of the hole,
wherein the first region comprises a distal end most distantly disposed from the hole, and
wherein the distal end of the first region is more adjacently disposed to the hole than to the connection portion.

13. The lens driving device of claim 12, wherein the distal end of the first region is more distantly disposed from the connection portion than from the hole.

14. The lens driving device of claim 12, wherein the distal end of the first region does not abut the connection portion.

15. The lens driving device of claim 12, wherein the bobbin comprises a protrusion coupled to the hole, and
wherein the first region is disposed at one side of the protrusion and the distal end of the first region is farthest from the protrusion.

16. The lens driving device of claim 12, wherein the first region is disposed adjacent to the hole.

17. A camera device, comprising:
a printed circuit board;
an image sensor disposed on the printed circuit board;
the lens driving device of claim 11; and
a lens coupled to the bobbin of the lens driving device.

18. An optical apparatus, comprising:
a main body;
the camera device of claim 17 disposed on the main body; and
a display disposed on the main body and outputting an image photographed by the camera device.

19. A lens driving device comprising:
a bobbin;
a first coil disposed on the bobbin;
a first magnet facing the first coil;
an upper elastic member connected to the bobbin;
a second magnet disposed on the bobbin;
a substrate having a length extending in an optical axis direction; and
a sensor configured to detect the second magnet and disposed on the substrate,
wherein the bobbin comprises a recess disposed with the second magnet, wherein the bobbin is opened at a portion corresponding to an upper surface of the second magnet by the recess of the bobbin, wherein the upper elastic member comprises an inner portion coupled with the bobbin, an outer portion disposed at an outer lateral of the inner portion, a connection portion connecting the inner portion and the outer portion, and a first region extending from the inner portion and covering the upper surface of the second magnet when viewed from above, wherein the substrate comprises a plurality of upper terminals, and a groove formed between the plurality of upper terminals, and wherein a portion of the upper elastic member passes through the groove of the substrate and is connected with the upper terminal of the substrate.

20. A lens driving device comprising:

a base;

a housing spaced apart from the base;

a bobbin disposed in the housing;

a first magnet disposed on the housing;

a first coil disposed on the bobbin and facing the first magnet;

a first substrate disposed between the base and the housing and comprising a second coil facing the first magnet;

an upper elastic member connecting the housing and the bobbin;

a lateral elastic member connecting the first substrate and the upper elastic member;

a second magnet disposed on the bobbin;

a second substrate having a length extending in an optical axis direction; and a sensor configured to detect the second magnet, wherein the upper elastic member is disposed on an upper surface of the bobbin, wherein the bobbin comprises a recess disposed with the second magnet, wherein the upper surface of the bobbin is opened at a portion corresponding to an upper surface of the second magnet by the recess of the bobbin, wherein the upper elastic member comprises a first region overlapping the second magnet in the optical axis direction, wherein an adhesive is disposed between the first region of the upper elastic member and the upper surface of the second magnet, wherein the second substrate comprises a plurality of upper terminals, and a groove formed between the plurality of upper terminals, and wherein a portion of the upper elastic member passes through the groove of the second substrate and is connected with the upper terminal of the substrate.

* * * * *